(12) United States Patent
Sinai et al.

(10) Patent No.: US 7,930,182 B2
(45) Date of Patent: Apr. 19, 2011

(54) COMPUTER-IMPLEMENTED TOOL FOR CREATION OF SPEECH APPLICATION CODE AND ASSOCIATED FUNCTIONAL SPECIFICATION

(75) Inventors: Julian Sinai, Palo Alto, CA (US); James E. White, Kaneohe, HI (US); Richard B. Unger, Menlo Park, CA (US); R. Douglas Sharp, Palo Alto, CA (US); James M. Riseman, San Francisco, CA (US); Eylon Stroh, San Carlos, CA (US)

(73) Assignee: Nuance Communications, Inc., Burlington, MA (US)

( * ) Notice: Subject to any disclaimer, the term of this patent is extended or adjusted under 35 U.S.C. 154(b) by 1118 days.

(21) Appl. No.: 11/376,658

(22) Filed: Mar. 14, 2006

(65) Prior Publication Data

US 2006/0212841 A1    Sep. 21, 2006

Related U.S. Application Data

(60) Provisional application No. 60/662,490, filed on Mar. 15, 2005, now abandoned.

(51) Int. Cl.
*G10L 15/00* (2006.01)
*G10L 21/00* (2006.01)
*G06F 17/24* (2006.01)

(52) U.S. Cl. ......... 704/270; 704/231; 715/238; 717/108
(58) Field of Classification Search ................. 704/270
See application file for complete search history.

(56) References Cited

U.S. PATENT DOCUMENTS

| | | | | |
|---|---|---|---|---|
| 6,058,166 A * | 5/2000 | Osder et al. | ................ | 379/88.22 |
| 6,115,711 A * | 9/2000 | White | ............................ | 707/10 |
| 6,173,266 B1 * | 1/2001 | Marx et al. | ..................... | 704/270 |
| 7,140,004 B1 * | 11/2006 | Kunins et al. | ..................... | 717/125 |
| 7,143,039 B1 * | 11/2006 | Stifelman et al. | ............. | 704/270 |
| 2004/0049737 A1 * | 3/2004 | Hunt et al. | ..................... | 715/513 |
| 2005/0177817 A1 * | 8/2005 | Arcaro et al. | ................. | 717/108 |
| 2005/0228668 A1 * | 10/2005 | Wilson et al. | ................. | 704/256 |
| 2006/0155526 A1 * | 7/2006 | Castillo et al. | .................... | 704/1 |
| 2006/0215824 A1 * | 9/2006 | Mitby et al. | ............. | 379/100.05 |

* cited by examiner

*Primary Examiner* — Justin W Rider
(74) *Attorney, Agent, or Firm* — Michael A. Glenn; Glenn Patent Group

(57) ABSTRACT

A machine-implemented method of building a speech application includes generating a graphical user interface to enable a user to create and edit a speech application, and receiving user inputs directed to the graphical user interface, where the user inputs specify a set of dialog flows representing the speech application. The method further includes, based on the user inputs, automatically generating executable code representing the speech application and a functional specification document describing the speech application.

27 Claims, 208 Drawing Sheets

Table of Contents

*\* To update the Table of Contents press CTRL-a and then press F9* main      3

1 DOCUMENT OVERVIEW     3
   1.1 REVISION HISTORY     3
   1.2 TYPOGRAPHICAL CONVENTIONS     3
   1.3 DIALOG STATE FORMAT     3
2 APPLICATION SUMMARY     3
   2.1 FUNCTIONALITY AND FEATURES     3
   2.2 USERS     5
   2.3 PERSONA     5
   2.4 VARIABLE DEFINITIONS     5
3 DIALOG FLOW     6
   3.1 UNIVERSAL BEHAVIORS     6
      3.1.1 *Universal Actions*     6
      3.1.2 *Universal Error Handling*     7
4 DIALOG STATES     8
   4.1 Start Page Information     8
   4.2 Start#Welcome     9
   4.3 Start#TransactionType     10
   4.4 CleanUpAndExit Page Information     12
   4.5 CleanUpAndExit#sayGoodbye     13
   4.6 CleanUpAndExit#hangup     14
5 APPENDICES     15
   5.1 GRAMMAR AND SLOT DEFINITIONS     15
   5.2 PROMPT LIST     16

FIG. 3-1

3 Dialog Flow

3.1 Universal Behaviors

Certain capabilities and behaviors are available in all dialog states, unless otherwise specified. These are called 'Universals.'

3.1.1 Universal Actions

The 'Universal Actions' grammar is active in all states that have recognition. This grammar is typically used to allow callers to ask for help, repeat prompts, or transfer to an operator. Examples of expressions and corresponding universal NL slot fill values are shown in the table below. The following table shows the universals available with the Nuance Voice Platform. These aren't necessarily active in this application.

| Universal Values | Sample Phrases |
|---|---|
| cancel | 'cancel'<br>'go back' |
| exit | 'exit'<br>'goodbye' |
| help | 'help'<br>'I need help' |
| mainmenu | 'main menu'<br>'start over' |
| operator | 'Service Representative'<br>'I want to talk with an operator'<br>'agent' |
| repeat | 'repeat' |

The following table shows the universal behaviors specified in this application.

| Universal Type | Action | Goto |
|---|---|---|
| help | Okay, here's some help.<br><br>Details:<br><br>help_universal "Okay, here's some help." | Continue with recognition in the state in which the universal was spoken. |
| repeat<br>AND (_previousBehavior == undefined) | | Continue with recognition in the state in which the universal was spoken. |
| repeat<br>AND (_previousBehavior != undefined) | | Throw the event:<br>_previousBehavior |
| operator | I'm sorry, there are no representatives available.<br><br>Details:<br><br>operator_universal "I'm sorry, there are no representatives available." | Continue with recognition in the state in which the universal was spoken. |
| exit | | CleanUpAndExit#sayGoodbye |

FIG. 3-2

4 Dialog States

This section provides details of the system behavior in each dialog state.

4.1 Start Page Information

4.1.1 Description

4.1.2 Page Variables

There are no variables defined for this page.

4.1.3 Call Flow

4.2 Start#Welcome

4.2.1 Description

Plays a welcome prompt to the user

*(This is a non-recognition processing state.)*

4.2.2 Special Features

4.2.3 Entry and Exit States

| Entry States | Exit States |
|---|---|
| -- | Start#TransactionType |

4.2.4 Actions

| Condition | Action | Goto |
|---|---|---|
| -- | Welcome<br><br>Details:<br><br>Start_Welcome "Welcome" | Start#TransactionType |

FIG. 3-4

4.3 Start#TransactionType

4.3.1 Description

Asks the caller if he wants to hear his balance or transfer money

*(This is a recognition state.)*

4.3.2 Special Features

4.3.3 Entry and Exit States

| Entry States | Exit States |
|---|---|
| Start#Welcome | CleanUpAndExit#sayGoodbye |

4.3.4 Pre-rec Prompts

| Type and Condition | Action |
|---|---|
| Entry Type = initial | Would you like to hear your balance or transfer money?<br><br>Details:<br><br>TransactionType_init "Would you like to hear your balance or transfer money?" |

4.3.5 Grammar: Start_recognition.gsl

| NL Slots | Values |
|---|---|
| <transactionslot> | "balance", "transfer", |

| Sample Phrases | Slots Filled |
|---|---|
| "please tell me my balance" | <transactionslot "balance"> |
| "my balance please" | <transactionslot "balance"> |
| "i want to transfer money" | <transactionslot "transfer"> |

4.3.6 Actions

| Condition | Action | Goto |
|---|---|---|
| -- | | CleanUpAndExit#sayGoodbye |

4.3.7 Error Behaviors

| Error Type | Action | Goto |
|---|---|---|
| WHEN ( COUNT = 1 )<br>nomatch noinput<br>maxspeechtimeout | Unspecified prompt<br><br>Details:<br><br>(missing prompt file) "Unspecified prompt" | Continue with rec in this state. |
| WHEN ( COUNT = 2 )<br>nomatch noinput<br>maxspeechtimeout | Unspecified prompt<br><br>Details:<br><br>(missing prompt file) "Unspecified | Continue with rec in this state. |

FIG 3-5

```
<?xml version="1.0"?>
<xs:schema
     xmlns="http://www.nuance.com/psxml"
     xmlns:jaxb="http://java.sun.com/xml/ns/jaxb"
     xmlns:xs="http://www.w3.org/2001/XMLSchema"
     targetNamespace="http://www.nuance.com/psxml"
     elementFormDefault="qualified"
     jaxb:version="1.0">

<xs:annotation>
       <xs:appinfo>
          <jaxb:schemaBindings>
             <jaxb:nameXmlTransform>
                <jaxb:elementName suffix="Element"/>
             </jaxb:nameXmlTransform>
          </jaxb:schemaBindings>
       </xs:appinfo>
    </xs:annotation>

<xs:import namespace="http://www.w3.org/XML/1998/namespace"
schemaLocation="http://www.w3.org/2001/xml.xsd"/>

<xs:element name="action">
       <xs:complexType>
          <xs:sequence>
             <xs:element ref="service"/>
             <xs:element ref="operation"/>
             <xs:element ref="inputs"/>
             <xs:element ref="outputs"/>
             <xs:element name="description" type="xs:string" minOccurs="0"/>
          </xs:sequence>
       </xs:complexType
    </xs:element>

<xs:element name="annotation">
       <xs:complexType>
          <xs:sequence>
             <xs:element ref="graphics" minOccurs="0"/>
          </xs:sequence>
          <xs:attribute name="text" type="xs:string" use="required"/>
       </xs:complexType>
    </xs:element>

<xs:element name="application-summary">
       <xs:complexType>
          <xs:sequence>
```

FIG. 9-1

```xml
        <xs:element name="description" type="xs:string" minOccurs="0"/>
        <xs:element ref="users" minOccurs="0"/>
        <xs:element ref="persona" minOccurs="0"/>
      </xs:sequence>
    </xs:complexType>
</xs:element>

<xs:element name="assign">
    <xs:complexType>
      <xs:sequence>
        <xs:element name="description" type="xs:string" minOccurs="0"/>
        <xs:element ref="lhs"/>
        <xs:element ref="rhs"/>
      </xs:sequence>
    </xs:complexType>
</xs:element>

<xs:element name="audio-file-expr">
    <xs:complexType>
      <xs:sequence minOccurs="0">
        <xs:element ref="tts"/>
      </xs:sequence>
      <xs:attribute name="expr" type="xs:string"/>
      <xs:attribute name="expr-gen" type="xs:string"/>
      <xs:attribute name="offsetexpr" type="xs:string"/>
      <xs:attribute name="offsetexpr-gen" type="xs:string"/>
    </xs:complexType>
</xs:element>

<xs:element name="audio-file-ref">
    <xs:complexType>
      <xs:attribute name="name" type="xs:string"/>
    </xs:complexType>
</xs:element>

<xs:element name="audio-value-expr">
    <xs:complexType>
      <xs:sequence minOccurs="0">
        <xs:element ref="tts"/>
      </xs:sequence>
      <xs:attribute name="expr" type="xs:string"/>
      <xs:attribute name="expr-gen" type="xs:string"/>
      <xs:attribute name="offsetexpr" type="xs:string"/>
      <xs:attribute name="offsetexpr-gen" type="xs:string"/>
    </xs:complexType>
</xs:element>
```

FIG. 9-2

```xml
<xs:element name="bounds">
  <xs:complexType>
    <xs:attribute name="x" type="xs:int"/>
    <xs:attribute name="y" type="xs:int"/>
    <xs:attribute name="width" type="xs:int"/>
    <xs:attribute name="height" type="xs:int"/>
  </xs:complexType>
</xs:element>

<xs:element name="business-rule">
  <xs:complexType>
    <xs:simpleContent>
      <xs:extension base="xs:string">
        <xs:attribute name="condition" type="xs:string" use="required"/>
        <xs:attribute name="condition-gen" type="xs:string"/>
      </xs:extension>
    </xs:simpleContent>
  </xs:complexType>
</xs:element>

<xs:complexType name="conditional">
  <xs:sequence>
    <xs:element ref="simple-expression" minOccurs="0"/>
  </xs:sequence>
  <xs:attribute name="condition" type="xs:string"/>
</xs:complexType>

<xs:element name="container-declarations">
  <xs:complexType>
    <xs:sequence>
      <xs:sequence minOccurs="0" maxOccurs="unbounded"> <!-- For table/list copy/cut/paste -->
        <xs:element ref="variable"/>
      </xs:sequence>
      <xs:element ref="properties" minOccurs="0"/>
      <xs:element ref="script" minOccurs="0"/>
    </xs:sequence>
  </xs:complexType>
</xs:element>

<xs:element name="context-file">
  <xs:complexType>
    <xs:attribute name="id" type="xs:string"/>
  </xs:complexType>
</xs:element>
```

FIG. 9-3

```xml
<xs:element name="cti-end-session">
   <xs:complexType>
      <xs:attribute name="reason" type="xs:string"/>
   </xs:complexType>
</xs:element>

<xs:element name="cti-extract">
   <xs:complexType>
      <xs:attribute name="ctisrc" type="xs:string" use="required"/>
      <xs:attribute name="vafdest" type="xs:string" use="required"/>
      <xs:attribute name="description" type="xs:string"/>
   </xs:complexType>
</xs:element>

<xs:element name="cti-insert">
   <xs:complexType>
      <xs:attribute name="vafsrc" type="xs:string" use="required"/>
      <xs:attribute name="ctidest" type="xs:string" use="required"/>
      <xs:attribute name="description" type="xs:string"/>
   </xs:complexType>
</xs:element>

<xs:element name="cti-interaction">
   <xs:complexType>
      <xs:sequence>
         <xs:element name="description" type="xs:string" minOccurs="0"/>
         <xs:sequence minOccurs="0" maxOccurs="unbounded"> <!-- For table/list copy/cut/paste -->
            <xs:element ref="cti-new-session"/>
         </xs:sequence>
         <xs:sequence minOccurs="0" maxOccurs="unbounded"> <!-- For table/list copy/cut/paste -->
            <xs:element ref="cti-insert"/>
         </xs:sequence>
         <xs:sequence minOccurs="0" maxOccurs="unbounded"> <!-- For table/list copy/cut/paste -->
            <xs:element ref="cti-extract"/>
         </xs:sequence>
         <xs:sequence minOccurs="0" maxOccurs="unbounded"> <!-- For table/list copy/cut/paste -->
            <xs:element ref="cti-end-session"/>
         </xs:sequence>
         <xs:sequence minOccurs="0" maxOccurs="unbounded"> <!-- For table/list copy/cut/paste -->
            <xs:element ref="cti-query-session"/>
```

FIG. 9-4

```
            </xs:sequence>
            <xs:sequence minOccurs="0" maxOccurs="unbounded"> <!-- For table/list
copy/cut/paste -->
               <xs:element ref="cti-transfer"/>
            </xs:sequence>
         </xs:sequence>
         <xs:attribute name="name" type="xs:string" use="required"/>
         <xs:attribute name="cti-info" type="xs:boolean" default="false"/>
      </xs:complexType>
   </xs:element>

<xs:element name="cti-new-session">
      <xs:complexType>
         <xs:sequence>
            <xs:element name="description" type="xs:string" minOccurs="0"/>
         </xs:sequence>
         <xs:attribute name="dialed-number" type="xs:string" use="required"/>
      </xs:complexType>
   </xs:element>

<xs:element name="cti-query-session">
      <xs:complexType>
         <xs:attribute name="status" type="xs:string" use="required"/>
         <xs:attribute name="ced" type="xs:string"/>
      </xs:complexType>
   </xs:element>

<xs:element name="cti-transfer">
      <xs:complexType>
         <xs:attribute name="type" use="required">
            <xs:simpleType>
               <xs:restriction base="xs:string">
                  <xs:enumeration value="fast"/>
                  <xs:enumeration value="consultation"/>
               </xs:restriction>
            </xs:simpleType>
         </xs:attribute>
         <xs:attribute name="destination" type="xs:string" use="required"/>
         <xs:attribute name="location" type="xs:string"/>
      </xs:complexType>
   </xs:element>

<xs:element name="data-access">
      <xs:complexType>
         <xs:sequence>
```

FIG. 9-5

```xml
            <xs:sequence minOccurs="0" maxOccurs="unbounded"> <!-- For table/list copy/cut/paste -->
                <xs:element ref="action"/>
            </xs:sequence>
        </xs:sequence>
    </xs:complexType>
</xs:element>

<xs:element name="decision-state">
    <xs:complexType>
        <xs:complexContent>
            <xs:extension base="dialog-state">
                <xs:sequence>
                    <xs:sequence minOccurs="0" maxOccurs="unbounded"> <!-- For table/list copy/cut/paste -->
                        <xs:element ref="dialog-action"/>
                    </xs:sequence>
                </xs:sequence>
            </xs:extension>
        </xs:complexContent>
    </xs:complexType>
</xs:element>

<xs:element name="developer">
    <xs:complexType>
        <xs:attribute name="name" type="xs:string" use="required"/>
    </xs:complexType>
</xs:element>

<xs:element name="dialog-action">
    <xs:complexType>
        <xs:complexContent>
            <xs:extension base="conditional">
                <xs:sequence>
                    <xs:element name="description" type="xs:string" minOccurs="0"/>
                    <xs:element ref="graphics" minOccurs="0"/>
                    <xs:choice minOccurs="0" maxOccurs="unbounded">
                        <xs:annotation>
                            <xs:appinfo>
                                <jaxb:property name="step"/>
                            </xs:appinfo>
                        </xs:annotation>
                        <xs:element ref="assign"/>
                        <xs:element ref="log"/>
                        <xs:element ref="prompt"/>
                        <xs:element ref="script"/>
```

FIG. 9-6

```
            <xs:element ref="send"/>
            <xs:element ref="taskbegin"/>
            <xs:element ref="taskend"/>
          </xs:choice>
          <xs:choice minOccurs="0">
            <xs:annotation>
              <xs:appinfo>
                <jaxb:property name="termination"/>
              </xs:appinfo>
            </xs:annotation>
            <xs:element ref="goto"/>
            <xs:element ref="repeat"/>
            <xs:element ref="return"/>
            <xs:element ref="submit"/>
            <xs:element ref="throw"/>
          </xs:choice>
        </xs:sequence>
        <xs:attribute name="id" type="xs:string" default=""/>
        <!-- The "target-id" attribute is for application and container references. -->
        <xs:attribute name="target-id" type="xs:int" default="-1"/>
      </xs:extension>
    </xs:complexContent>
  </xs:complexType>
</xs:element>

<xs:complexType name="dialog-state" abstract="true">
  <xs:sequence>
    <xs:element ref="graphics" minOccurs="0"/>
    <xs:element name="description" type="xs:string" minOccurs="0"/>
    <xs:element name="special" type="xs:string" minOccurs="0"/>
  </xs:sequence>
  <xs:attribute name="name" type="xs:string" use="required"/>
</xs:complexType>

<xs:element name="digitstring-state">
  <xs:complexType>
    <xs:complexContent>
      <xs:extension base="dialog-state">
        <xs:sequence>
          <xs:element ref="properties" minOccurs="0"/>
          <xs:element ref="pre-recognition" minOccurs="0"/>
          <xs:sequence minOccurs="0" maxOccurs="unbounded"> <!-- For table/list copy/cut/paste -->
            <xs:element ref="universal-behavior"/>
          </xs:sequence>
```

FIG. 9-7

```
            <xs:sequence minOccurs="0" maxOccurs="unbounded"> <!-- For table/list
copy/cut/paste -->
                <xs:element ref="error-behavior"/>
            </xs:sequence>
            <xs:sequence minOccurs="0" maxOccurs="unbounded"> <!-- For table/list
copy/cut/paste -->
                <xs:element ref="dialog-action"/>
            </xs:sequence>
          </xs:sequence>
          <xs:attribute name="timeout" type="xs:string"/>
          <xs:attribute name="termkeys" type="xs:string"/>
          <xs:attribute name="minlength" type="xs:int" default="1"/>
          <xs:attribute name="maxlength" type="xs:int" default="1"/>
        </xs:extension>
      </xs:complexContent>
    </xs:complexType>
  </xs:element>

<xs:element name="dtmf-audio">
    <xs:complexType>
      <xs:attribute name="expr" type="xs:string"/>
      <xs:attribute name="expr-gen" type="xs:string"/>
    </xs:complexType>
  </xs:element>

<xs:element name="dtmf-state">
    <xs:complexType>
      <xs:complexContent>
        <xs:extension base="dialog-state">
          <xs:sequence>
            <xs:element ref="properties" minOccurs="0"/>
            <xs:element ref="pre-recognition" minOccurs="0"/>
            <xs:sequence minOccurs="0" maxOccurs="unbounded"> <!-- For table/list
copy/cut/paste -->
                <xs:element ref="universal-behavior"/>
            </xs:sequence>
            <xs:sequence minOccurs="0" maxOccurs="unbounded"> <!-- For table/list
copy/cut/paste -->
                <xs:element ref="error-behavior"/>
            </xs:sequence>
            <xs:sequence minOccurs="0" maxOccurs="unbounded"> <!-- For table/list
copy/cut/paste -->
                <xs:element ref="dialog-action"/>
            </xs:sequence>
          </xs:sequence>
          <xs:attribute name="timeout" type="xs:string"/>
```

FIG. 9-8

```xml
            <xs:attribute name="termkeys" type="xs:string"/>
          </xs:extension>
        </xs:complexContent>
      </xs:complexType>
    </xs:element>

<xs:element name="enum">
      <xs:complexType>
        <xs:attribute name="value" type="xs:string" use="required"/>
      </xs:complexType>
    </xs:element>

<xs:element name="error-behavior">
      <xs:complexType>
        <xs:complexContent>
          <xs:extension base="IBehavior">
            <xs:attribute name="type" type="xs:NMTOKENS"/>
            <xs:attribute name="count" type="xs:int"/>
          </xs:extension>
        </xs:complexContent>
      </xs:complexType>
    </xs:element>

<xs:element name="escape-state">
      <xs:complexType>
        <xs:complexContent>
          <xs:extension base="dialog-state">
            <xs:sequence>
              <xs:sequence minOccurs="0" maxOccurs="unbounded"> <!-- For table/list copy/cut/paste -->
                <xs:element ref="param"/>
              </xs:sequence>
              <xs:sequence minOccurs="0" maxOccurs="unbounded"> <!-- For table/list copy/cut/paste -->
                <xs:element ref="output"/>
              </xs:sequence>
              <xs:element ref="post-recognition" minOccurs="0"/>
              <xs:sequence minOccurs="0" maxOccurs="unbounded"> <!-- For table/list copy/cut/paste -->
                <xs:element ref="error-behavior"/>
              </xs:sequence>
            </xs:sequence>
            <xs:attribute name="src" type="xs:string"/>
          </xs:extension>
        </xs:complexContent>
      </xs:complexType>
```

FIG. 9-9

```
</xs:element>

<xs:complexType name="expression">
  <xs:attribute name="advanced" type="xs:boolean" default="true"/>
  <xs:attribute name="category" type="xs:string"/>
  <xs:attribute name="expr" type="xs:string"/>
  <xs:attribute name="expr-gen" type="xs:string"/>
</xs:complexType>

<xs:element name="generic-container">
  <xs:complexType>
    <xs:sequence>
      <xs:element name="description" type="xs:string" minOccurs="0"/>
      <xs:element ref="container-declarations" minOccurs="0"/>
      <xs:choice minOccurs="0" maxOccurs="unbounded">
        <xs:annotation>
          <xs:appinfo>
            <jaxb:property name="state"/>
          </xs:appinfo>
        </xs:annotation>
        <xs:element ref="decision-state"/>
        <xs:element ref="digitstring-state"/>
        <xs:element ref="dtmf-state"/>
        <xs:element ref="escape-state"/>
        <xs:element ref="processing-state"/>
        <xs:element ref="recognition-state"/>
        <xs:element ref="record-state"/>
        <xs:element ref="subdialog-state"/>
        <xs:element ref="terminate-state"/>
        <xs:element ref="transfer-state"/>
        <xs:element ref="vaf-state"/>
      </xs:choice>
      <xs:element ref="annotation" minOccurs="0" maxOccurs="unbounded"/>
    </xs:sequence>
    <xs:attribute name="name" type="xs:string" use="required"/>
    <xs:attribute name="id" type="xs:long" use="required"/>
    <xs:attribute name="initial-state" type="xs:string" use="required"/>
    <xs:attribute name="lang" type="xs:string"/><!-- Not exposed in GUI; see NUAN00015150 -->
  </xs:complexType>
</xs:element>

<xs:element name="global-information">
  <xs:complexType>
    <xs:sequence>
      <xs:element ref="application-summary" minOccurs="0"/>
```

FIG. 9-10

```
            <xs:sequence minOccurs="0" maxOccurs="unbounded"> <!-- For table/list
copy/cut/paste -->
                <xs:element ref="developer"/>
            </xs:sequence>
            <xs:element ref="properties" minOccurs="0"/>
            <xs:sequence minOccurs="0" maxOccurs="unbounded"> <!-- For table/list
copy/cut/paste -->
                <xs:element ref="variable"/>
            </xs:sequence>
            <xs:sequence minOccurs="0" maxOccurs="unbounded"> <!-- For table/list
copy/cut/paste -->
                <xs:element ref="vaf-variable"/>
            </xs:sequence>
            <xs:element ref="script" minOccurs="0"/>
            <xs:sequence minOccurs="0" maxOccurs="unbounded"> <!-- For table/list
copy/cut/paste -->
                <xs:element ref="universal"/>
            </xs:sequence>
            <xs:sequence minOccurs="0" maxOccurs="unbounded"> <!-- For table/list
copy/cut/paste -->
                <xs:element ref="universal-behavior"/>
            </xs:sequence>
            <xs:sequence minOccurs="0" maxOccurs="unbounded"> <!-- For table/list
copy/cut/paste -->
                <xs:element ref="error-behavior"/>
            </xs:sequence>
            <xs:element ref="revision-history" minOccurs="0"/>
            <xs:sequence minOccurs="0" maxOccurs="unbounded"> <!-- For table/list
copy/cut/paste -->
                <xs:element ref="server-side-error"/>
            </xs:sequence>
        </xs:sequence>
        <xs:attribute name="customer" type="xs:string"/>
        <xs:attribute name="partner" type="xs:string"/>
        <xs:attribute name="company-name" type="xs:string"/>
        <xs:attribute name="application-version" type="xs:string"/>
        <xs:attribute name="initial-container" type="xs:string"/>
        <xs:attribute ref="xml:lang"/>
    </xs:complexType>
</xs:element>

<xs:element name="goto">
    <xs:complexType>
        <xs:complexContent>
            <xs:extension base="termination">
                <xs:attribute name="state" type="xs:string" default=""/>
```

FIG. 9-11

```xml
<xs:attribute name="container" type="xs:string" default=""/>
<xs:attribute name="url" type="xs:string" default=""/>
            <xs:attribute name="flavour" default="page or state">
                <xs:simpleType>
                    <xs:restriction base="xs:string">
                        <xs:enumeration value="page or state"/>
                        <xs:enumeration value="url"/>
                        <xs:enumeration value="previous state"/>
                    </xs:restriction>
                </xs:simpleType>
            </xs:attribute>
        </xs:extension>
    </xs:complexContent>
  </xs:complexType>
</xs:element>

<xs:element name="grammar">
  <xs:complexType>
    <xs:sequence>
      <xs:element name="description" type="xs:string" minOccurs="0"/>
    </xs:sequence>
    <xs:attribute name="top-rule" type="xs:string"/>
    <xs:attribute name="src" type="xs:string"/>
    <xs:attribute name="expr" type="xs:string"/>
    <xs:attribute name="flavour" default="grammar file">
        <xs:simpleType>
            <xs:restriction base="xs:string">
                <xs:enumeration value="grammar file"/>
                <xs:enumeration value="dynamic file expression"/>
                <xs:enumeration value="built-in grammar"/>
            </xs:restriction>
        </xs:simpleType>
    </xs:attribute>
  </xs:complexType>
</xs:element>

<xs:element name="graphics">
  <xs:complexType>
    <xs:sequence>
        <!-- When the "graphics" element appears in a dialog state,
             the "bounds" element describes the state.
             When the "graphics" element appears in a dialog action,
             the "bounds" element describes the target application or container reference. -->
        <xs:element ref="bounds"/>
        <!-- When the "graphics" element appears in a dialog action,
             the "points" element describes the transition. -->
```

FIG. 9-12

```xml
<xs:element ref="points" minOccurs="0"/>
<!-- When the "graphics" element appears in a dialog action,
     the "ports" element describes the transition. -->
<xs:element ref="ports" minOccurs="0"/>
<!-- When the "graphics" element appears in a dialog action,
     the "label" element describes the transition. -->
<xs:element ref="label" minOccurs="0"/>
      </xs:sequence>
    </xs:complexType>
</xs:element>

<xs:complexType name="IBehavior" abstract="true">
    <xs:sequence>
        <xs:element ref="dialog-action" minOccurs="0"/>
    </xs:sequence>
        <xs:attribute name="scope" default="Global">
            <xs:simpleType>
                <xs:restriction base="xs:string">
                    <xs:enumeration value="Global"/>
                    <xs:enumeration value="Local"/>
                    <xs:enumeration value="Hybrid"/>
                </xs:restriction>
            </xs:simpleType>
        </xs:attribute>
        <!-- The "global-id" attribute correlates between global and local settings. -->
        <xs:attribute name="global-id" type="xs:int" default="-1"/>
        <xs:attribute name="enabled" type="xs:boolean" default="true"/>
        <!-- The "expanded" attribute enables certain runtime consistency checks. -->
        <xs:attribute name="expanded" type="xs:boolean" default="false"/>
    </xs:complexType>

<xs:element name="inputs">
    <xs:complexType>
        <xs:sequence>
            <xs:sequence minOccurs="0" maxOccurs="unbounded"> <!-- For table/list copy/cut/paste -->
                <xs:element ref="simple"/>
            </xs:sequence>
        </xs:sequence>
    </xs:complexType>
</xs:element>

<xs:element name="label">
    <xs:complexType>
        <xs:sequence minOccurs="0" maxOccurs="1">
            <xs:element ref="point"/>
```

FIG. 9-13

```
      </xs:sequence>
    </xs:complexType>
  </xs:element>

<xs:element name="lhs" type="expression"/>

<xs:element name="log">
    <xs:complexType>
      <xs:attribute name="label" type="xs:string"/>
      <xs:attribute name="expr" type="xs:string"/>
      <xs:attribute name="expr-gen" type="xs:string"/>
    </xs:complexType>
  </xs:element>

<xs:element name="nbest">
    <xs:complexType>
      <xs:sequence>
        <xs:element ref="script" minOccurs="0"/>
      </xs:sequence>
      <xs:attribute name="enabled" type="xs:boolean" default="false"/>
      <xs:attribute name="maxnbest" type="xs:int"/>
    </xs:complexType>
  </xs:element>

<xs:element name="operation">
    <xs:complexType>
      <xs:attribute name="name" type="xs:string" use="required"/>
    </xs:complexType>
  </xs:element>

<xs:element name="outputs">
    <xs:complexType>
      <xs:sequence>
        <xs:sequence minOccurs="0" maxOccurs="unbounded"> <!-- For table/list copy/cut/paste -->
          <xs:element ref="simple"/>
        </xs:sequence>
      </xs:sequence>
    </xs:complexType>
  </xs:element>

<xs:element name="param">
    <xs:complexType>
      <xs:attribute name="name" type="xs:NMTOKEN"/>
      <xs:attribute name="expr" type="xs:string"/>
      <xs:attribute name="expr-gen" type="xs:string"/>
```

FIG. 9-14

```xml
    </xs:complexType>
</xs:element>

<xs:element name="output">
    <xs:complexType>
        <xs:attribute name="src" type="xs:NMTOKEN"/>
        <xs:attribute name="dst" type="xs:NMTOKEN"/>
        <xs:attribute name="dst-category" type="xs:string"/>
    </xs:complexType>
</xs:element>

<xs:element name="persona">
    <xs:complexType>
        <xs:sequence>
            <xs:element name="description" type="xs:string" minOccurs="0"/>
        </xs:sequence>
    </xs:complexType>
</xs:element>

<xs:element name="point">
    <xs:complexType>
        <xs:attribute name="x" type="xs:int"/>
        <xs:attribute name="y" type="xs:int"/>
    </xs:complexType>
</xs:element>

<xs:element name="points">
    <xs:complexType>
        <xs:sequence minOccurs="0" maxOccurs="unbounded">
            <xs:element ref="point"/>
        </xs:sequence>
    </xs:complexType>
</xs:element>

<xs:element name="post-recognition">
    <xs:complexType>
        <xs:sequence>
            <xs:element name="description" type="xs:string" minOccurs="0"/>
            <xs:sequence minOccurs="0" maxOccurs="unbounded"> <!-- For table/list copy/cut/paste -->
                <xs:element ref="dialog-action"/>
            </xs:sequence>
        </xs:sequence>
    </xs:complexType>
</xs:element>
```

FIG. 9-15

```xml
<xs:element name="ports">
  <xs:complexType>
    <xs:attribute name="source" type="xs:string"/>
    <xs:attribute name="target" type="xs:string"/>
  </xs:complexType>
</xs:element>

<xs:element name="pre-recognition">
  <xs:complexType>
    <xs:sequence>
      <xs:element name="description" type="xs:string" minOccurs="0"/>
      <xs:sequence minOccurs="0" maxOccurs="unbounded"> <!-- For table/list copy/cut/paste -->
        <xs:element ref="prompt"/>
      </xs:sequence>
    </xs:sequence>
  </xs:complexType>
</xs:element>

<xs:element name="processing-state">
  <xs:complexType>
    <xs:complexContent>
      <xs:extension base="dialog-state">
        <xs:sequence>
          <xs:sequence minOccurs="0" maxOccurs="unbounded"> <!-- For table/list copy/cut/paste -->
            <xs:element ref="dialog-action"/>
          </xs:sequence>
        </xs:sequence>
      </xs:extension>
    </xs:complexContent>
  </xs:complexType>
</xs:element>

<xs:element name="project">
  <xs:complexType>
    <xs:sequence>
      <xs:element ref="global-information"/>
      <xs:sequence minOccurs="0" maxOccurs="unbounded"> <!-- For table/list copy/cut/paste -->
        <xs:element ref="generic-container"/>
      </xs:sequence>
    </xs:sequence>
    <xs:attribute name="version" type="xs:int" default="1"/>
  </xs:complexType>
</xs:element>
```

FIG. 9-16

```xml
<xs:element name="prompt">
    <xs:complexType>
        <xs:complexContent>
            <xs:extension base="conditional">
                <xs:sequence>
                    <xs:choice minOccurs="0" maxOccurs="unbounded">
                        <xs:annotation>
                            <xs:appinfo>
                                <jaxb:property name="segment"/>
                            </xs:appinfo>
                        </xs:annotation>
                        <xs:element ref="audio-file-ref"/>
                        <xs:element ref="audio-file-expr"/>
                        <xs:element ref="audio-value-expr"/>
                        <xs:element ref="dtmf-audio"/>
                        <xs:element ref="say-as"/>
                        <xs:element ref="silence"/>
                        <xs:element ref="tts"/>
                    </xs:choice>
                </xs:sequence>
                <xs:attribute name="bargein" type="xs:boolean" default="true"/>
                <xs:attribute name="bargeintype">
                    <xs:simpleType>
                        <xs:restriction base="xs:string">
                            <xs:enumeration value="speech"/>
                            <xs:enumeration value="hotword"/>
                        </xs:restriction>
                    </xs:simpleType>
                </xs:attribute>
                <xs:attribute name="flavour" default="simple">
                    <xs:simpleType>
                        <xs:restriction base="xs:string">
                            <xs:enumeration value="simple"/>
                            <xs:enumeration value="concatenated"/>
                            <xs:enumeration value="random"/>
                        </xs:restriction>
                    </xs:simpleType>
                </xs:attribute>
                <xs:attribute name="type" default="initial">
                    <xs:simpleType>
                        <xs:restriction base="xs:string">
                            <xs:enumeration value="initial"/>
                            <xs:enumeration value="reentry"/>
                            <xs:enumeration value="previous"/>
                        </xs:restriction>
```

FIG. 9-17

```xml
          </xs:simpleType>
        </xs:attribute>
        <xs:attribute name="previous-type" default="state">
          <xs:simpleType>
            <xs:restriction base="xs:string">
              <xs:enumeration value="page"/>
              <xs:enumeration value="state"/>
            </xs:restriction>
          </xs:simpleType>
        </xs:attribute>
        <xs:attribute name="previous-item" type="xs:string"/>
        <xs:attribute name="count" type="xs:int" default="1"/>
        <xs:attribute name="timeout" type="xs:string"/>
        <xs:attribute name="lang" type="xs:string"/>
        <xs:attribute name="src" type="xs:string"/>
      </xs:extension>
    </xs:complexContent>
  </xs:complexType>
</xs:element>

<xs:element name="properties">
  <xs:complexType>
    <xs:sequence>
      <xs:element ref="context-file" minOccurs="0"/>
      <xs:sequence minOccurs="0" maxOccurs="unbounded"> <!-- For table/list copy/cut/paste -->
        <xs:element ref="universal-weight"/>
      </xs:sequence>
      <xs:sequence minOccurs="0" maxOccurs="unbounded"> <!-- For table/list copy/cut/paste -->
        <xs:element ref="property"/>
      </xs:sequence>
    </xs:sequence>
  </xs:complexType>
</xs:element>

<xs:element name="universal-weight">
  <xs:complexType>
    <xs:attribute name="type" type="xs:NMTOKEN" use="required"/>
    <xs:attribute name="weight" type="xs:string" use="required"/>
  </xs:complexType>
</xs:element>

<xs:element name="property">
  <xs:complexType>
    <xs:sequence>
```

FIG. 9-18

```
            <xs:element name="description" type="xs:string" minOccurs="0"/>
          </xs:sequence>
          <xs:attribute name="name" type="xs:NMTOKEN" use="required"/>
          <xs:attribute name="value" type="xs:string" use="required"/>
        </xs:complexType>
      </xs:element>

<xs:element name="recognition-state">
        <xs:complexType>
          <xs:complexContent>
            <xs:extension base="dialog-state">
              <xs:sequence>
                <xs:element ref="properties" minOccurs="0"/>
                <xs:element ref="pre-recognition" minOccurs="0"/>
                <xs:sequence minOccurs="0" maxOccurs="unbounded"> <!-- For table/list copy/cut/paste -->
                  <xs:element ref="slot"/>
                </xs:sequence>
                <xs:sequence minOccurs="0" maxOccurs="unbounded"> <!-- For table/list copy/cut/paste -->
                  <xs:element ref="sample-expression"/>
                </xs:sequence>
                <xs:element ref="grammar" minOccurs="0"/>
                <xs:element ref="nbest" minOccurs="0"/>
                <xs:element ref="post-recognition" minOccurs="0"/>
                <xs:sequence minOccurs="0" maxOccurs="unbounded"> <!-- For table/list copy/cut/paste -->
                  <xs:element ref="universal-behavior"/>
                </xs:sequence>
                <xs:sequence minOccurs="0" maxOccurs="unbounded"> <!-- For table/list copy/cut/paste -->
                  <xs:element ref="error-behavior"/>
                </xs:sequence>
              </xs:sequence>
            </xs:extension>
          </xs:complexContent>
        </xs:complexType>
      </xs:element>

<xs:element name="record-state">
        <xs:complexType>
          <xs:complexContent>
            <xs:extension base="dialog-state">
              <xs:sequence>
                <xs:element ref="properties" minOccurs="0"/>
                <xs:element ref="pre-recognition" minOccurs="0"/>
```

FIG. 9-19

```xml
            <xs:element ref="post-recognition" minOccurs="0"/>
            <xs:sequence minOccurs="0" maxOccurs="unbounded"> <!-- For table/list copy/cut/paste -->
              <xs:element ref="error-behavior"/>
            </xs:sequence>
          </xs:sequence>
          <xs:attribute name="type" type="xs:string"/>
          <xs:attribute name="beep" type="xs:boolean" default="false"/>
          <xs:attribute name="maxtime" type="xs:string"/>
          <xs:attribute name="finalsilence" type="xs:string"/>
          <xs:attribute name="dtmfterm" type="xs:boolean" default="true"/>
          <xs:attribute name="destexpr" type="xs:string"/>
          <xs:attribute name="destexpr-gen" type="xs:string"/>
        </xs:extension>
      </xs:complexContent>
    </xs:complexType>
  </xs:element>

<xs:element name="repeat">
    <xs:complexType>
      <xs:complexContent>
        <xs:extension base="termination">
          <xs:attribute name="reprompt" type="xs:boolean" default="false"/>
        </xs:extension>
      </xs:complexContent>
    </xs:complexType>
  </xs:element>

<xs:element name="return">
    <xs:complexType>
      <xs:complexContent>
        <xs:extension base="termination">
          <xs:attribute name="flavour" default="namelist">
            <xs:simpleType>
              <xs:restriction base="xs:string">
                <xs:enumeration value="namelist"/>
                <xs:enumeration value="throw"/>
              </xs:restriction>
            </xs:simpleType>
          </xs:attribute>
          <xs:attribute name="eventexpr" type="xs:string"/>
          <xs:attribute name="eventexpr-gen" type="xs:string"/>
          <xs:attribute name="messageexpr" type="xs:string"/>
          <xs:attribute name="messageexpr-gen" type="xs:string"/>
        </xs:extension>
      </xs:complexContent>
```

FIG. 9-20

```
</xs:complexType>
</xs:element>

<xs:element name="revision">
   <xs:complexType>
      <xs:attribute name="number" type="xs:string"/>
      <xs:attribute name="date" type="xs:string"/>
      <xs:attribute name="author" type="xs:string"/>
      <xs:attribute name="notes" type="xs:string"/>
   </xs:complexType>
</xs:element>

<xs:element name="revision-history">
   <xs:complexType>
      <xs:sequence>
         <xs:element name="description" type="xs:string" minOccurs="0"/>
         <xs:sequence minOccurs="0" maxOccurs="unbounded"> <!-- For table/list copy/cut/paste -->
            <xs:element ref="revision"/>
         </xs:sequence>
      </xs:sequence>
   </xs:complexType>
</xs:element>

<xs:element name="rhs" type="expression"/>

<xs:element name="sample-expression">
   <xs:complexType>
      <xs:sequence>
         <xs:element name="utterance" type="xs:string"/>
         <xs:sequence minOccurs="0" maxOccurs="unbounded"> <!-- For table/list copy/cut/paste -->
            <xs:element ref="slot-expression"/>
         </xs:sequence>
      </xs:sequence>
   </xs:complexType>
</xs:element>

<xs:element name="say-as">
   <xs:complexType>
      <xs:attribute name="expr" type="xs:string"/>
      <xs:attribute name="expr-gen" type="xs:string"/>
      <xs:attribute name="type" type="xs:string"/>
   </xs:complexType>
</xs:element>
```

FIG. 9-21

```xml
<xs:element name="script">
  <xs:complexType>
    <xs:simpleContent>
      <xs:extension base="xs:string">
        <xs:attribute name="src" type="xs:string"/>
        <xs:attribute name="charset" type="xs:string"/>
      </xs:extension>
    </xs:simpleContent>
  </xs:complexType>
</xs:element>

<xs:element name="send">
  <xs:complexType>
    <xs:complexContent>
      <xs:extension base="submit-base"/>
    </xs:complexContent>
  </xs:complexType>
</xs:element>

<xs:element name="server-side-error">
  <xs:complexType>
    <xs:attribute name="page" type="xs:string"/>
    <xs:attribute name="url" type="xs:string"/>
    <xs:attribute name="type" type="xs:string" use="required"/>
  </xs:complexType>
</xs:element>

<xs:element name="service">
  <xs:complexType>
    <xs:sequence>
      <xs:element name="description" type="xs:string" minOccurs="0"/>
    </xs:sequence>
    <xs:attribute name="flavour" default="url">
      <xs:simpleType>
        <xs:restriction base="xs:string">
          <xs:enumeration value="prototype"/>
          <xs:enumeration value="url"/>
          <xs:enumeration value="custom"/>
          <xs:enumeration value="built-in"/>
        </xs:restriction>
      </xs:simpleType>
    </xs:attribute>
    <xs:attribute name="name" type="xs:NMTOKEN" use="required"/>
    <xs:attribute name="uri" type="xs:string" use="required"/>
    <xs:attribute name="qname" type="xs:string"/>
    <xs:attribute name="port" type="xs:string"/>
```

FIG. 9-22

```
        </xs:complexType>
    </xs:element>

<xs:element name="silence">
        <xs:complexType>
            <xs:attribute name="msecs" type="xs:int" use="required"/>
        </xs:complexType>
    </xs:element>

<xs:element name="simple">
        <xs:complexType>
            <xs:sequence>
                <xs:element name="description" type="xs:string" minOccurs="0"/>
                <xs:sequence minOccurs="0" maxOccurs="unbounded"> <!-- For table/list copy/cut/paste -->
                    <xs:element ref="enum"/>
                </xs:sequence>
            </xs:sequence>
            <xs:attribute name="name" type="xs:NMTOKEN" use="required"/>
            <xs:attribute name="value" type="xs:string"/>
            <xs:attribute name="type" type="xs:string"/>
            <xs:attribute name="value-gen" type="xs:string"/>
        </xs:complexType>
    </xs:element>

<xs:element name="simple-expression">
        <xs:complexType>
            <xs:sequence>
                <xs:sequence minOccurs="0" maxOccurs="unbounded"> <!-- For table/list copy/cut/paste -->
                    <xs:element ref="term"/>
                </xs:sequence>
            </xs:sequence>
        </xs:complexType>
    </xs:element>

<xs:element name="slot">
        <xs:complexType>
            <xs:sequence>
                <xs:element name="description" type="xs:string" minOccurs="0"/>
                <xs:sequence minOccurs="0" maxOccurs="unbounded"> <!-- For table/list copy/cut/paste -->
                    <xs:element ref="enum"/>
                </xs:sequence>
            </xs:sequence>
            <xs:attribute name="name" type="xs:string" use="required"/>
```

FIG. 9-23

```
      </xs:complexType>
    </xs:element>

<xs:element name="slot-expression">
      <xs:complexType>
        <xs:attribute name="name" type="xs:string" use="required"/>
        <xs:attribute name="value" type="xs:string"/>
      </xs:complexType>
    </xs:element>

<xs:element name="subdialog-state">
      <xs:complexType>
        <xs:complexContent>
          <xs:extension base="dialog-state">
            <xs:sequence>
              <xs:sequence minOccurs="0" maxOccurs="unbounded"> <!-- For table/list copy/cut/paste -->
                <xs:element ref="param"/>
              </xs:sequence>
              <xs:sequence minOccurs="0" maxOccurs="unbounded"> <!-- For table/list copy/cut/paste -->
                <xs:element ref="output"/>
              </xs:sequence>
              <xs:element ref="post-recognition" minOccurs="0"/>
              <xs:sequence minOccurs="0" maxOccurs="unbounded"> <!-- For table/list copy/cut/paste -->
                <xs:element ref="error-behavior"/>
              </xs:sequence>
            </xs:sequence>
            <xs:attribute name="container" type="xs:string" use="required"/>
          </xs:extension>
        </xs:complexContent>
      </xs:complexType>
    </xs:element>

<xs:element name="submit">
      <xs:complexType>
        <xs:complexContent>
          <xs:extension base="submit-base"/>
        </xs:complexContent>
      </xs:complexType>
    </xs:element>

<xs:complexType name="submit-base" abstract="true">
      <xs:complexContent>
        <xs:extension base="termination">
```

FIG. 9-24

```xml
<xs:sequence>
    <xs:element ref="audio-file-ref" minOccurs="0" maxOccurs="1"/>
</xs:sequence>
<xs:attribute name="destexpr" type="xs:string"/>
<xs:attribute name="enctype" default="application/x-www-form-urlencoded">
    <xs:simpleType>
        <xs:restriction base="xs:string">
            <xs:enumeration value="application/x-www-form-urlencoded"/>
            <xs:enumeration value="multipart/form-data"/>
            <xs:enumeration value="application/octet-stream"/>
        </xs:restriction>
    </xs:simpleType>
</xs:attribute>
<xs:attribute name="method" default="get">
    <xs:simpleType>
        <xs:restriction base="xs:string">
            <xs:enumeration value="get"/>
            <xs:enumeration value="post"/>
        </xs:restriction>
    </xs:simpleType>
</xs:attribute>
<xs:attribute name="namelist" type="xs:string"/>
        </xs:extension>
    </xs:complexContent>
</xs:complexType>

<xs:element name="taskbegin">
    <xs:complexType>
        <xs:attribute name="name" type="xs:string" use="required"/>
    </xs:complexType>
</xs:element>

<xs:element name="taskend">
    <xs:complexType>
        <xs:complexContent>
            <xs:extension base="conditional">
                <xs:attribute name="name" type="xs:string" use="required"/>
                <xs:attribute name="reasonexpr" type="xs:string"/>
                <xs:attribute name="reasonexpr-gen" type="xs:string"/>
            </xs:extension>
        </xs:complexContent>
    </xs:complexType>
</xs:element>

<xs:element name="term">
    <xs:complexType>
```

FIG. 9-25

```
<xs:sequence>
    <xs:element ref="lhs"/>
    <xs:element ref="rhs"/>
</xs:sequence>
<xs:attribute name="firstrow" type="xs:boolean" default="false"/>
<xs:attribute name="booleanop" default="n/a">
    <xs:simpleType>
        <xs:restriction base="xs:string">
            <xs:enumeration value="n/a"/>
            <xs:enumeration value="and"/>
            <xs:enumeration value="or"/>
        </xs:restriction>
    </xs:simpleType>
</xs:attribute>
<xs:attribute name="op" type="xs:string" use="required"/>
        </xs:complexType>
    </xs:element>

<xs:element name="terminate-state">
        <xs:complexType>
            <xs:complexContent>
                <xs:extension base="dialog-state">
                    <xs:sequence>
                        <xs:sequence minOccurs="0" maxOccurs="unbounded"> <!-- For table/list copy/cut/paste -->
                            <xs:element ref="dialog-action"/>
                        </xs:sequence>
                    </xs:sequence>
                </xs:extension>
            </xs:complexContent>
        </xs:complexType>
    </xs:element>

<xs:complexType name="termination" abstract="true"/>

<xs:element name="throw">
        <xs:complexType>
            <xs:complexContent>
                <xs:extension base="termination">
                    <xs:attribute name="eventexpr" type="xs:string"/>
                    <xs:attribute name="messageexpr" type="xs:string"/>
                    <xs:attribute name="incrementcounter" type="xs:boolean" default="true"/>
                </xs:extension>
            </xs:complexContent>
        </xs:complexType>
    </xs:element>
```

FIG. 9-26

```xml
<xs:element name="transfer-state">
    <xs:complexType>
        <xs:complexContent>
            <xs:extension base="dialog-state">
                <xs:sequence>
                    <xs:sequence minOccurs="0" maxOccurs="unbounded"> <!-- For table/list copy/cut/paste -->
                        <xs:element ref="utterance"/>
                    </xs:sequence>
                    <xs:element ref="properties" minOccurs="0"/>
                    <xs:element ref="pre-recognition" minOccurs="0"/>
                    <xs:element ref="grammar" minOccurs="0"/>
                    <xs:element ref="post-recognition" minOccurs="0"/>
                    <xs:sequence minOccurs="0" maxOccurs="unbounded"> <!-- For table/list copy/cut/paste -->
                        <xs:element ref="error-behavior"/>
                    </xs:sequence>
                </xs:sequence>
                <xs:attribute name="destexpr" type="xs:string"/>
                <xs:attribute name="destexpr-gen" type="xs:string"/>
                <xs:attribute name="connecttimeout" type="xs:string"/>
                <xs:attribute name="maxtime" type="xs:string"/>
                <xs:attribute name="transferaudio" type="xs:string"/>
                <xs:attribute name="aaiexpr" type="xs:string"/>
                <xs:attribute name="aaiexpr-gen" type="xs:string"/>
                <xs:attribute name="type">
                    <xs:simpleType>
                        <xs:restriction base="xs:string">
                            <xs:enumeration value="blind"/>
                            <xs:enumeration value="bridge"/>
                            <xs:enumeration value="conditional"/>
                        </xs:restriction>
                    </xs:simpleType>
                </xs:attribute>
                <xs:attribute name="localuriexpr" type="xs:string"/>
                <xs:attribute name="localuriexpr-gen" type="xs:string"/>
                <xs:attribute name="farenddialog" type="xs:string"/>
                <xs:attribute name="warningtime" type="xs:string"/>
                <xs:attribute name="warningaudio" type="xs:string"/>
                <xs:attribute name="devicedetection" type="xs:NMTOKEN"/>
            </xs:extension>
        </xs:complexContent>
    </xs:complexType>
</xs:element>
```

FIG. 9-27

```
<xs:element name="tts" type="xs:string"/>

<xs:element name="universal">
   <xs:complexType>
      <xs:sequence>
         <xs:element name="description" type="xs:string" minOccurs="0"/>
         <xs:sequence minOccurs="0" maxOccurs="unbounded"> <!-- For table/list copy/cut/paste -->
            <xs:element ref="utterance"/>
         </xs:sequence>
      </xs:sequence>
      <xs:attribute name="type" type="xs:NMTOKEN" use="required"/>
   </xs:complexType>
</xs:element>

<xs:element name="universal-behavior">
   <xs:complexType>
      <xs:complexContent>
         <xs:extension base="IBehavior">
            <xs:attribute name="type" type="xs:NMTOKEN"/>
         </xs:extension>
      </xs:complexContent>
   </xs:complexType>
</xs:element>

<xs:element name="users">
   <xs:complexType>
      <xs:sequence>
         <xs:element name="description" type="xs:string" minOccurs="0"/>
      </xs:sequence>
   </xs:complexType>
</xs:element>

<xs:element name="utterance">
   <xs:complexType>
      <xs:sequence>
         <xs:element name="utterance" type="xs:string"/>
      </xs:sequence>
   </xs:complexType>
</xs:element>

<xs:element name="vaf-state">
   <xs:complexType>
      <xs:complexContent>
         <xs:extension base="dialog-state">
            <xs:sequence>
```

FIG. 9-28

```
                    <xs:element ref="audio-file-ref" minOccurs="0" maxOccurs="1"/>
                    <xs:element ref="data-access" minOccurs="0"/>
                    <xs:element ref="cti-interaction" minOccurs="0"/>
                    <xs:sequence minOccurs="0" maxOccurs="unbounded"> <!-- For table/list
copy/cut/paste -->
                        <xs:element ref="business-rule"/>
                    </xs:sequence>
                    <xs:sequence minOccurs="0" maxOccurs="unbounded"> <!-- For table/list
copy/cut/paste -->
                        <xs:element ref="dialog-action"/>
                    </xs:sequence>
                </xs:sequence>
            </xs:extension>
        </xs:complexContent>
    </xs:complexType>
</xs:element>

<xs:element name="vaf-variable">
    <xs:complexType>
        <xs:sequence>
            <xs:element name="description" type="xs:string" minOccurs="0"/>
            <xs:sequence minOccurs="0" maxOccurs="unbounded"> <!-- For table/list
copy/cut/paste -->
                <xs:element ref="enum"/>
            </xs:sequence>
        </xs:sequence>
        <xs:attribute name="name" type="xs:NMTOKEN" use="required"/>
        <xs:attribute name="context" type="xs:NMTOKEN" use="required"/>
    </xs:complexType>
</xs:element>

<xs:element name="variable">
    <xs:complexType>
        <xs:sequence>
            <xs:element name="description" type="xs:string" minOccurs="0"/>
            <xs:sequence minOccurs="0" maxOccurs="unbounded"> <!-- For table/list
copy/cut/paste -->
                <xs:element ref="enum"/>
            </xs:sequence>
        </xs:sequence>
        <xs:attribute name="name" type="xs:NMTOKEN" use="required"/>
        <xs:attribute name="value" type="xs:string"/>
        <xs:attribute name="value-gen" type="xs:string"/>
    </xs:complexType>
</xs:element>
</xs:schema>
```

FIG. 9-29

The following XSLT transforms generate VoiceXML code from a PSXML file:

cti-config.xsl
data-config.xsl
grammar.xsl
struts-config.xsl
transitionrules.xsl
voicexml cti-config.xsl

```
<?xml version="1.0"?>
<!--
    Converts PS-XML to cti-config.xml, required by VAF.

@author Rich Unger

Namespaces defined here:

root namespace: refers to the voicexml namespace because that's the root
            namespace of the content we'll be generating.
    xsl: the XSLT namespace
    psxml: for elements in the source (PS-XML) format
    vb: for custom extension functions (defined at the bottom of this file)
    func: for declaring functions in the vbuilder namespace
-->
<xsl:stylesheet xmlns="http://com.nuance.vaf/cti-config"
                xmlns:xsl="http://www.w3.org/1999/XSL/Transform"
                xmlns:psxml="http://www.nuance.com/psxml"
                xmlns:vb="http://vbuilder.nuance.com/xslt"
                xmlns:func="http://exslt.org/functions"
                version="1.1"
                extension-element-prefixes="vb func"
                exclude-result-prefixes="psxml">

<xsl:output method="xml"
                doctype-public="-//Nuance Communications Inc.//DTD V-Server CTI
Configuration 1.0//EN"
                doctype-system="http://www.nuance.com/dtds/vserver/cti-config.dtd"
                indent="yes"/>

<xsl:param name="SUBDIALOG_NAME" select="''"/>

<xsl:template match="psxml:project">
        <cti>
            <xsl:apply-templates select="*/psxml:vaf-state/psxml:cti-
interaction[*[local-name() != 'description']]"/>
        </cti>
    </xsl:template>

<xsl:template match="psxml:cti-interaction">
        <xsl:variable name="pageName" select="vb:makeNmtoken(../../@name)"/>
        <xsl:variable name="stateName" select="vb:makeNmtoken(../@name)"/>
```

FIG. 10-1

```
        <xsl:variable name="qName" select="concat($SUBDIALOG_NAME, '_', $pageName,
'_', $stateName)"/>

<xsl:if test="psxml:description">
            <xsl:comment><xsl:value-of select="psxml:description"/></xsl:comment>
        </xsl:if>
        <interaction name="{$qName}" cti-info="{@cti-info}">
            <!-- enforce an ordering here, so that we don't do an
                 end-session before a query-session, or something equally silly -->
            <xsl:apply-templates select="psxml:cti-new-session"/>
            <xsl:apply-templates select="psxml:cti-insert | psxml:cti-extract"/>
            <xsl:apply-templates select="psxml:cti-query-session"/>
            <xsl:apply-templates select="psxml:cti-transfer"/>
            <xsl:apply-templates select="psxml:cti-end-session"/>
        </interaction>
    </xsl:template>

<xsl:template match="psxml:cti-new-session">
        <xsl:if test="psxml:description">
            <xsl:comment><xsl:value-of select="psxml:description"/></xsl:comment>
        </xsl:if>
        <!-- call.dialog.ctiDialedNumber is created in voicexml.xsl in the
             template for psxml:vaf-state -->
        <new-session dialed-number="call.dialog.ctiDialedNumber"/>
    </xsl:template>

<xsl:template match="psxml:cti-insert">
        <xsl:if test="@description">
            <xsl:comment><xsl:value-of select="@description"/></xsl:comment>
        </xsl:if>
        <xsl:if test="vb:exists(@vafsrc) and vb:exists(@ctidest)">
            <xsl:variable name="insertName" select="concat('call.dialog.',
translate(@ctidest, '.', '_'))"/>
            <insert vafsrc="{$insertName}" ctidest="{@ctidest}"/>
        </xsl:if>
    </xsl:template>

<xsl:template match="psxml:cti-extract">
        <xsl:if test="@description">
            <xsl:comment><xsl:value-of select="@description"/></xsl:comment>
        </xsl:if>
        <xsl:if test="vb:exists(@ctisrc) and vb:exists(@vafdest)">
            <extract ctisrc="{@ctisrc}" vafdest="call.{vb:trim(@vafdest)}"/>
        </xsl:if>
    </xsl:template>

<xsl:template match="psxml:cti-end-session">
        <end-session reason="call.dialog.ctiEndSessionReason"/>
    </xsl:template>

<xsl:template match="psxml:cti-query-session">
        <query-session status="call.dialog.ctiQuerySessionStatus" ced="{@ced}"/>
    </xsl:template>

<xsl:template match="psxml:cti-transfer">
        <transfer type="{@type}" destination="{@destination}"
location="{@location}"/>
```

FIG. 10-2

```
        </xsl:template>

<!--===================== Extension Functions ===============-->

<!--
        Function for converting an xs:string to a NMTOKEN.
        Replaces any character that is not a
        letter, digit, '.', '-', or '_'

Usage
            <xsl:value-of select="vb:makeNmtoken(@name)"/>
        -->
        <func:function name="vb:makeNmtoken">
            <xsl:param name="str"/>
            <func:result select="token:stringToNmtoken($str)"
xmlns:token="java:com.nuance.tools.design.main.utils.TransformUtils"/>
        </func:function>

<!-- calls java.lang.String.trim() -->
        <func:function name="vb:trim">
            <xsl:param name="mystring"/>
            <func:result select="str:trim(string($mystring))"
                         xmlns:str="java:java.lang.String"/>
        </func:function>

<func:function name="vb:exists">
            <xsl:param name="node"/>

<func:result select="$node and (string($node) != '')"/>
        </func:function>

</xsl:stylesheet>X
``` data-config.xsl

```
<?xml version="1.0"?>
<!--
    Converts PS-XML to data-config.xml, required by VAF.

@author Rich Unger

Namespaces defined here:

root namespace: refers to the voicexml namespace because that's the root
            namespace of the content we'll be generating.
    xsl: the XSLT namespace
    psxml: for elements in the source (PS-XML) format
    vb: for custom extension functions (defined at the bottom of this file)
    func: for declaring functions in the vb namespace -->
<xsl:stylesheet xmlns="http://com.nuance.vaf/data-config"
                xmlns:xsl="http://www.w3.org/1999/XSL/Transform"
                xmlns:psxml="http://www.nuance.com/psxml"
```

FIG. 10-3

```
                xmlns:vb="http://vbuilder.nuance.com/xslt"
                xmlns:func="http://exslt.org/functions"
                version="1.1"
                extension-element-prefixes="vb func"
                exclude-result-prefixes="psxml">

<xsl:output method="xml"
                doctype-public="-//Nuance Communications Inc.//DTD V-Server Data
Configuration 1.0//EN"
                doctype-system="http://www.nuance.com/dtds/vserver/data-config.dtd"
                indent="yes"/>

<!-- used to prevent duplicate services -->
    <xsl:variable name="dupes" select="vb:newSet()"/>

<xsl:param name="SUBDIALOG_NAME" select="''"/>

<xsl:template match="psxml:project">
        <xsl:variable name="actionNodes" select="*/psxml:vaf-state/psxml:data-
access/psxml:action[vb:exists(psxml:operation/@name)]"/>
        <xsl:variable name="serviceNodes" select="$actionNodes/psxml:service"/>

<xsl:if test="$actionNodes">
            <data>
                <!-- services -->
                <services>
                    <xsl:apply-templates select="$serviceNodes"/>
                </services>

<!-- actions -->
                <actions>
                    <xsl:apply-templates select="$actionNodes"/>
                </actions>
            </data>
        </xsl:if>
    </xsl:template>

<xsl:template match="psxml:service">
        <xsl:if test="vb:addToSet($dupes, string(@name))">
            <xsl:if test="psxml:description">
                <xsl:comment><xsl:value-of
select="psxml:description"/></xsl:comment>
            </xsl:if>
            <service name="{@name}" uri="{@uri}" qname="{@qname}" port="{@port}"/>
        </xsl:if>
    </xsl:template>

<xsl:template match="psxml:action">
        <xsl:if test="psxml:description">
            <xsl:comment><xsl:value-of select="psxml:description"/></xsl:comment>
        </xsl:if>

<!-- create a unique name for this data action:
"pageName_stateName__dataAction" -->
        <xsl:variable name="qName" select="concat( $SUBDIALOG_NAME, '_',
vb:makeNmtoken(../../../@name), '_', vb:makeNmtoken(../../@name), '__dataAction'
)"/>
```

FIG. 10-4

```
<action name="{$qName}" service="{psxml:service/@name}">
    <xsl:for-each select="psxml:operation">
        <operation name="{@name}"/>
    </xsl:for-each>

<xsl:for-each select="psxml:inputs">
        <inputs>
            <xsl:for-each select="psxml:simple">
                <xsl:if test="psxml:description">
                    <xsl:comment><xsl:value-of select="psxml:description"/></xsl:comment>
                </xsl:if>
                <!-- we're building all the params on the client side, and creating variables
                     with the same name as the WSDL input names, so they'll all be prepared
                     by voicexml.xsl and passed in the <submit>, accessible here as
                     call.dialog.foo
                -->
                <simple name="{@name}" key="call.dialog.{vb:trim(@name)}" type="{vb:makeType(@type)}"/>
            </xsl:for-each>
        </inputs>
    </xsl:for-each>

<xsl:for-each select="psxml:outputs">
        <outputs>
            <xsl:for-each select="psxml:simple" mode="output">
                <xsl:if test="psxml:description">
                    <xsl:comment><xsl:value-of select="psxml:description"/></xsl:comment>
                </xsl:if>
                <!-- map the result to a variable in the call context. voicexml.xsl
                     will take that variable, and assign it to an ecmascript var of the
                     same name on the client side
                -->
                <simple name="{@name}" key="call.{vb:trim(@value)}" type="{vb:makeType(@type)}"/>
            </xsl:for-each>
        </outputs>
    </xsl:for-each>
</action>
</xsl:template>

<!--
Function for converting an xs:string to a NMTOKEN
Replaces any character that is not a
letter, digit, '.', '-', or '_'

Usage
    <xsl:value-of select="vb:makeNmtoken(@name)"/>
-->
<func:function name="vb:makeNmtoken">
```

FIG. 10-5

```
    <xsl:param name="str"/>
    <func:result select="token:stringToNmtoken($str)"

xmlns:token="java:com.nuance.tools.design.main.utils.TransformUtils"/>
</func:function>

<func:function name="vb:makeType">
    <xsl:param name="str"/>
    <func:result select="type:typeNameToJavaObject($str)"

xmlns:type="java:com.nuance.tools.design.main.utils.TransformUtils"/>
</func:function>

<!-- calls java.lang.String.trim() -->
    <func:function name="vb:trim">
        <xsl:param name="mystring"/>
        <func:result select="str:trim(string($mystring))"
                    xmlns:str="java:java.lang.String"/>
    </func:function>

<func:function name="vb:exists">
    <xsl:param name="node"/>

<func:result select="$node and (string($node) != '')"/>
</func:function>

<!-- functions for dealing with java Sets -->
<func:function name="vb:newSet">
    <func:result select="set:new()" xmlns:set="java:java.util.HashSet"/>
</func:function>
<func:function name="vb:addToSet">
    <xsl:param name="myset"/>
    <xsl:param name="mystring"/> <!-- param should be wrapped in a string(...)
call, so we compare string values and not saxon Node objects -->
    <func:result select="set:add($myset, $mystring)"
xmlns:set="java:java.util.HashSet"/>
</func:function>

</xsl:stylesheet>
``` grammar.xsl

```
<?xml version="1.0"?>
<!--
    Converts PS-XML to grammar content.

@author Rich Unger

Namespaces defined here:

root namespace: refers to the voicexml namespace because that's the root
            namespace of the content we'll be generating.
    xsl: the XSLT namespace
    psxml: for elements in the source (PS-XML) format
    nuance: nuance-proprietary voicexml extension tags
    context: the jsp taglib namespace declared by the VAF
```

FIG. 10-6

```
    saxon: for saxon-specific XSLT extensions
    vb: for custom extension functions (defined at the bottom of this file)
    func: for declaring functions in the vb namespace
-->
<xsl:stylesheet xmlns:xsl="http://www.w3.org/1999/XSL/Transform"
                xmlns:psxml="http://www.nuance.com/psxml"
                xmlns:saxon="http://icl.com/saxon"
                xmlns:vb="http://vbuilder.nuance.com/xslt"
                xmlns:func="http://exslt.org/functions"
                xmlns:locale="java:com.nuance.tools.util.InternationalizationUtils"
                version="1.1"
                extension-element-prefixes="saxon vb func"
                exclude-result-prefixes="psxml locale">
    <!--
    xmlns:nuance="http://voicexml.nuance.com/dialog"
    xmlns:context="/context"
    xmlns:voice="http://www.w3.org/2001/vxml"
    -->

<!-- i18n: encoding -->
    <xsl:variable name="outputEncoding" select="locale:getDefaultEncodingName()"/>

<xsl:output method="text"
            encoding="{$outputEncoding}"/>

<!-- The system path to the root of the project (e.g.
'c:/projects/myproject/main/') -->
    <xsl:param name="XSL_PROJECT_ROOT" select="'./'"/>

<!-- If the user chose to regenerate, it overrides other tests -->
    <xsl:param name="REGENERATING_GRAMMAR" select="false()" />

<!-- If the user chose to regenerate, this is the state to generate grammar for
-->
    <xsl:param name="STATE_NAME" select="'-NOT SET-'" />
    <xsl:param name="PAGE_NAME" select="'-NOT SET-'" />

<!-- keep track of our current position -->
    <xsl:variable name="pageName" select="''" saxon:assignable="yes"/>
    <xsl:variable name="stateName" select="''" saxon:assignable="yes"/>

<xsl:template match="psxml:project">
        <!-- don't bother generating anything if we have no pages -->
        <xsl:if test="*[contains(local-name(),'-container')]">
            <xsl:apply-templates/>
        </xsl:if>
    </xsl:template>

<xsl:template match="psxml:recognition-state"
xmlns="http://www.w3.org/2001/vxml">

<saxon:assign name="pageName" select="vb:makeNmtoken(../@name)"/>
        <saxon:assign name="stateName" select="vb:makeNmtoken(@name)"/>

<!-- Generate for all states or just one? -->
```

FIG. 10-7

```
        <xsl:if test="$STATE_NAME='-NOT SET-' or ($REGENERATING_GRAMMAR='true' and
$STATE_NAME=$stateName and $PAGE_NAME=$pageName)">

<!-- create a stub grammar, if it doesn't exist and is
             a relative URI (doesn't contain a ':')
        -->
        <xsl:if test="vb:shouldGenerateGrammarStub(psxml:grammar)">

<xsl:variable name="ruleName" saxon:assignable="yes"
select="psxml:grammar/@top-rule"/>
                <xsl:if test="$ruleName=''">
                    <saxon:assign name="ruleName" select="'Sample_Rule'"/>
                </xsl:if>

<xsl:document href="{$XSL_PROJECT_ROOT}grammars/{psxml:grammar/@src}"
                          method="text"
                          media-type="application/x-nuance-gsl">;GSL2.0
;
; Generated by V-Builder.
; This is a stub grammar generated from sample phrases in the design.

<xsl:value-of select="$ruleName"/>:public [
<xsl:for-each select="psxml:sample-expression">
    <xsl:text>    (</xsl:text>
    <xsl:value-of select="psxml:utterance"/>
    <xsl:text>)   { </xsl:text><xsl:for-each select="psxml:slot-
expression[vb:exists(@name)]"><<xsl:value-of select="@name"/> <xsl:text>
</xsl:text><xsl:value-of select="@value"/>> </xsl:for-each>}
</xsl:for-each>]
                </xsl:document>
            </xsl:if><!-- shouldGenerateGrammarStub() -->
        </xsl:if><!-- Generate for all states or just one? -->

</xsl:template>

<!--===================== Extension Functions ================-->

<!--
    Returns true if
      the supplied grammarURI does not already exist and
      it is not an absolute URL.
    -->
    <func:function name="vb:shouldGenerateGrammarStub"
xmlns:util="java:com.nuance.tools.design.main.utils.TransformUtils">
        <xsl:param name="grammar"/>

<xsl:variable name="grammarURI" select="concat( 'grammars/', $grammar/@src
)"/>
        <xsl:variable name="grammarExists" select="vb:fileExists($grammarURI)"/>
        <xsl:variable name="grammarIsRelative" select="not(contains($grammarURI,
':'))"/>

<xsl:variable name="dialogUnit"
                      select="saxon:tokenize($XSL_PROJECT_ROOT, '/\\')[last()]"/>
```

FIG. 10-8

```
        <xsl:choose>
            <xsl:when test="$REGENERATING_GRAMMAR">
                <xsl:value-of select="vb:log(concat($grammar/@src, ' has been
generated.'))"/>
                <func:result select="true()"/>
            </xsl:when>
            <xsl:when test="vb:toLowerCase($grammar/@flavour) = 'dynamic file
expression'">
                <func:result select="false()"/>
            </xsl:when>
            <xsl:when test="$grammarIsRelative">
                <xsl:choose>
                    <xsl:when test="$grammarExists">
                            <func:result select="false()"/>
                    </xsl:when>
                    <xsl:otherwise>
                            <func:result select="true()"/> <!-- first time writing the
file -->
                    </xsl:otherwise>
                </xsl:choose>
            </xsl:when>
            <xsl:otherwise>
                <func:result select="false()"/> <!-- absolute URL -->
            </xsl:otherwise>
        </xsl:choose>

</func:function>

<!--
    Function for checking for the existence of a file.
    Used to prevent clobbering on output.

Usage:
        <xsl:if test="vb:fileExists('dialogs/generated/root.vxml')">
            <xsl:message>root already exists!</xsl:message>
        </xsl:if>
    -->
    <func:function name="vb:fileExists">
        <xsl:param name="theFile"/>
        <func:result select="file:exists(file:new(concat($XSL_PROJECT_ROOT,
$theFile)))"
                      xmlns:file="java:java.io.File"/>
    </func:function>

<!--
    Function for converting an xs:string to a NMTOKEN.
    Replaces any character that is not a
    letter, digit, '.', '-', or '_'

Usage
        <xsl:value-of select="vb:makeNmtoken(@name)"/>
    -->
    <func:function name="vb:makeNmtoken">
        <xsl:param name="str"/>
        <func:result select="token:stringToNmtoken($str)"
```

FIG. 10-9

```xml
        xmlns:token="java:com.nuance.tools.design.main.utils.TransformUtils"/>
    </func:function>

<func:function name="vb:exists">
        <xsl:param name="node"/>

<func:result select="$node and (string($node) != '')"/>
    </func:function>

<func:function name="vb:toLowerCase">
        <xsl:param name="mystring"/>
        <func:result select="str:toLowerCase(string($mystring))"
                     xmlns:str="java:java.lang.String"/>
    </func:function>

<func:function name="vb:log"
xmlns:util="java:com.nuance.tools.design.main.utils.TransformUtils">
        <xsl:param name="str"/>
        <xsl:variable name="foo" select="util:log($str)"/>
    </func:function>

</xsl:stylesheet>
``` struts-config.xsl

```xml
<?xml version="1.0"?>
<!--
    Converts PS-XML to struts-config.xml, required by VAF.

@author Rich Unger

Namespaces defined here:

root namespace: refers to the voicexml namespace because that's the root
            namespace of the content we'll be generating.
    xsl: the XSLT namespace
    psxml: for elements in the source (PS-XML) format
    nuance: nuance-proprietary voicexml extension tags
    saxon: for saxon-specific XSLT extensions
    vb: for custom extension functions (defined at the bottom of this file)
    func: for declaring functions in the vb namespace -->
<xsl:stylesheet xmlns:xsl="http://www.w3.org/1999/XSL/Transform"
                xmlns:psxml="http://www.nuance.com/psxml"
                xmlns:saxon="http://icl.com/saxon"
                xmlns:locale="java:com.nuance.tools.util.InternationalizationUtils"
                xmlns:vb="http://vbuilder.nuance.com/xslt"
                xmlns:func="http://exslt.org/functions"
                version="1.1"
                extension-element-prefixes="saxon vb func"
                exclude-result-prefixes="psxml">
                <!--
                xmlns="http://com.nuance.vaf/struts-config"
                -->
```

FIG. 10-10

```xml
<!-- i18n: encoding -->
<xsl:variable name="outputEncoding" select="locale:getDefaultEncodingName()"/>

<xsl:output method="xml"
            encoding="{$outputEncoding}"
            doctype-public="-//Apache Software Foundation//DTD Struts Configuration 1.1//EN"
            doctype-system="http://jakarta.apache.org/struts/dtds/struts-config_1_1.dtd"
            indent="yes"/>

<xsl:param name="SUBDIALOG_NAME" select="''"/>
<xsl:variable name="SUBDIALOG_DIR" select="concat($SUBDIALOG_NAME, '/')"/>

<xsl:param name="MAIN_DIALOG_NAME" select="''"/>

<xsl:template match="psxml:project">
<struts-config>

<xsl:text>
</xsl:text>
  <xsl:comment>=============== Form Beans Definitions ==================</xsl:comment>
  <form-beans>
    <form-bean name="dialogForm"
               type="com.nuance.vaf.struts.action.VAFActionForm"/>
  </form-beans>

<xsl:if test="psxml:global-information/psxml:server-side-error">
      <xsl:text>
</xsl:text>
      <xsl:comment>=============== Global Exceptions Definitions ==================</xsl:comment>
      <global-exceptions>
         <xsl:for-each select="psxml:global-information/psxml:server-side-error">
            <exception type="{@type}" key="">
               <xsl:choose>
                  <xsl:when test="vb:exists(@page)">
                     <xsl:variable name="container" select="@page"/>
                     <xsl:attribute name="path">/<xsl:value-of select="concat(vb:urlEncode($SUBDIALOG_DIR), 'dialogs/generated/', vb:urlEncode(vb:makeNmtoken(@page)), '.jsp')"/></xsl:attribute>
                  </xsl:when>
                  <xsl:otherwise><xsl:attribute name="path"><xsl:value-of select="@url"/></xsl:attribute></xsl:otherwise>
               </xsl:choose>
            </exception>
         </xsl:for-each>
      </global-exceptions>
  </xsl:if>

<xsl:text>
</xsl:text>
  <xsl:comment>=============== Action Mapping Definitions ==================</xsl:comment>
  <action-mappings>

<!-- the browser.initialPage (for the main dialog only) -->
  <xsl:if test="$SUBDIALOG_NAME = $MAIN_DIALOG_NAME">
```

FIG. 10-11

```
<xsl:text>
</xsl:text>
<xsl:comment>Used as the browser's initial page</xsl:comment>
<action path="/browserInitialPage"
        className="com.nuance.vaf.struts.action.VAFActionMapping"
        name="dialogForm"
        type="com.nuance.vaf.struts.action.VAFAction"
        attribute="browserInitialPage"
        scope="request"
        validate="false">
    <forward name="initialPage"
             className="com.nuance.vaf.struts.action.VAFActionForward"
path="/{vb:urlEncode($MAIN_DIALOG_NAME)}/dialogs/generated/parseQueryString.jsp"
             redirect="false">
        <set-property property="forwardQueryString" value="true"/>
    </forward>
</action>
</xsl:if>

<xsl:for-each select=".//psxml:vaf-state">
<xsl:variable name="pageName" select="vb:makeNmtoken(../@name)"/>
<xsl:variable name="stateName" select="vb:makeNmtoken(@name)"/>
<xsl:variable name="qName" select="concat($SUBDIALOG_NAME, '_', $pageName, '_', $stateName)"/>
<xsl:variable name="encodedQName" select="concat(vb:urlEncode($SUBDIALOG_NAME), '_', vb:urlEncode($pageName), '_', vb:urlEncode($stateName))"/>
    <xsl:if test="psxml:description">
        <xsl:comment><xsl:value-of select="psxml:description"/></xsl:comment>
    </xsl:if>
    <action path="/{$qName}"
            className="com.nuance.vaf.struts.action.VAFActionMapping"
            name="dialogForm"
            type="com.nuance.vaf.struts.action.VAFAction"
            attribute="{$qName}"
            scope="request"
            validate="false">

<!-- if we're doing any data access... -->
        <xsl:if test="vb:exists(psxml:data-access/psxml:action/psxml:operation/@name)">
            <!-- build a comma separated list of <data:action>s -->
            <xsl:variable name="dataActionList" saxon:assignable="yes" select="''"/>
            <xsl:for-each select="psxml:data-access/psxml:action[vb:exists(psxml:operation/@name)]">
                <xsl:if test="position() != 1">
                    <saxon:assign name="dataActionList" select="concat($dataActionList, ',')"/>
                </xsl:if>

<!-- data-access action name is
"dialogName_pageName_stateName__dataAction"
                     (as defined in data-config.xsl) -->
                <xsl:variable name="actionName" select="concat( $SUBDIALOG_NAME,
'_', vb:makeNmtoken(../../@name), '_', vb:makeNmtoken(../@name),
'__dataAction' )"/>
```

FIG. 10-12

```xml
            <saxon:assign name="dataActionList" select="concat($dataActionList,
$actionName)"/>
        </xsl:for-each>
        <set-property property="dataActions" value="{$dataActionList}"/>
    </xsl:if>

<!-- if we're doing any CTI interaction... -->
    <xsl:if test="psxml:cti-interaction/*[local-name() != 'description']">
        <set-property property="ctiInteraction" value="{$qName}"/>
    </xsl:if>

<!-- if we're doing any business rules... -->
    <!-- ...not in this version
    <xsl:if test="psxml:business-rule">
        <set-property property="businessRules"
value="{$SUBDIALOG_DIR}dialogs/generated/{$encodedQName}_bz.drl"/>
    </xsl:if>
    -->

<!-- if we're doing any transitions... -->
    <xsl:if test="psxml:dialog-action">
        <xsl:if test="psxml:dialog-action[last() > 1]">
            <!-- if there's only 1 transition, the vaf doesn't require a rules
file -->
            <set-property property="transitionRules"
value="{$SUBDIALOG_DIR}dialogs/generated/{$encodedQName}_tr.drl"/>
        </xsl:if>

<xsl:for-each select="psxml:dialog-action/psxml:goto">
            <xsl:choose>
                <xsl:when test="vb:exists(@container)">
                    <xsl:variable name="container" select="@container"/>
                    <xsl:variable name="destPage"
select="vb:makeNmtoken($container)"/>
                    <xsl:variable name="isJsp" select="vb:isJspPage(
/psxml:project/psxml:generic-container[@name=$container] )"/>
                    <xsl:variable name="extension">
                        <xsl:choose>
                            <xsl:when test="$isJsp">.jsp</xsl:when>
                            <xsl:otherwise>.vxml</xsl:otherwise>
                        </xsl:choose>
                    </xsl:variable>
                    <!--
                    Use forwards for JSP's, and redirects for (browser
cacheable) static files
                    -->
                    <forward name="{$destPage}"
path="/{vb:urlEncode($SUBDIALOG_DIR)}dialogs/generated/{vb:urlEncode($destPage)}{$e
xtension}"
                                 redirect="{string(not($isJsp))}"/>
                </xsl:when> <!-- end @container -->
                <xsl:when test="vb:exists(@url)"> <!-- explicit URL specified -
->
                    <!-- check for ends-with('.jsp') -->
                    <xsl:variable name="isJsp" select="substring(@url, string-
length(@url) - string-length('.jsp') + 1) = '.jsp'"/>
```

FIG. 10-13

```
                        <!--
                        Use forwards for JSP's, and redirects for (browser
cacheable) static files
                        -->
                        <forward name="{@url}"
                                 path="{@url}"
                                 redirect="{string(not($isJsp))}"/>
                </xsl:when>
            </xsl:choose>
        </xsl:for-each>
    </xsl:if>

</action>

</xsl:for-each>
</action-mappings>

<xsl:text>
</xsl:text>
<xsl:comment>=============== Controller Configuration
================</xsl:comment>
<controller
    className="com.nuance.vaf.struts.action.VAFControllerConfig"
    contentType="text/html;charset=UTF-8"
    debug="3"
    locale="true"
    nocache="true"
    processorClass="com.nuance.vaf.struts.action.VAFRequestProcessor">
        <!--
        <set-property property="appProperties"
value="dialogs/application.properties"/>
        -->
        <xsl:if test="*/psxml:vaf-state/psxml:data-
access/psxml:action[vb:exists(psxml:operation/@name)]">
            <set-property property="dataConfigUri" value="WEB-INF/data-
config.xml"/>
        </xsl:if>
        <xsl:if test="*/psxml:vaf-state/psxml:cti-interaction[*[local-name() !=
'description']]">
            <set-property property="ctiConfigUri" value="WEB-INF/cti-config.xml"/>
        </xsl:if>
</controller>

</struts-config>
</xsl:template>

<!--
Function for converting an xs:string to a NMTOKEN.
Replaces any character that is not a
letter, digit, '.', '-', or '_'

Usage
    <xsl:value-of select="vb:makeNmtoken(@name)"/>
-->
<func:function name="vb:makeNmtoken">
    <xsl:param name="str"/>
    <func:result select="token:stringToNmtoken($str)"
```

FIG. 10-14

```
xmlns:token="java:com.nuance.tools.design.main.utils.TransformUtils"/>
</func:function>

<func:function name="vb:urlEncode">
        <xsl:param name="str"/>
        <func:result select="util:urlEncode(string($str))"
            xmlns:util="java:com.nuance.tools.design.main.utils.TransformUtils"/>
    </func:function>

<!--
    A page should be a JSP if it is transitioned to from a vaf-state or server-
side-error.

Usage: <xsl:if test="vb:isJspPage($containerNode)"/>
    -->
    <func:function name="vb:isJspPage">
        <xsl:param name="container"/>
        <xsl:variable name="result" select="false()" saxon:assignable="yes"/>

<xsl:for-each select="/psxml:project/psxml:global-information/psxml:server-
side-error">
            <xsl:if test="$container/@name = @page">
                <saxon:assign name="result" select="true()"/>
            </xsl:if>
        </xsl:for-each>

<xsl:for-each select="/psxml:project/*/psxml:vaf-state/psxml:dialog-
action/psxml:goto">
            <xsl:if test="$container/@name = @container">
                <saxon:assign name="result" select="true()"/>
            </xsl:if>
        </xsl:for-each>

<func:result select="$result"/>
    </func:function>

<func:function name="vb:exists">
    <xsl:param name="node"/>

<func:result select="$node and (string($node) != '')"/>
</func:function>

</xsl:stylesheet>
``` transitionrules.xsl

```
<?xml version="1.0"?>
<!--
    Converts PS-XML to {stateName}_tr.drl, used by VAF
    for transition rules.

@author Rich Unger

Namespaces defined here:
```

FIG. 10-15

```
    root namespace: refers to the voicexml namespace because that's the root
        namespace of the content we'll be generating.
    xsl: the XSLT namespace
    psxml: for elements in the source (PS-XML) format
    nuance: nuance-proprietary voicexml extension tags
    saxon: for saxon-specific XSLT extensions
    vb: for custom extension functions (defined at the bottom of this file)
    func: for declaring functions in the vb namespace
-->
<xsl:stylesheet xmlns="http://com.nuance.vaf/nuance-drools"
                xmlns:xsl="http://www.w3.org/1999/XSL/Transform"
                xmlns:psxml="http://www.nuance.com/psxml"
                xmlns:saxon="http://icl.com/saxon"
                xmlns:vb="http://vbuilder.nuance.com/xslt"
                xmlns:func="http://exslt.org/functions"
                version="1.1"
                extension-element-prefixes="saxon vb func"
                exclude-result-prefixes="psxml">

<xsl:output method="xml"
                doctype-public="-//Nuance Communications Inc.//DTD V-Server Rules
1.0//EN"
                doctype-system="http://www.nuance.com/dtds/vserver/rules-
config.dtd"
                indent="yes"
                cdata-section-elements="condition consequence"/>

<!-- The system path to the root of the project (e.g.
'c:/projects/myproject/main/') -->
    <xsl:param name="XSL_PROJECT_ROOT" select="'./'"/>
    <xsl:param name="SUBDIALOG_NAME" select="''"/>

<!-- The system path to the root of the generated dialogs -->
    <xsl:variable name="OUTPUT_PATH" select="concat($XSL_PROJECT_ROOT,
'dialogs/generated/')"/>

<xsl:template match="psxml:project">
    <xsl:for-each select="*/psxml:vaf-state[psxml:dialog-action[last() > 1]]"> <!--
vaf states with more than 1 transition out -->
        <xsl:variable name="pageName" select="vb:makeNmtoken(../@name)"/>
        <xsl:variable name="stateName" select="vb:makeNmtoken(@name)"/>
        <xsl:variable name="qName" select="concat($SUBDIALOG_NAME, '_', $pageName,
'_', $stateName)"/>

<xsl:document href="{$OUTPUT_PATH}{$qName}_tr.drl">
            <rules>
                <rule-set name="{generate-id()}">
                    <xsl:for-each select="psxml:dialog-action">
                        <vaf-rule name="{generate-id()}">
                            <condition><xsl:value-of
select="vb:convertToJavaCond(@condition)"/></condition>
                            <consequence>
                                <xsl:choose>
                                    <xsl:when
test="vb:exists(psxml:goto/@container)">
```

FIG. 10-16

```
context.getDialogContext().setForward("<xsl:value-of
select="vb:makeNmtoken(psxml:goto/@container)"/>");
                                </xsl:when>
                                <xsl:when test="vb:exists(psxml:goto/@url)">
<!-- @url -->
context.getDialogContext().setForward("<xsl:value-of select="psxml:goto/@url"/>");
                                </xsl:when>
                            </xsl:choose>
                        </consequence>
                    </vaf-rule>
                </xsl:for-each>
            </rule-set>
        </rules>
    </xsl:document>

</xsl:for-each>
</xsl:template>

<!--
Function for converting an xs:string to a NMTOKEN.
Replaces any character that is not a
letter, digit, '.', '-', or '_'

Usage
    <xsl:value-of select="vb:makeNmtoken(@name)"/>
-->
<func:function name="vb:makeNmtoken">
    <xsl:param name="str"/>
    <func:result select="token:stringToNmtoken($str)"

xmlns:token="java:com.nuance.tools.design.main.utils.TransformUtils"/>
</func:function>

<!--
Function for converting ExpressionBuilder syntax into Java
If the expression is empty, return 'true'
-->
<func:function name="vb:convertToJavaCond">
    <xsl:param name="srcExpr"/>

<!--
    <xsl:variable name="translated" select="eb:codeGen(1, $srcExpr)"

xmlns:eb="java:com.nuance.tools.design.psxml.ui.expressionbuilder.ExpressionBuilder
"/>
                -->
    <xsl:variable name="translated" select="$srcExpr"/>

<xsl:choose>
        <xsl:when test="$translated = ''">
            <func:result select="'true'"/>
        </xsl:when>
        <xsl:otherwise>
            <func:result select="$translated"/>
        </xsl:otherwise>
    </xsl:choose>
</func:function>
```

FIG. 10-17

```
<func:function name="vb:exists">
    <xsl:param name="node"/>

<func:result select="$node and (string($node) != '')"/>
</func:function>

</xsl:stylesheet>
``` voicexml

```
<?xml version="1.0"?>
<!--
    Converts PS-XML to voicexml (runnable) content.

@author Rich Unger

Namespaces defined here:

root namespace: refers to the voicexml namespace because that's the root
            namespace of the content we'll be generating.
    xsl: the XSLT namespace
    psxml: for elements in the source (PS-XML) format
    nuance: nuance-proprietary voicexml extension tags
    context: the jsp taglib namespace declared by the VAF
    saxon: for saxon-specific XSLT extensions
    vb: for custom extension functions (defined at the bottom of this file)
    func: for declaring functions in the vb namespace
-->
<xsl:stylesheet xmlns:xsl="http://www.w3.org/1999/XSL/Transform"
            xmlns:psxml="http://www.nuance.com/psxml"
            xmlns:saxon="http://icl.com/saxon"
            xmlns:vb="http://vbuilder.nuance.com/xslt"
            xmlns:func="http://exslt.org/functions"
            xmlns:locale="java:com.nuance.tools.util.InternationalizationUtils"
            xmlns:map="java:java.util.HashMap"
            version="1.1"
            extension-element-prefixes="saxon vb func"
            exclude-result-prefixes="psxml locale map">
            <!--
            xmlns:nuance="http://voicexml.nuance.com/dialog"
            xmlns:context="/context"
            xmlns:voice="http://www.w3.org/2001/vxml"
            -->

<!-- i18n: encoding -->
    <xsl:variable name="outputEncoding" select="locale:getDefaultEncodingName()"/>

<!-- voicexml doctype declaration -->
    <xsl:variable name="publicDoctype" select="'-//Nuance/DTD VoiceXML 2.0//EN'"/>
    <xsl:variable name="systemDoctype"
select="'http://voicexml.nuance.com/dtd/nuancevoicexml-2-0.dtd'"/>

<!-- mutable variables (without using saxon:assignable) -->
```

FIG. 10-18

```
    <xsl:variable name="mutable" select="map:new()"/>

<xsl:output method="xml"
            indent="yes"
            encoding="{$outputEncoding}"
            media-type="application/voicexml+xml"/>
            <!--
            doctype-system="{$systemDoctype}"
            doctype-public="{$publicDoctype}"
            cdata-section-elements="voice:script"
            -->

<!-- The system path to the root of the project (e.g.
'c:/projects/myproject/main/') -->
    <xsl:param name="XSL_PROJECT_ROOT" select="'./'"/>

<xsl:param name="MAIN_DIALOG_NAME" select="'main'"/>
    <xsl:param name="SUBDIALOG_NAME" select="''"/>

<!-- The relative path to the root of the project from the generated pages
(e.g. '../../') -->
    <xsl:variable name="DIALOG_UNIT_ROOT">../../</xsl:variable>

<!-- The relative path to the root of the netbeans project -->
    <xsl:variable name="NB_PROJECT_ROOT">../../../</xsl:variable>

<!-- Prevent the output of any nuance-proprietary tags/attributes
        (will probably lead to code that doesn't run quite right) -->
    <xsl:param name="NO_NUANCE_EXTENSIONS"/>
    <xsl:variable name="NO_NUANCE" select="$NO_NUANCE_EXTENSIONS = 'true'"/>

<!-- Printed at the top of each generated vxml file -->
    <xsl:template name="VxmlHeader">
        <xsl:text>
</xsl:text>
        <xsl:comment>
This file was automatically generated by V-Builder.  Do not edit this file
directly.
It will be overwritten the next time code is generated.

Alternatively, you may copy this file out of the 'generated' folder, and maintain
it yourself.  The file will cease to be "managed" by a call flow view in V-Builder.
It may still be accessed, however, as the target of an Escape State.
        </xsl:comment>
    </xsl:template>

<xsl:template match="psxml:project">
        <!-- don't bother generating anything if we have no pages -->
        <xsl:if test="*[contains(local-name(),'-container')]">
            <xsl:apply-templates/>
        </xsl:if>
    </xsl:template>

<!-- map the global-information to a voicexml root document -->
    <xsl:template match="psxml:global-information"
xmlns="http://www.w3.org/2001/vxml">
        <xsl:document href="{$XSL_PROJECT_ROOT}dialogs/generated/root.vxml"
                    doctype-system="{$systemDoctype}"
```

FIG. 10-19

```
                    doctype-public="{$publicDoctype}">
        <xsl:call-template name="VxmlHeader"/>
        <vxml version="2.0" xmlns:nuance="http://voicexml.nuance.com/dialog"
xmlns="http://www.w3.org/2001/vxml">

<!-- copy the xml:lang attribute, if it exists -->
            <xsl:if test="vb:exists(@xml:lang)">
                <xsl:attribute name="xml:lang">
                    <xsl:value-of select="@xml:lang"/>
                </xsl:attribute>
            </xsl:if>

<meta name="Generator" content="V-Builder 3.0.0"/>

<xsl:text>
</xsl:text>
            <xsl:comment>
            The implicit variable containing the contents of the guard variable
on the
            last interactive dialog state.
            </xsl:comment>
            <var name="lastresult"/>

<xsl:text>
</xsl:text>
            <xsl:comment>
            The implicit variable for the app's root directory.
            </xsl:comment>
            <var name="_projectRoot" expr="'{$DIALOG_UNIT_ROOT}'"/>

<xsl:text>
</xsl:text>
            <xsl:comment>
            The implicit variable tracking how many times we've entered a
particular state
            (used for re-entry prompt logic).
            </xsl:comment>
            <var name="_stateVisits" expr="new Object()"/>

<xsl:text>
</xsl:text>
            <xsl:comment>
            The implicit variable tracking which error/universal behavior was
most recently
            executed (used for 'repeat' universal).
            </xsl:comment>
            <var name="_previousBehavior"/>

<xsl:text>
</xsl:text>
            <xsl:comment>
            The implicit variable containing the name of the previous state
            visited.  This will take the form "Page Name#State Name", as
entered
            in the vbuilder design tool.  _previousState gets used by
            pre-recognition prompts.
            </xsl:comment>
            <var name="_previousState" expr="''"/>
            <var name="_savedPrevGotoState" expr="''"/>
            <var name="_prevGotoState" expr="''"/>

<xsl:text>
</xsl:text>
```

FIG. 10-20

```
              <xsl:comment>
              The implicit script containing the path of the servlet context.
              Used by data access prototyping.
              </xsl:comment>
              <script src="servletContext.js"/>

<xsl:if test="/psxml:project/psxml:generic-container/psxml:vaf-
state">
                     <xsl:text>
</xsl:text>
                     <xsl:comment>
                     server-side contexts.  Need to declare this so that if we
                     declare call.foo later, we won't get an ECMAScript error.
                     </xsl:comment>
                     <var name="call" expr="new Object()"/>
                     <var name="call.dialog" expr="new Object()"/>
                     <xsl:if test="/psxml:project/psxml:generic-container/psxml:vaf-
state/psxml:cti-interaction">
                            <var name="cti" expr="new Object()"/>
                     </xsl:if>
                     <xsl:text>
</xsl:text>
                     <xsl:comment>end server-side contexts</xsl:comment>
                     <xsl:text>
</xsl:text>
              </xsl:if>

<xsl:if test="/psxml:project/psxml:generic-
container/psxml:recognition-state/psxml:nbest[@enabled = 'true']">
                     <xsl:text>
</xsl:text>
                     <xsl:comment>
                     The maxinterpretations property is really just around for
voicexml spec compliance in the maxnbest property.
                     It's safe to always make maxintepretations some absurdly high
number.
                     </xsl:comment>
                     <property name="maxinterpretations" value="10000"/>
              </xsl:if>

<xsl:apply-templates select="psxml:application-summary"/>
              <xsl:apply-templates select="psxml:properties"/>
              <xsl:apply-templates select="psxml:variable"/>
              <xsl:apply-templates select="psxml:script"/>
              <xsl:apply-templates select="psxml:universal-behavior |
psxml:error-behavior" mode="globalscope"/>
              <xsl:apply-templates select="psxml:reco-test-boilerplate"/>
              <xsl:apply-templates select="psxml:dtt-boilerplate"/>
              <xsl:apply-templates select="psxml:revision-history"/>

<!-- generate the universal grammars -->
              <xsl:apply-templates select="." mode="standard-universals"/>
              <xsl:apply-templates select="psxml:universal"/>

<xsl:text>
</xsl:text>
              <xsl:comment>
              If there's a missing state-specific handler, catch it here and do
nothing, rather than
              getting the system error prompt.
              </xsl:comment>
              <catch event="local">
```

FIG. 10-21

```
                        <log label="trace:?level=INFO" expr="'No state-specific
component found for Hybrid event: ' + _event"/>
                    </catch>

<xsl:text>
</xsl:text>
                    <xsl:comment>
                    These two handlers implement the 'repeat' behavior of the
'Termination' column in the
                    dialog actions tables.
                    </xsl:comment>
                    <catch event="rerecognize.noreprompt">
                    </catch>
                    <catch event="rerecognize.reprompt">
                        <reprompt/>
                    </catch>

<xsl:text>
</xsl:text>
                    <xsl:comment>
                    This root page is used as the initial page of the dialog.
                        It will map parameters to global variables, and transition to
                    the page specified in the GUI as the "initial page" for this
dialog.
                    </xsl:comment>
                    <form id="initialPage">
                        <xsl:text>
</xsl:text>
                        <xsl:comment>
                        The input parameter must from the subdialog must correspond
to a
                        form-level var declaration.  These var/assign pairs will
receive
                        the parameter value, and assign them to global variables.
                        </xsl:comment>
                        <xsl:for-each select="psxml:variable">
                            <var name="PARAM_{vb:trim(@name)}"/>
                        </xsl:for-each>
                        <block>
                            <xsl:for-each select="psxml:variable">
                                <if cond="PARAM_{vb:trim(@name)} != undefined">
                                    <assign name="application.{vb:trim(@name)}"
expr="PARAM_{vb:trim(@name)}"/>
                                </if>
                            </xsl:for-each>

<!-- is the target page dynamic? -->
                            <xsl:variable name="target" select="@initial-
container"/>
                            <goto
next="{vb:urlEncode(vb:makeNmtoken($target))}.vxml"/>
                        </block>
                    </form>
                </vxml>
            </xsl:document>

<xsl:if test="$MAIN_DIALOG_NAME = $SUBDIALOG_NAME">
            <xsl:document
href="{$XSL_PROJECT_ROOT}dialogs/generated/parseQueryString.jsp">
```

FIG. 10-22

```
            <jsp:root xmlns:jsp="http://java.sun.com/JSP/Page" version="1.2"
xmlns:context="/context" xmlns:version="/version">
                <jsp:directive.page pageEncoding="{$outputEncoding}"
contentType="text/xml;charset={$outputEncoding}"/>
                <version:content-base/>
                <jsp:scriptlet>
        if( request.getQueryString() == null ) {
            response.sendRedirect("root.vxml");
        }
        response.setHeader("Cache-Control", "no-cache");
    </jsp:scriptlet>

<xsl:call-template name="VxmlHeader"/>
                <vxml version="2.0"
                      application="root.vxml"
                      xmlns="http://www.w3.org/2001/vxml">
                    <form>
                        <block>

<xsl:text>
</xsl:text>
        <xsl:comment>
        This script block allows variables to be <submit>ed into the app
with
        a standard query string of the format "?var1=value1&var2=value2".
        These values will take precedence over default variable values, but not
over
        values passed in with a subdialog state.
        </xsl:comment>

<jsp:scriptlet>
            String queryString = request.getQueryString();
            if(queryString != null)
            {
                java.util.StringTokenizer tok = new
java.util.StringTokenizer(queryString, "\u0026"); // ampersand
                while(tok.hasMoreTokens()) {
                    String expression = tok.nextToken();
                    int index = expression.indexOf('=');
                    <!-- must disable output escaping for '>' here to work with
weblogic -->
                    if( index <xsl:text disable-output-
escaping="yes">></xsl:text> 0 ) {
                        String varName = expression.substring(0, index);
                        String varVal = expression.substring(index+1);
        </jsp:scriptlet>
                        <script>
                        <jsp:expression>"application[\""+varName+"\"] =
\""+varVal+"\";"</jsp:expression>
                        </script>
                                    <jsp:scriptlet>
                    }
                }
            }
        </jsp:scriptlet>

<goto next="root.vxml"/>
                    </block>
```

FIG. 10-23

```
                    </form>
                </ vxml>
            </jsp:root>
        </xsl:document>
    </xsl:if>
</xsl:template>

<!-- each generic-container is a page with form for each dialog state -->
<xsl:template match="psxml:generic-container"
xmlns="http://www.w3.org/2001/vxml">

<!-- the name of the page -->
        <xsl:if test="vb:setVar('pageName', vb:makeNmtoken(@name))"/>

<!-- is this page dynamic? -->
        <xsl:if test="vb:isJspPage(.)">
            <!-- declare all the server-side variables used in
                 this page as javascript variables -->
            <xsl:call-template name="jsp-vars"/>
        </xsl:if>

<xsl:document
href="{$XSL_PROJECT_ROOT}dialogs/generated/{vb:getVar('pageName')}.vxml"
                    doctype-system="{$systemDoctype}"
                    doctype-public="{$publicDoctype}">
            <xsl:call-template name="VxmlHeader"/>
            <xsl:apply-templates select="psxml:description"/>
            <vxml version="2.0"
                    application="root.vxml"
                    xmlns:nuance="http://voicexml.nuance.com/dialog"
                    xmlns="http://www.w3.org/2001/vxml">

<!-- copy the xml:lang attribute, if it exists -->
                <xsl:choose>
                    <xsl:when test="vb:exists(@lang)">
                        <xsl:attribute name="xml:lang">
                            <xsl:value-of select="@lang"/>
                        </xsl:attribute>
                    </xsl:when>
                    <xsl:when test="vb:exists(../psxml:global-
information/@xml:lang)">
                        <xsl:attribute name="xml:lang">
                            <xsl:value-of select="../psxml:global-
information/@xml:lang"/>
                        </xsl:attribute>
                    </xsl:when>
                </xsl:choose>

<meta name="Generator" content="V-Builder 3.0.0"/>

<!-- scope the declarations at the page-level -->
                <xsl:apply-templates select="psxml:container-declarations"/>

<!-- the initial state -->
                <xsl:apply-templates select="*[local-name() != 'description' and
local-name() != 'container-declarations' and @name = ../@initial-state]"/>
```

FIG. 10-24

```
                <!-- the rest of the states -->
                <xsl:apply-templates select="*[local-name() != 'description' and
local-name() != 'container-declarations' and @name != ../@initial-state]"/>
            </vxml>
        </xsl:document>
    </xsl:template>

<!--
    Locates all server-side variables used in attributes below
    the context node, and creates an ECMAScript variable with
    the value of the server-side variable (using jsp)
    -->
    <xsl:template name="jsp-vars" xmlns:context="/context"
xmlns:jsp="http://java.sun.com/JSP/Page">
        <xsl:variable name="projectNode" select="/psxml:project"/>

<!-- used to prevent duplicates -->
        <xsl:variable name="dupes" select="vb:newSet()"/>

<!-- the vaf-states that point to this page -->
        <xsl:variable name="containerName" select="./@name"/>
        <xsl:variable name="vafStates" select="/psxml:project/*/psxml:vaf-
state[psxml:dialog-action/psxml:goto/@container = $containerName]"/>
        <xsl:document
href="{$XSL_PROJECT_ROOT}dialogs/generated/{vb:getVar('pageName')}.jsp">
            <xsl:call-template name="VxmlHeader"/>
            <jsp:root xmlns:jsp="http://java.sun.com/JSP/Page" version="1.2"
xmlns:context="/context" xmlns:version="/version">
                <jsp:directive.page pageEncoding="{$outputEncoding}"
contentType="text/xml;charset={$outputEncoding}"/>
                <version:content-base/>

<vxml version="2.0"
                    application="root.vxml"
                    xmlns="http://www.w3.org/2001/vxml"
                    xmlns:nuance="http://voicexml.nuance.com/dialog">

<meta name="Generator" content="V-Builder 3.0.0"/>

<!-- for each DB output variable... -->
                    <xsl:for-each select="$vafStates/psxml:data-
access/psxml:action/psxml:outputs/psxml:simple">
                        <xsl:if test="vb:addToSet($dupes, string(@value))">
                        <xsl:choose>
                            <!-- 2D array -->
                            <xsl:when test="starts-with(@type, 'ArrayOfArrayOf')">
<xsl:variable name="javaId" select="vb:makeNmtoken(@value)"/>
<context:call id="{$javaId}_length" key="call.{@value}.length"
type="java.lang.Integer"/>
<jsp:scriptlet>
if (<xsl:value-of select="$javaId"/>_length.intValue() != 0)
{
</jsp:scriptlet>
    <script>
<jsp:scriptlet>
    out.println("application.<xsl:value-of select="@value"/> = new Array();");
    <!-- must use != instead of '<' here to work with weblogic -->
```

FIG. 10-25

```
        for (int i=0; i != <xsl:value-of select="$javaId"/>_length.intValue(); i++)
        {
            String row = "call.<xsl:value-of select="@value"/>[" + i + ']';
            String rowLength = row + ".length";

out.println("application.<xsl:value-of select="@value"/>[" + i + "] = new
Array();");
</jsp:scriptlet>
<context:call id="{$javaId}_length2" key="%=rowLength%" type="java.lang.Integer"/>
<jsp:scriptlet>
        <!-- must use != instead of '<' here to work with weblogic -->
        for (int j=0; j != <xsl:value-of select="$javaId"/>_length2.intValue();
j++)
        {
            String elem = row + '[' + j + ']';
            out.print("application.<xsl:value-of select="@value"/>[" + i + "][" + j
+ "] = \"");</jsp:scriptlet><context:call key="%=elem%"
xmlEscape="true"/><jsp:scriptlet>
            out.println("\";");
        }
    }
</jsp:scriptlet>
    </script>
<jsp:scriptlet>
}
</jsp:scriptlet>
                        </xsl:when>
                        <!-- 1D array -->
                        <xsl:when test="starts-with(@type, 'ArrayOf')">
<xsl:variable name="javaId" select="vb:makeNmtoken(@value)"/>
<context:call id="{$javaId}_length" key="call.{@value}.length"
type="java.lang.Integer"/>
<jsp:scriptlet>
if (<xsl:value-of select="$javaId"/>_length.intValue() != 0)
{
</jsp:scriptlet>
    <script>
application.<xsl:value-of select="@value"/> = new Array();
<jsp:scriptlet>
    <!-- must use != instead of '<' here to work with weblogic -->
    for (int i=0; i != <xsl:value-of select="$javaId"/>_length.intValue(); i++)
    {
        String elem = "call.<xsl:value-of select="@value"/>[" + i + ']';
</jsp:scriptlet>
application.<xsl:value-of select="@value"/>[<jsp:expression>i</jsp:expression>] =
"<context:call key="%=elem%" xmlEscape="true"/>";
<jsp:scriptlet>
    }
</jsp:scriptlet>
    </script>
<jsp:scriptlet>
}
</jsp:scriptlet>
                        </xsl:when>
                        <!-- non-array -->
                        <xsl:otherwise>
    <script>
```

FIG. 10-26

```
application.<xsl:value-of select="@value"/> = "<context:call key="call.{@value}"
xmlEscape="true"/>";
    </script>
                </xsl:otherwise>
            </xsl:choose>
          </xsl:if>
       </xsl:for-each>

<!-- for each CTI extraction -->
       <xsl:for-each select="$vafStates/psxml:cti-interaction/psxml:cti-
extract[vb:exists(@vafdest)]">
            <xsl:if test="vb:addToSet($dupes, string(@vafdest))">
    <script>
application.<xsl:value-of select="@vafdest"/> = "<context:call
key="call.{@vafdest}"/>";
    </script>
            </xsl:if>
       </xsl:for-each>

<!-- for the results of a CTI query session -->
       <xsl:for-each select="$vafStates/psxml:cti-interaction/psxml:cti-
query-session">
    <script>
application.cti.action = "<context:call key="cti.action"/>";
application.cti.reason = "<context:call key="cti.reason"/>";
application.cti.destinationNumber = "<context:call key="cti.destinationNumber"/>";
application.cti.routeType = "<context:call key="cti.routeType"/>";
    </script>
       </xsl:for-each>

<form>
                       <block>
                           <goto
next="{vb:urlEncode(vb:getVar('pageName'))}.vxml"/>
                       </block>
                   </form>
                </vxml>
            </jsp:root>
         </xsl:document>
    </xsl:template>

<xsl:template match="psxml:container-declarations">
        <xsl:apply-templates select="psxml:properties"/>
        <xsl:apply-templates select="psxml:variable"/>
        <xsl:apply-templates select="psxml:script"/>
    </xsl:template>

<xsl:template match="psxml:application-summary"/>

<xsl:template match="psxml:digitstring-state"
xmlns="http://www.w3.org/2001/vxml">
        <xsl:apply-templates select="psxml:description"/>

<xsl:if test="vb:setVar('stateName', vb:makeNmtoken(@name))"/>
        <form id="{vb:getVar('stateName')}">
            <xsl:apply-templates select="." mode="prompt_condition_vars"/>
            <var name="_previousBehavior" expr="undefined"/>
```

FIG. 10-27

```
        <field name="{vb:getVar('stateName')}">
            <property name="inputmodes" value="dtmf"/>

<!-- dtmf termination timeout -->
            <xsl:if test="vb:exists(@timeout)">
                <property name="termtimeout" value="{@timeout}"/>
            </xsl:if>

<!-- dtmf termination keys (if blank, we _want_ to explicitly
                set it to the empty string, as the default is # -->
            <property name="termchar" value="{@termkeys}"/>

<!-- the prompts -->
            <xsl:apply-templates select="psxml:pre-recognition">
                <xsl:with-param name="inside-interactive-state"
select="true()"/>
            </xsl:apply-templates>

<xsl:apply-templates select="psxml:properties"/>
            <xsl:call-template name="context-file-ref"/>
            <xsl:apply-templates select="psxml:universal-behavior |
psxml:error-behavior" mode="localscope"/>

<!-- Here, we output <link>s to universal grammars.  -->
            <xsl:call-template name="UniversalLinks"/>

<!-- default minlength and maxlength to 1 if nothing specified -->
            <xsl:variable name="minlength">
                <xsl:choose>
                    <xsl:when test="vb:exists(@minlength)"><xsl:value-of
select="@minlength"/></xsl:when>
                    <xsl:otherwise>1</xsl:otherwise>
                </xsl:choose>
            </xsl:variable>
            <xsl:variable name="maxlength">
                <xsl:choose>
                    <xsl:when test="vb:exists(@maxlength)"><xsl:value-of
select="@maxlength"/></xsl:when>
                    <xsl:otherwise>1</xsl:otherwise>
                </xsl:choose>
            </xsl:variable>

<xsl:choose>
                <xsl:when test="$maxlength = $minlength">
                    <grammar src="builtin:dtmf/digits?length={$minlength}"/>
                </xsl:when>
                <xsl:when test="$maxlength < $minlength">
                    <!-- let's be kind -->
                    <grammar
src="builtin:dtmf/digits?minlength={$maxlength};maxlength={$minlength}"/>
                </xsl:when>
                <xsl:otherwise>
                    <grammar
src="builtin:dtmf/digits?minlength={$minlength};maxlength={$maxlength}"/>
                </xsl:otherwise>
            </xsl:choose>
```

FIG. 10-28

```
                <filled>
                    <!-- store the guard variable to lastresult$ -->
                    <assign name="application.lastresult"
expr="{vb:getVar('stateName')}"/>
                    <xsl:apply-templates select="." mode="var_previousState"/>
                    <xsl:apply-templates select="psxml:dialog-action"/>
                </filled>
            </field>
        </form>
    </xsl:template>

<xsl:template match="psxml:recognition-state"
xmlns="http://www.w3.org/2001/vxml">
        <xsl:apply-templates select="psxml:description"/>

<xsl:if test="vb:setVar('stateName', vb:makeNmtoken(@name))"/>

<form id="{vb:getVar('stateName')}">
            <xsl:apply-templates select="." mode="prompt_condition_vars"/>
            <var name="_previousBehavior" expr="undefined"/>

<field name="{vb:getVar('stateName')}">
                <xsl:if test="psxml:nbest/@enabled = 'true'">
                    <property name="maxnbest" value="{psxml:nbest/@maxnbest}"/>
                </xsl:if>

<!-- the prompts -->
                <xsl:apply-templates select="psxml:pre-recognition">
                    <xsl:with-param name="inside-interactive-state"
select="true()"/>
                </xsl:apply-templates>

<xsl:apply-templates select="psxml:properties"/>
                <xsl:call-template name="context-file-ref"/>
                <xsl:apply-templates select="psxml:universal-behavior |
psxml:error-behavior" mode="localscope"/>

<!-- Here, we output <link>s to universal grammars. -->
                <xsl:call-template name="UniversalLinks"/>

<xsl:apply-templates select="psxml:grammar"/>

<filled>
                    <!-- store the guard variable to lastresult$ -->
                    <assign name="application.lastresult"
expr="{vb:getVar('stateName')}"/>
                    <xsl:for-each select="psxml:post-recognition">
                        <xsl:apply-templates select="psxml:description"/>
                        <xsl:apply-templates select=".." mode="var_previousState"/>
                        <xsl:apply-templates select="psxml:dialog-action"/>
                    </xsl:for-each>
                </filled>
            </field>
        </form>

</xsl:template>
```

FIG. 10-29

```xml
<xsl:template match="psxml:record-state" xmlns="http://www.w3.org/2001/vxml">
    <xsl:apply-templates select="psxml:description"/>

<xsl:if test="vb:setVar('stateName', vb:makeNmtoken(@name))"/>

<form id="{vb:getVar('stateName')}">
        <xsl:apply-templates select="." mode="prompt_condition_vars"/>

<record name="{vb:getVar('stateName')}" beep="{@beep}"
dtmfterm="{@dtmfterm}">
            <xsl:if test="vb:exists(@maxtime)">
                <xsl:attribute name="maxtime"><xsl:value-of
select="@maxtime"/></xsl:attribute>
            </xsl:if>
            <xsl:if test="vb:exists(@finalsilence)">
                <xsl:attribute name="finalsilence"><xsl:value-of
select="@finalsilence"/></xsl:attribute>
            </xsl:if>
            <xsl:if test="vb:exists(@destexpr)">
                <xsl:choose>
                    <xsl:when test="$NO_NUANCE">
                        <xsl:comment>You've elected to not output any Nuance
extension elements. Unfortunately, there is no VoiceXML 2.0 standard technique for
specifying a destination URL for a recording (without an accompanying page
transition). If you re-generate your code with Nuance extensions enabled, you'll
see a 'destexpr' attribute here.</xsl:comment>
                    </xsl:when>
                    <xsl:otherwise>
                        <xsl:attribute name="destexpr"><xsl:value-of
select="vb:convertEcma(@destexpr)"/></xsl:attribute>
                    </xsl:otherwise>
                </xsl:choose>
            </xsl:if>

<!-- the prompt -->
            <xsl:apply-templates select="psxml:pre-recognition">
                <xsl:with-param name="inside-interactive-state"
select="true()"/>
            </xsl:apply-templates>

<xsl:apply-templates select="psxml:properties"/>
            <xsl:call-template name="context-file-ref"/>
            <xsl:apply-templates select="psxml:error-behavior"
mode="localscope"/>

<filled>
                <!-- store the result of the recording to lastresult$ -->
                <assign name="application.lastresult"
expr="{vb:getVar('stateName')}"/>
                <xsl:for-each select="psxml:post-recognition">
                    <xsl:apply-templates select="psxml:description"/>
                    <xsl:apply-templates select=".." mode="var_previousState"/>
                    <xsl:apply-templates select="psxml:dialog-action"/>
                </xsl:for-each>
            </filled>
        </record>
```

FIG. 10-30

```
        </form>
    </xsl:template>

<xsl:template match="psxml:subdialog-state"
xmlns="http://www.w3.org/2001/vxml">
        <xsl:apply-templates select="psxml:description"/>

<xsl:if test="vb:setVar('stateName', vb:makeNmtoken(@name))"/>

<form id="{vb:getVar('stateName')}">
            <xsl:apply-templates select="." mode="prompt_condition_vars"/>
            <subdialog name="{vb:getVar('stateName')}">
                <!-- is the target page dynamic? -->
                <xsl:attribute name="src">
                    <xsl:value-of select="concat($NB_PROJECT_ROOT,
vb:urlEncode(vb:makeNmtoken(@container)), '/dialogs/generated/root.vxml')"/>
                </xsl:attribute>

<xsl:for-each select="psxml:param[vb:exists(@expr)]">
                    <param name="PARAM_{@name}" expr="{vb:convertEcma(@expr)}"/>
                </xsl:for-each>

<xsl:apply-templates select="psxml:error-behavior"
mode="localscope"/>

<filled>
                    <!-- the outputs from the subdialog's <return> element
                         get assigned to app-or-page scoped variables here -->
                    <xsl:for-each select="psxml:output">
                        <assign name="{@dst}"
expr="{vb:getVar('stateName')}.{vb:trim(@src)}"/>
                    </xsl:for-each>
                    <!-- the standard post-rec set of <dialog-action>s -->
                    <xsl:for-each select="psxml:post-recognition">
                        <xsl:apply-templates select="psxml:description"/>
                        <xsl:apply-templates select=".." mode="var_previousState"/>
                        <xsl:apply-templates select="psxml:dialog-action"/>
                    </xsl:for-each>
                </filled>
            </subdialog>
        </form>
    </xsl:template>

<xsl:template match="psxml:escape-state" xmlns="http://www.w3.org/2001/vxml">
        <xsl:apply-templates select="psxml:description"/>

<xsl:if test="vb:setVar('stateName', vb:makeNmtoken(@name))"/>

<!-- the URI of the dialog we want to run, relative to _projectRoot/dialogs
-->
        <xsl:variable name="pageURI" select="concat('dialogs/', @src)"/>

<form id="{vb:getVar('stateName')}">
            <xsl:apply-templates select="." mode="prompt_condition_vars"/>
            <subdialog name="{vb:getVar('stateName')}">

<!-- point to a dialog in _projectRoot/dialogs/ -->
```

FIG. 10-31

```
            <xsl:choose>
                <xsl:when test="contains(@src,':')">
                    <xsl:attribute name="src"><xsl:value-of
select="@src"/></xsl:attribute>
                </xsl:when>
                <xsl:when test="vb:exists(@src)">
                    <xsl:attribute name="src"><xsl:value-of
select="concat($DIALOG_UNIT_ROOT, vb:urlEncode($pageURI))"/></xsl:attribute>
                </xsl:when>
            </xsl:choose>

<xsl:apply-templates select="psxml:param"/>
            <xsl:apply-templates select="psxml:error-behavior"
mode="localscope"/>

<filled>
                <!-- the outputs from the subdialog's <return> element
                     get assigned to app-or-page scoped variables here -->
                <xsl:for-each select="psxml:output">
                    <assign name="{@dst}"
expr="{vb:getVar('stateName')}.{vb:trim(@src)}"/>
                </xsl:for-each>
                <xsl:for-each select="psxml:post-recognition">
                    <xsl:apply-templates select="psxml:description"/>
                    <xsl:apply-templates select=".." mode="var_previousState"/>
                    <xsl:apply-templates select="psxml:dialog-action"/>
                </xsl:for-each>
            </filled>
        </subdialog>
    </form>

<xsl:if test="not( vb:fileExists($pageURI) ) and not(contains(@src, ':'))">
        <xsl:document href="{$XSL_PROJECT_ROOT}{$pageURI}"
                doctype-system="{$systemDoctype}"
                doctype-public="{$publicDoctype}">
            <xsl:apply-templates select="psxml:description"/>
            <vxml version="2.0"
                xmlns:nuance="http://voicexml.nuance.com/dialog"
                xmlns="http://www.w3.org/2001/vxml">

<!-- copy the xml:lang attribute, if it exists -->
                <xsl:if test="vb:exists(/psxml:project/psxml:global-
information/@xml:lang)">
                    <xsl:attribute name="xml:lang">
                        <xsl:value-of select="/psxml:project/psxml:global-
information/@xml:lang"/>
                    </xsl:attribute>
                </xsl:if>

<meta name="Generator" content="V-Builder 3.0.0"/>

<xsl:variable name="escapeNamelist" select="vb:newBuffer()"/>

<xsl:text>
</xsl:text>
                <xsl:comment>These variables need to be returned to the parent
application.</xsl:comment>
                <xsl:for-each select="psxml:output">
```

FIG. 10-32

```
                        <var name="{@src}"/>
                        <xsl:if test="vb:appendToBuffer($escapeNamelist,
concat(@src, ' '))"/>
                    </xsl:for-each>

<form>
                        <xsl:text>
</xsl:text>
                        <xsl:comment>Subdialog parameters passed into this escape
state.</xsl:comment>
                        <xsl:for-each select="psxml:param">
                            <var name="{@name}"/>
                        </xsl:for-each>
                        <xsl:text>
</xsl:text>
                        <xsl:comment>End subdialog parameters.</xsl:comment>

<block>
                            <xsl:text>
</xsl:text>
                            <xsl:comment>This is just a prompt to let you know
where you are when testing this app.</xsl:comment>
                            <prompt>You have entered an escape state without
modifying the sample page generated for that state.</prompt>
                            <log label="trace:?level=USER_WARN">You have entered an
escape state without modifying the sample page generated for that state.  The page
is at <xsl:value-of select="$pageURI"/>.</log>
                            <return
namelist="{vb:appendToBuffer($escapeNamelist)}"/>
                        </block>
                    </form>
                </vxml>
            </xsl:document>
        </xsl:if>
    </xsl:template>

<xsl:template match="psxml:transfer-state" xmlns="http://www.w3.org/2001/vxml">
        <xsl:apply-templates select="psxml:description"/>

<xsl:if test="vb:setVar('stateName', vb:makeNmtoken(@name))"/>

<form id="{vb:getVar('stateName')}">
            <xsl:apply-templates select="." mode="prompt_condition_vars"/>
            <transfer name="{vb:getVar('stateName')}">
                <xsl:if test="vb:exists(@destexpr)">
                    <xsl:attribute name="destexpr"><xsl:value-of
select="vb:convertEcma(@destexpr)"/></xsl:attribute>
                </xsl:if>
                <xsl:if test="vb:exists(@connecttimeout)">
                    <xsl:attribute name="connecttimeout"><xsl:value-of
select="@connecttimeout"/></xsl:attribute>
                </xsl:if>
                <xsl:if test="vb:exists(@maxtime)">
                    <xsl:attribute name="maxtime"><xsl:value-of
select="@maxtime"/></xsl:attribute>
                </xsl:if>
                <xsl:if test="vb:exists(@transferaudio)">
                    <xsl:attribute name="transferaudio"><xsl:value-of
select="@transferaudio"/></xsl:attribute>
                </xsl:if>
```

FIG. 10-33

```xml
                <xsl:if test="vb:exists(@aaiexpr)">
                        <xsl:attribute name="aaiexpr"><xsl:value-of
select="vb:convertEcma(@aaiexpr)"/></xsl:attribute>
                </xsl:if>
                <xsl:if test="not($NO_NUANCE)">
                        <xsl:if test="vb:exists(@type)">
                                <xsl:attribute name="type"><xsl:value-of
select="@type"/></xsl:attribute>
                        </xsl:if>
                        <xsl:if test="vb:exists(@localuriexpr)">
                                <xsl:attribute name="localuriexpr"><xsl:value-of
select="vb:convertEcma(@localuriexpr)"/></xsl:attribute>
                        </xsl:if>
                        <xsl:if test="vb:exists(@farenddialogexpr)">
                                <xsl:attribute name="farenddialogexpr"><xsl:value-of
select="vb:convertEcma(@farenddialogexpr)"/></xsl:attribute>
                        </xsl:if>
                        <xsl:if test="vb:exists(@warningtime)">
                                <xsl:attribute name="warningtime"><xsl:value-of
select="@warningtime"/></xsl:attribute>
                        </xsl:if>
                        <xsl:if test="vb:exists(@warningaudio)">
                                <xsl:attribute name="warningaudio"><xsl:value-of
select="@warningaudio"/></xsl:attribute>
                        </xsl:if>
                        <xsl:if test="vb:exists(@devicedetection)">
                                <xsl:attribute name="devicedetection"><xsl:value-of
select="@devicedetection"/></xsl:attribute>
                        </xsl:if>
                </xsl:if>
                <!-- default is 'blind', and the only other choice is conditional
(which is nuance-proprietary).
                        The tool does not support bridged transfers -->
                <xsl:if test="$NO_NUANCE and (@type = 'conditional')">
                        <xsl:comment>You've elected to not output any Nuance extension
elements.  Unfortunately, there is no VoiceXML 2.0 standard technique for doing a
conditional transfer.  If you re-generate your code with Nuance extensions enabled,
you'll see additional attributes here.</xsl:comment>
                </xsl:if>

<!-- the prompt -->
                <xsl:apply-templates select="psxml:pre-recognition"/>

<xsl:apply-templates select="psxml:properties"/>
                <xsl:call-template name="context-file-ref"/>
                <xsl:apply-templates select="psxml:error-behavior"
mode="localscope"/>

<filled>
                        <!-- store the result of the transfer to lastresult$ -->
                        <assign name="application.lastresult"
expr="{vb:getVar('stateName')}"/>
                        <xsl:for-each select="psxml:post-recognition">
                                <xsl:apply-templates select="psxml:description"/>
                                <xsl:apply-templates select=".." mode="var_previousState"/>
                                <xsl:apply-templates select="psxml:dialog-action"/>
                        </xsl:for-each>
```

FIG. 10-34

```
            </filled>
        </transfer>
    </form>
</xsl:template>

<xsl:template match="psxml:dtmf-state" xmlns="http://www.w3.org/2001/vxml">
    <xsl:apply-templates select="psxml:description"/>

<xsl:if test="vb:setVar('stateName', vb:makeNmtoken(@name))"/>

<form id="{vb:getVar('stateName')}">
        <xsl:apply-templates select="." mode="prompt_condition_vars"/>
        <var name="_previousBehavior" expr="undefined"/>

<field name="{vb:getVar('stateName')}">
            <property name="inputmodes" value="dtmf"/>

<!-- dtmf termination timeout -->
            <xsl:if test="vb:exists(@timeout)">
                <property name="termtimeout" value="{@timeout}"/>
            </xsl:if>

<!-- dtmf termination keys (if blank, we _want_ to explicitly
                 set it to the empty string, as the default is # -->
                <property name="termchar" value="{@termkeys}"/>

<!-- the prompt -->
            <xsl:apply-templates select="psxml:pre-recognition">
                <xsl:with-param name="inside-interactive-state"
select="true()"/>
            </xsl:apply-templates>

<xsl:apply-templates select="psxml:properties"/>
            <xsl:call-template name="context-file-ref"/>
            <xsl:apply-templates select="psxml:universal-behavior |
psxml:error-behavior" mode="localscope"/>

<!-- The <option> tags -->
            <xsl:for-each select="psxml:dialog-action">
                <option dtmf="{@condition}"/>
            </xsl:for-each>

<!-- The <filled> tag, executed after one of the
                 options is recognized -->
            <filled>
                <xsl:apply-templates select="." mode="var_previousState"/>

<xsl:for-each select="psxml:dialog-action">
                    <if cond="{vb:getVar('stateName')} == '{@condition}'">
                        <xsl:apply-templates select="psxml:repeat | psxml:goto
| psxml:throw | psxml:return | psxml:submit"/>
                    </if>
                </xsl:for-each>
            </filled>

<!-- Here, we output <link>s to universal grammars. -->
            <xsl:call-template name="UniversalLinks"/>
```

FIG. 10-35

```
            </field>
        </form>
    </xsl:template>

<xsl:template match="psxml:processing-state | psxml:decision-state"
xmlns="http://www.w3.org/2001/vxml">
        <xsl:apply-templates select="psxml:description"/>

<xsl:if test="vb:setVar('stateName', vb:makeNmtoken(@name))"/>

<form id="{vb:getVar('stateName')}">
            <xsl:apply-templates select="." mode="prompt_condition_vars"/>
            <block name="{vb:getVar('stateName')}">
                <xsl:apply-templates select="." mode="var_previousState"/>
                <xsl:apply-templates select="psxml:dialog-action"/>
            </block>
        </form>
    </xsl:template>

<xsl:template match="psxml:terminate-state"
xmlns="http://www.w3.org/2001/vxml">
        <xsl:apply-templates select="psxml:description"/>

<xsl:if test="vb:setVar('stateName', vb:makeNmtoken(@name))"/>

<form id="{vb:getVar('stateName')}">
            <block name="{vb:getVar('stateName')}">
                <disconnect/>
            </block>
            <xsl:if test="psxml:dialog-action">
                <catch event="connection.disconnect.hangup">
                    <xsl:apply-templates select="psxml:dialog-action"/>
                </catch>
            </xsl:if>
        </form>
    </xsl:template>

<xsl:template match="psxml:properties" xmlns="http://www.w3.org/2001/vxml">
        <xsl:apply-templates select="psxml:property"/>
    </xsl:template>

<xsl:template match="psxml:property" xmlns="http://www.w3.org/2001/vxml">
        <xsl:apply-templates select="psxml:description"/>
        <property value="{@value}" name="{@name}"/>
    </xsl:template>

<xsl:template name="context-file-ref" xmlns="http://www.w3.org/2001/vxml">

<xsl:variable name="context-file-src"
select="'../../grammars/context.ctx#'"/>
        <property>
            <xsl:attribute name="src">
                <xsl:choose>
                    <xsl:when test="vb:exists(psxml:properties/psxml:context-file/@id)">
                        <xsl:value-of select="concat($context-file-src,
psxml:properties/psxml:context-file/@id)"/>
```

FIG. 10-36

```
                        <xsl:if test="vb:addStateContext(../@name, @name,
psxml:properties/psxml:context-file/@id)"/>
                    </xsl:when>
                    <xsl:otherwise>
                        <xsl:value-of select="concat($context-file-src, '_state_',
vb:getVar('pageName'), '_', vb:getVar('stateName'))"/>
                        <xsl:if test="vb:addStateContext(../@name, @name, '')"/>
                    </xsl:otherwise>
                </xsl:choose>
            </xsl:attribute>
        </property>
    </xsl:template>

<xsl:template match="psxml:variable" xmlns="http://www.w3.org/2001/vxml">
        <xsl:apply-templates select="psxml:description"/>
        <var name="{@name}">
            <xsl:if test="vb:exists(@value)">
                <xsl:attribute name="expr">
                    <xsl:value-of select="vb:convertEcma(@value)"/>
                </xsl:attribute>
            </xsl:if>
        </var>
    </xsl:template>

<!-- creates a stub grammar to trigger a custom universal -->
    <xsl:template match="psxml:universal">

<!-- the name of the grammer we'll generate -->
        <xsl:variable name="grammarURI"
                    select="concat('grammars/universals/', vb:makeNmtoken(@type),
'.gsl')"/>

<!-- the stub grammar (don't clobber an existing grammar file) -->
        <xsl:if test="not( vb:fileExists($grammarURI) )">
            <xsl:document href="{$XSL_PROJECT_ROOT}{$grammarURI}"
                        method="text"
                        media-type="application/x-nuance-gsl">;GSL2.0
;
; Generated by V-Builder.
; This is a stub grammar generated from sample phrases in the design.

Custom_Universal:public [
<xsl:for-each select="psxml:utterance">
    <xsl:text>    (</xsl:text><xsl:value-of
select="vb:trim(.)"/><xsl:text>)
</xsl:text>
</xsl:for-each>]
            </xsl:document>
        </xsl:if>
    </xsl:template>

<!-- creates the standard set of universals -->
    <xsl:template match="*" mode="standard-universals">
        <xsl:variable name="help" select="concat('grammars/universals/',
'help.gsl')"/>
        <xsl:variable name="repeat" select="concat('grammars/universals/',
'repeat.gsl')"/>
```

FIG. 10-37

```
        <xsl:variable name="operator" select="concat('grammars/universals/',
'operator.gsl')"/>
        <xsl:variable name="exit" select="concat('grammars/universals/',
'exit.gsl')"/>
        <xsl:variable name="mainmenu" select="concat('grammars/universals/',
'mainmenu.gsl')"/>
        <xsl:variable name="cancel" select="concat('grammars/universals/',
'cancel.gsl')"/>

<xsl:if test="not( vb:fileExists($help) )">
            <xsl:document href="{$XSL_PROJECT_ROOT}{$help}"
                          method="text"
                          media-type="application/x-nuance-gsl"><![CDATA[;GSL2.0
;
; Generated by V-Builder.
; This is a standard universal grammar.

Help:public [
    help
    (help please)~.01
    (i need help)~.01
] {<command help>}]]>
            </xsl:document>
        </xsl:if>

<xsl:if test="not( vb:fileExists($repeat) )">
            <xsl:document href="{$XSL_PROJECT_ROOT}{$repeat}"
                          method="text"
                          media-type="application/x-nuance-gsl"><![CDATA[;GSL2.0
;
; Generated by V-Builder.
; This is a standard universal grammar.

Repeat:public [ repeat ] {<command repeat>}]]>
            </xsl:document>
        </xsl:if>

<xsl:if test="not( vb:fileExists($operator) )">
            <xsl:document href="{$XSL_PROJECT_ROOT}{$operator}"
                          method="text"
                          media-type="application/x-nuance-gsl"><![CDATA[;GSL2.0
;
; Generated by V-Builder.
; This is a standard universal grammar.

Operator:public [
    ( ?[uh huh um]~.05 [
            operator
            ( ?customer ?service representative )
            ( [live real] person )
            agent~.001
            (customer service [rep person])
            (human being)
            supervisor
            (customer service)
            (customer support)
```

FIG. 10-38

```
                    ( [
                            ( [ can could ] i have )
                            ( can i ?just~.1 talk to )
                            ( can i speak [ to with~.1 ] )
                            ( ?just~.1 get me )
                            ( ?just~.1 give me )
                            ( how about )
                            ( ?( i ?just~.1) [ need want ] )
                            ( [ ( i would like ) ( i'd ?just~.1 like ) ] )

( [ ( let me )
                                ( ?( i ?just~.1) [ need want ] to )
                                ( no i [ need want ] to )
                                ( ?no~.1 [ ( i would like ) ( i'd ?just~.1 like ) ] to )
                                ( i wish to )
                              ] [ talk speak ] [ to with~.1 ] )

( [ talk speak ] [ to with~.1 ] )

] [ [ (customer service) somebody someone (customer support) ]
                        [ ( [an a the] operator )
                          ( [a the] ?customer ?service representative )
                          ( a ?[live real] person )
                          ( [an the] agent )
                          ( [a the] rep )
                          ( [a the] customer service [rep person] )
                          ( a human ?being )
                          ( [a the] supervisor ) ] ] )~.01

] ?please~.05 )
    ] {<command operator>}]]>
            </xsl:document>
        </xsl:if>

<xsl:if test="not( vb:fileExists($exit) )">
            <xsl:document href="{$XSL_PROJECT_ROOT}{$exit}"
                          method="text"
                          media-type="application/x-nuance-gsl"><![CDATA[;GSL2.0
;
; Generated by V-Builder.
; This is a standard universal grammar.

Exit:public [
    goodbye
    bye~.0001
    end~.0001
    exit~.001
    finished~.001
    (?i'm done)~.001
    quit~.001
] {<command exit>}]]>
            </xsl:document>
        </xsl:if>

<xsl:if test="not( vb:fileExists($mainmenu) )">
            <xsl:document href="{$XSL_PROJECT_ROOT}{$mainmenu}"
                          method="text"
```

FIG. 10-39

```
                            media-type="application/x-nuance-gsl"><![CDATA[;GSL2.0
;
; Generated by V-Builder.
; This is a standard universal grammar.

MainMenu:public [
    (main menu)
    (?main menu)~.01
    (main menu please)~.001
    (?go back to ?the ?main menu)~.001

(start over)
] {<command mainmenu>}]]>
            </xsl:document>
        </xsl:if>

<xsl:if test="not( vb:fileExists($cancel) )">
            <xsl:document href="{$XSL_PROJECT_ROOT}{$cancel}"
                          method="text"
                          media-type="application/x-nuance-gsl"><![CDATA[;GSL2.0
;
; Generated by V-Builder.
; This is a standard universal grammar.

Cancel:public [
    (go back)~.01
    cancel~.01
] {<command cancel>}]]>
            </xsl:document>
        </xsl:if>

</xsl:template>

<xsl:template match="psxml:universal-behavior | psxml:error-behavior"
mode="globalscope" xmlns="http://www.w3.org/2001/vxml">
        <xsl:if test="vb:exists(@type)">
            <catch event="{@type}">
                <!-- note: count is only valid in error-behavior -->
                <xsl:if test="vb:exists(@count)">
                    <xsl:attribute name="count">
                        <xsl:value-of select="@count"/>
                    </xsl:attribute>
                </xsl:if>

<!-- apply the dialog action's condition at the <catch> level,
                     so we'll just ignore the event if the condition doesn't hold,
                     instead of catching it and doing nothing -->
                <xsl:if test="vb:exists(psxml:dialog-action/@condition)">
                    <xsl:attribute name="cond">
                        <xsl:value-of select="vb:convertEcma(psxml:dialog-
action/@condition)"/>
                    </xsl:attribute>
                </xsl:if>

<xsl:call-template name="MainMenuStartOver"/>
```

FIG. 10-40

```
                <!-- if the caller says 'repeat', this indicates the prompt to play
-->
                <xsl:if test="@type != 'repeat'">
                    <assign name="_previousBehavior" expr="_event"/>
                </xsl:if>

<!-- For declaring _randomizedPrompt if necessary -->
                <xsl:apply-templates select="." mode="prompt_condition_vars"/>

<!-- defer the handling of the executable content, but leave out
                    the condition, because we took care of that above.
                    Also leave out the destination, because we'll take care of
that below,
                    with a reprompt -->
                <xsl:apply-templates select="psxml:dialog-action">
                    <xsl:with-param name="ignore-destination" select="@scope =
'Hybrid'"/>
                    <xsl:with-param name="inside-catch" select="true()"/>
                </xsl:apply-templates>

<!-- throw an event which will be caught by some locally-scoped
handler (to play
                    state-specific prompts) -->
                <xsl:if test="@scope = 'Hybrid'">
                    <throw>
                        <xsl:choose>
                            <xsl:when test="vb:exists(@count)">
                                <!-- the suffix will be used to match up the local
and global portions -->
                                <xsl:attribute name="eventexpr">'local.' + _event +
'.<xsl:value-of select="@count"/>'</xsl:attribute>
                            </xsl:when>
                            <xsl:otherwise>
                                <xsl:attribute name="eventexpr">'local.' +
_event</xsl:attribute>
                            </xsl:otherwise>
                        </xsl:choose>
                    </throw>
                </xsl:if>
            </catch>
        </xsl:if>
    </xsl:template>

<xsl:template match="psxml:universal-behavior | psxml:error-behavior"
mode="localscope" xmlns="http://www.w3.org/2001/vxml">
        <!-- Locally-scoped event handler -->
        <xsl:if test="vb:exists(@type) and @scope = 'Local' and @enabled !=
'false'">
            <catch event="{@type}">
                <!-- note: count is only valid in error-behavior -->
                <xsl:if test="vb:exists(@count)">
                    <xsl:attribute name="count">
                        <xsl:value-of select="@count"/>
                    </xsl:attribute>
                </xsl:if>

<!-- apply the dialog action's condition at the <catch> level,
```

FIG. 10-41

```
                    so we'll just ignore the event if the condition doesn't hold,
                    instead of catching it and doing nothing -->
                <xsl:if test="vb:exists(psxml:dialog-action/@condition)">
                    <xsl:attribute name="cond">
                        <xsl:value-of select="vb:convertEcma(psxml:dialog-
action/@condition)"/>
                    </xsl:attribute>
                </xsl:if>

<xsl:call-template name="MainMenuStartOver"/>

<!-- if the caller says 'repeat', this indicates the prompt to play
-->
                <xsl:if test="@type != 'repeat'">
                    <assign name="_previousBehavior" expr="_event"/>
                </xsl:if>

<!-- defer the handling of the executable content, but leave out
                    the condition, because we took care of that above. -->
                <xsl:apply-templates select="psxml:dialog-action">
                    <xsl:with-param name="inside-catch" select="true()"/>
                </xsl:apply-templates>
            </catch>
        </xsl:if>

<!-- Globally-scoped event handler, with a local state-specific prompt
(generates the local part) -->
        <xsl:if test="vb:exists(@type) and @scope = 'Hybrid' and @enabled !=
'false'">
            <xsl:variable name="eventBaseName" select="vb:prependToElements(@type,
'local.')"/>
            <catch>
                <!-- use the count to match up with the global catch handler, which
                    will include its count in the event name -->
                <xsl:choose>
                    <xsl:when test="vb:exists(@count)">
                        <xsl:attribute name="event"><xsl:value-of
select="vb:appendToElements($eventBaseName, concat('.', @count))"/></xsl:attribute>
                    </xsl:when>
                    <xsl:otherwise>
                        <xsl:attribute name="event"><xsl:value-of
select="$eventBaseName"/></xsl:attribute>
                    </xsl:otherwise>
                </xsl:choose>

<!-- if the caller says 'repeat', this indicates the prompt to play
-->
                <xsl:if test="@type != 'repeat'">
                    <assign name="_previousBehavior" expr="_event"/>
                </xsl:if>

<!-- The local part of a Hybrid handler has 2 pieces.
                    The first is the state-specific prompt... -->
                <xsl:for-each select="psxml:dialog-action/psxml:prompt[last()]">
                    <xsl:apply-templates select="." mode="audio_components"/>
                </xsl:for-each>
```

FIG. 10-42

```
            <!-- ...and the second piece is the destination -->
            <xsl:apply-templates select="psxml:dialog-action">
                <xsl:with-param name="ignore-actions" select="true()"/>
                <xsl:with-param name="inside-catch" select="true()"/>
            </xsl:apply-templates>
        </catch>
    </xsl:if>
</xsl:template>

<!--
Here, we output <link>s to universal grammars.
A universal is active if enabled = true:

Use a HashSet to make sure we don't output the same grammar twice.
-->
<xsl:template name="UniversalLinks" xmlns="http://www.w3.org/2001/vxml">

<xsl:variable name="localProps" select="psxml:properties"/>
    <xsl:variable name="pageProps" select="../psxml:container-
declarations/psxml:properties"/>
    <xsl:variable name="appProps" select="/psxml:project/psxml:global-
information/psxml:properties"/>

<xsl:variable name="links" select="vb:newSet()"/>

<xsl:for-each select="psxml:universal-behavior[@scope='Local']"> <!-- inner
scope -->
        <xsl:if test="@enabled = 'true'"> <!-- ignore any rows not enabled -->
            <xsl:variable name="univBehType" select="@type"/>
            <xsl:for-each select="saxon:tokenize(@type)">
                <xsl:if test="vb:addToSet($links, string(.))">
                    <link event="{string(.)}">
                        <xsl:call-template name="LinkGrammar">
                            <xsl:with-param name="univ-type"
select="$univBehType"/>
                            <xsl:with-param name="grammar-src"
select="concat($DIALOG_UNIT_ROOT, 'grammars/universals/', vb:urlEncode(.),
'.gsl')"/>
                            <xsl:with-param name="local-props"
select="$localProps"/>
                            <xsl:with-param name="page-props"
select="$pageProps"/>
                            <xsl:with-param name="app-props"
select="$appProps"/>
                        </xsl:call-template>
                    </link>
                </xsl:if>
            </xsl:for-each>
        </xsl:if>
    </xsl:for-each>

<xsl:for-each select="psxml:universal-behavior[@scope='Hybrid' or
@scope='Global']"> <!-- outer scope, overrided -->
        <xsl:variable name="univBehType" select="@type"/>
        <xsl:variable name="enabled" select="@enabled = 'true'"/>
        <xsl:for-each select="saxon:tokenize(@type)">
            <!-- do not ignore any rows, enabled or not -->
```

FIG. 10-43

```
                <xsl:if test="vb:addToSet($links, string(.)) and $enabled">
                    <link event="{string(.)}">
                        <xsl:call-template name="LinkGrammar">
                            <xsl:with-param name="univ-type" select="$univBehType"/>
                            <xsl:with-param name="grammar-src" select="concat($DIALOG_UNIT_ROOT, 'grammars/universals/', vb:urlEncode(.), '.gsl')"/>
                            <xsl:with-param name="local-props" select="$localProps"/>
                            <xsl:with-param name="page-props" select="$pageProps"/>
                            <xsl:with-param name="app-props" select="$appProps"/>
                        </xsl:call-template>
                    </link>
                </xsl:if>
            </xsl:for-each>
        </xsl:for-each>

<xsl:for-each select="/psxml:project/psxml:global-information/psxml:universal-behavior"> <!-- outer scope -->
            <xsl:variable name="univBehType" select="@type"/>
            <xsl:for-each select="saxon:tokenize(@type)">
                <xsl:if test="vb:addToSet($links, string(.))">
                    <link event="{string(.)}">
                        <xsl:call-template name="LinkGrammar">
                            <xsl:with-param name="univ-type" select="$univBehType"/>
                            <xsl:with-param name="grammar-src" select="concat($DIALOG_UNIT_ROOT, 'grammars/universals/', vb:urlEncode(.), '.gsl')"/>
                            <xsl:with-param name="local-props" select="$localProps"/>
                            <xsl:with-param name="page-props" select="$pageProps"/>
                            <xsl:with-param name="app-props" select="$appProps"/>
                        </xsl:call-template>
                    </link>
                </xsl:if>
            </xsl:for-each>
        </xsl:for-each>
    </xsl:template>

<xsl:template name="LinkGrammar" xmlns="http://www.w3.org/2001/vxml">
        <xsl:param name="univ-type"/>
        <xsl:param name="grammar-src"/>
        <xsl:param name="local-props"/>
        <xsl:param name="page-props"/>
        <xsl:param name="app-props"/>

<xsl:variable name="localUnivWt" select="$local-props/psxml:universal-weight[@type=$univ-type]"/>
        <xsl:variable name="localWt" select="$localUnivWt/@weight"/>
        <xsl:variable name="pageUnivWt" select="$page-props/psxml:universal-weight[@type=$univ-type]"/>
        <xsl:variable name="pageWt" select="$pageUnivWt/@weight"/>
        <xsl:variable name="appUnivWt" select="$app-props/psxml:universal-weight[@type=$univ-type]"/>
        <xsl:variable name="appWt" select="$appUnivWt/@weight"/>
```

FIG. 10-44

```
<!-- Local trumps Page trumps App -->
<xsl:variable name="wt">
    <xsl:choose>
        <xsl:when test="$localWt != ''">
            <xsl:value-of select="$localWt"/>
        </xsl:when>
        <xsl:when test="$pageWt != ''">
            <xsl:value-of select="$pageWt"/>
        </xsl:when>
        <xsl:when test="$appWt != ''">
            <xsl:value-of select="$appWt"/>
        </xsl:when>
    </xsl:choose>
</xsl:variable>

<grammar>
    <xsl:attribute name="src"><xsl:value-of select="$grammar-src"/></xsl:attribute>
    <xsl:if test="$wt != ''">
        <xsl:attribute name="weight"><xsl:value-of select="$wt"/></xsl:attribute>
    </xsl:if>
</grammar>
</xsl:template>

<!--
CT 17124: clear out re-entry counters, so the initial prompt will be played
when entering states instead of re-entry prompts.
-->
<xsl:template name="MainMenuStartOver" xmlns="http://www.w3.org/2001/vxml">
    <xsl:if test="@type = 'mainmenu'">
        <xsl:text>
</xsl:text>
        <xsl:comment>Clear out state visit counters, so the initial prompts will play on the next visit instead of the re-entry prompts.</xsl:comment>
        <assign name="_stateVisits" expr="new Object()"/>
    </xsl:if>
</xsl:template>

<xsl:template match="psxml:revision-history">
    <xsl:if test="psxml:revision">
        <xsl:text>
</xsl:text>
        <xsl:comment>
            <xsl:value-of select="psxml:description"/>
            <xsl:for-each select="psxml:revision">
                
Revision #<xsl:value-of select="@number"/>
                
Date<xsl:value-of select="@date"/>
                
Author<xsl:value-of select="@author"/>
                
Notes<xsl:value-of select="@notes"/>
                

            </xsl:for-each>
        </xsl:comment>
    </xsl:if>
</xsl:template>

<xsl:template match="psxml:grammar" xmlns="http://www.w3.org/2001/vxml">
    <xsl:apply-templates select="psxml:description"/>
```

FIG. 10-45

```
<grammar>
    <!-- if @src contains ':', it's an absolute URL -->
    <xsl:choose>
        <xsl:when test="vb:toLowerCase(@flavour) = 'built-in grammar'">
            <xsl:attribute name="src">
                <xsl:value-of select="@src"/>
            </xsl:attribute>
        </xsl:when>
        <xsl:when test="vb:toLowerCase(@flavour) = 'dynamic file expression'">
            <xsl:attribute name="expr">_projectRoot + 'grammars/' + <xsl:value-of select="vb:convertEcma(@expr)"/></xsl:attribute>
        </xsl:when>
        <xsl:when test="contains(@src, ':') and vb:exists(@top-rule)">
            <xsl:attribute name="src">
                <xsl:value-of select="concat(vb:urlEncode(@src),'#',@top-rule)"/>
            </xsl:attribute>
        </xsl:when>
        <xsl:when test="not(contains(@src, ':')) and vb:exists(@top-rule)">
            <xsl:attribute name="src">
                <xsl:value-of select="concat($DIALOG_UNIT_ROOT, 'grammars/', vb:urlEncode(@src),'#',@top-rule)"/>
            </xsl:attribute>
        </xsl:when>
        <xsl:when test="contains(@src,':') and not(vb:exists(@top-rule))">
            <xsl:attribute name="src">
                <xsl:value-of select="@src"/>
            </xsl:attribute>
        </xsl:when>
        <xsl:otherwise>
            <xsl:attribute name="src">
                <xsl:value-of select="concat($DIALOG_UNIT_ROOT, 'grammars/', vb:urlEncode(@src))"/>
            </xsl:attribute>
        </xsl:otherwise>
    </xsl:choose>

<!-- if there's a <nbest/> sibling, create a <nuance:nbest/> child here -->
    <xsl:if test="../psxml:nbest/@enabled = 'true'">
        <xsl:apply-templates select="../psxml:nbest"/>
    </xsl:if>
</grammar>
</xsl:template>

<xsl:template match="psxml:nbest" xmlns="http://www.w3.org/2001/vxml"
xmlns:nuance="http://voicexml.nuance.com/dialog">
    <!-- vbs will complain if both src and text() are specified, so we'll enforce
        a precedence here (the precedence order is arbitrary) -->
    <xsl:for-each select="psxml:script">
        <xsl:choose>
            <xsl:when test="$NO_NUANCE">
                <xsl:comment>You've elected to not output any Nuance extension elements.  Unfortunately, there is no VoiceXML 2.0 standard technique for adding
```

```
nbest-processing to a grammar.  If you re-generate your code with Nuance extensions
enabled, you'll see a 'nuance:nbest' element here.</xsl:comment>
                </xsl:when>
                <xsl:when test="contains(@src,':')">
                    <nuance:nbest src="{@src}">
                        <!-- charset is only valid for external scripts -->
                        <xsl:if test="vb:exists(@charset)">
                            <xsl:attribute name="charset"><xsl:value-of
select="@charset"/></xsl:attribute>
                        </xsl:if>
                    </nuance:nbest>
                </xsl:when>
                <xsl:when test="vb:exists(@src)">
                    <nuance:nbest
src="{$DIALOG_UNIT_ROOT}dialogs/{vb:urlEncode(@src)}">
                        <!-- charset is only valid for external scripts -->
                        <xsl:if test="vb:exists(@charset)">
                            <xsl:attribute name="charset"><xsl:value-of
select="@charset"/></xsl:attribute>
                        </xsl:if>
                    </nuance:nbest>
                </xsl:when>
                <xsl:when test="text()">
                    <nuance:nbest>
                        <xsl:for-each select="text()">
                            <xsl:value-of select="vb:convertEcma(vb:stripCdata(.),
false())"/>
                        </xsl:for-each>
                    </nuance:nbest>
                </xsl:when>
            </xsl:choose>
        </xsl:for-each>
    </xsl:template>

<xsl:template match="psxml:dialog-action" xmlns="http://www.w3.org/2001/vxml">
        <!-- sometimes, we'll apply the condition and destination
             outside of this block (like for universals/errors) -->
        <xsl:param name="inside-catch" select="false()"/>
        <xsl:param name="ignore-destination" select="false()"/>
        <xsl:param name="ignore-actions" select="false()"/>

<xsl:apply-templates select="psxml:description"/>

<!-- perform the actions and do the transition -->
        <xsl:choose>
            <xsl:when test="not($inside-catch) and vb:exists(@condition)">
                <if>
                    <xsl:attribute name="cond"><xsl:value-of
select="vb:convertEcma(@condition)"/></xsl:attribute>
                    <xsl:if test="not($ignore-actions)">
                        <xsl:apply-templates select="psxml:assign | psxml:log |
psxml:prompt | psxml:script | psxml:send | psxml:taskbegin | psxml:taskend"/>
                    </xsl:if>

<xsl:if test="not($ignore-destination)">
                        <xsl:apply-templates select="psxml:repeat | psxml:goto |
psxml:throw | psxml:return | psxml:submit">
```

FIG. 10-47

```
                                <xsl:with-param name="inside-catch" select="$inside-
catch"/>
                        </xsl:apply-templates>
                    </xsl:if>
                </if>
            </xsl:when>
            <xsl:otherwise> <!-- don't wrap in an <if/> -->
                <xsl:if test="not($ignore-actions)">
                    <xsl:apply-templates select="psxml:assign | psxml:log |
psxml:prompt | psxml:script | psxml:send | psxml:taskbegin | psxml:taskend"/>
                </xsl:if>

<xsl:if test="not($ignore-destination)">
                    <xsl:apply-templates select="psxml:repeat | psxml:goto |
psxml:throw | psxml:return | psxml:submit">
                        <xsl:with-param name="inside-catch" select="$inside-
catch"/>
                    </xsl:apply-templates>
                </xsl:if>
            </xsl:otherwise>
        </xsl:choose>
    </xsl:template>

<xsl:template match="psxml:goto" xmlns="http://www.w3.org/2001/vxml">
        <xsl:param name="inside-catch" select="false()"/>
        <xsl:choose>
            <xsl:when test="@flavour = 'page or state'">
                <xsl:choose>
                    <xsl:when test="vb:exists(@state) and
not(vb:exists(@container))">
                        <goto next="#{vb:makeNmtoken(@state)}"/>
                    </xsl:when>
                    <xsl:when test="vb:exists(@container) and
not(vb:exists(@state))">
                        <xsl:variable name="container" select="@container"/>
                        <goto
next="{vb:urlEncode(vb:makeNmtoken($container))}.vxml"/>
                    </xsl:when>
                    <xsl:when test="vb:exists(@container) and vb:exists(@state)">
                        <!-- is the target page dynamic? -->
                        <xsl:variable name="container" select="@container"/>
                        <goto
next="{vb:urlEncode(vb:makeNmtoken($container))}.vxml#{vb:makeNmtoken(@state)}"/>
                    </xsl:when>
                </xsl:choose>
            </xsl:when>
            <xsl:when test="@flavour = 'url'">
                <goto next="{@url}"/>
            </xsl:when>
            <xsl:when test="@flavour = 'previous state'">
                <xsl:choose>
                    <xsl:when test="$inside-catch">
                        <goto expr="_prevGotoState"/>
                    </xsl:when>
                    <xsl:otherwise>
                        <goto expr="_savedPrevGotoState"/>
                    </xsl:otherwise>
```

FIG. 10-48

```xml
            </xsl:choose>
          </xsl:when>
        </xsl:choose>
    </xsl:template>

<xsl:template match="psxml:submit" xmlns="http://www.w3.org/2001/vxml">
        <submit expr="{vb:convertEcma(@destexpr)}" enctype="{@enctype}"
method="{@method}" namelist="{@namelist}">
            <xsl:variable name="latency" select="psxml:audio-file-ref[1]/@name"/>
            <xsl:choose>
                <xsl:when test="contains($latency, ':')">
                    <xsl:attribute name="fetchaudio"><xsl:value-of
select="$latency"/></xsl:attribute>
                </xsl:when>
                <xsl:when test="vb:exists($latency)">
                    <xsl:attribute name="fetchaudio"><xsl:value-of
select="concat($DIALOG_UNIT_ROOT, 'prompts/',
vb:urlEncode($latency))"/></xsl:attribute>
                </xsl:when>
            </xsl:choose>
        </submit>
    </xsl:template>

<xsl:template match="psxml:repeat" xmlns="http://www.w3.org/2001/vxml">
        <xsl:param name="inside-catch" select="false()"/>

<!-- If we're under a 'filled' element, we need to clear the guard variable
we just filled.
             If we're in a 'catch' element, the default behavior is rerecognize, so
there's nothing to do. -->
        <xsl:if test="not($inside-catch)">
            <clear/>
        </xsl:if>

<xsl:choose>
            <xsl:when test="@reprompt = 'true'">
                <throw event="rerecognize.reprompt"/>
            </xsl:when>
            <xsl:otherwise>
                <throw event="rerecognize.noreprompt"/>
            </xsl:otherwise>
        </xsl:choose>
    </xsl:template>

<xsl:template match="psxml:assign" xmlns="http://www.w3.org/2001/vxml">
        <!-- drop any empty rows (<lhs expr=""/>) -->
        <xsl:if test="vb:exists(psxml:lhs/@expr-gen)">
            <xsl:apply-templates select="psxml:description"/>
            <assign name="{psxml:lhs/@expr-gen}">
                <xsl:attribute name="expr">
                    <xsl:value-of select="vb:convertEcma(psxml:rhs/@expr-gen)"/>
                </xsl:attribute>
            </assign>
        </xsl:if>
    </xsl:template>
```

FIG. 10-49

```
        <xsl:template match="psxml:vaf-state" xmlns="http://www.w3.org/2001/vxml"
xmlns:nuance="http://voicexml.nuance.com/dialog">
                <xsl:apply-templates select="psxml:description"/>

<xsl:if test="vb:setVar('stateName', vb:makeNmtoken(@name))"/>

<!-- everything in the namelist will get seen on the VAF as
dialog.variablename -->
                <xsl:variable name="namelist" select="vb:newBuffer()"/>

<form id="{vb:getVar('stateName')}">
                        <block name="{vb:getVar('stateName')}">

<xsl:apply-templates select="." mode="var_previousState"/>
                <!-- Create variables for data access input parameters -->
                <xsl:variable name="prototyping" select="starts-with(psxml:data-
access/psxml:action/psxml:service/@uri, '/wsdl/prototype')"/>
                <xsl:for-each select="psxml:data-
access/psxml:action/psxml:inputs/psxml:simple">
                        <assign name="call.dialog.{vb:trim(@name)}">
                                <xsl:attribute name="expr">
                                        <xsl:choose>
                                                <xsl:when test="$prototyping and
vb:trim(@name)='data'">
                                                        <!-- for the prototyping service, the input
param is a path to a csv file,
                                                        which must be the full path, including the
projectName-version string -->
                                                        <xsl:value-of select="concat( "'/' +
", 'getServletContext()', " + '/", $SUBDIALOG_NAME, "/data/' +
'", vb:convertEcma(@value), "'" )"/>
                                                </xsl:when>
                                                <xsl:otherwise>
                                                        <xsl:value-of select="vb:convertEcma(@value)"/>
                                                </xsl:otherwise>
                                        </xsl:choose>
                                </xsl:attribute>
                        </assign>
                        <xsl:if test="vb:exists(@value)">
                                <xsl:if test="vb:appendToBuffer($namelist,
concat('call.dialog.', vb:trim(@name), ' '))"/>
                        </xsl:if>
                </xsl:for-each>

<!-- Create variable for CTI new-session (dialed-number attribute)
-->
                <xsl:for-each select="psxml:cti-interaction/psxml:cti-new-session">
                        <assign name="call.dialog.ctiDialedNumber"
expr="{vb:convertEcma(@dialed-number)}"/>
                        <xsl:if test="vb:appendToBuffer($namelist,
'call.dialog.ctiDialedNumber ')"/>
                </xsl:for-each>

<!-- Create variables for CTI inserts -->
                <xsl:for-each select="psxml:cti-interaction/psxml:cti-insert">
                        <xsl:if test="vb:exists(@vafsrc)">
```

FIG. 10-50

```xml
                    <xsl:variable name="ctiVarName"
select="concat('call.dialog.', translate(@ctidest, '.', '_'))"/>
                    <assign name="{$ctiVarName}">
                        <xsl:attribute name="expr">
                            <xsl:value-of select="vb:convertEcma(@vafsrc)"/>
                        </xsl:attribute>
                    </assign>
                    <xsl:if test="vb:appendToBuffer($namelist,
concat($ctiVarName, ' '))"/>
                    </xsl:if>
                </xsl:for-each>

<!-- Create variable for reason attribute of CTI end-sessions -->
                <xsl:for-each select="psxml:cti-interaction/psxml:cti-end-session">
                    <assign name="call.dialog.ctiEndSessionReason">
                        <xsl:attribute name="expr">
                            <xsl:choose>
                                <xsl:when test="vb:exists(@reason)">'<xsl:value-of
select="vb:convertEcma(@reason)"/>'</xsl:when>
                                <xsl:otherwise>'cause-normal'</xsl:otherwise>
                            </xsl:choose>
                        </xsl:attribute>
                    </assign>
                    <xsl:if test="vb:appendToBuffer($namelist,
'call.dialog.ctiEndSessionReason ')"/>
                </xsl:for-each>

<!-- pass along a status for CTI query-sessions -->
                <xsl:for-each select="psxml:cti-interaction/psxml:cti-query-
session">
                    <assign name="call.dialog.ctiQuerySessionStatus"
expr="'none'"/>
                    <xsl:if test="vb:appendToBuffer($namelist,
'call.dialog.ctiQuerySessionStatus ')"/>
                </xsl:for-each>

<!-- if we're starting a CTI session, we need to pass in the CTI
port number,
                    ANI, and DNIS (see VAF CTI FS section 4.1.1) -->
                <xsl:if test="psxml:cti-interaction/psxml:cti-new-session">
                    <assign name="call.ctiPortNumber"
expr="session.connection.ctiport"/>
                    <assign name="call.ani" expr="session.connection.RemoteURI"/>
                    <assign name="call.dnis" expr="session.connection.LocalURI"/>
                    <xsl:if test="vb:appendToBuffer($namelist, 'call.ctiPortNumber
call.ani call.dnis ')"/>
                </xsl:if>

<!-- Submit any client-side variables that are used by the VAF
rules -->
                <xsl:variable name="vafRulesVariables"
select="vb:getSubmitNamelist(.)"/>
                <xsl:for-each select="saxon:tokenize( $vafRulesVariables )">
                    <assign name="call.dialog.{.}" expr="{.}"/>
                </xsl:for-each>
                <xsl:if test="vb:appendToBuffer($namelist,
vb:prependToElements($vafRulesVariables, 'call.dialog.'))"/>
```

FIG. 10-51

```xml
                    <!-- the VAF will determine the next page to load -->
                    <submit
next="/vaf/{vb:urlEncode($SUBDIALOG_NAME)}_{vb:urlEncode(vb:getVar('pageName'))}_{vb:urlEncode(vb:getVar('stateName'))}.do"
                                        namelist="{vb:appendToBuffer($namelist)}">
                        <xsl:variable name="latency" select="psxml:audio-file-ref[1]/@name"/>
                        <xsl:choose>
                            <xsl:when test="contains($latency, ':')">
                                <xsl:attribute name="fetchaudio"><xsl:value-of select="$latency"/></xsl:attribute>
                            </xsl:when>
                            <xsl:when test="vb:exists($latency)">
                                <xsl:attribute name="fetchaudio"><xsl:value-of select="concat($DIALOG_UNIT_ROOT, 'prompts/',
vb:urlEncode($latency))"/></xsl:attribute>
                            </xsl:when>
                        </xsl:choose>
                    </submit>
                </block>
            </form>
    </xsl:template>

<xsl:template match="psxml:pre-recognition"
xmlns="http://www.w3.org/2001/vxml">
        <!-- we only care about our _entryPath if we're inside a state we might
             re-enter before going somewhere else (nomatch triggering a reprompt,
             for example) -->
        <xsl:param name="inside-interactive-state" select="false()"/>

<xsl:apply-templates select="psxml:description"/>
        <!-- processing order: previous, reentry (in descending count order from n
to 1), initial -->
        <xsl:apply-templates select="psxml:prompt">
            <!-- length('previous') > length('reentry') or length('initial') -->
            <xsl:sort select="string-length(@type)" data-type="number"
order="descending"/>
            <!-- 'reentry' before 'initial' -->
            <xsl:sort select="@type" order="descending"/>
            <!-- for re-entry prompts, check higher counts first -->
            <xsl:sort select="@count" data-type="number" order="descending"/>
            <xsl:with-param name="inside-interactive-state" select="$inside-
interactive-state"/>
        </xsl:apply-templates>
    </xsl:template>

<xsl:template match="psxml:prompt" xmlns="http://www.w3.org/2001/vxml">
        <!-- we only care about our _entryPath if we're inside a state we might
             re-enter before going somewhere else (nomatch triggering a reprompt,
             for example) -->
        <xsl:param name="inside-interactive-state" select="false()"/>

<!-- a bunch of cases used to determine the contents of the cond
attribute -->
        <xsl:choose>
```

FIG. 10-52

```
            <xsl:when test="not($inside-interactive-state) and
vb:exists(@condition)">
                <xsl:apply-templates select="." mode="audio_components">
                    <xsl:with-param name="promptCond"
select="vb:convertEcma(@condition)"/>
                </xsl:apply-templates>
            </xsl:when>
            <xsl:when test="$inside-interactive-state">
                <xsl:variable name="reentryGuard"
select="concat('_stateVisits.', vb:makeNmtoken(vb:getVar('pageName')), '_',
vb:makeNmtoken(vb:getVar('stateName')))"/>

<xsl:variable name="promptCondition">
                    <xsl:choose>
                        <xsl:when test="@type = 'initial' and
vb:exists(@condition)">
                            <xsl:value-of select="vb:convertEcma(@condition)"/>
                        </xsl:when>
                        <xsl:when test="@type = 'initial' and
not(vb:exists(@condition))">
                            <xsl:value-of select="'true'"/>
                        </xsl:when>
                        <xsl:when test="@type = 'reentry' and
vb:exists(@condition)">
                            <xsl:value-of select="concat( '(', $reentryGuard, ' >=
', @count, ') && (', vb:convertEcma(@condition), ')' )"/>
                        </xsl:when>
                        <xsl:when test="@type = 'reentry' and
not(vb:exists(@condition))">
                            <xsl:value-of select="concat($reentryGuard, ' >= ',
@count)"/>
                        </xsl:when>
                        <xsl:when test="@type = 'previous' and @previous-type =
'page' and vb:exists(@condition)">
                            <xsl:value-of select="concat(
"_previousState.indexOf('", @previous-item, "#') == 0 &&
", vb:convertEcma(@condition) )"/>
                        </xsl:when>
                        <xsl:when test="@type = 'previous' and @previous-type =
'page' and not(vb:exists(@condition))">
                            <xsl:value-of select="concat(
"_previousState.indexOf('", @previous-item, "#') == 0" )"/>
                        </xsl:when>
                        <xsl:when test="@type = 'previous' and @previous-type =
'state' and vb:exists(@condition)">
                            <xsl:value-of select="concat(
"_previousState.indexOf('#", @previous-item, "') != -1 &&
", vb:convertEcma(@condition) )"/>
                        </xsl:when>
                        <xsl:when test="@type = 'previous' and @previous-type =
'state' and not(vb:exists(@condition))">
                            <xsl:value-of select="concat(
"_previousState.indexOf('#", @previous-item, "') != -1" )"/>
                        </xsl:when>
                    </xsl:choose>
                </xsl:variable>
```

FIG. 10-53

```
                            <!-- the syntax of the condition is different if this is the
only prompt specified, or
                      the first in a series of prompts -->
                  <xsl:choose>
                      <!-- only prompt -->
                      <xsl:when test="position()=1 and position()=last()">
                      <xsl:choose>
                          <xsl:when test="$promptCondition != 'true'">
                              <xsl:apply-templates select="."
mode="audio_components">
                                  <xsl:with-param name="promptCond"
select="$promptCondition"/>
                              </xsl:apply-templates>
                          </xsl:when>
                          <xsl:otherwise>
                              <xsl:apply-templates select="."
mode="audio_components"/>
                          </xsl:otherwise>
                      </xsl:choose>
                      </xsl:when>
                      <!-- first prompt -->
                      <xsl:when test="position()=1">
                      <xsl:apply-templates select="." mode="audio_components">
                          <xsl:with-param name="promptCond">_played =
((<xsl:value-of select="$promptCondition"/>))</xsl:with-param>
                      </xsl:apply-templates>
                      </xsl:when>
                      <xsl:otherwise>
                          <xsl:apply-templates select="." mode="audio_components">
                              <xsl:with-param name="promptCond">if (!_played) _played
= ((<xsl:value-of select="$promptCondition"/>)); else false</xsl:with-param>
                          </xsl:apply-templates>
                      </xsl:otherwise>
                  </xsl:choose>
              </xsl:when>
              <xsl:otherwise>
                  <xsl:apply-templates select="." mode="audio_components"/>
              </xsl:otherwise>
          </xsl:choose>
      </xsl:template>

<xsl:template match="psxml:prompt" xmlns="http://www.w3.org/2001/vxml"
mode="audio_components">
          <xsl:param name="promptCond" select="''"/>
          <xsl:variable name="flavour" select="vb:toLowerCase(@flavour)"/>

<prompt>
              <xsl:if test="vb:exists(@lang)">
                  <xsl:attribute name="xml:lang">
                      <xsl:value-of select="@lang"/>
                  </xsl:attribute>
              </xsl:if>
              <xsl:if test="@bargein = 'false'">
                  <xsl:attribute name="bargein">false</xsl:attribute>
              </xsl:if>
              <xsl:if test="@bargeintype = 'hotword'">
                  <xsl:attribute name="bargeintype">hotword</xsl:attribute>
```

FIG. 10-54

```
            </xsl:if>
            <xsl:if test="vb:exists(@timeout)">
                <xsl:attribute name="timeout">
                    <xsl:value-of select="@timeout"/>
                </xsl:attribute>
            </xsl:if>
            <xsl:if test="vb:exists($promptCond)">
                <xsl:attribute name="cond">
                    <xsl:value-of select="$promptCond"/>
                </xsl:attribute>
            </xsl:if>

<xsl:choose>
                <xsl:when test="$flavour = 'concatenated' or $flavour = 'random'">
                    <xsl:apply-templates select="psxml:audio-file-ref |
psxml:audio-file-expr | psxml:audio-value-expr | psxml:say-as | psxml:tts |
psxml:dtmf-audio | psxml:silence">
                        <xsl:with-param name="flavour" select="$flavour"/>
                    </xsl:apply-templates>
                </xsl:when>
                <xsl:otherwise> <!-- @flavour = 'simple' -->
                    <audio>
                        <xsl:choose>
                            <xsl:when test="contains(@src, ':')">
                                <xsl:attribute name="src"><xsl:value-of
select="@src"/></xsl:attribute>
                            </xsl:when>
                            <xsl:otherwise>
                                <xsl:attribute name="src"><xsl:value-of
select="concat($DIALOG_UNIT_ROOT, 'prompts/', vb:urlEncode(@src),
'.wav')"/></xsl:attribute>
                            </xsl:otherwise>
                        </xsl:choose>
                        <xsl:value-of select="vb:getTranscript(@src)" disable-
output-escaping="yes"/>
                    </audio>
                </xsl:otherwise>
            </xsl:choose>
        </prompt>
    </xsl:template>

<xsl:template match="*" xmlns="http://www.w3.org/2001/vxml"
mode="prompt_condition_vars">
        <!-- if ___, we need a flag to determine if any prompt has been played yet
-->
        <xsl:if test="count(psxml:pre-recognition/psxml:prompt) > 1">
            <var name="_played" expr="new Object()"/>
        </xsl:if>

<!-- if there are any reentry prompts, we need to track a prompt counter
for this state -->
        <xsl:if test="psxml:pre-recognition/psxml:prompt/@type = 'reentry'">
            <xsl:variable name="reentryGuard" select="concat('_stateVisits.',
vb:getVar('pageName'), '_', vb:getVar('stateName'))"/>
            <script><xsl:value-of select="$reentryGuard"/> = <xsl:value-of
select="$reentryGuard"/> == undefined ? 0 : ++<xsl:value-of
select="$reentryGuard"/>;</script>
```

FIG. 10-55

```
        </xsl:if>

<!-- if there any randomized prompts, we need a random number to check
against -->
        <xsl:if test=".//psxml:prompt[@flavour = 'random']">
            <!--
            With random prompts, we need a random number, so that
            we can choose between the different prompt elements.
            (in VoiceXML 2.1, we can embed the conditional
            logic in a single <prompt/>).
            -->
            <var name="_randomizedPrompt" expr="new Array()"/>
            <script>
<xsl:for-each select=".//psxml:prompt[@flavour = 'random']">
<xsl:variable name="n" select="count(psxml:audio-file-ref | psxml:audio-file-expr |
psxml:audio-value-expr | psxml:say-as | psxml:tts)"/>
                _randomizedPrompt[<xsl:value-of select="position()"/>] =
Math.floor(Math.random()*<xsl:value-of select="$n"/>)+1;
      </xsl:for-each>
            </script>
        </xsl:if>
    </xsl:template>

<xsl:template match="psxml:audio-file-ref" xmlns="http://www.w3.org/2001/vxml">
        <xsl:param name="flavour"/>
        <xsl:variable name="filename" select="@name"/>

<xsl:variable name="path">
            <xsl:choose>
                <xsl:when test="contains(@name, ':')"><xsl:value-of
select="@name"/></xsl:when>
                <xsl:otherwise><xsl:value-of select="concat($DIALOG_UNIT_ROOT,
'prompts/', vb:urlEncode(@name), '.wav')"/></xsl:otherwise>
            </xsl:choose>
        </xsl:variable>

<xsl:if test="vb:setVar('rndPromptIndex', 1)"/>
        <xsl:variable name="curPrompt" select=".."/>
        <xsl:variable name="curState" select="ancestor::*[contains(name(), '-
state')]"/>
        <xsl:for-each select="$curState//psxml:prompt[@flavour = 'random']">
            <xsl:if test="$curPrompt = .">
                <xsl:if test="vb:setVar('rndPromptIndex', position())"/>
            </xsl:if>
        </xsl:for-each>

<xsl:choose>
            <xsl:when test="$flavour = 'random'">
                <audio expr="_randomizedPrompt[{vb:getVar('rndPromptIndex')}] ==
{position()} ? '{$path}' : undefined">
                    <xsl:value-of select="vb:getTranscript(@name)" disable-output-
escaping="yes"/>
                </audio>
            </xsl:when>

<xsl:otherwise>
                <audio src="{$path}">
```

FIG. 10-56

```
                    <xsl:value-of select="vb:getTranscript(@name)" disable-output-
escaping="yes"/>
                </audio>
            </xsl:otherwise>
        </xsl:choose>

</xsl:template>

<xsl:template match="psxml:audio-file-expr"
xmlns="http://www.w3.org/2001/vxml">
        <xsl:param name="flavour"/>
        <xsl:variable name="path">_projectRoot + 'prompts/' + <xsl:value-of
select="vb:convertEcma(@expr)"/></xsl:variable>

<xsl:if test="vb:setVar('rndPromptIndex', 1)"/>
        <xsl:variable name="curPrompt" select=".."/>
        <xsl:variable name="curState" select="ancestor::*[contains(name(), '-
state')]"/>
        <xsl:for-each select="$curState//psxml:prompt[@flavour = 'random']">
            <xsl:if test="$curPrompt = .">
                <xsl:if test="vb:setVar('rndPromptIndex', position())"/>
            </xsl:if>
        </xsl:for-each>

<audio>
            <xsl:choose>
                <xsl:when test="$flavour = 'random'">
                    <xsl:attribute name="expr">_randomizedPrompt[<xsl:value-of
select="vb:getVar('rndPromptIndex')"/>] == <xsl:value-of select="position()"/> ?
<xsl:value-of select="$path"/> : undefined</xsl:attribute>
                </xsl:when>
                <xsl:otherwise>
                    <xsl:attribute name="expr"><xsl:value-of
select="$path"/></xsl:attribute>
                </xsl:otherwise>
            </xsl:choose>
            <xsl:if test="vb:exists(@offsetexpr)">
                <xsl:choose>
                    <xsl:when test="$NO_NUANCE">
                        <xsl:comment>You've elected to not output any Nuance
extension elements.  Unfortunately, there is no VoiceXML 2.0 standard technique for
specifying an offset into an audio file.  If you re-generate your code with Nuance
extensions enabled, you'll see an 'offsetexpr' attribute here.</xsl:comment>
                    </xsl:when>
                    <xsl:otherwise>
                        <xsl:attribute name="offsetexpr"><xsl:value-of
select="vb:convertEcma(@offsetexpr)"/></xsl:attribute>
                    </xsl:otherwise>
                </xsl:choose>
            </xsl:if>
            <xsl:apply-templates select="psxml:tts"/>
        </audio>
    </xsl:template>

<xsl:template match="psxml:audio-value-expr"
xmlns="http://www.w3.org/2001/vxml">
        <xsl:param name="flavour"/>
```

FIG. 10-57

```
        <xsl:variable name="path"><xsl:value-of
select="vb:convertEcma(@expr)"/></xsl:variable>

<xsl:if test="vb:setVar('rndPromptIndex', 1)"/>
        <xsl:variable name="curPrompt" select=".."/>
        <xsl:variable name="curState" select="ancestor::*[contains(name(), '-
state')]"/>
        <xsl:for-each select="$curState//psxml:prompt[@flavour = 'random']">
            <xsl:if test="$curPrompt = .">
                <xsl:if test="vb:setVar('rndPromptIndex', position())"/>
            </xsl:if>
        </xsl:for-each>

<audio>
            <xsl:choose>
                <xsl:when test="$flavour = 'random'">
                    <xsl:attribute name="expr">_randomizedPrompt[<xsl:value-of
select="vb:getVar('rndPromptIndex')"/>] == <xsl:value-of select="position()"/> ?
<xsl:value-of select="$path"/> : undefined</xsl:attribute>
                </xsl:when>
                <xsl:otherwise>
                    <xsl:attribute name="expr"><xsl:value-of
select="$path"/></xsl:attribute>
                </xsl:otherwise>
            </xsl:choose>
            <xsl:if test="vb:exists(@offsetexpr)">
                <xsl:choose>
                    <xsl:when test="$NO_NUANCE">
                        <xsl:comment>You've elected to not output any Nuance
extension elements.  Unfortunately, there is no VoiceXML 2.0 standard technique for
specifying an offset into an audio file.  If you re-generate your code with Nuance
extensions enabled, you'll see an 'offsetexpr' attribute here.</xsl:comment>
                    </xsl:when>
                    <xsl:otherwise>
                        <xsl:attribute name="offsetexpr"><xsl:value-of
select="vb:convertEcma(@offsetexpr)"/></xsl:attribute>
                    </xsl:otherwise>
                </xsl:choose>
            </xsl:if>
            <xsl:apply-templates select="psxml:tts"/>
        </audio>
    </xsl:template>

<xsl:template match="psxml:silence" xmlns="http://www.w3.org/2001/vxml">
        <audio src="pause:{@msecs}"/>
    </xsl:template>

<xsl:template match="psxml:dtmf-audio" xmlns="http://www.w3.org/2001/vxml">
        <audio>
            <xsl:attribute name="expr">'dtmf:' + <xsl:value-of
select="vb:convertEcma(@expr)"/></xsl:attribute>
        </audio>
    </xsl:template>

<xsl:template match="psxml:say-as" xmlns="http://www.w3.org/2001/vxml">
        <xsl:param name="flavour"/>
        <xsl:if test="vb:setVar('rndPromptIndex', 1)"/>
```

FIG. 10-58

```
            <xsl:variable name="curPrompt" select=".."/>
            <xsl:variable name="curState" select="ancestor::*[contains(name(), '-
state')]"/>
            <xsl:for-each select="$curState//psxml:prompt[@flavour = 'random']">
                <xsl:if test="$curPrompt = .">
                    <xsl:if test="vb:setVar('rndPromptIndex', position())"/>
                </xsl:if>
            </xsl:for-each>

<xsl:variable name="content">
                <xsl:choose>
                    <xsl:when test="$flavour = 'random'">_randomizedPrompt[<xsl:value-
of select="vb:getVar('rndPromptIndex')"/>] == <xsl:value-of select="position()"/> ?
<xsl:value-of select="vb:convertEcma(@expr)"/> : ''</xsl:when>
                    <xsl:otherwise><xsl:value-of
select="vb:convertEcma(@expr)"/></xsl:otherwise>
                </xsl:choose>
            </xsl:variable>

<xsl:choose>
                <xsl:when test="vb:exists(@type) and @type != '-string value-'">
                    <say-as type="{@type}">
                    <value>
                        <xsl:attribute name="expr">
                            <xsl:value-of select="$content"/>
                        </xsl:attribute>
                    </value>
                    </say-as><xsl:text> </xsl:text>
                </xsl:when>
                <xsl:otherwise>
                    <value>
                        <xsl:attribute name="expr">
                            <xsl:value-of select="$content"/>
                        </xsl:attribute>
                    </value><xsl:text> </xsl:text>
                </xsl:otherwise>
            </xsl:choose>
    </xsl:template>

<xsl:template match="psxml:tts" xmlns="http://www.w3.org/2001/vxml">
        <xsl:param name="flavour"/>
        <xsl:variable name="index" select="position()"/>

<xsl:if test="vb:setVar('rndPromptIndex', 1)"/>
        <xsl:variable name="curPrompt" select=".."/>
        <xsl:variable name="curState" select="ancestor::*[contains(name(), '-
state')]"/>
            <xsl:for-each select="$curState//psxml:prompt[@flavour = 'random']">
                <xsl:if test="$curPrompt = .">
                    <xsl:if test="vb:setVar('rndPromptIndex', position())"/>
                </xsl:if>
            </xsl:for-each>

<xsl:for-each select="text()">
                <xsl:choose>
                    <xsl:when test="$flavour = 'random'">
```

FIG. 10-59

```
                        <xsl:text disable-output-escaping="yes"><value
expr="_randomizedPrompt[</xsl:text>
                        <xsl:value-of select="vb:getVar('rndPromptIndex')"/>
                        <xsl:text>] == </xsl:text>
                        <xsl:value-of select="$index"/>
                        <xsl:text> ? '</xsl:text>
                        <xsl:value-of select="vb:convertEcmaSingleQuote(.)" disable-
output-escaping="yes"/>
                        <xsl:text disable-output-escaping="yes"> ' :
' '"/></xsl:text>
                </xsl:when>
                <xsl:otherwise><xsl:value-of select="." disable-output-
escaping="yes"/><xsl:text> </xsl:text></xsl:otherwise>
            </xsl:choose>
        </xsl:for-each>
    </xsl:template>

<xsl:template match="psxml:description">
        <xsl:if test="string(.) != ''">
            <xsl:text>
</xsl:text>
            <xsl:comment><xsl:value-of select="."/></xsl:comment>
        </xsl:if>
    </xsl:template>

<!--===================== voicexml executable content
==========================-->

<xsl:template match="psxml:taskbegin"
xmlns:nuance="http://voicexml.nuance.com/dialog">
        <xsl:choose>
            <xsl:when test="$NO_NUANCE">
                <log>Task begin: <value expr="{@name}"/></log>
            </xsl:when>
            <xsl:otherwise>
                <nuance:taskbegin name="{@name}"/>
            </xsl:otherwise>
        </xsl:choose>
    </xsl:template>

<xsl:template match="psxml:taskend"
xmlns:nuance="http://voicexml.nuance.com/dialog">
        <xsl:choose>
            <xsl:when test="$NO_NUANCE">
                <log>Task End: name=<value expr="{@name}"/>, complete=<value
expr="{vb:convertEcma(@condition)}"/>, reason=<value
expr="{vb:convertEcma(@reasonexpr)}"/></log>
            </xsl:when>
            <xsl:otherwise>
                <nuance:taskend name="{@name}">
                    <xsl:if test="vb:exists(@condition)">
                        <xsl:attribute name="cond">
                            <xsl:value-of select="vb:convertEcma(@condition)"/>
                        </xsl:attribute>
                    </xsl:if>
                    <xsl:if test="vb:exists(@reasonexpr)">
                        <xsl:attribute name="reasonexpr">
                            <xsl:value-of select="vb:convertEcma(@reasonexpr)"/>
```

FIG. 10-60

```
                </xsl:attribute>
            </xsl:if>
        </nuance:taskend>
    </xsl:otherwise>
</xsl:choose>
</xsl:template>

<xsl:template match="psxml:log" xmlns="http://www.w3.org/2001/vxml">
    <log label="{@label}">
        <xsl:attribute name="expr">
            <xsl:value-of select="vb:convertEcma(@expr)"/>
        </xsl:attribute>
    </log>
</xsl:template>

<xsl:template match="psxml:param" xmlns="http://www.w3.org/2001/vxml">
    <param name="{@name}">
        <xsl:attribute name="expr">
            <xsl:value-of select="vb:convertEcma(@expr)"/>
        </xsl:attribute>
    </param>
</xsl:template>

<xsl:template match="psxml:return" xmlns="http://www.w3.org/2001/vxml">
    <xsl:choose>
        <xsl:when test="@flavour = 'throw'">
            <return eventexpr="{vb:convertEcma(@eventexpr)}">
                <xsl:if test="vb:exists(@messageexpr)">
                    <xsl:attribute name="messageexpr">
                        <xsl:value-of select="vb:convertEcma(@messageexpr)"/>
                    </xsl:attribute>
                </xsl:if>
            </return>
        </xsl:when>
        <xsl:otherwise>
            <return namelist="{vb:buildReturnNamelist()}"/>
        </xsl:otherwise>
    </xsl:choose>
</xsl:template>

<xsl:template match="psxml:throw" xmlns="http://www.w3.org/2001/vxml">
    <throw>
        <xsl:attribute name="eventexpr">
            <xsl:value-of select="vb:convertEcma(@eventexpr)"/>
        </xsl:attribute>
        <xsl:if test="vb:exists(@messageexpr)">
            <xsl:attribute name="messageexpr">
                <xsl:value-of select="vb:convertEcma(@messageexpr)"/>
            </xsl:attribute>
        </xsl:if>
        <xsl:if test="@incrementcounter = 'false'">
            <xsl:choose>
                <xsl:when test="$NO_NUANCE">
                    <xsl:comment>You've elected to not output any Nuance
 extension elements.  Unfortunately, there is no VoiceXML 2.0 standard technique for
 throwing an event without incrementing the event counter.  If you re-generate your
```

FIG. 10-61

```
code with Nuance extensions enabled, you'll see a 'incrementcounter' attribute
here.</xsl:comment>
                    </xsl:when>
                    <xsl:otherwise>
                        <xsl:attribute
name="incrementcounter">false</xsl:attribute>
                    </xsl:otherwise>
                </xsl:choose>
            </xsl:if>
        </throw>
    </xsl:template>

<xsl:template match="psxml:script" xmlns="http://www.w3.org/2001/vxml">
        <!-- vbs will complain if both src and text() are specified, so we'll
enforce
            a precedence here (the precedence order is arbitrary) -->
        <xsl:choose>
            <xsl:when test="contains(@src,':')">
                <script src="{@src}">
                    <!-- charset is only valid for external scripts -->
                    <xsl:if test="vb:exists(@charset)">
                        <xsl:attribute name="charset"><xsl:value-of
select="@charset"/></xsl:attribute>
                    </xsl:if>
                </script>
            </xsl:when>
            <xsl:when test="vb:exists(@src)">
                <script src="{$DIALOG_UNIT_ROOT}dialogs/{vb:urlEncode(@src)}">
                    <!-- charset is only valid for external scripts -->
                    <xsl:if test="vb:exists(@charset)">
                        <xsl:attribute name="charset"><xsl:value-of
select="@charset"/></xsl:attribute>
                    </xsl:if>
                </script>
            </xsl:when>
            <xsl:when test="text()">
                <script>
                    <xsl:for-each select="text()">
                        <xsl:value-of select="vb:convertEcma(vb:stripCdata(.),
false())"/>
                    </xsl:for-each>
                </script>
            </xsl:when>
        </xsl:choose>
    </xsl:template>

<xsl:template match="psxml:send" xmlns="http://www.w3.org/2001/vxml"
xmlns:nuance="http://voicexml.nuance.com/dialog">
        <xsl:choose>
            <xsl:when test="$NO_NUANCE">
                <xsl:comment>You've elected to not output any Nuance extension
elements.  Unfortunately, there is no VoiceXML 2.0 standard technique for sending
to a URL without a page transition.  If you re-generate your code with Nuance
extensions enabled, you'll see a 'nuance:send' element here.</xsl:comment>
            </xsl:when>
            <xsl:otherwise>
```

FIG. 10-62

```
                <nuance:send destexpr="{vb:convertEcma(@destexpr)}"
enctype="{@enctype}" method="{@method}" namelist="{@namelist}">
                    <xsl:variable name="latency" select="psxml:audio-file-
ref[1]/@name"/>
                    <xsl:choose>
                        <xsl:when test="contains($latency, ':')">
                            <xsl:attribute name="fetchaudio"><xsl:value-of
select="$latency"/></xsl:attribute>
                        </xsl:when>
                        <xsl:when test="vb:exists($latency)">
                            <xsl:attribute name="fetchaudio"><xsl:value-of
select="concat($DIALOG_UNIT_ROOT, 'prompts/',
vb:urlEncode($latency))"/></xsl:attribute>
                        </xsl:when>
                    </xsl:choose>
                </nuance:send>
            </xsl:otherwise>
        </xsl:choose>
    </xsl:template>

<!--===================== SSML elements ============================-->

<!--
    <xsl:template match="p | s | voice | prosody | audio | emphasis | say-as | sub
 | phoneme | break | mark" mode="ssml">
        <xsl:element name="{local-name()}">
            <xsl:for-each select="@*">
                <xsl:attribute name="{name(.)}"><xsl:value-of
select="."/></xsl:attribute>
            </xsl:for-each>
            <xsl:apply-templates mode="ssml"/>
        </xsl:element>
    </xsl:template>
    -->

<xsl:template match="text()" mode="ssml">
        <xsl:value-of select="." disable-output-escaping="yes"/><xsl:text>
</xsl:text>
    </xsl:template>

<!--===================== Implicit Variables ==================-->

<!-- store the state we're transitioning from,
         for initial prompt in next state to know
         where we came from -->
    <xsl:template match="*" mode="var_previousState"
xmlns="http://www.w3.org/2001/vxml">
        <assign name="_savedPrevGotoState" expr="_prevGotoState"/>
        <assign name="_prevGotoState"
expr="'{vb:urlEncode(vb:makeNmtoken(vb:getVar('pageName')))}.vxml#{vb:makeNmtoken(v
b:getVar('stateName'))}'"/>
        <assign name="_previousState"
expr="'{vb:getVar('pageName')}#{vb:getVar('stateName')}'"/>
    </xsl:template>

<!--===================== Extension Functions ==================-->
```

FIG. 10-63

```
<!--
Function for checking for the existence of a file.
Used to prevent clobbering on output.

Usage:
    <xsl:if test="vb:fileExists('dialogs/generated/root.vxml')">
        <xsl:message>root already exists!</xsl:message>
    </xsl:if>
-->
<func:function name="vb:fileExists">
    <xsl:param name="theFile"/>
    <func:result select="file:exists(file:new(concat($XSL_PROJECT_ROOT, $theFile)))"
                    xmlns:file="java:java.io.File"/>
</func:function>

<!--
Function for converting an xs:string to a NMTOKEN.
Replaces any character that is not a
letter, digit, '.', '-', or '_'

Usage
    <xsl:value-of select="vb:makeNmtoken(@name)"/>
-->
<func:function name="vb:makeNmtoken">
    <xsl:param name="str"/>
    <func:result select="token:stringToNmtoken($str)"
xmlns:token="java:com.nuance.tools.design.main.utils.TransformUtils"/>
</func:function>

<!--
Function for getting a list of all the client-side
variables used in the supplied server-side state Usage
    <xsl:value-of select="vb:getSubmitNamelist($a_vaf_state)"/>
-->
<func:function name="vb:getSubmitNamelist"
                xmlns:list="java:java.util.LinkedList">
    <xsl:param name="state"/>

<xsl:variable name="expressionList" select="list:new()"/>

<xsl:for-each select="$state/psxml:business-rule | $state/psxml:dialog-action">
        <xsl:if test="list:add($expressionList, string(@condition))"/>
    </xsl:for-each>

<func:result select="eb:getClientVars($expressionList)"
xmlns:eb="java:com.nuance.tools.design.main.utils.TransformUtils"/>
</func:function>

<!--
Creates a space-delimited list of the app variables
```

FIG. 10-64

```
-->
    <func:function name="vb:buildReturnNamelist">
        <xsl:variable name="result" select="vb:newBuffer()"/>

<xsl:for-each select="/psxml:project/psxml:global-information/psxml:variable">
            <xsl:if test="vb:appendToBuffer($result, concat(@name, ' '))"/>
        </xsl:for-each>

<func:result select="vb:appendToBuffer($result)"/>
    </func:function>

<!--
    String transformations on ECMAScript attributes (escaping stuff, etc)

Replaces double-quotes with single quotes from ECMAScript expressions.
    If these expressions go through JSP, a bug in Jasper would result in JSP
    compile errors at runtime such as:
       out.println("<submit namelist="foo"");
    ... note the unescaped quote mark
    -->
    <func:function name="vb:convertEcma"
xmlns:util="java:com.nuance.tools.design.main.utils.TransformUtils">
        <xsl:param name="srcExpr"/>
        <xsl:param name="insideAttribute" select="true()"/>
        <func:result select="util:convertEcma($srcExpr, $insideAttribute)"/>
    </func:function>

<!--
    String transformations on ECMAScript attributes (escaping stuff, etc)

Produces text suitable for inclusion between single quotes(').
    -->
    <func:function name="vb:convertEcmaSingleQuote"
xmlns:util="java:com.nuance.tools.design.main.utils.TransformUtils">
        <xsl:param name="srcExpr"/>
        <func:result select="util:convertEcmaSingleQuote($srcExpr)"/>
    </func:function>

<!--
    Sometimes people paste code snippets in a CDATA block.  This functions strips
    out the <![CDATA[ ... ]]> endpoints.
    -->
    <func:function name="vb:stripCdata" xmlns:str="java:java.lang.String">
        <xsl:param name="src"/>
        <xsl:choose>
            <xsl:when test="starts-with($src, '<![CDATA[')">
                <!-- strip out the CDATA marker -->
                <func:result select="str:substring($src, 9, str:length($src) - 3)"/>
            </xsl:when>
            <xsl:otherwise>
                <func:result select="$src"/>
            </xsl:otherwise>
```

FIG. 10-65

```
        </xsl:choose>
    </func:function>

<!--
    A page should be a JSP if it is transitioned to from a vaf-state or server-
side-error.

Usage: <xsl:if test="vb:isJspPage($containerNode)"/>
    -->
    <func:function name="vb:isJspPage">
        <xsl:param name="container"/>
        <xsl:if test="vb:setVar('result', false())"/>

<xsl:for-each select="/psxml:project/psxml:global-information/psxml:server-
side-error">
            <xsl:if test="$container/@name = @page">
                <xsl:if test="vb:setVar('result', true())"/>
            </xsl:if>
        </xsl:for-each>

<xsl:for-each select="/psxml:project/*/psxml:vaf-state/psxml:dialog-
action/psxml:goto">
            <xsl:if test="$container/@name = @container">
                <xsl:if test="vb:setVar('result', true())"/>
            </xsl:if>
        </xsl:for-each>

<func:result select="vb:getVar('result')"/>
    </func:function>

<!-- return the transcript for the prompt with the given path -->
    <func:function name="vb:getTranscript">
        <xsl:param name="promptPath"/>
        <xsl:variable name="dialogUnit"
                      select="saxon:tokenize($XSL_PROJECT_ROOT, '/\\')[last()]"/>
        <func:result select="util:getPromptTranscript($dialogUnit, $promptPath)"
xmlns:util="java:com.nuance.tools.design.main.utils.TransformUtils"/>
    </func:function>

<func:function name="vb:exists">
        <xsl:param name="node"/>

<func:result select="$node and (string($node) != '')"/>
    </func:function>

<func:function name="vb:toLowerCase">
        <xsl:param name="mystring"/>
        <func:result select="str:toLowerCase(string($mystring))"
                     xmlns:str="java:java.lang.String"/>
    </func:function>

<!--
    arg1: space-delimited list
    arg2: string to prepend to each element in the list
    returns: new space-delimited list
    -->
```

FIG. 10-66

```
<func:function name="vb:prependToElements">
    <xsl:param name="mylist"/>
    <xsl:param name="mystring"/>
    <xsl:variable name="result" select="vb:newBuffer()"/>

<xsl:for-each select="saxon:tokenize( $mylist )">
        <xsl:if test="vb:appendToBuffer($result, concat($mystring, string(.), ' '))"/>
    </xsl:for-each>

<func:result select="vb:appendToBuffer($result)"/>
</func:function>

<!--
arg1: space-delimited list
arg2: string to append to each element in the list
returns: new space-delimited list
-->
<func:function name="vb:appendToElements">
    <xsl:param name="mylist"/>
    <xsl:param name="mystring"/>
    <xsl:variable name="result" select="vb:newBuffer()"/>

<xsl:for-each select="saxon:tokenize( $mylist )">
        <xsl:if test="vb:appendToBuffer($result, concat(string(.), $mystring, ' '))"/>
    </xsl:for-each>

<func:result select="vb:appendToBuffer($result)"/>
</func:function>

<!--
returns true if argument A ends with string B
-->
<func:function name="vb:endsWith">
    <xsl:param name="A"/>
    <xsl:param name="B"/>
    <func:result select="substring($A, string-length($A) - string-length($B) + 1) = $B"/>
</func:function>

<!-- calls java.lang.String.trim() -->
<func:function name="vb:trim">
    <xsl:param name="mystring"/>
    <func:result select="str:trim(string($mystring))"
                 xmlns:str="java:java.lang.String"/>
</func:function>

<func:function name="vb:urlEncode">
    <xsl:param name="str"/>
    <func:result select="util:urlEncode(string($str))"
        xmlns:util="java:com.nuance.tools.design.main.utils.TransformUtils"/>
</func:function>

<!-- functions for dealing with java Sets -->
<func:function name="vb:newSet">
    <func:result select="set:new()" xmlns:set="java:java.util.HashSet"/>
```

FIG. 10-67

```xml
        </func:function>
    <func:function name="vb:addToSet">
        <xsl:param name="myset"/>
        <xsl:param name="mystring"/> <!-- param should be wrapped in a string(...)
call, so we compare string values and not saxon Node objects -->
        <func:result select="set:add($myset, $mystring)"
xmlns:set="java:java.util.HashSet"/>
    </func:function>

<!-- functions that provide StringBuffer-like functionality -->
    <func:function name="vb:newBuffer" xmlns:stack="java:java.util.Stack">
        <xsl:param name="initial" select="''"/>
        <xsl:variable name="result" select="stack:new()"/>
        <xsl:if test="stack:push($result, $initial)"/>
        <func:result select="$result"/>
    </func:function>
    <func:function name="vb:appendToBuffer" xmlns:stack="java:java.util.Stack">
        <xsl:param name="mystack"/>
        <xsl:param name="str" select="''"/>
        <xsl:variable name="curval" select="stack:pop($mystack)"/>
        <xsl:variable name="newval" select="concat($curval, $str)"/>
        <xsl:if test="stack:push($mystack, $newval)"/>
        <func:result select="$newval"/>
    </func:function>

<!-- functions that provide a mutable varaible without using saxon:assignable -
-->
    <func:function name="vb:setVar">
        <xsl:param name="key"/>
        <xsl:param name="val"/>
        <xsl:if test="map:put($mutable, $key, $val)"/>
        <func:result select="$val"/>
    </func:function>
    <func:function name="vb:getVar">
        <xsl:param name="key"/>
        <func:result select="map:get($mutable, $key)"/>
    </func:function>

<func:function name="vb:log"
xmlns:util="java:com.nuance.tools.design.main.utils.TransformUtils">
        <xsl:param name="str"/>
        <xsl:variable name="foo" select="util:log($str)"/>
    </func:function>

<func:function name="vb:addStateContext"
xmlns:util="java:com.nuance.tools.design.main.utils.TransformUtils">
        <xsl:param name="page"/>
        <xsl:param name="state"/>
        <xsl:param name="ctxId"/>
        <xsl:variable name="foo" select="util:addStateContext($SUBDIALOG_NAME,
$page, $state, $ctxId)"/>
    </func:function>

</xsl:stylesheet>
```

FIG. 10-68

```xml
<?xml version="1.0" encoding="UTF-8" ?>
- <xsl:stylesheet version="1.1" xmlns:ns1="http://www.nuance.com/psxml"
    xmlns:xsl="http://www.w3.org/1999/XSL/Transform"
    xmlns:fo="http://www.w3.org/1999/XSL/Format"
    xmlns:func="http://exslt.org/functions"
    xmlns:jfor="http://www.jfor.org/xmlns/2001/stylesheet"
    xmlns:helper="java:com.nuance.tools.design.docgen.XSLHelper"
    xmlns:vbutils="java:com.nuance.tools.design.main.utils.TransformUtils"
    xmlns:saxon="http://icl.com/saxon" xmlns:vb="http://vbuilder.nuance.com/xslt" exclude-
    result-prefixes="fo helper" extension-element-prefixes="func saxon vb">
- <!--
***************************************************************
**  Title:         dialogspec2fo.xsl                          **
**  Description:   XSL Transformation converting XML config into **
**                 XSL formatting objects.  The resulting      **
**                 formatting objects can be converted into an **
**                 RTF document using jfor (www.jfor.org)      **
**  Author         Will Lavery                                **
**  Version        1.0                                        **
***************************************************************
-->
- <!--
Attribute sets
-->
- <!--
Style attribute sets
-->
- <xsl:attribute-set name="vb-boilerplate-heading">
- <xsl:attribute name="font-family">
  <xsl:value-of select="$vb-font-family-times" />
    </xsl:attribute>
  <xsl:attribute name="font-style">italic</xsl:attribute>
  <xsl:attribute name="text-align">center</xsl:attribute>
  <xsl:attribute name="font-size">9pt</xsl:attribute>
    </xsl:attribute-set>
- <xsl:attribute-set name="vb-column-heading" use-attribute-sets="vb-table-cell">
  <xsl:attribute name="font-weight">bold</xsl:attribute>
  <xsl:attribute name="text-align">center</xsl:attribute>
    </xsl:attribute-set>
- <xsl:attribute-set name="vb-legal-notice">
- <xsl:attribute name="font-family">
  <xsl:value-of select="$vb-font-family-times" />
    </xsl:attribute>
  <xsl:attribute name="font-size">8pt</xsl:attribute>
  <xsl:attribute name="text-align">left</xsl:attribute>
    </xsl:attribute-set>
- <xsl:attribute-set name="vb-page-number">
- <xsl:attribute name="font-family">
  <xsl:value-of select="$vb-font-family-arial" />
    </xsl:attribute>
  <xsl:attribute name="space-after">3pt</xsl:attribute>
```

FIG. 11-1

```
<xsl:attribute name="font-weight">bold</xsl:attribute>
<xsl:attribute name="text-align">center</xsl:attribute>
<xsl:attribute name="font-size">9pt</xsl:attribute>
    </xsl:attribute-set>
- <xsl:attribute-set name="vb-table-cell">
- <xsl:attribute name="font-family">
  <xsl:value-of select="$vb-font-family-times" />
    </xsl:attribute>
  <xsl:attribute name="font-size">10pt</xsl:attribute>
    </xsl:attribute-set>
  - <!--
    Required to preserve newlines between prompts and other actions
    -->
- <xsl:attribute-set name="vb-prompt-table-cell">
- <xsl:attribute name="font-family">
  <xsl:value-of select="$vb-font-family-times" />
    </xsl:attribute>
  <xsl:attribute name="font-size">10pt</xsl:attribute>
  <xsl:attribute name="white-space-collapse">false</xsl:attribute>
    </xsl:attribute-set>
  - <!--
    Required to for underlined term "Details"
    -->
- <xsl:attribute-set name="vb-prompt-detail-cell">
- <xsl:attribute name="font-family">
  <xsl:value-of select="$vb-font-family-times" />
    </xsl:attribute>
  <xsl:attribute name="font-size">10pt</xsl:attribute>
  <xsl:attribute name="text-decoration">underline</xsl:attribute>
  <xsl:attribute name="white-space-collapse">false</xsl:attribute>
    </xsl:attribute-set>
  - <!--
    Required to preserve newlines between actions
    -->
- <xsl:attribute-set name="vb-action-table-cell">
- <xsl:attribute name="font-family">
  <xsl:value-of select="$vb-font-family-times" />
    </xsl:attribute>
  <xsl:attribute name="font-size">10pt</xsl:attribute>
  <xsl:attribute name="white-space-collapse">false</xsl:attribute>
  <xsl:attribute name="white-space-treatment">preserve</xsl:attribute>
    </xsl:attribute-set>
  - <!--
    Fonts
    -->
<xsl:variable name="vb-font-family-arial" select="helper:getArialFontFamily()" />
<xsl:variable name="vb-font-family-times" select="helper:getTimesFontFamily()" />
<xsl:variable name="vb-font-family-courier" select="helper:getCourierFontFamily()" />
- <!--
  =============================
```

FIG. 11-2

```
                -->
              - <!--
                        PARAMETERS
                -->
              - <!--
                  ================================
                -->
              - <!--
                  The paths to all the subdialog documents
                -->
              <xsl:param name="SUBDIALOGS" />
              - <!--
                  The main dialog
                -->
              <xsl:param name="MAIN_DIALOG" />
              - <!--
                  Gets assigned below when we iterate through each design file
                -->
              <xsl:variable name="DIALOG_UNIT" select="'undefined'" saxon:assignable="yes" />
              <xsl:variable name="PROJECT_NAME" select="'undefined'" saxon:assignable="yes" />
              <xsl:param name="COMPANY_NAME" select="'Nuance Communications'" />
              <xsl:param name="CONFIDENTIALITY_TITLE" select="'NUANCE PROPRIETARY AND
                  CONFIDENTIAL INFORMATION'" />
              <xsl:param name="CONFIDENTIALITY_BODY" select="'This Dialog Specification document,
                  formatting, linking methodologies, transition strategies and aspects of Voice User
                  Interface design methodology represented in this document are Nuance"s proprietary
                  and confidential information. Recipient shall treat all such information as confidential
                  and shall use such information only as specifically authorized by Nuance, only for
                  purposes of the design project for which Recipient has received the information.'" />
              <xsl:param name="COPYRIGHT_FOOTER" select="'Copyright 2004 by Nuance
                  Communications. All rights reserved. No part of this document may be used, reproduced
                  or disclosed without a license agreement or nondisclosure agreement with Nuance
                  Communications.'" />
              - <!--
                  ================================
                -->
              - <!--
                  START OF FILE PROCESSING
                -->
              - <!--
                  ================================
                -->
            - <xsl:template match="/">
            - <fo:root xmlns:fo="http://www.w3.org/1999/XSL/Format">
            - <fo:layout-master-set>
              - <!--
                  fo:layout-master-set defines in its children the page layout:
                          the pagination and layout specifications
                              - page-masters: have the role of describing the intended subdivisions
                                          of a page and the geometry of these subdivisions
                              - page-sequence-masters: have the role of describing the sequence
                                                   of page-masters that will be used to generate
```

FIG. 11-3

```
                                        pages during the formatting of an fo:page-
    sequence
    -->
  - <!--
    layout for the first page, title page so no header or footer
    -->
  - <fo:simple-page-master master-name="first" page-height="29.7cm" page-width="21cm">
    <fo:region-body margin-bottom="1.5in" margin-left="1in" margin-right="1in" margin-top="0.5in"
      />
    <fo:region-after />
      </fo:simple-page-master>
  - <!--
    layout for the table of contents, there's a footer
    -->
  - <fo:simple-page-master master-name="tableofcontents" margin-bottom="1in" margin-right="1in"
      margin-left="1in" margin-top="0.5in" page-height="29.7cm" page-width="21cm">
    <fo:region-body />
    <fo:region-after />
      </fo:simple-page-master>
  - <!--
    WL JFOR NOTE: the last margin settings seem to override all others
    -->
  - <!--
    layout for the content of the document, there's a footer
    -->
  - <fo:simple-page-master master-name="content" margin-bottom="1.2in" margin-right="1in"
      margin-left="1in" margin-top="0.5in" page-height="29.7cm" page-width="21cm">
    <fo:region-body />
    <fo:region-after />
      </fo:simple-page-master>
      </fo:layout-master-set>
  - <!--
    WL created a stylesheet for the common fonts and formatting
    -->
  - <jfor:stylesheet>
  - <jfor:style name="SectionHeader" white-space-collapse="false" space-after="15pt" font-
      size="12pt" font-weight="bold" color="white" background-color="#0152AB">
  - <xsl:attribute name="font-family">
    <xsl:value-of select="$vb-font-family-arial" />
      </xsl:attribute>
      </jfor:style>
  - <jfor:style name="SubSectionHeader" white-space-collapse="false" space-after="10pt" font-
      size="11pt" font-weight="bold">
  - <xsl:attribute name="font-family">
    <xsl:value-of select="$vb-font-family-arial" />
      </xsl:attribute>
      </jfor:style>
  - <jfor:style name="SubSubSectionHeader" white-space-collapse="false" start-indent="0.5cm"
      space-before="5pt" space-after="10pt" font-size="11pt">
```

FIG. 11-4

```
- <xsl:attribute name="font-family">
  <xsl:value-of select="$vb-font-family-arial" />
    </xsl:attribute>
    </jfor:style>
- <jfor:style name="ContentText" start-indent="1cm" space-after="12pt" font-size="10pt">
- <xsl:attribute name="font-family">
  <xsl:value-of select="$vb-font-family-times" />
    </xsl:attribute>
    </jfor:style>
- <jfor:style name="ContentTextPreserveWhitespace" white-space-collapse="false" start-
    indent="1cm" space-after="12pt" font-size="10pt">
- <xsl:attribute name="font-family">
  <xsl:value-of select="$vb-font-family-times" />
    </xsl:attribute>
    </jfor:style>
- <jfor:style name="ContentNote" start-indent="1cm" space-after="12pt" font-style="italic" font-
    size="10pt">
- <xsl:attribute name="font-family">
  <xsl:value-of select="$vb-font-family-times" />
    </xsl:attribute>
    </jfor:style>
- <jfor:style name="ContentCode" start-indent="1cm" space-after="12pt" font-size="10pt">
- <xsl:attribute name="font-family">
  <xsl:value-of select="$vb-font-family-courier" />
    </xsl:attribute>
    </jfor:style>
  <jfor:style name="TableTitle" xsl:use-attribute-sets="vb-column-heading" />
- <!--
   WL JFOR PROBLEM: I switched the code to make these styles paragraph styles
                               BUT when text is in a table, the style doesn't show up
                               UNLESS there is a block that follows the style block
                               SO only prompt paragraph styles exist in tables since
     they
                               always have an empty <fo:block> </fo:block> aftwerwards
    -->
  <jfor:style name="BodyTextTable" xsl:use-attribute-sets="vb-table-cell" />
- <jfor:style name="ListBullet" white-space-collapse="false" start-indent="2cm" font-size="10pt">
- <xsl:attribute name="font-family">
  <xsl:value-of select="$vb-font-family-times" />
    </xsl:attribute>
    </jfor:style>
- <jfor:style name="SpecialFeatureBullet" white-space-collapse="false" start-indent="1cm" font-
    size="10pt">
- <xsl:attribute name="font-family">
  <xsl:value-of select="$vb-font-family-times" />
    </xsl:attribute>
    </jfor:style>
- <jfor:style name="GrammarBullet" white-space-collapse="false" start-indent="1cm" font-
    size="10pt">
- <xsl:attribute name="font-family">
```

FIG. 11-5

```xml
    <xsl:value-of select="$vb-font-family-times" />
      </xsl:attribute>
      </jfor:style>
- <jfor:style name="prompt" white-space-collapse="false" font-weight="bold" font-size="10pt">
- <xsl:attribute name="font-family">
    <xsl:value-of select="$vb-font-family-times" />
      </xsl:attribute>
      </jfor:style>
- <jfor:style name="prompt-instruction" white-space-collapse="false" font-style="italic" font-size="10pt">
- <xsl:attribute name="font-family">
    <xsl:value-of select="$vb-font-family-times" />
      </xsl:attribute>
      </jfor:style>
- <jfor:style name="link" color="blue" font-size="10pt">
- <xsl:attribute name="font-family">
    <xsl:value-of select="$vb-font-family-times" />
      </xsl:attribute>
      </jfor:style>
      </jfor:stylesheet>
- <!--
  TITLE PAGE
  -->
<xsl:apply-templates select="./ns1:project" mode="title-page" />
- <!--
  since the helper stores state across invocations,
          help the helper by clearing its vector map of entry
          and exit states before we use it.
  -->
<xsl:value-of select="helper:clearVector($helper_instance, 'StateLinks')" />
<xsl:value-of select="helper:clearVector($helper_instance, 'PageLinks')" />
<xsl:value-of select="helper:clearVector($helper_instance, 'PromptList')" />
<xsl:value-of select="helper:clearVector($helper_instance, 'PromptLinks')" />
- <!--
  ==================================================================================
  -->
- <!--
  ITERATE THROUGH EACH FILE, ONCE FOR TOC, ONCE FOR CONTENT
  -->
- <!--
  ==================================================================================
  -->
- <!--
  ==================================================================================
  -->
- <!--
                    PER DESIGN FILE TABLE OF CONTENTS
  -->
- <!--
  ==================================================================================
  -->
```

FIG. 11-6

```xml
- <fo:page-sequence master-reference="tableofcontents">
- <xsl:element name="fo:block">
- <xsl:attribute name="font-family">
  <xsl:value-of select="$vb-font-family-times" />
    </xsl:attribute>
  <xsl:attribute name="font-size">20pt</xsl:attribute>
  Table of Contents
    </xsl:element>
  <fo:block />
- <xsl:element name="fo:block">
- <xsl:attribute name="font-family">
  <xsl:value-of select="$vb-font-family-times" />
    </xsl:attribute>
  <xsl:attribute name="color">black</xsl:attribute>
  <xsl:attribute name="font-style">italic</xsl:attribute>
  <xsl:attribute name="font-size">8pt</xsl:attribute>
    * To update the Table of Contents press CTRL-a and then press F9
    </xsl:element>
- <xsl:for-each select="saxon:tokenize($SUBDIALOGS, ';')">
  - <!--
    The path to the current design file
    -->
  <saxon:assign name="DIALOG_UNIT" select="." />
  <saxon:assign name="PROJECT_NAME"
     select="vbutils:getProjectNameFromUrl($DIALOG_UNIT)" />
  <xsl:value-of select="helper:addDialog($helper_instance, $PROJECT_NAME)" />
  <xsl:value-of select="helper:clearStateList($helper_instance,
     vbutils:getProjectNameFromUrl($DIALOG_UNIT))" />
  <xsl:value-of select="helper:clearVector($helper_instance, concat($PROJECT_NAME,
     'EntryStates'))" />
  <xsl:value-of select="helper:clearVector($helper_instance, concat($PROJECT_NAME,
     'ExitStates'))" />
- <xsl:for-each select="document(.)">
- <xsl:apply-templates select="ns1:project" mode="PerDesignFileTblOfContents">
  <xsl:with-param name="companyName" select="ns1:project/ns1:global-
     information/@company-name" />
  <xsl:with-param name="companyNameLen" select="string-length(ns1:project/ns1:global-
     information/@company-name)" />
  <xsl:with-param name="COPYRIGHT_FOOTER" select="$COPYRIGHT_FOOTER" />
  <xsl:with-param name="vb-font-family-times" select="$vb-font-family-times" />
    </xsl:apply-templates>
    </xsl:for-each>
    </xsl:for-each>
    </fo:page-sequence>
- <!--
  END TABLE OF CONTENTS
  -->
- <!--
  =================================================================================
  -->
```

FIG. 11-7

```
<!--
                CONTENT FOR EACH DESIGN FILE
-->
<!--
================================================================================
-->
<xsl:for-each select="saxon:tokenize($SUBDIALOGS, ';')">
  <!--
    The name of the folder containing the current design file
  -->
  <saxon:assign name="DIALOG_UNIT" select="." />
  <saxon:assign name="PROJECT_NAME"
     select="vbutils:getProjectNameFromUrl($DIALOG_UNIT)" />
  <xsl:for-each select="document(.)">
    <xsl:apply-templates select="ns1:project">
      <xsl:with-param name="COPYRIGHT_FOOTER" select="$COPYRIGHT_FOOTER" />
    </xsl:apply-templates>
  </xsl:for-each>
</xsl:for-each>
    </fo:root>
  </xsl:template>
<!--
================================
-->
<!--
  ROOT ELEMENT FOR EACH PROJECT
-->
<!--
================================
-->
<xsl:template match="ns1:project">
  <xsl:param name="COPYRIGHT_FOOTER" />
  <xsl:variable name="companyName" select="ns1:global-information/@company-name" />
  <xsl:variable name="companyNameLen" select="string-length($companyName)" />
  <!--
================================================================================
-->
  <!--
                        CONTENT
  -->
  <!--
================================================================================
-->
  <fo:page-sequence master-reference="content">
    <!--
      PAGE FOOTER
    -->
    <fo:static-content flow-name="xsl-region-after">
      <xsl:element name="fo:block" use-attribute-sets="vb-page-number">
        <fo:page-number />
      </xsl:element>
```

FIG. 11-8

```
- <xsl:element name="fo:block" use-attribute-sets="vb-legal-notice">
  - <!--
    check to see if there's a company name
    -->
  - <xsl:choose>
  - <xsl:when test="$companyNameLen > 0">
      Copyright 2004 by
      <xsl:value-of select="$companyName" />
      . All rights reserved. No part of this document may be used, reproduced or disclosed
      without a license agreement or nondisclosure agreement with
      <xsl:value-of select="$companyName" />
      .
    </xsl:when>
  - <xsl:otherwise>
      <xsl:value-of select="$COPYRIGHT_FOOTER" />
    </xsl:otherwise>
    </xsl:choose>
    </xsl:element>
  - <!--
    WL WORKAROUND: this pushes the footer up so that it prints
    -->
  - <!--
    Empty paragraph for spacing
    -->
    <fo:block />
    <fo:block />
    </fo:static-content>
  - <!--
    BODY OF THE PAGE
    -->
- <fo:flow flow-name="xsl-region-body">
- <xsl:element name="fo:block">
- <xsl:attribute name="font-family">
    <xsl:value-of select="$vb-font-family-times" />
    </xsl:attribute>
    <xsl:attribute name="font-size">20pt</xsl:attribute>
- <xsl:attribute name="id">
    <xsl:value-of select="concat('DesignFileStart_', helper:getDialogIndex($helper_instance, $PROJECT_NAME))" />
    </xsl:attribute>
    <xsl:value-of select="$PROJECT_NAME" />
    </xsl:element>
  - <!--
    WL NOTE: Nuance blues are 1: 0152AB (darkest, matches title page), 2: 0962C4, 3:
    1071DC, 4: 4995E7
    -->
  - <!--
    WL NOTE: We're setting white-space-collapse to false so that tabs work, this means
    you've got to
                            watch out for additional whitespace between tags in this
    document
```

FIG. 11-9

```
-->
- <!--
Section Title
-->
- <!--
WL NOTE: the TABS after section headers are a jfor hack so that the background color
    spans most of the line
-->
<xsl:variable name="sectionIterator" select="0" saxon:assignable="yes" />
<xsl:variable name="subSectionIterator" select="1" saxon:assignable="yes" />
- <xsl:if test="$PROJECT_NAME = $MAIN_DIALOG">
    <saxon:assign name="sectionIterator" select="$sectionIterator+1" />
- <fo:block jfor-class="SectionHeader">
- <xsl:attribute name="id">
    <xsl:value-of select="concat('DocumentOverview_',
        helper:getDialogIndex($helper_instance, $PROJECT_NAME))" />
    </xsl:attribute>
<xsl:text />
<xsl:value-of select="$sectionIterator" />
    Document Overview
<xsl:text />
- <!--
1
-->
    </fo:block>
- <!--
Sub-section title
-->
- <fo:block jfor-class="SubSectionHeader">
- <xsl:attribute name="id">
    <xsl:value-of select="concat('RevisionHistory_', helper:getDialogIndex($helper_instance,
        $PROJECT_NAME))" />
    </xsl:attribute>
<xsl:text />
<xsl:value-of select="$sectionIterator" />
    .
<xsl:value-of select="$subSectionIterator" />
    Revision History
<xsl:text />
- <!--
1.1
-->
    </fo:block>
- <fo:block jfor-class="ContentText">
    This dialog specification document is produced and controlled by
- <xsl:choose>
- <xsl:when test="$companyNameLen > 0">
    <xsl:value-of select="$companyName" />
    .
    </xsl:when>
```

FIG. 11-10

```
<xsl:otherwise>Nuance Communications.</xsl:otherwise>
  </xsl:choose>
  All requests to make changes to this document should be directed to the authors so that
  changes are made by the authors through the appropriate version control procedures.
</fo:block>
- <!--
WL INDENTATION NOTE: I customized jfor and indentation now works.  The indentation
will be taken out
                 of the first column, so make sure you add the amount of indentation
to the size of the first column
                 ex. I indent tables by 1cm so each first column needs to be 10mm
bigger than I want it
-->
- <!--
Revisions table
-->
- <fo:table>
 - <!--
WL: total length is 155mm
-->
  <fo:table-column column-width="30mm" />
  <fo:table-column column-width="25mm" />
  <fo:table-column column-width="40mm" />
  <fo:table-column column-width="60mm" />
- <fo:table-body>
- <fo:table-row>
- <fo:table-cell border-style="thin" padding="1pt" background-color="#4995E7">
    <xsl:element name="fo:block" use-attribute-sets="vb-column-heading">Revision
      Number</xsl:element>
    </fo:table-cell>
- <fo:table-cell border-style="thin" padding="1pt" background-color="#4995E7">
    <xsl:element name="fo:block" use-attribute-sets="vb-column-heading">Date</xsl:element>
    </fo:table-cell>
- <fo:table-cell border-style="thin" padding="1pt" background-color="#4995E7">
    <xsl:element name="fo:block" use-attribute-sets="vb-column-heading">Author</xsl:element>
    </fo:table-cell>
- <fo:table-cell border-style="thin" padding="1pt" background-color="#4995E7">
    <xsl:element name="fo:block" use-attribute-sets="vb-column-heading">Notes</xsl:element>
    </fo:table-cell>
    </fo:table-row>
  - <!--
WL we loop through each revision tag
-->
- <xsl:for-each select="ns1:global-information/ns1:revision-history/ns1:revision">
- <fo:table-row>
  - <!--
WL NOTE: jfor doesn't support padding-left so you can only apply general padding
-->
- <fo:table-cell border-style="thin" padding="3pt">
- <xsl:element name="fo:block" use-attribute-sets="vb-table-cell">
  <xsl:value-of select="@number" />
```

FIG. 11-11

```
        </xsl:element>
      </fo:table-cell>
- <fo:table-cell border-style="thin" padding="3pt">
- <xsl:element name="fo:block" use-attribute-sets="vb-table-cell">
    <xsl:value-of select="@date" />
      </xsl:element>
    </fo:table-cell>
- <fo:table-cell border-style="thin" padding="3pt">
- <xsl:element name="fo:block" use-attribute-sets="vb-table-cell">
    <xsl:value-of select="@author" />
      </xsl:element>
    </fo:table-cell>
- <fo:table-cell border-style="thin" padding="3pt">
- <xsl:element name="fo:block" use-attribute-sets="vb-table-cell">
    <xsl:value-of select="@notes" />
      </xsl:element>
    </fo:table-cell>
    </fo:table-row>
    </xsl:for-each>
    </fo:table-body>
    </fo:table>
- <!--
  Typographical Conventions
  -->
- <!--
  add some space before subsection header
  -->
  <saxon:assign name="subSectionIterator" select="$subSectionIterator+1" />
- <fo:block space-before="5mm" jfor-class="SubSectionHeader">
- <xsl:attribute name="id">
    <xsl:value-of select="concat('TypographicalConventions_',
      helper:getDialogIndex($helper_instance, $PROJECT_NAME))" />
      </xsl:attribute>
  <xsl:text />
  <xsl:value-of select="$sectionIterator" />
     .
  <xsl:value-of select="$subSectionIterator" />
  Typographical Conventions
  <xsl:text />
- <!--
  1.2
  -->
  </fo:block>
- <fo:block jfor-class="ContentText">
    Prompt text in sample dialogs is within quotes and bold (e.g.,
    <fo:inline font-weight="bold">"May I help you"</fo:inline>
    ).
  </fo:block>
  <fo:block jfor-class="ContentText">Verbal responses from the user and sample phrases are
    within quotes (e.g. "Yes").</fo:block>
```

FIG. 11-12

```
- <fo:block jfor-class="ContentText">
    Natural language (NL) slots are bold and between angle brackets (e.g.,
    <fo:inline font-weight="bold"><name></fo:inline>
      ). NL slots, which are determined by the grammar being used, are filled with values
      based on what the user has said. Sometimes the values of NL slots are stored in system
      variables for later use.
    </fo:block>
- <fo:block jfor-class="ContentText">
    Text-to-speech (TTS) output is shown in italics (e.g., Say-as expr:
    <fo:inline font-style="italic">name</fo:inline>
      ). If the TTS value is a literal, it is also placed in quotes (e.g., TTS:
    <fo:inline font-style="italic">"The date I heard was"</fo:inline>
      ).
    </fo:block>
  - <!--
    Dialog State Format
    -->
  <saxon:assign name="subSectionIterator" select="$subSectionIterator+1" />
- <fo:block jfor-class="SubSectionHeader">
- <xsl:attribute name="id">
    <xsl:value-of select="concat('DialogStateFormat_', helper:getDialogIndex($helper_instance,
      $PROJECT_NAME))" />
    </xsl:attribute>
  <xsl:text />
  <xsl:value-of select="$sectionIterator" />
    .
  <xsl:value-of select="$subSectionIterator" />
    Dialog State Format
  <xsl:text />
  - <!--
    1.3
    -->
    </fo:block>
  <fo:block jfor-class="ContentText">A dialog state represents one conversational interchange
    between the system and the user. Dialog states may contain the following
    elements:</fo:block>
- <fo:block jfor-class="ContentText">
  <fo:inline font-weight="bold">Description:</fo:inline>
    Explains what interaction takes place in the dialog state.
    </fo:block>
- <fo:block jfor-class="ContentText">
  <fo:inline font-weight="bold">Special Features:</fo:inline>
    Describes relevant special features, such as whether N-best processing is used or the
    state is a hotword state, and any universal behavior (whether there are exceptions,
    etc.).
    </fo:block>
- <fo:block jfor-class="ContentText">
  <fo:inline font-weight="bold">Entry and Exit States:</fo:inline>
    Lists (as links) the possible preceding and following dialog states.
    </fo:block>
```

FIG. 11-13

```
- <fo:block jfor-class="ContentText">
  <fo:inline font-weight="bold">Pre-rec Prompts:</fo:inline>
    Lists the prompts that may be played prior to receiving the user's input.
  </fo:block>
- <fo:block jfor-class="ContentText">
  <fo:inline font-weight="bold">Grammar:</fo:inline>
    In a recognition state, defines the grammar used for recognizing the user's input, by
      showing slot names and values. Also shows sample phrases that fill the NL slots.
  <fo:inline font-style="italic">The 'Sample Phrases' list is not exhaustive.</fo:inline>
  </fo:block>
- <fo:block jfor-class="ContentText">
  <fo:inline font-weight="bold">Actions:</fo:inline>
    Lists the actions to be taken by the system (typically based on system variable values).
  </fo:block>
- <fo:block jfor-class="ContentText">
  <fo:inline font-weight="bold">Error Behaviors:</fo:inline>
    If an error behavior for a dialog state differs from the application-level behavior, it will
      be noted in this section.
  </fo:block>
- <fo:block jfor-class="ContentText">
  <fo:inline font-weight="bold">State-Specific Universal Behaviors:</fo:inline>
    If a universal behavior (e.g., help) for a dialog state differs from the application-level
      behavior, it will be noted in this section.
  </fo:block>
  </xsl:if>
- <!--
  test="$PROJECT_NAME = $MAIN_DIALOG"
  -->
- <!--
  Section Title
  -->
  <saxon:assign name="sectionIterator" select="$sectionIterator+1" />
  <saxon:assign name="subSectionIterator" select="0" />
- <fo:block jfor-class="SectionHeader">
- <xsl:attribute name="id">
  <xsl:value-of select="concat('ApplicationSummary_',
    helper:getDialogIndex($helper_instance, $PROJECT_NAME))" />
  </xsl:attribute>
  <xsl:text />
  <xsl:value-of select="$sectionIterator" />
    Application Summary
  <xsl:text />
- <!--
  2
  -->
  </fo:block>
- <xsl:if test="$PROJECT_NAME = $MAIN_DIALOG">
- <!--
  Sub-section title
  -->
```

FIG. 11-14

```
<saxon:assign name="subSectionIterator" select="$subSectionIterator+1" />
- <fo:block jfor-class="SubSectionHeader">
- <xsl:attribute name="id">
  <xsl:value-of select="concat('FunctionalityandFeatures_',
    helper:getDialogIndex($helper_instance, $PROJECT_NAME))" />
  </xsl:attribute>
  <xsl:text />
  <xsl:value-of select="$sectionIterator" />
     .
  <xsl:value-of select="$subSectionIterator" />
  Functionality and Features
  <xsl:text />
  - <!--
  2.1
    -->
  </fo:block>
- <!--
  Functionality block from the GUI
  -->
- <fo:block jfor-class="ContentTextPreserveWhitespace">
- <xsl:if test="ns1:global-information/ns1:application-summary/ns1:description">
  <xsl:value-of select="ns1:global-information/ns1:application-summary/ns1:description" />
  </xsl:if>
- <xsl:if test="not( ns1:global-information/ns1:application-summary/ns1:description )">
  <fo:inline font-style="italic" color="red">No description was provided in the
    configuration.</fo:inline>
  </xsl:if>
  </fo:block>
- <!--
  DTMF
  -->
- <fo:block jfor-class="SubSubSectionHeader">
- <xsl:attribute name="id">
  <xsl:value-of select="concat('AppSummaryDTMF_', helper:getDialogIndex($helper_instance,
    $PROJECT_NAME))" />
  </xsl:attribute>
  <xsl:text />
  <xsl:value-of select="$sectionIterator" />
     .
  <xsl:value-of select="$subSectionIterator" />
  .1 DTMF
  <xsl:text />
  - <!--
  2.1.1
    -->
  </fo:block>
  <fo:block jfor-class="ContentText">Where applicable, callers can use DTMF (touch-tone) to
    enter such things as phone numbers, PINs, dates, and monetary amounts.</fo:block>
  - <!--
  TTS
```

FIG. 11-15

```
    -->
- <fo:block jfor-class="SubSubSectionHeader">
- <xsl:attribute name="id">
    <xsl:value-of select="concat('AppSummaryTTS_', helper:getDialogIndex($helper_instance,
      $PROJECT_NAME))" />
    </xsl:attribute>
  <xsl:text />
  <xsl:value-of select="$sectionIterator" />
     .
  <xsl:value-of select="$subSectionIterator" />
     .2 Text-to-Speech Output
  <xsl:text />
- <!--
  2.1.2
  -->
  </fo:block>
  <fo:block jfor-class="ContentText">Text-to-speech output will be used in the application, if
    needed.</fo:block>
- <!--
  N-Best
  -->
- <fo:block jfor-class="SubSubSectionHeader">
- <xsl:attribute name="id">
    <xsl:value-of select="concat('AppSummaryNBest_', helper:getDialogIndex($helper_instance,
      $PROJECT_NAME))" />
    </xsl:attribute>
  <xsl:text />
  <xsl:value-of select="$sectionIterator" />
     .
  <xsl:value-of select="$subSectionIterator" />
     .3 N-Best/Skiplists
  <xsl:text />
- <!--
  2.1.3
  -->
  </fo:block>
  <fo:block jfor-class="ContentText">The N-best list is where the recognizer stores not only
    the result that has the highest probability but also N other results in order of decreasing
    probability. To avoid caller frustration and to get more calls put through successfully, the
    application implements a "skip list". Skip lists are used in combination with N-best lists
    and store items that have been negatively confirmed by the caller. When the caller is re-
    prompted in the same state, items in the N-best list that are present in the skip list are
    discarded and the application skips over to the next result on the list. If all the results in
    the N-best list are on the skip list, the top choice on the N-best list should be
    selected.</fo:block>
  <fo:block jfor-class="ContentText">N-best lists are also used in conjunction with checksum
    algorithms (e.g., for credit card numbers) and other data sources (e.g., customer
    databases). Cross-referencing the N-best results allows the application to eliminate
    incorrect recognition hypotheses. This technique is often combined with a skip
    list..</fo:block>
- <!--
```

FIG. 11-16

```
    Fillers
    -->
- <fo:block jfor-class="SubSubSectionHeader">
- <xsl:attribute name="id">
  <xsl:value-of select="concat('AppSummaryFillers_',
     helper:getDialogIndex($helper_instance, $PROJECT_NAME))" />
  </xsl:attribute>
  <xsl:text />
  <xsl:value-of select="$sectionIterator" />
  .
  <xsl:value-of select="$subSectionIterator" />
  .4 Filler - prefixes, suffixes
  <xsl:text />
  - <!--
  2.1.4
  -->
  </fo:block>
  <fo:block jfor-class="ContentText">Fillers are incorporated in the grammar before (prefix)
     and after (suffix) the meaningful portion of the sentence. Examples of fillers are: 'I want
     to,' 'I want,' 'please,' 'uh,' and 'um.'</fo:block>
  - <!--
    Bargein
    -->
- <fo:block jfor-class="SubSubSectionHeader">
- <xsl:attribute name="id">
  <xsl:value-of select="concat('AppSummaryBargein_',
     helper:getDialogIndex($helper_instance, $PROJECT_NAME))" />
  </xsl:attribute>
  <xsl:text />
  <xsl:value-of select="$sectionIterator" />
  .
  <xsl:value-of select="$subSectionIterator" />
  .5 Barge-in
  <xsl:text />
  - <!--
  2.1.5
  -->
  </fo:block>
  <fo:block jfor-class="ContentText">Barge-in is the ability of the system to recognize that a
     caller is speaking while a prompt is still playing, and to stop playing the prompt. Barge-in
     enables faster service for experienced callers who can interrupt prompts, quickly going
     through the dialog. Less-experienced callers are still guided by full prompts.</fo:block>
  - <!--
    Random
    -->
- <fo:block jfor-class="SubSubSectionHeader">
- <xsl:attribute name="id">
  <xsl:value-of select="concat('AppSummaryRandom_',
     helper:getDialogIndex($helper_instance, $PROJECT_NAME))" />
  </xsl:attribute>
  <xsl:text />
```

FIG. 11-17

```
<xsl:value-of select="$sectionIterator" />
    .
<xsl:value-of select="$subSectionIterator" />
    .6 Randomization of prompts
<xsl:text />
- <!--
2.1.6
-->
</fo:block>
<fo:block jfor-class="ContentText">Certain prompts that are heard over and over again may
    have variations that are played randomly. For example, the confirmation 'okay' might be
    randomly varied with 'sure' and 'got it.' This makes the system more conversational and
    natural.</fo:block>
- <!--
Nonreco
-->
- <fo:block jfor-class="SubSubSectionHeader">
- <xsl:attribute name="id">
  <xsl:value-of select="concat('AppSummaryNonreco_',
      helper:getDialogIndex($helper_instance, $PROJECT_NAME))" />
  </xsl:attribute>
<xsl:text />
<xsl:value-of select="$sectionIterator" />
    .
<xsl:value-of select="$subSectionIterator" />
    .7 Non-recognition States
<xsl:text />
- <!--
2.1.7
-->
</fo:block>
<fo:block jfor-class="ContentText">Non-recognition states are used mainly in cases where
    the system needs to do data processing, such as sending or retrieving information from
    the back-end. Sometimes these states will also include brief informational prompts that
    are played back to the caller, such as "Sorry, but I was not able to complete your
    request. Now, hold on and I'll take you back to the Main Menu."</fo:block>
<fo:block jfor-class="ContentText">In non-rec states, barge-in is off, which means that if a
    caller says something during this state, nothing will happen. Barge-in will be turned back
    on when the caller reaches the next state.</fo:block>
- <!--
Tasks
-->
- <fo:block jfor-class="SubSubSectionHeader">
- <xsl:attribute name="id">
  <xsl:value-of select="concat('AppSummaryTasks_', helper:getDialogIndex($helper_instance,
      $PROJECT_NAME))" />
  </xsl:attribute>
<xsl:text />
<xsl:value-of select="$sectionIterator" />
    .
<xsl:value-of select="$subSectionIterator" />
```

FIG. 11-18

```
.8 Task Completion Tags
<xsl:text />
- <!--
2.1.8
-->
</fo:block>
<fo:block jfor-class="ContentText">For VoiceXML applications, to add more accurate
    reporting, tasks can be labeled with task completion tags in the code to signify a task
    start and a task end. Where appropriate, task completion tags are noted in the dialog
    spec to be added to the code. For example, an end tag might look like this:</fo:block>
<fo:block jfor-class="ContentCode"><nuance:taskend name="accountbalance" cond=
    "true"/></fo:block>
<fo:block jfor-class="ContentText">It is important to be careful with tags in the case of
    things like "repeat" or switching between subapplications, to make sure the taskbegin
    and taskend tags match up correctly.</fo:block>
<fo:block jfor-class="ContentText">In addition, states in which a task has already been
    completed (and no new task has been started) should override the max error and
    universals to make sure a task end tag is not written, to avoid mis-matched
    tags.</fo:block>
- <!--
Hotword
-->
- <fo:block jfor-class="SubSubSectionHeader">
- <xsl:attribute name="id">
  <xsl:value-of select="concat('AppSummaryHotword_',
    helper:getDialogIndex($helper_instance, $PROJECT_NAME))" />
  </xsl:attribute>
<xsl:text />
<xsl:value-of select="$sectionIterator" />
  .
<xsl:value-of select="$subSectionIterator" />
  .9 Hotword
<xsl:text />
- <!--
2.1.9
-->
</fo:block>
<fo:block jfor-class="ContentText">Hotword states are used in cases where the system is not
    expecting the caller to say something in response to a prompt, but instead is playing
    back information to a caller. Examples of this include implicit confirmation ("Okay, fifty
    dollars..") or general information playback ("The phone number is: 604 555 1234, and
    the amount owed is fifty-six dollars..") However, rather than make these non-
    recognition states, hotword allows the callers to say a small subset of things, such as
    "no!" or "repeat", which gives the dialog more flexibility.</fo:block>
<fo:block jfor-class="ContentText">In a hotword state, the prompt is only cut off if the user
    says something within grammar. All out of grammar utterances are ignored and the
    prompt continues playing as if the caller hadn't said anything.</fo:block>
<fo:block jfor-class="ContentText">For example, if the user is in a hotword state and says
    something out of grammar, such as "pizza," nothing happens. In a normal state, the
    prompt would stop and the user would hear an error message. Hotword states do not
```

FIG. 11-19 contain error messages, because there will never be a reject error. If an utterance is out of grammar, it is ignored as if the user never spoke.</fo:block>
  <fo:block jfor-class="ContentText">Hotword states generally have small grammars, such as just the universals.</fo:block>
  <!--
  Grammar Labels
  -->
  <fo:block jfor-class="SubSubSectionHeader">
    <xsl:attribute name="id">
      <xsl:value-of select="concat('AppSummaryGrammarLabels_', helper:getDialogIndex($helper_instance, $PROJECT_NAME))" />
    </xsl:attribute>
    <xsl:text />
    <xsl:value-of select="$sectionIterator" />
    .
    <xsl:value-of select="$subSectionIterator" />
    .10 VoiceXML Grammar Labels
    <xsl:text />
    <!--
    2.1.10
    -->
  </fo:block>
  <fo:block jfor-class="ContentText">A grammar label is automatically included for each state. Grammar labels are essential for efficient system tuning.</fo:block>
  <saxon:assign name="subSectionIterator" select="$subSectionIterator+1" />
  <!--
  Users
  -->
  <fo:block jfor-class="SubSectionHeader">
    <xsl:attribute name="id">
      <xsl:value-of select="concat('USERS_', helper:getDialogIndex($helper_instance, $PROJECT_NAME))" />
    </xsl:attribute>
    <xsl:text />
    <xsl:value-of select="$sectionIterator" />
    .
    <xsl:value-of select="$subSectionIterator" />
    Users
    <xsl:text />
    <!--
    2.2
    -->
  </fo:block>
  <!--
  Users block from the GUI
  -->
  <fo:block jfor-class="ContentTextPreserveWhitespace">
    <xsl:if test="ns1:global-information/ns1:application-summary/ns1:users/ns1:description">
      <xsl:value-of select="ns1:global-information/ns1:application-summary/ns1:users/ns1:description" />
    </xsl:if>
```

FIG. 11-20

```
</fo:block>
- <!--
Persona
-->
<saxon:assign name="subSectionIterator" select="$subSectionIterator+1" />
- <fo:block jfor-class="SubSectionHeader">
- <xsl:attribute name="id">
   <xsl:value-of select="concat('PERSONA_', helper:getDialogIndex($helper_instance,
      $PROJECT_NAME))" />
   </xsl:attribute>
  <xsl:text />
  <xsl:value-of select="$sectionIterator" />
  .
  <xsl:value-of select="$subSectionIterator" />
  Persona
  <xsl:text />
- <!--
2.3
-->
  </fo:block>
- <!--
Users block from the GUI
-->
- <fo:block jfor-class="ContentTextPreserveWhitespace">
- <xsl:if test="ns1:global-information/ns1:application-
   summary/ns1:persona/ns1:description">
   <xsl:value-of select="ns1:global-information/ns1:application-
      summary/ns1:persona/ns1:description" />
   </xsl:if>
   </fo:block>
   </xsl:if>
- <!--
  test="$PROJECT_NAME = $MAIN_DIALOG"
-->
- <!--
Vars
-->
<saxon:assign name="subSectionIterator" select="$subSectionIterator+1" />
- <fo:block jfor-class="SubSectionHeader">
- <xsl:attribute name="id">
   <xsl:value-of select="concat('VARIABLEDEFINITIONS_',
      helper:getDialogIndex($helper_instance, $PROJECT_NAME))" />
   </xsl:attribute>
  <xsl:text />
  <xsl:value-of select="$sectionIterator" />
  .
  <xsl:value-of select="$subSectionIterator" />
  Variable Definitions
  <xsl:text />
- <!--
2.4
```

FIG. 11-21

```
  -->
  </fo:block>
<fo:block jfor-class="ContentText">Application variable information is listed below (if
  available).</fo:block>
- <!--
  CT 16454: hide app properties
  -->
- <!--
  Application Properties Table - ->
              <xsl:if test="not(ns1:global-information/ns1:properties/ns1:property)">
                <fo:block jfor-class="ContentText">
                  There are no properties defined for this application.
                </fo:block>
              </xsl:if>
              <xsl:apply-templates select="ns1:global-information/ns1:properties">
                <xsl:with-param name="tableHeader" select="'Application Properties
  Table'"/>
              </xsl:apply-templates>
              <fo:block> </fo:block
  -->
- <!--
  Application Variables Table
  -->
- <xsl:choose>
- <xsl:when test="ns1:global-information/ns1:variable">
- <fo:table>
  <fo:table-column column-width="155mm" />
- <fo:table-body>
- <fo:table-row>
- <fo:table-cell border-style="thin" padding="1pt" background-color="#1071DC">
    <xsl:element name="fo:block" use-attribute-sets="vb-column-heading">Application Variables
      Table</xsl:element>
    </fo:table-cell>
    </fo:table-row>
    </fo:table-body>
    </fo:table>
- <fo:table>
  <fo:table-column column-width="64mm" />
  <fo:table-column column-width="43mm" />
  <fo:table-column column-width="48mm" />
- <fo:table-body>
  <xsl:call-template name="VariablesTitleRow" />
  <xsl:apply-templates select="ns1:global-information/ns1:variable" />
    </fo:table-body>
    </fo:table>
    </xsl:when>
- <xsl:otherwise>
  <fo:block jfor-class="ContentText">There are no variables set in this application.</fo:block>
    </xsl:otherwise>
    </xsl:choose>
- <!--
```

FIG. 11-22

```
        insert a page break
        -->
<fo:block break-before="page" />
- <!--
  Section Title
  -->
<saxon:assign name="sectionIterator" select="$sectionIterator+1" />
<saxon:assign name="subSectionIterator" select="1" />
- <fo:block jfor-class="SectionHeader">
- <xsl:attribute name="id">
  <xsl:value-of select="concat('DialogFlow_', helper:getDialogIndex($helper_instance,
    $PROJECT_NAME))" />
  </xsl:attribute>
<xsl:text />
<xsl:value-of select="$sectionIterator" />
  Dialog Flow
<xsl:text />
- <!--
3
  -->
  </fo:block>
- <!--
  We are missing a dialog flow description section from the PSXML
                  Once we add it, this code will render it.
                  See NUAN00016281.

-->
- <!--

<fo:block jfor-class="SubSectionHeader">
                <xsl:attribute name="id">
                    <xsl:value-of select="concat('GeneralDescription_',
  helper:getDialogIndex($helper_instance, $PROJECT_NAME))"/>
                </xsl:attribute>
                <xsl:text/>3.1	General Description<xsl:text/>
              </fo:block>

<fo:block jfor-class="ContentTextPreserveWhitespace">
                <xsl:if test="ns1:global-information/ns1:dialog-
  flow/ns1:description">
                    <xsl:value-of select="ns1:global-information/ns1:dialog-
  flow/ns1:description"/>
                </xsl:if>
                <xsl:if test="not( ns1:global-information/ns1:dialog-
  flow/ns1:description )">
                    <fo:inline font-style="italic" color="red">
                      No description was provided in the configuration.
                    </fo:inline>
                </xsl:if>
              </fo:block>

-->
- <!--
  Sub-section title
```

FIG. 11-23

```
      -->
   - <fo:block jfor-class="SubSectionHeader">
   - <xsl:attribute name="id">
     <xsl:value-of select="concat('UniversalBehaviors_', helper:getDialogIndex($helper_instance,
        $PROJECT_NAME))" />
        </xsl:attribute>
     <xsl:text />
     <xsl:value-of select="$sectionIterator" />
       .
     <xsl:value-of select="$subSectionIterator" />
       Universal Behaviors
     <xsl:text />
     - <!--
     3.2
       -->
       </fo:block>
     <fo:block jfor-class="ContentText">Certain capabilities and behaviors are available in all
        dialog states, unless otherwise specified. These are called 'Universals.'</fo:block>
     - <!--
       Sub-sub-section title
       -->
   - <fo:block jfor-class="SubSubSectionHeader">
   - <xsl:attribute name="id">
     <xsl:value-of select="concat('UniversalActions_', helper:getDialogIndex($helper_instance,
        $PROJECT_NAME))" />
        </xsl:attribute>
     <xsl:text />
     <xsl:value-of select="$sectionIterator" />
       .
     <xsl:value-of select="$subSectionIterator" />
       .1 Universal Actions
     <xsl:text />
     - <!--
     3.2.1
       -->
       </fo:block>
   - <fo:block jfor-class="ContentText">
       The 'Universal Actions' grammar is active in all states that have recognition. This
       grammar is typically used to allow callers to ask for help, repeat prompts, or transfer to
       an operator. Examples of expressions and corresponding universal NL slot fill values are
       shown in the table below.
     <fo:inline font-weight="bold">The following table shows the universals available with the
       Nuance Voice Platform. These aren't necessarily active in this application.</fo:inline>
       </fo:block>
     - <!--
       Universal slot table
       -->
   - <fo:table>
     - <!--
       WL: total length is 155mm
       -->
```

FIG. 11-24

```xml
<fo:table-column column-width="75mm" />
<fo:table-column column-width="80mm" />
- <fo:table-body>
- <fo:table-row>
- <fo:table-cell border-style="thin" padding="1pt" background-color="#4995E7">
    <xsl:element name="fo:block" use-attribute-sets="vb-column-heading">Universal
      Values</xsl:element>
    </fo:table-cell>
- <fo:table-cell border-style="thin" padding="1pt" background-color="#4995E7">
    <xsl:element name="fo:block" use-attribute-sets="vb-column-heading">Sample
      Phrases</xsl:element>
    </fo:table-cell>
  </fo:table-row>
- <fo:table-row>
- <fo:table-cell border-style="thin" padding="3pt">
    <xsl:element name="fo:block" use-attribute-sets="vb-table-cell">cancel</xsl:element>
    </fo:table-cell>
- <fo:table-cell border-style="thin" padding="3pt">
    <xsl:element name="fo:block" use-attribute-sets="vb-table-cell">'cancel'</xsl:element>
    <xsl:element name="fo:block" use-attribute-sets="vb-table-cell">'go back'</xsl:element>
    </fo:table-cell>
  </fo:table-row>
- <fo:table-row>
- <fo:table-cell border-style="thin" padding="3pt">
    <xsl:element name="fo:block" use-attribute-sets="vb-table-cell">exit</xsl:element>
    </fo:table-cell>
- <fo:table-cell border-style="thin" padding="3pt">
    <xsl:element name="fo:block" use-attribute-sets="vb-table-cell">'exit'</xsl:element>
    <xsl:element name="fo:block" use-attribute-sets="vb-table-cell">'goodbye'</xsl:element>
    </fo:table-cell>
  </fo:table-row>
- <fo:table-row>
- <fo:table-cell border-style="thin" padding="3pt">
    <xsl:element name="fo:block" use-attribute-sets="vb-table-cell">help</xsl:element>
    </fo:table-cell>
- <fo:table-cell border-style="thin" padding="3pt">
    <xsl:element name="fo:block" use-attribute-sets="vb-table-cell">'help'</xsl:element>
    <xsl:element name="fo:block" use-attribute-sets="vb-table-cell">'I need help'</xsl:element>
    </fo:table-cell>
  </fo:table-row>
- <fo:table-row>
- <fo:table-cell border-style="thin" padding="3pt">
    <xsl:element name="fo:block" use-attribute-sets="vb-table-cell">mainmenu</xsl:element>
    </fo:table-cell>
- <fo:table-cell border-style="thin" padding="3pt">
    <xsl:element name="fo:block" use-attribute-sets="vb-table-cell">'main menu'</xsl:element>
    <xsl:element name="fo:block" use-attribute-sets="vb-table-cell">'start over'</xsl:element>
    </fo:table-cell>
  </fo:table-row>
```

FIG. 11-25

```
- <fo:table-row>
- <fo:table-cell border-style="thin" padding="3pt">
    <xsl:element name="fo:block" use-attribute-sets="vb-table-cell">operator</xsl:element>
    </fo:table-cell>
- <fo:table-cell border-style="thin" padding="3pt">
    <xsl:element name="fo:block" use-attribute-sets="vb-table-cell">'Service
      Representative'</xsl:element>
    <xsl:element name="fo:block" use-attribute-sets="vb-table-cell">'I want to talk with an
      operator'</xsl:element>
    <xsl:element name="fo:block" use-attribute-sets="vb-table-cell">'agent'</xsl:element>
    </fo:table-cell>
    </fo:table-row>
- <fo:table-row>
- <fo:table-cell border-style="thin" padding="3pt">
    <xsl:element name="fo:block" use-attribute-sets="vb-table-cell">repeat</xsl:element>
    </fo:table-cell>
- <fo:table-cell border-style="thin" padding="3pt">
    <xsl:element name="fo:block" use-attribute-sets="vb-table-cell">'repeat'</xsl:element>
    </fo:table-cell>
    </fo:table-row>
    </fo:table-body>
    </fo:table>
  <fo:block />
  <fo:block />
- <xsl:if test="ns1:global-information/ns1:universal-behavior">
- <fo:block jfor-class="ContentText">
    The following table shows the universal behaviors specified in
    <fo:inline font-weight="bold">this application.</fo:inline>
    </fo:block>
  - <!--
    Universal actions table
    -->
- <fo:table>
  - <!--
    WL: total length is 155mm
    -->
    <fo:table-column column-width="50mm" />
    <fo:table-column column-width="60mm" />
    <fo:table-column column-width="45mm" />
- <fo:table-body>
- <xsl:call-template name="ConditionActionGotoTitleRow">
    <xsl:with-param name="condition" select="'Universal Type'" />
    </xsl:call-template>
    <xsl:apply-templates select="ns1:global-information/ns1:universal-behavior" />
    </fo:table-body>
    </fo:table>
  <fo:block />
  </xsl:if>
- <xsl:if test="not(ns1:global-information/ns1:universal-behavior)">
```

FIG. 11-26

```
<fo:block jfor-class="ContentText">NOTE: no universal behaviors are described in this
  project. Universals are likely handled at the state level.</fo:block>
  </xsl:if>
- <xsl:if test="ns1:global-information/ns1:error-behavior">
  - <!--
  Sub-sub-section title
  -->
- <fo:block jfor-class="SubSubSectionHeader">
- <xsl:attribute name="id">
  <xsl:value-of select="concat('UniversalErrorHandling_',
    helper:getDialogIndex($helper_instance, $PROJECT_NAME))" />
  </xsl:attribute>
  <xsl:text />
  <xsl:value-of select="$sectionIterator" />
  .
  <xsl:value-of select="$subSectionIterator" />
  .2 Universal Error Handling
  <xsl:text />
  - <!--
  3.2.2
  -->
  </fo:block>
  <fo:block jfor-class="ContentText">Universal error handling is outlined below. This error
    behavior can be overriden in any given state.</fo:block>
  - <!--
  Error table
  -->
- <fo:table>
  - <!--
  WL: total length is 155mm
  -->
  <fo:table-column column-width="50mm" />
  <fo:table-column column-width="60mm" />
  <fo:table-column column-width="45mm" />
- <fo:table-body>
- <xsl:call-template name="ConditionActionGotoTitleRow">
  <xsl:with-param name="condition" select="'Error Type'" />
  </xsl:call-template>
  <xsl:apply-templates select="ns1:global-information/ns1:error-behavior" />
  </fo:table-body>
  </fo:table>
  <fo:block />
  </xsl:if>
- <!--
  insert a page break
  -->
  <fo:block break-before="page" />
- <!--
  Section Title
  -->
  <saxon:assign name="sectionIterator" select="$sectionIterator+1" />
```

FIG. 11-27

```
<saxon:assign name="subSectionIterator" select="1" />
- <fo:block jfor-class="SectionHeader">
- <xsl:attribute name="id">
  <xsl:value-of select="concat('DialogStates_', helper:getDialogIndex($helper_instance,
    $PROJECT_NAME))" />
  </xsl:attribute>
  <xsl:text />
  <xsl:value-of select="$sectionIterator" />
    Dialog States
  <xsl:text />
  - <!--
  4
  -->
  </fo:block>
  <fo:block jfor-class="ContentText">This section provides details of the system behavior in
    each dialog state.</fo:block>
  <xsl:variable name="stateListIterator" select="0" saxon:assignable="yes" />
  <xsl:variable name="stateListSize" select="helper:getStateListSize($helper_instance,
    $PROJECT_NAME)" />
- <saxon:while test="$stateListIterator < $stateListSize">
  <xsl:variable name="completeStateName" select="helper:getState($helper_instance,
    $PROJECT_NAME, $stateListIterator)" />
- <xsl:choose>
- <xsl:when test="contains($completeStateName, '#')">
- <xsl:apply-templates select="ns1:generic-container[@name = substring-
    before($completeStateName, '#')]" mode="states">
  <xsl:with-param name="containerState" select="substring-
    after(helper:getState($helper_instance, $PROJECT_NAME, $stateListIterator), '#')" />
  <xsl:with-param name="stateNumber" select="$stateListIterator + 1" />
  <xsl:with-param name="sectionNumber" select="$sectionIterator" />
  </xsl:apply-templates>
  </xsl:when>
- <xsl:otherwise>
- <xsl:apply-templates select="ns1:generic-container[@name = $completeStateName]"
    mode="container">
  <xsl:with-param name="stateNumber" select="$stateListIterator + 1" />
  <xsl:with-param name="sectionNumber" select="$sectionIterator" />
  </xsl:apply-templates>
  </xsl:otherwise>
  </xsl:choose>
  <saxon:assign name="stateListIterator" select="$stateListIterator+1" />
  </saxon:while>
- <!--
  since the helper stores state across invocations,
              help the helper by clearing its map of call flow
              urls, now that we're done with it
  -->
  <xsl:value-of select="helper:clearCallFlowMap($helper_instance, $DIALOG_UNIT)" />
- <!--
  insert a page break
```

FIG. 11-28

```xml
-->
<fo:block break-before="page" />
<!--
  Section Title
-->
<saxon:assign name="sectionIterator" select="$sectionIterator+1" />
<saxon:assign name="subSectionIterator" select="1" />
<fo:block jfor-class="SectionHeader">
  <xsl:attribute name="id">
    <xsl:value-of select="concat('Appendices_', helper:getDialogIndex($helper_instance, $PROJECT_NAME))" />
  </xsl:attribute>
  <xsl:text />
  <xsl:value-of select="$sectionIterator" />
  Appendices
  <xsl:text />
  <!--
  5
  -->
</fo:block>
<!--
  Sub-section title
-->
<fo:block jfor-class="SubSectionHeader">
  <xsl:attribute name="id">
    <xsl:value-of select="concat('GRAMMARANDSLOTDEFINITIONS_',
      helper:getDialogIndex($helper_instance, $PROJECT_NAME))" />
  </xsl:attribute>
  <xsl:text />
  <xsl:value-of select="$sectionIterator" />
  .1 Grammar and Slot Definitions
  <xsl:text />
  <!--
  5.1
  -->
</fo:block>
<!--
  Grammar table
-->
<fo:table>
  <!--
    WL: total length is 155mm
  -->
  <fo:table-column column-width="45mm" />
  <fo:table-column column-width="45mm" />
  <fo:table-column column-width="20mm" />
  <fo:table-column column-width="45mm" />
  <fo:table-body>
    <fo:table-row>
      <fo:table-cell border-style="thin" padding="1pt" background-color="#4995E7">
```

FIG. 11-29

```xml
<xsl:element name="fo:block" use-attribute-sets="vb-column-heading">Dialog
    State</xsl:element>
    </fo:table-cell>
<fo:table-cell border-style="thin" padding="1pt" background-color="#4995E7">
<xsl:element name="fo:block" use-attribute-sets="vb-column-
    heading">Grammar</xsl:element>
    </fo:table-cell>
<fo:table-cell border-style="thin" padding="1pt" background-color="#4995E7">
<xsl:element name="fo:block" use-attribute-sets="vb-column-heading">Slots</xsl:element>
    </fo:table-cell>
<fo:table-cell border-style="thin" padding="1pt" background-color="#4995E7">
<xsl:element name="fo:block" use-attribute-sets="vb-column-heading">Slot
    Values</xsl:element>
    </fo:table-cell>
    </fo:table-row>
<!--
    go through each generic-container and find the recognition states
    -->
<xsl:for-each select="ns1:generic-container">
<xsl:for-each select="ns1:recognition-state/ns1:grammar">
<fo:table-row>
<fo:table-cell border-style="thin" padding="3pt">
<xsl:element name="fo:block" use-attribute-sets="vb-table-cell">
<fo:basic-link jfor-class="link">
<xsl:attribute name="internal-destination">
<xsl:value-of select="concat(helper:getVectorElement($helper_instance, 'StateLinks',
    concat(../../@name, '#', ../@name), 0), '_grammar')" />
    </xsl:attribute>
<xsl:value-of select="concat(../../@name, '#', ../@name)" />
    </fo:basic-link>
    </xsl:element>
    </fo:table-cell>
<fo:table-cell border-style="thin" padding="3pt">
<xsl:choose>
<xsl:when test="@flavour = 'dynamic file expression'">
<xsl:element name="fo:block" use-attribute-sets="vb-table-cell">
<xsl:value-of select="@expr" />
    </xsl:element>
    </xsl:when>
<xsl:when test="not(@top-rule = '')">
<xsl:element name="fo:block" use-attribute-sets="vb-table-cell">
<xsl:value-of select="concat(@src, '#', @top-rule)" />
    </xsl:element>
    </xsl:when>
<xsl:otherwise>
<xsl:element name="fo:block" use-attribute-sets="vb-table-cell">
<xsl:value-of select="@src" />
    </xsl:element>
    </xsl:otherwise>
    </xsl:choose>
```

FIG. 11-30

```xml
      </fo:table-cell>
    <fo:table-cell border-style="thin" padding="3pt">
      <xsl:for-each select="../ns1:slot">
        <xsl:element name="fo:block" use-attribute-sets="vb-table-cell">
          <xsl:value-of select="@name" />
        </xsl:element>
      </xsl:for-each>
      </fo:table-cell>
    <fo:table-cell border-style="thin" padding="3pt">
      <xsl:for-each select="../ns1:slot">
        <xsl:element name="fo:block" use-attribute-sets="vb-table-cell">
          <xsl:for-each select="ns1:enum">
            <xsl:value-of select="@value" />
            ,
          </xsl:for-each>
        </xsl:element>
      </xsl:for-each>
      </fo:table-cell>
      </fo:table-row>
      </xsl:for-each>
      </xsl:for-each>
      </fo:table-body>
      </fo:table>
      <!--
        insert a page break
      -->
      <fo:block break-before="page" />
      <!--
        Sub-section title
      -->
      <fo:block jfor-class="SubSectionHeader">
        <xsl:attribute name="id">
          <xsl:value-of select="concat('PROMPTLIST_', helper:getDialogIndex($helper_instance, $PROJECT_NAME))" />
        </xsl:attribute>
        <xsl:text />
        <xsl:value-of select="$sectionIterator" />
        .2 Prompt List
        <xsl:text />
        <!--
        5.2
        -->
      </fo:block>
    <fo:table>
      <fo:table-column column-width="70mm" />
      <fo:table-column column-width="85mm" />
      <fo:table-body>
        <fo:table-row>
          <fo:table-cell border-style="thin" padding="1pt" background-color="#4995E7">
```

FIG. 11-31

```
<xsl:element name="fo:block" use-attribute-sets="vb-column-heading">Prompt
    File</xsl:element>
  </fo:table-cell>
- <fo:table-cell border-style="thin" padding="1pt" background-color="#4995E7">
  <xsl:element name="fo:block" use-attribute-sets="vb-column-
      heading">Transcription</xsl:element>
  </fo:table-cell>
  </fo:table-row>
- <xsl:for-each select="/descendant::*[name() = 'prompt']">
- <xsl:if test="not(@flavour) or @flavour = 'simple'">
- <fo:table-row>
- <fo:table-cell border-style="thin" padding="3pt">
- <xsl:element name="fo:block" use-attribute-sets="vb-table-cell">
- <xsl:attribute name="id">
  <xsl:value-of select="helper:getVectorElement($helper_instance, 'PromptLinks', @src, 0)" />
      </xsl:attribute>
  <xsl:value-of select="@src" />
      </xsl:element>
    </fo:table-cell>
- <fo:table-cell border-style="thin" padding="3pt">
- <xsl:element name="fo:block" use-attribute-sets="vb-table-cell">
  <xsl:value-of select="concat(' ', '''', vb:getTranscript(@src), '''')" />
      </xsl:element>
    </fo:table-cell>
    </fo:table-row>
    </xsl:if>
    </xsl:for-each>
- <xsl:for-each select="/descendant::*[name() = 'audio-file-ref']">
- <fo:table-row>
- <fo:table-cell border-style="thin" padding="3pt">
- <xsl:element name="fo:block" use-attribute-sets="vb-table-cell">
- <xsl:attribute name="id">
  <xsl:value-of select="helper:getVectorElement($helper_instance, 'PromptLinks', @name, 0)"
      />
      </xsl:attribute>
  <xsl:value-of select="@name" />
      </xsl:element>
    </fo:table-cell>
- <fo:table-cell border-style="thin" padding="3pt">
- <xsl:element name="fo:block" use-attribute-sets="vb-table-cell">
  <xsl:value-of select="concat(' ', '''', vb:getTranscript(@name), '''')" />
      </xsl:element>
    </fo:table-cell>
    </fo:table-row>
    </xsl:for-each>
    </fo:table-body>
    </fo:table>
  <fo:block />
  <fo:block />
```

FIG. 11-32

```
    </fo:flow>
  </fo:page-sequence>
<!--
END OF CONTENT
-->
</xsl:template>
<!--
  ++++++++++++++++++++++++++++++++++++++++++++++++++++++++++++++++++++++++++++++++++++++++++++
  +++++++++++++++
-->
<!--
  ++++++++++++++++++++++++++++++++++++++++++++++++++++++++++++++++++++++++++++++++++++++++++++
  +++++++++++++++
-->
<!--
                                    TEMPLATES SECTION
-->
<!--
  The rest of this file contains the templates that help fill the document and are
  called within the
-->
<!--
  above Table of Contents or Content page sequences.
-->
<!--
  ++++++++++++++++++++++++++++++++++++++++++++++++++++++++++++++++++++++++++++++++++++++++++++
  +++++++++++++++
-->
<!--
  ==============================================================================
-->
<!--
                                        TITLE PAGE
-->
<!--
  ==============================================================================
-->
<xsl:template mode="title-page" match="ns1:project">
  <fo:page-sequence master-reference="first">
    <xsl:variable name="companyName" select="ns1:global-information/@company-name" />
    <xsl:variable name="companyNameLen" select="string-length($companyName)" />
    <!--
    PAGE FOOTER
    -->
    <fo:static-content flow-name="xsl-region-after">
      <xsl:element name="fo:block" use-attribute-sets="vb-boilerplate-heading">
        <xsl:choose>
          <xsl:when test="$companyNameLen > 0">
```

FIG. 11-33

```xml
<xsl:value-of select="translate($companyName, 'abcdefghijklmnopqrstuvwxyz',
   'ABCDEFGHIJKLMNOPQRSTUVWXYZ')" />
   PROPRIETARY AND CONFIDENTIAL INFORMATION
   </xsl:when>
- <xsl:otherwise>
  <xsl:value-of select="$CONFIDENTIALITY_TITLE" />
    </xsl:otherwise>
    </xsl:choose>
    </xsl:element>
- <xsl:element name="fo:block" use-attribute-sets="vb-legal-notice">
  <xsl:attribute name="font-style">italic</xsl:attribute>
- <xsl:choose>
- <xsl:when test="$companyNameLen > 0">
   This Dialog Specification document, formatting, linking methodologies, transition
   strategies and aspects of Voice User Interface design methodology represented in this
   document are the proprietary and confidential information of
  <xsl:value-of select="$companyName" />
   . Recipient shall treat all such information as confidential and shall use such information
   only as specifically authorized by
  <xsl:value-of select="$companyName" />
   , only for purposes of the design project for which Recipient has received the information.
   </xsl:when>
- <xsl:otherwise>
  <xsl:value-of select="$CONFIDENTIALITY_BODY" />
    </xsl:otherwise>
    </xsl:choose>
    </xsl:element>
- <!--
   WL WORKAROUND: this pushes the footer up so that it prints
   -->
- <!--
   Empty paragraph for spacing
   -->
  <fo:block />
  <fo:block />
    </fo:static-content>
- <!--
   BODY OF THE PAGE
   -->
- <fo:flow flow-name="xsl-region-body">
- <!--
   WL TABLE instead of graphic, Solaris has issues with needing the DISPLAY set
   -->
- <fo:table>
  <fo:table-column column-width="155mm" />
- <fo:table-body>
- <fo:table-row>
- <fo:table-cell padding="18pt" background-color="#0152AB">
- <fo:block font-family="{$vb-font-family-arial}" font-weight="bold" font-size="18pt"
   color="white">
```

FIG. 11-34

```xml
<!--
  check to see if there's a company name
-->
<xsl:choose>
<xsl:when test="$companyNameLen > 0">
  <xsl:value-of select="$companyName" />
  </xsl:when>
<xsl:otherwise>
  <xsl:value-of select="$COMPANY_NAME" />
    </xsl:otherwise>
    </xsl:choose>
    </fo:block>
    </fo:table-cell>
    </fo:table-row>
    </fo:table-body>
    </fo:table>
<fo:block />
<fo:block />
<fo:block />
<!--
  Logo
-->
<xsl:variable name="logoPath" select="helper:getCompanyLogo($helper_instance)" />
<xsl:choose>
<xsl:when test="$logoPath">
<fo:block>
<fo:external-graphic>
<xsl:attribute name="src">
  <xsl:value-of select="$logoPath" />
    </xsl:attribute>
    </fo:external-graphic>
    </fo:block>
    </xsl:when>
<xsl:otherwise>
<fo:block />
<fo:block />
<fo:block />
<fo:block />
<fo:block />
  </xsl:otherwise>
  </xsl:choose>
<!--
  Empty paragraphs for spacing
-->
<fo:block />
<fo:block />
<fo:block />
<fo:block />
<fo:block />
<fo:block />
```

FIG. 11-35

```xml
<fo:block />
<fo:block />
<fo:block />
<!--
  Dialog Specification Title
-->
<xsl:element name="fo:block">
  <xsl:attribute name="space-after">4pt</xsl:attribute>
  <xsl:attribute name="font-weight">bold</xsl:attribute>
  <xsl:attribute name="font-size">32pt</xsl:attribute>
  <xsl:attribute name="color">black</xsl:attribute>
  <xsl:attribute name="font-family">
    <xsl:value-of select="$vb-font-family-arial" />
  </xsl:attribute>
  Dialog Specification
</xsl:element>
<fo:block />
<xsl:element name="fo:block">
  <xsl:attribute name="font-family">
    <xsl:value-of select="$vb-font-family-times" />
  </xsl:attribute>
  <xsl:attribute name="font-size">20pt</xsl:attribute>
  <xsl:value-of select="$MAIN_DIALOG" />
</xsl:element>
<fo:block />
<!--
  check to see if there's an application version
-->
<xsl:if test="ns1:global-information/@application-version">
  <xsl:element name="fo:block">
    <xsl:attribute name="font-family">
      <xsl:value-of select="$vb-font-family-times" />
    </xsl:attribute>
    <xsl:attribute name="font-size">18pt</xsl:attribute>
    <xsl:attribute name="font-weight">bold</xsl:attribute>
    Application Version:
  </xsl:element>
  <xsl:element name="fo:block">
    <xsl:attribute name="font-family">
      <xsl:value-of select="$vb-font-family-times" />
    </xsl:attribute>
    <xsl:attribute name="font-size">18pt</xsl:attribute>
    <xsl:value-of select="ns1:global-information/@application-version" />
  </xsl:element>
</xsl:if>
<fo:block />
<!--
  check to see if there's a customer name
-->
<xsl:if test="ns1:global-information/@customer">
```

FIG. 11-36

```
- <xsl:element name="fo:block">
- <xsl:attribute name="font-family">
  <xsl:value-of select="$vb-font-family-times" />
    </xsl:attribute>
  <xsl:attribute name="font-size">18pt</xsl:attribute>
  <xsl:attribute name="font-weight">bold</xsl:attribute>
    Prepared for:
    </xsl:element>
- <xsl:element name="fo:block">
- <xsl:attribute name="font-family">
  <xsl:value-of select="$vb-font-family-times" />
    </xsl:attribute>
  <xsl:attribute name="font-size">16pt</xsl:attribute>
  <xsl:value-of select="ns1:global-information/@customer" />
    </xsl:element>
    </xsl:if>
  <fo:block />
- <!--
    check to see if there's a partner name
    -->
- <xsl:if test="ns1:global-information/@partner">
- <xsl:element name="fo:block">
- <xsl:attribute name="font-family">
  <xsl:value-of select="$vb-font-family-times" />
    </xsl:attribute>
  <xsl:attribute name="font-size">18pt</xsl:attribute>
  <xsl:attribute name="font-weight">bold</xsl:attribute>
    Partner:
    </xsl:element>
- <xsl:element name="fo:block">
- <xsl:attribute name="font-family">
  <xsl:value-of select="$vb-font-family-times" />
    </xsl:attribute>
  <xsl:attribute name="font-size">16pt</xsl:attribute>
  <xsl:value-of select="ns1:global-information/@partner" />
    </xsl:element>
    </xsl:if>
- <!--
    check to see if there are developer names
    -->
- <xsl:if test="ns1:global-information/ns1:developer">
- <xsl:element name="fo:block">
- <xsl:attribute name="font-family">
  <xsl:value-of select="$vb-font-family-times" />
    </xsl:attribute>
  <xsl:attribute name="font-size">14pt</xsl:attribute>
    Developer(s):
- <xsl:for-each select="ns1:global-information/ns1:developer">
  <xsl:value-of select="@name" />
  <xsl:if test="following-sibling::ns1:developer">,</xsl:if>
```

FIG. 11-37

```xml
</xsl:for-each>
</xsl:element>
</xsl:if>
<!--
  if we didn't have application version, customer, etc... we insert space
-->
<xsl:if test="not($DIALOG_UNIT)">
  <fo:block font-size="20pt" />
</xsl:if>
<xsl:if test="not(ns1:global-information/@application-version)">
  <fo:block font-size="18pt" />
</xsl:if>
<xsl:if test="not(ns1:global-information/@customer)">
  <fo:block font-size="16pt" />
</xsl:if>
<xsl:if test="not(ns1:global-information/@partner)">
  <fo:block font-size="16pt" />
</xsl:if>
<xsl:if test="not(ns1:global-information/ns1:developer)">
  <fo:block font-size="14pt" />
</xsl:if>
<!--
  Empty paragraphs for spacing
-->
<fo:block />
<fo:block />
<fo:block />
<fo:block />
<fo:block />
<fo:block />
<fo:block />
<!--
  MAKE SURE TITLE PAGE FITS ON ONE PAGE!!
          <fo:block> </fo:block>
          <fo:block> </fo:block>
          <fo:block> </fo:block>
          <fo:block> </fo:block>
          <fo:block> </fo:block>
-->
<!--
  Yellow bar across the bottom of the first page
-->
<fo:table>
  <fo:table-column column-width="155mm" />
  <fo:table-body>
    <fo:table-row>
      <fo:table-cell background-color="#FDB900">
        <fo:block font-size="12pt" />
      </fo:table-cell>
    </fo:table-row>
```

FIG. 11-38

```
    </fo:table-body>
   </fo:table>
  </fo:flow>
 </fo:page-sequence>
<!--
END TITLE PAGE
-->
</xsl:template>
<!--

================================================================================
    =============
-->
<!--
                        MASTER TABLE OF CONTENTS TEMPLATE
-->
<!--

================================================================================
    =============
-->
<xsl:template mode="master-table-of-contents" match="ns1:project" />
<!--

================================================================================
    =============
-->
<!--
                              STATE ORDERING TEMPLATE
-->
<!--

================================================================================
    =============
-->
<xsl:template mode="state-ordering" match="ns1:project">
 <xsl:for-each select="ns1:generic-container">
  <xsl:variable name="curPage" select="@name" />
  <xsl:value-of select="helper:addToStateList($helper_instance, $PROJECT_NAME, @name)" />
<!--
          A generic container can contain one or more of the following states:
          (NOTE the level of the dialog-action, we need this to figure out
     transitions)
             1) decision-state (ns1:dialog-action)
             2) digitstring-state (ns1:dialog-action)
             3) dtmf-state (ns1:dialog-action)
             4) escape-state (ns1:post-recognition/ns1:dialog-action)
             5) processing-state (ns1:dialog-action)
             6) recognition-state (ns1:post-recognition/ns1:dialog-action)
             7) record-state (ns1:post-recognition/ns1:dialog-action)
             8) subdialog-state (ns1:post-recognition/ns1:dialog-action)
             9) terminate-state (ns1:dialog-action)
             10) transfer-state (ns1:post-recognition/ns1:dialog-action)
```

FIG. 11-39

```
                11) vaf-state (ns1:dialog-action)
   -->
- <xsl:for-each select="*">
  <xsl:variable name="curState" select="@name" />
  <xsl:variable name="qName" select="concat($curPage, '#', $curState)" />
- <xsl:choose>
  - <!--
    these are the states that have dialog-action tags directly underneath them
    -->
  - <!--
    WL IMPORTANT NOTE: these name(.) match the exact tag in the design file, so if
    there's a ns1:decision-state, then you'd need to match that
    -->
- <xsl:when test="local-name(.) = 'decision-state' or(local-name(.) = 'digitstring-state')
    or(local-name(.) = 'dtmf-state') or(local-name(.) = 'processing-state') or(local-name(.)
    = 'terminate-state') or(local-name(.) = 'vaf-state')">
  - <!--
    add state to list
    -->
  <xsl:value-of select="helper:addToStateList($helper_instance, $PROJECT_NAME, $qName)"
    />
  - <!--
    now we go through all dialog-action tags to look for transitions...
    -->
- <xsl:for-each select="ns1:dialog-action/ns1:goto">
- <xsl:call-template name="AddToEntryAndExitHash">
  <xsl:with-param name="qName" select="$qName" />
  <xsl:with-param name="curPage" select="$curPage" />
  <xsl:with-param name="targetPage" select="@container" />
  <xsl:with-param name="targetState" select="@state" />
    </xsl:call-template>
    </xsl:for-each>
    </xsl:when>
  - <!--
    these are the states that have post-processing tags and then dialog-actions
    underneath those
    -->
- <xsl:when test="local-name(.) = 'escape-state' or(local-name(.) = 'recognition-state')
    or(local-name(.) = 'record-state') or(local-name(.) = 'subdialog-state') or(local-name(.)
    = 'transfer-state')">
  - <!--
    add state to list
    -->
  <xsl:value-of select="helper:addToStateList($helper_instance, $PROJECT_NAME, $qName)"
    />
  - <!--
    now we go through all post recognition dialog-action tags to look for transitions...
    -->
- <xsl:for-each select="ns1:post-recognition/ns1:dialog-action/ns1:goto">
- <xsl:call-template name="AddToEntryAndExitHash">
```

FIG. 11-40

```
<xsl:with-param name="qName" select="$qName" />
<xsl:with-param name="curPage" select="$curPage" />
<xsl:with-param name="targetPage" select="@container" />
<xsl:with-param name="targetState" select="@state" />
    </xsl:call-template>
    </xsl:for-each>
    </xsl:when>
    </xsl:choose>
    </xsl:for-each>
- <!--
  State
  -->
   </xsl:for-each>
- <!--
  Page
  -->
<xsl:value-of select="helper:sortStateList($helper_instance, $PROJECT_NAME)" />
    </xsl:template>
- <!--

================================================================
  =============
  -->
- <!--
                     TABLE OF CONTENTS TEMPLATE
  -->
- <!--

================================================================
  =============
  -->
- <xsl:template mode="create-table-of-contents" match="ns1:generic-container">
  <xsl:param name="containerState" />
  <xsl:param name="stateNumber" />
  <xsl:param name="sectionNumber" />
  <xsl:variable name="projectIndex" select="helper:getDialogIndex($helper_instance,
      $PROJECT_NAME)" />
- <fo:table>
  <fo:table-column column-width="5mm" />
  <fo:table-column column-width="10mm" />
  <fo:table-column column-width="132mm" />
  <fo:table-column column-width="8mm" />
- <fo:table-body>
- <fo:table-row>
- <fo:table-cell padding="0.5pt">
  <fo:block />
    </fo:table-cell>
- <fo:table-cell padding="0.5pt">
- <fo:block>
  <xsl:text />
  <xsl:value-of select="$sectionNumber" />
```

FIG. 11-41

```
    <xsl:value-of select="$stateNumber" />
    <xsl:text />
      </fo:block>
      </fo:table-cell>
- <fo:table-cell padding="0.5pt">
- <fo:block>
- <xsl:if test="$containerState = ''">
    <xsl:variable name="linkname" select="concat('PageInfo_', $projectIndex, '_',
      $stateNumber)" />
    <xsl:value-of select="helper:addVector($helper_instance, 'PageLinks', @name, $linkname)"
      />
- <fo:basic-link jfor-class="link">
- <xsl:attribute name="internal-destination">
    <xsl:value-of select="$linkname" />
      </xsl:attribute>
    <xsl:value-of select="concat(@name,' Page Information')" />
      </fo:basic-link>
      </xsl:if>
- <xsl:if test="not($containerState = '')">
    <xsl:variable name="linkname" select="concat('StateInfo_', $projectIndex, '_',
      $stateNumber)" />
    <xsl:value-of select="helper:addVector($helper_instance, 'StateLinks', concat(@name, '#',
      $containerState), $linkname)" />
- <fo:basic-link jfor-class="link">
- <xsl:attribute name="internal-destination">
    <xsl:value-of select="$linkname" />
      </xsl:attribute>
    <xsl:value-of select="concat(@name,'#',$containerState)" />
      </fo:basic-link>
      </xsl:if>
      </fo:block>
      </fo:table-cell>
- <fo:table-cell padding="0.5pt">
- <xsl:element name="fo:block" use-attribute-sets="vb-table-cell">
    <xsl:attribute name="color">black</xsl:attribute>
- <!--
    WL NOTE: page numbers don't seem to work if there's whitespace in the id
    -->
- <fo:page-number-citation>
- <xsl:attribute name="ref-id">
- <xsl:if test="$containerState = ''">
    <xsl:value-of select="helper:getVectorElement($helper_instance, 'PageLinks', @name, 0)" />
      </xsl:if>
- <xsl:if test="not($containerState = '')">
    <xsl:value-of select="helper:getVectorElement($helper_instance, 'StateLinks',
      concat(@name, '#', $containerState), 0)" />
      </xsl:if>
      </xsl:attribute>
      </fo:page-number-citation>
```

FIG. 11-42

```
      </xsl:element>
    </fo:table-cell>
   </fo:table-row>
  </fo:table-body>
</fo:table>
<!--
Subsections make the Table of Contents too big so we'll comment them out, below is
an example:
   <fo:table>
      <fo:table-column column-width="10mm"/>
      <fo:table-column column-width="137mm"/>
      <fo:table-column column-width="8mm"/>
      <fo:table-body>
        <fo:table-row>
          <fo:table-cell padding="0.5pt">
            <fo:block/>
          </fo:table-cell>
          <fo:table-cell padding="0.5pt">
            <fo:block>
              <fo:basic-link jfor-class="link" font-style="italic">
                <xsl:attribute name="internal-destination">
                  <xsl:value-of select="concat(@name, '_description')"/>
                </xsl:attribute><xsl:value-of select="$sectionNumber"/>.<xsl:value-of
select="$stateNumber"/>.1	Description
              </fo:basic-link>
            </fo:block>
          </fo:table-cell>
          <fo:table-cell padding="0.5pt">
            <fo:block color="black" font-style="italic" font-family="Times New Roman"
font-size="10pt">
              <fo:inline>
                <fo:page-number-citation>
                  <xsl:attribute name="ref-id">
                    <xsl:value-of select="concat(@name, '_description')"/>
                  </xsl:attribute>
                </fo:page-number-citation>
              </fo:inline>
            </fo:block>
          </fo:table-cell>
        </fo:table-row>
      </fo:table-body>
   </fo:table>
-->
</xsl:template>
<!--
==================================================================================
================
-->
<!--
                    PAGE INFORMATION CONTENT TEMPLATE
-->
<!--
```

FIG. 11-43

```
========================================================================
============
-->
<xsl:template mode="container" match="ns1:generic-container">
<xsl:param name="stateNumber" />
<xsl:param name="sectionNumber" />
<!--
  insert a page break (unless this is the first state)
-->
<xsl:if test="not($stateNumber = 1)">
<fo:block break-before="page" />
</xsl:if>
<fo:block jfor-class="SubSectionHeader">
<xsl:attribute name="id">
<xsl:value-of select="helper:getVectorElement($helper_instance, 'PageLinks', @name, 0)" />
</xsl:attribute>
<xsl:value-of select="$sectionNumber" />
.
<xsl:value-of select="$stateNumber" />
<xsl:value-of select="concat(' ', @name, ' Page Information')" />
</fo:block>
<fo:block jfor-class="SubSubSectionHeader">
<xsl:attribute name="id">
<xsl:value-of select="translate(translate(concat(@name, '_description'), ' ', ''), '-', '_')" />
</xsl:attribute>
<xsl:value-of select="$sectionNumber" />
.
<xsl:value-of select="$stateNumber" />
.1 Description
</fo:block>
<!--
  Below we print out the description and we also add a line indicating what kind of
  state it is
-->
<fo:block jfor-class="ContentTextPreserveWhitespace">
<xsl:value-of select="ns1:description" />
</fo:block>
<!--
CT 16454: hide page properties
-->
<!--
  fo:block jfor-class="SubSubSectionHeader">
      <xsl:attribute name="id">
        <xsl:value-of select="translate(translate(concat(@name, '_properties'), ' ',
''), '-', '_')"/>
      </xsl:attribute><xsl:value-of select="$sectionNumber"/>.<xsl:value-of
  select="$stateNumber"/>.2	Page Properties</fo:block>

<!- - Page Properties Table - ->
      <xsl:if test="not(ns1:container-declarations/ns1:properties/ns1:property)">
        <fo:block jfor-class="ContentText">
```

FIG. 11-44

```
            There are no properties defined for this page.
          </fo:block>
        </xsl:if>
        <xsl:apply-templates select="ns1:container-declarations/ns1:properties">
          <xsl:with-param name="tableHeader" select="'Page Properties Table'"/>
        </xsl:apply-templates>
    -->
  - <fo:block jfor-class="SubSubSectionHeader">
  - <xsl:attribute name="id">
      <xsl:value-of select="translate(translate(concat(@name, '_variables'), ' ', ''), '-', '_')" />
    </xsl:attribute>
    <xsl:value-of select="$sectionNumber" />
    .
    <xsl:value-of select="$stateNumber" />
    .2 Page Variables
    </fo:block>
  - <!--
    Page Variables Table
    -->
  - <xsl:choose>
  - <xsl:when test="ns1:container-declarations/ns1:variable">
  - <fo:table>
      <fo:table-column column-width="155mm" />
  - <fo:table-body>
  - <fo:table-row>
  - <fo:table-cell border-style="thin" padding="1pt" background-color="#1071DC">
      <xsl:element name="fo:block" use-attribute-sets="vb-column-heading">Page Variables
        Table</xsl:element>
      </fo:table-cell>
      </fo:table-row>
      </fo:table-body>
      </fo:table>
  - <fo:table>
      <fo:table-column column-width="64mm" />
      <fo:table-column column-width="43mm" />
      <fo:table-column column-width="48mm" />
  - <fo:table-body>
      <xsl:call-template name="VariablesTitleRow" />
      <xsl:apply-templates select="ns1:container-declarations/ns1:variable" />
      </fo:table-body>
      </fo:table>
      </xsl:when>
  - <xsl:otherwise>
      <fo:block jfor-class="ContentText">There are no variables defined for this page.</fo:block>
      </xsl:otherwise>
      </xsl:choose>
    <xsl:variable name="includeCallFlows" select="helper:getIncludeCallFlowsInSpec()" />
  - <xsl:if test="$includeCallFlows = 'true'">
  - <fo:block jfor-class="SubSubSectionHeader">
  - <xsl:attribute name="id">
```

FIG. 11-45

```xml
<xsl:value-of select="translate(translate(concat(@name, '_callflow'), ' ', ''), '-', '_')" />
    </xsl:attribute>
<xsl:value-of select="$sectionNumber" />
.
<xsl:value-of select="$stateNumber" />
.3 Call Flow
</fo:block>
<fo:block text-align="center">
<xsl:variable name="callFlowUrl" select="helper:getCallFlowUrl($helper_instance,
    $PROJECT_NAME, @name)" />
<xsl:choose>
<xsl:when test="$callFlowUrl and( not($callFlowUrl = ''))">
<fo:external-graphic>
<xsl:attribute name="src">
<xsl:value-of select="helper:getCallFlowUrl($helper_instance, $PROJECT_NAME, @name)" />
    </xsl:attribute>
    </fo:external-graphic>
    </xsl:when>
<xsl:otherwise>(Empty Page)</xsl:otherwise>
    </xsl:choose>
    </fo:block>
    </xsl:if>
    </xsl:template>
<!--
    ================================================================================
    ==============
-->
<!--
                            DIALOG STATES CONTENT TEMPLATE
-->
<!--
    ================================================================================
    ==============
-->
<xsl:template mode="states" match="ns1:generic-container">
<xsl:param name="containerState" />
<xsl:param name="stateNumber" />
<xsl:param name="sectionNumber" />
<!--
    insert a page break (unless this is the first state)
-->
<xsl:if test="not($stateNumber = 1)">
<fo:block break-before="page" />
    </xsl:if>
<fo:block jfor-class="SubSectionHeader">
<xsl:attribute name="id">
<xsl:value-of select="helper:getVectorElement($helper_instance, 'StateLinks',
    concat(@name, '#', $containerState), 0)" />
    </xsl:attribute>
```

FIG. 11-46

```
<xsl:value-of select="$sectionNumber" />
.
<xsl:value-of select="$stateNumber" />
<xsl:value-of select="concat(' ', @name, '#', $containerState)" />
    </fo:block>
<fo:block jfor-class="SubSubSectionHeader">
<xsl:attribute name="id">
  <xsl:value-of select="translate(translate(concat(@name, '_', $containerState, '_description'),
    ' ', ''), '-', '_')" />
  </xsl:attribute>
<xsl:value-of select="$sectionNumber" />
.
<xsl:value-of select="$stateNumber" />
  .1 Description
  </fo:block>
<!--
   Below we print out the description and we also add a line indicating what kind of
   state it is
-->
<fo:block jfor-class="ContentTextPreserveWhitespace">
<xsl:if test="ns1:processing-state[@name = $containerState]">
  <xsl:value-of select="ns1:processing-state[@name = $containerState]/ns1:description" />
  <fo:block jfor-class="ContentNote">(This is a non-recognition processing state.)</fo:block>
  </xsl:if>
<xsl:if test="ns1:recognition-state[@name = $containerState]">
  <xsl:value-of select="ns1:recognition-state[@name = $containerState]/ns1:description" />
  <fo:block jfor-class="ContentNote">(This is a recognition state.)</fo:block>
  </xsl:if>
<xsl:if test="ns1:digitstring-state[@name = $containerState]">
  <xsl:value-of select="ns1:digitstring-state[@name = $containerState]/ns1:description" />
  <fo:block jfor-class="ContentNote">(This is a DTMF input state.)</fo:block>
  </xsl:if>
<xsl:if test="ns1:dtmf-state[@name = $containerState]">
  <xsl:value-of select="ns1:dtmf-state[@name = $containerState]/ns1:description" />
  <fo:block jfor-class="ContentNote">(This is a DTMF routing state.)</fo:block>
  </xsl:if>
<xsl:if test="ns1:decision-state[@name = $containerState]">
  <xsl:value-of select="ns1:decision-state[@name = $containerState]/ns1:description" />
  <fo:block jfor-class="ContentNote">(This is a decision state.)</fo:block>
  </xsl:if>
<xsl:if test="ns1:escape-state[@name = $containerState]">
  <xsl:value-of select="ns1:escape-state[@name = $containerState]/ns1:description" />
<fo:block jfor-class="ContentNote">
  <xsl:value-of select="concat('(This is an escape state transitioning to: ', ns1:escape-
    state[@name = $containerState]/@src, ')' )" />
  </fo:block>
  </xsl:if>
<xsl:if test="ns1:record-state[@name = $containerState]">
  <xsl:value-of select="ns1:record-state[@name = $containerState]/ns1:description" />
  <fo:block jfor-class="ContentNote">(This is a record state.)</fo:block>
```

FIG. 11-47

```
        </xsl:if>
- <xsl:if test="ns1:subdialog-state[@name = $containerState]">
   <xsl:variable name="subdialogname" select="ns1:subdialog-state[@name =
      $containerState]" />
   <xsl:value-of select="$subdialogname/ns1:description" />
- <fo:block jfor-class="ContentNote">
   <fo:inline>(This is a subdialog calling the</fo:inline>
- <xsl:choose>
   - <!--
     This isn't perfect: if one subdialog name contains another, you
                         could end up with an invalid link, but that should be rare,
     and
                         the result is non-fatal: it will take you to the top of the
     page -->
- <xsl:when test="contains($SUBDIALOGS, $subdialogname/@container)">
- <fo:basic-link jfor-class="link">
- <xsl:attribute name="internal-destination">
   <xsl:value-of select="concat('DesignFileStart_', helper:getDialogIndex($helper_instance,
      $subdialogname/@container))" />
     </xsl:attribute>
   <xsl:text />
   <xsl:value-of select="$subdialogname/@container" />
   <xsl:text />
     </fo:basic-link>
     </xsl:when>
- <xsl:otherwise>
   <xsl:value-of select="$subdialogname/@container" />
     </xsl:otherwise>
     </xsl:choose>
   <fo:inline>subdialog)</fo:inline>
     </fo:block>
     </xsl:if>
- <xsl:if test="ns1:terminate-state[@name = $containerState]">
   <xsl:value-of select="ns1:terminate-state[@name = $containerState]/ns1:description" />
   <fo:block jfor-class="ContentNote">(This is a terminate state.)</fo:block>
     </xsl:if>
- <xsl:if test="ns1:transfer-state[@name = $containerState]">
   <xsl:value-of select="ns1:transfer-state[@name = $containerState]/ns1:description" />
   <fo:block jfor-class="ContentNote">(This is a transfer state.)</fo:block>
     </xsl:if>
- <xsl:if test="ns1:vaf-state[@name = $containerState]">
   <xsl:value-of select="ns1:vaf-state[@name = $containerState]/ns1:description" />
   <fo:block jfor-class="ContentNote">(This is a server-side state.)</fo:block>
     </xsl:if>
     </fo:block>
  - <!--
    Special Features section
    -->
```

FIG. 11-48

```
- <fo:block jfor-class="SubSubSectionHeader">
- <xsl:attribute name="id">
    <xsl:value-of select="translate(translate(concat(@name, '_', $containerState, '_description'),
        ' ', ''), '-', '_')" />
    </xsl:attribute>
    <xsl:value-of select="$sectionNumber" />
    .
    <xsl:value-of select="$stateNumber" />
    .2 Special Features
  </fo:block>
- <fo:block jfor-class="ContentTextPreserveWhitespace">
- <xsl:if test="ns1:*[@name = $containerState]/ns1:special">
    <xsl:value-of select="ns1:*[@name = $containerState]/ns1:special" />
  </xsl:if>
  </fo:block>
- <fo:block jfor-class="SubSubSectionHeader">
- <xsl:attribute name="id">
    <xsl:value-of select="translate(translate(concat(@name, '_', $containerState, '_entry'), ' ',
        ''), '-', '_')" />
    </xsl:attribute>
    <xsl:value-of select="$sectionNumber" />
    .
    <xsl:value-of select="$stateNumber" />
    .3 Entry and Exit States
  </fo:block>
- <!--
   Entry and exit states table
   -->
- <fo:table>
  - <!--
     WL: total length is 155mm
     -->
    <fo:table-column column-width="82mm" />
    <fo:table-column column-width="73mm" />
- <fo:table-body>
- <fo:table-row>
- <fo:table-cell border-style="thin" padding="1pt" background-color="#4995E7">
    <xsl:element name="fo:block" use-attribute-sets="vb-column-heading">Entry
      States</xsl:element>
    </fo:table-cell>
- <fo:table-cell border-style="thin" padding="1pt" background-color="#4995E7">
    <xsl:element name="fo:block" use-attribute-sets="vb-column-heading">Exit
      States</xsl:element>
    </fo:table-cell>
    </fo:table-row>
- <fo:table-row>
- <fo:table-cell border-style="thin" padding="3pt">
  - <!--
     get the size of the entry states vector
     -->
```

FIG. 11-49

```
<xsl:variable name="entryVectorSize" select="helper:getVectorSize($helper_instance,
    concat($PROJECT_NAME, 'EntryStates'),concat(@name,'#',$containerState))" />
<xsl:if test="$entryVectorSize < 1">
<fo:block>--</fo:block>
    </xsl:if>
<xsl:if test="$entryVectorSize > 0">
<xsl:call-template name="EntryStates">
<xsl:with-param name="state" select="concat(@name,'#',$containerState)" />
<xsl:with-param name="vectorsize" select="$entryVectorSize" />
<xsl:with-param name="count" select="$entryVectorSize" />
    </xsl:call-template>
    </xsl:if>
    </fo:table-cell>
<fo:table-cell border-style="thin" padding="3pt">
 <!--
    get the size of the exit states vector
    -->
<xsl:variable name="exitVectorSize" select="helper:getVectorSize($helper_instance,
    concat($PROJECT_NAME, 'ExitStates'),concat(@name,'#',$containerState))" />
<xsl:if test="$exitVectorSize < 1">
<fo:block>--</fo:block>
    </xsl:if>
<xsl:if test="$exitVectorSize > 0">
<xsl:call-template name="ExitStates">
<xsl:with-param name="state" select="concat(@name,'#',$containerState)" />
<xsl:with-param name="vectorsize" select="$exitVectorSize" />
<xsl:with-param name="count" select="$exitVectorSize" />
    </xsl:call-template>
    </xsl:if>
    </fo:table-cell>
    </fo:table-row>
    </fo:table-body>
    </fo:table>
<fo:block />
 <!--
    the rest of the state types can have different combinations of things so we use an
       index to figure out subsection numbering
    -->
<xsl:value-of select="helper:setIndex($helper_instance, $PROJECT_NAME, 3)" />
 <!--
    Here we check to see if pre-recognition AKA initial behavior exists for the state,
       we only print something if a prompt exists
    -->
<xsl:if test="ns1:recognition-state[@name = $containerState]/ns1:pre-
    recognition/ns1:prompt or(ns1:digitstring-state[@name = $containerState]/ns1:pre-
    recognition)/ns1:prompt or(ns1:dtmf-state[@name = $containerState]/ns1:pre-
    recognition)/ns1:prompt or(ns1:record-state[@name = $containerState]/ns1:pre-
    recognition)/ns1:prompt or(ns1:transfer-state[@name = $containerState]/ns1:pre-
    recognition)/ns1:prompt">
<xsl:value-of select="helper:incrementIndex($helper_instance, $PROJECT_NAME)" />
```

FIG. 11-50

```
- <fo:block jfor-class="SubSubSectionHeader">
- <xsl:attribute name="id">
    <xsl:value-of select="translate(translate(concat(@name, '_', $containerState, '_initial'), ' ',
      ''), '-', '_')" />
    </xsl:attribute>
    <xsl:value-of select="$sectionNumber" />
    .
    <xsl:value-of select="$stateNumber" />
    .
    <xsl:value-of select="helper:getIndex($helper_instance, $PROJECT_NAME)" />
    Pre-rec Prompts
    </fo:block>
- <fo:table>
    <fo:table-column column-width="50mm" />
    <fo:table-column column-width="105mm" />
- <fo:table-body>
- <fo:table-row>
- <fo:table-cell border-style="thin" padding="1pt" background-color="#4995E7">
    <xsl:element name="fo:block" use-attribute-sets="vb-column-heading">Type and
      Condition</xsl:element>
    </fo:table-cell>
- <fo:table-cell border-style="thin" padding="1pt" background-color="#4995E7">
    <xsl:element name="fo:block" use-attribute-sets="vb-column-heading">Action</xsl:element>
    </fo:table-cell>
    </fo:table-row>
    <xsl:apply-templates select="ns1:recognition-state[@name = $containerState]/ns1:pre-
      recognition" />
    <xsl:apply-templates select="ns1:digitstring-state[@name = $containerState]/ns1:pre-
      recognition" />
    <xsl:apply-templates select="ns1:dtmf-state[@name = $containerState]/ns1:pre-recognition"
      />
    <xsl:apply-templates select="ns1:record-state[@name = $containerState]/ns1:pre-
      recognition" />
    <xsl:apply-templates select="ns1:transfer-state[@name = $containerState]/ns1:pre-
      recognition" />
    </fo:table-body>
    </fo:table>
    <fo:block />
    </xsl:if>
- <!--
    Check to see if there's a grammar for the state, to my knowledge only a recognition
      state can have a grammar
    -->
- <xsl:if test="ns1:recognition-state[@name = $containerState]/ns1:grammar">
- <!--
    increment index
    -->
    <xsl:value-of select="helper:incrementIndex($helper_instance, $PROJECT_NAME)" />
- <!--
    if it's a recognition state:
```

FIG. 11-51

```
        -->
- <xsl:for-each select="ns1:recognition-state[@name = $containerState]/ns1:grammar">
- <xsl:variable name="grammarText">
- <xsl:choose>
- <xsl:when test="@flavour = 'dynamic file expression'">
    <xsl:value-of select="@expr" />
    </xsl:when>
- <xsl:when test="not(@top-rule = '')">
    <xsl:value-of select="concat(@src, '#', @top-rule)" />
    </xsl:when>
- <xsl:otherwise>
    <xsl:value-of select="@src" />
    </xsl:otherwise>
    </xsl:choose>
    </xsl:variable>
- <fo:block jfor-class="SubSubSectionHeader">
- <xsl:attribute name="id">
    <xsl:value-of select="concat(helper:getVectorElement($helper_instance, 'StateLinks',
      concat(../../@name, '#', $containerState), 0), '_grammar')" />
    </xsl:attribute>
    <xsl:value-of select="$sectionNumber" />
    .
    <xsl:value-of select="$stateNumber" />
    .
    <xsl:value-of select="helper:getIndex($helper_instance, $PROJECT_NAME)" />
    Grammar:
    <xsl:value-of select="$grammarText" />
    </fo:block>
    </xsl:for-each>
- <fo:table>
    <fo:table-column column-width="40mm" />
    <fo:table-column column-width="115mm" />
- <fo:table-body>
- <fo:table-row>
- <fo:table-cell border-style="thin" padding="1pt" background-color="#4995E7">
    <xsl:element name="fo:block" use-attribute-sets="vb-column-heading">NL Slots</xsl:element>
    </fo:table-cell>
- <fo:table-cell border-style="thin" padding="1pt" background-color="#4995E7">
    <xsl:element name="fo:block" use-attribute-sets="vb-column-heading">Values</xsl:element>
    </fo:table-cell>
    </fo:table-row>
- <!--
    WL Now we should check for a builtin grammar or see if there's a slot tag
    -->
- <!--
    if it's a recognition state:
    -->
- <xsl:for-each select="ns1:recognition-state[@name = $containerState]/ns1:slot">
- <fo:table-row>
- <fo:table-cell border-style="thin" padding="3pt">
```

FIG. 11-52

```
- <xsl:element name="fo:block" use-attribute-sets="vb-table-cell">
    <
  - <fo:inline font-weight="bold">
    <xsl:value-of select="@name" />
      </fo:inline>
      >
      </xsl:element>
      </fo:table-cell>
- <fo:table-cell border-style="thin" padding="3pt">
- <xsl:element name="fo:block" use-attribute-sets="vb-table-cell">
- <xsl:for-each select="ns1:enum">
    <xsl:value-of select="@value" />
    <xsl:if test="following-sibling::ns1:enum">,</xsl:if>
      </xsl:for-each>
      </xsl:element>
      </fo:table-cell>
      </fo:table-row>
      </xsl:for-each>
      </fo:table-body>
      </fo:table>
    <fo:block />
- <fo:table>
    <fo:table-column column-width="110mm" />
    <fo:table-column column-width="45mm" />
- <fo:table-body>
- <fo:table-row>
- <fo:table-cell border-style="thin" padding="1pt" background-color="#4995E7">
    <xsl:element name="fo:block" use-attribute-sets="vb-column-heading">Sample Phrases</xsl:element>
    </fo:table-cell>
- <fo:table-cell border-style="thin" padding="1pt" background-color="#4995E7">
    <xsl:element name="fo:block" use-attribute-sets="vb-column-heading">Slots Filled</xsl:element>
    </fo:table-cell>
    </fo:table-row>
- <xsl:for-each select="ns1:recognition-state[@name = $containerState]/ns1:sample-expression">
- <fo:table-row>
- <fo:table-cell border-style="thin" padding="3pt">
- <xsl:element name="fo:block" use-attribute-sets="vb-table-cell">
    <xsl:value-of select="concat('"', ns1:utterance, '"')" />
    </xsl:element>
    </fo:table-cell>
- <fo:table-cell border-style="thin" padding="3pt">
- <xsl:for-each select="ns1:slot-expression">
- <xsl:if test="not(@name = '') and not(@value = '')">
- <xsl:element name="fo:block" use-attribute-sets="vb-table-cell">
    <xsl:value-of select="concat( '<', @name, ' ', @value, '>' )" />
    </xsl:element>
```

FIG. 11-53

```
</xsl:if>
</xsl:for-each>
</fo:table-cell>
</fo:table-row>
</xsl:for-each>
</fo:table-body>
</fo:table>
</xsl:if>
<!--
Check to see if there's an action for the state.  NOTE: dialog-action tags can be at
two different levels:
            ns1:post-recognition/ns1:dialog-action:
                recognition-state
                escape-state
                record-state
                subdialog-state
                transfer-state
            ns1:dialog-action:
                digitstring-state
                dtmf-state
                vaf-state
                processing-state
                decision-state
                terminate-state
-->
<xsl:if test="*[@name = $containerState]/ns1:post-recognition/ns1:dialog-action
    or(*[@name = $containerState]/ns1:dialog-action)">
<!--
increment index
-->
<xsl:value-of select="helper:incrementIndex($helper_instance, $PROJECT_NAME)" />
<fo:block jfor-class="SubSubSectionHeader">
<xsl:attribute name="id">
    <xsl:value-of select="translate(translate(concat(@name, '_', $containerState, '_action'), ' ',
        ''), '-', '_')" />
    </xsl:attribute>
<xsl:value-of select="$sectionNumber" />
.
<xsl:value-of select="$stateNumber" />
.
<xsl:value-of select="helper:getIndex($helper_instance, $PROJECT_NAME)" />
    Actions
    </fo:block>
<fo:table>
<fo:table-column column-width="40mm" />
<fo:table-column column-width="75mm" />
<fo:table-column column-width="40mm" />
<fo:table-body>
<xsl:call-template name="ConditionActionGotoTitleRow">
<xsl:with-param name="condition" select="'Condition'" />
    </xsl:call-template>
```

FIG. 11-54

```
- <xsl:apply-templates select="*[@name = $containerState]/ns1:post-recognition/ns1:dialog-
    action">
  <xsl:with-param name="currentContainer" select="@name" />
  </xsl:apply-templates>
- <xsl:apply-templates select="*[@name = $containerState]/ns1:dialog-action">
  <xsl:with-param name="currentContainer" select="@name" />
  </xsl:apply-templates>
  </fo:table-body>
  </fo:table>
  <fo:block />
  </xsl:if>
- <!--
  Error Behavior section
  -->
- <xsl:if test="*[@name = $containerState]/ns1:error-behavior">
  <xsl:value-of select="helper:incrementIndex($helper_instance, $PROJECT_NAME)" />
- <fo:block jfor-class="SubSubSectionHeader">
- <xsl:attribute name="id">
  <xsl:value-of select="concat(@name, '_error')" />
  </xsl:attribute>
  <xsl:value-of select="$sectionNumber" />
        .
  <xsl:value-of select="$stateNumber" />
        .
  <xsl:value-of select="helper:getIndex($helper_instance, $PROJECT_NAME)" />
  Error Behaviors
  </fo:block>
- <fo:table>
  <fo:table-column column-width="50mm" />
  <fo:table-column column-width="60mm" />
  <fo:table-column column-width="45mm" />
- <fo:table-body>
- <xsl:call-template name="ConditionActionGotoTitleRow">
  <xsl:with-param name="condition" select="'Error Type'" />
  </xsl:call-template>
  <xsl:apply-templates select="*[@name = $containerState]/ns1:error-behavior" />
  </fo:table-body>
  </fo:table>
  <fo:block />
  </xsl:if>
- <!--
  now we go through all the universal behavior tags and see which sections need to be
  created
  -->
- <xsl:if test="*[@name = $containerState]/ns1:universal-behavior[not(@enabled = 'false')
    and not(@scope = 'Global')]">
- <xsl:call-template name="StateSpecificUniversalsSection">
  <xsl:with-param name="containerState" select="$containerState" />
  <xsl:with-param name="stateNumber" select="$stateNumber" />
  <xsl:with-param name="sectionNumber" select="$sectionNumber" />
```

FIG. 11-55

```
        </xsl:call-template>
      </xsl:if>
- <!--
    Add inputs and outputs tables for subdialogs and escape states
    -->
- <xsl:if test="ns1:subdialog-state[@name = $containerState]/ns1:param[@name and
    not(@name = '')]">
    <xsl:value-of select="helper:incrementIndex($helper_instance, $PROJECT_NAME)" />
- <fo:block jfor-class="SubSubSectionHeader">
- <xsl:attribute name="id">
    <xsl:value-of select="concat(@name, '_error')" />
      </xsl:attribute>
    <xsl:value-of select="$sectionNumber" />
      .
    <xsl:value-of select="$stateNumber" />
      .
    <xsl:value-of select="helper:getIndex($helper_instance, $PROJECT_NAME)" />
      Inputs to the Subdialog
      </fo:block>
- <fo:table>
  <fo:table-column column-width="82mm" />
  <fo:table-column column-width="73mm" />
- <fo:table-body>
  <xsl:call-template name="NameValueTitleRow" />
- <xsl:for-each select="ns1:subdialog-state[@name = $containerState]/ns1:param[@name
    and not(@name = '')]">
    <xsl:call-template name="NameValueRow" />
      </xsl:for-each>
      </fo:table-body>
      </fo:table>
      </xsl:if>
- <xsl:if test="ns1:escape-state[@name = $containerState]/ns1:param[@name and
    not(@name = '')]">
    <xsl:value-of select="helper:incrementIndex($helper_instance, $PROJECT_NAME)" />
- <fo:block jfor-class="SubSubSectionHeader">
- <xsl:attribute name="id">
    <xsl:value-of select="concat(@name, '_error')" />
      </xsl:attribute>
    <xsl:value-of select="$sectionNumber" />
      .
    <xsl:value-of select="$stateNumber" />
      .
    <xsl:value-of select="helper:getIndex($helper_instance, $PROJECT_NAME)" />
      Inputs to the Escape Page
      </fo:block>
- <fo:table>
  <fo:table-column column-width="82mm" />
  <fo:table-column column-width="73mm" />
- <fo:table-body>
  <xsl:call-template name="NameValueTitleRow" />
```

FIG. 11-56

```xml
- <xsl:for-each select="ns1:escape-state[@name = $containerState]/ns1:param[@name and
    not(@name = '')]">
  <xsl:call-template name="NameValueRow" />
    </xsl:for-each>
    </fo:table-body>
    </fo:table>
    </xsl:if>
- <xsl:if test="ns1:subdialog-state[@name = $containerState]/ns1:output[(@dst and
    not(@dst = '')) or (@src and not(@src = ''))]">
  <xsl:value-of select="helper:incrementIndex($helper_instance, $PROJECT_NAME)" />
- <fo:block jfor-class="SubSubSectionHeader">
- <xsl:attribute name="id">
  <xsl:value-of select="concat(@name, '_error')" />
    </xsl:attribute>
  <xsl:value-of select="$sectionNumber" />
    .
  <xsl:value-of select="$stateNumber" />
    .
  <xsl:value-of select="helper:getIndex($helper_instance, $PROJECT_NAME)" />
    Outputs from the Subdialog
    </fo:block>
- <fo:table>
  <fo:table-column column-width="82mm" />
  <fo:table-column column-width="73mm" />
- <fo:table-body>
  <xsl:call-template name="SrcDstTitleRow" />
- <xsl:for-each select="ns1:subdialog-state[@name = $containerState]/ns1:output[(@dst and
    not(@dst = '')) or (@src and not(@src = ''))]">
  <xsl:call-template name="SrcDstRow" />
    </xsl:for-each>
    </fo:table-body>
    </fo:table>
    </xsl:if>
- <xsl:if test="ns1:escape-state[@name = $containerState]/ns1:output[(@dst and not(@dst =
    '')) or (@src and not(@src = ''))]">
  <xsl:value-of select="helper:incrementIndex($helper_instance, $PROJECT_NAME)" />
- <fo:block jfor-class="SubSubSectionHeader">
- <xsl:attribute name="id">
  <xsl:value-of select="concat(@name, '_error')" />
    </xsl:attribute>
  <xsl:value-of select="$sectionNumber" />
    .
  <xsl:value-of select="$stateNumber" />
    .
  <xsl:value-of select="helper:getIndex($helper_instance, $PROJECT_NAME)" />
    Outputs from the Escape Page
    </fo:block>
- <fo:table>
  <fo:table-column column-width="82mm" />
```

FIG. 11-57

```
<fo:table-column column-width="73mm" />
<fo:table-body>
<xsl:call-template name="SrcDstTitleRow" />
<xsl:for-each select="ns1:escape-state[@name = $containerState]/ns1:output[(@dst and
    not(@dst = '')) or (@src and not(@src = ''))]">
<xsl:call-template name="SrcDstRow" />
</xsl:for-each>
</fo:table-body>
</fo:table>
</xsl:if>
<!--
CT 16454: hide state-specific properties
-->
<!--
State-specific properties - ->
    <xsl:if test="*[@name = $containerState]/ns1:properties/ns1:property">
      <xsl:value-of select="helper:incrementIndex($helper_instance, $PROJECT_NAME)"/>
      <fo:block jfor-class="SubSubSectionHeader">
         <xsl:value-of select="$sectionNumber"/>.<xsl:value-of
select="$stateNumber"/>.<xsl:value-of select="helper:getIndex($helper_instance,
$PROJECT_NAME)"/>	State-Specific Properties</fo:block>
      <xsl:apply-templates select="*[@name = $containerState]/ns1:properties">
        <xsl:with-param name="tableHeader" select="'State-Specific Properties
Table'"/>
      </xsl:apply-templates>
    </xsl:if
-->
</xsl:template>
<!--
=========================================================================================
=============
-->
<!--
                        PROPERTIES TITLE ROW TEMPLATE
-->
<!--
=========================================================================================
=============
-->
<xsl:template name="PropertiesTitleRow">
<fo:table-row>
<fo:table-cell border-style="thin" padding="1pt" background-color="#4995E7">
<xsl:element name="fo:block" use-attribute-sets="vb-column-heading">Name</xsl:element>
</fo:table-cell>
<fo:table-cell border-style="thin" padding="1pt" background-color="#4995E7">
<xsl:element name="fo:block" use-attribute-sets="vb-column-heading">Value</xsl:element>
</fo:table-cell>
<fo:table-cell border-style="thin" padding="1pt" background-color="#4995E7">
<xsl:element name="fo:block" use-attribute-sets="vb-column-
heading">Description</xsl:element>
```

FIG. 11-58

```
        </fo:table-cell>
        </fo:table-row>
    </xsl:template>
- <!--
    ================================================================================
    ==============
    -->
- <!--                        PROPERTIES TABLE TEMPLATE
    -->
- <!--

================================================================================
    ==============
    -->
- <xsl:template match="ns1:properties">
    <xsl:param name="tableHeader" select="'Properties Table'" />
- <xsl:if test="ns1:property">
- <fo:table>
    <fo:table-column column-width="155mm" />
- <fo:table-body>
- <fo:table-row>
- <fo:table-cell border-style="thin" padding="1pt" background-color="#1071DC">
- <xsl:element name="fo:block" use-attribute-sets="vb-column-heading">
    <xsl:value-of select="$tableHeader" />
        </xsl:element>
        </fo:table-cell>
        </fo:table-row>
        </fo:table-body>
        </fo:table>
- <fo:table>
    <fo:table-column column-width="64mm" />
    <fo:table-column column-width="43mm" />
    <fo:table-column column-width="48mm" />
- <fo:table-body>
    <xsl:call-template name="PropertiesTitleRow" />
- <xsl:for-each select="ns1:property">
- <fo:table-row>
- <fo:table-cell border-style="thin" padding="1pt">
- <xsl:element name="fo:block" use-attribute-sets="vb-table-cell">
    <xsl:value-of select="@name" />
        </xsl:element>
        </fo:table-cell>
- <fo:table-cell border-style="thin" padding="1pt">
- <xsl:element name="fo:block" use-attribute-sets="vb-table-cell">
    <xsl:attribute name="text-align">center</xsl:attribute>
    <xsl:value-of select="@value" />
        </xsl:element>
        </fo:table-cell>
```

FIG. 11-59

```xml
<fo:table-cell border-style="thin" padding="1pt">
  <xsl:element name="fo:block" use-attribute-sets="vb-table-cell">
    <xsl:if test="ns1:description">
      <xsl:value-of select="ns1:description" />
    </xsl:if>
    <xsl:if test="not(ns1:description)">--</xsl:if>
  </xsl:element>
</fo:table-cell>
</fo:table-row>
</xsl:for-each>
</fo:table-body>
</fo:table>
</xsl:if>
</xsl:template>
<!--
================================================================================
===============
-->
<!--
                              VARIABLES TITLE ROW TEMPLATE
-->
<!--
================================================================================
===============
-->
<xsl:template name="VariablesTitleRow">
<fo:table-row>
<fo:table-cell border-style="thin" padding="1pt" background-color="#4995E7">
  <xsl:element name="fo:block" use-attribute-sets="vb-column-heading">Name</xsl:element>
</fo:table-cell>
<fo:table-cell border-style="thin" padding="1pt" background-color="#4995E7">
  <xsl:element name="fo:block" use-attribute-sets="vb-column-heading">Initial
    Value</xsl:element>
</fo:table-cell>
<fo:table-cell border-style="thin" padding="1pt" background-color="#4995E7">
  <xsl:element name="fo:block" use-attribute-sets="vb-column-
    heading">Description</xsl:element>
</fo:table-cell>
</fo:table-row>
</xsl:template>
<!--
================================================================================
===============
-->
<!--
                              VARIABLES ROW TEMPLATE
-->
<!--
```

FIG. 11-60

```
=======================================================================
==============
-->
<xsl:template match="ns1:variable">
<fo:table-row>
<fo:table-cell border-style="thin" padding="1pt">
<xsl:element name="fo:block" use-attribute-sets="vb-table-cell">
  <xsl:value-of select="@name" />
  </xsl:element>
  </fo:table-cell>
<fo:table-cell border-style="thin" padding="1pt">
<xsl:element name="fo:block" use-attribute-sets="vb-table-cell">
  <xsl:attribute name="text-align">center</xsl:attribute>
<!--
    WL for now we use value not value-gen
    -->
<xsl:if test="@value">
  <xsl:value-of select="@value" />
  </xsl:if>
  <xsl:if test="not(@value)">--</xsl:if>
  </xsl:element>
  </fo:table-cell>
<fo:table-cell border-style="thin" padding="1pt">
<xsl:element name="fo:block" use-attribute-sets="vb-table-cell">
<xsl:if test="ns1:description">
  <xsl:value-of select="ns1:description" />
  </xsl:if>
  <xsl:if test="not(ns1:description)">--</xsl:if>
  </xsl:element>
  </fo:table-cell>
  </fo:table-row>
  </xsl:template>
<!--

=======================================================================
    ==============
    -->
<!--
                              INPUT NAME AND VALUE TITLE ROW TEMPLATE
    -->
<!--

=======================================================================
    ==============
    -->
<xsl:template name="NameValueTitleRow">
<fo:table-row>
<fo:table-cell border-style="thin" padding="1pt" background-color="#4995E7">
  <xsl:element name="fo:block" use-attribute-sets="vb-column-heading">Name</xsl:element>
  </fo:table-cell>
```

FIG. 11-61

```
- <fo:table-cell border-style="thin" padding="1pt" background-color="#4995E7">
  <xsl:element name="fo:block" use-attribute-sets="vb-column-heading">Value</xsl:element>
  </fo:table-cell>
  </fo:table-row>
  </xsl:template>
- <!--
  ================================================================================
  ===============
  -->
- <!--
                         INPUT NAME AND VALUE ROW TEMPLATE
  -->
- <!--
  ================================================================================
  ===============
  -->
- <xsl:template name="NameValueRow">
- <fo:table-row>
- <fo:table-cell border-style="thin" padding="3pt">
- <xsl:element name="fo:block" use-attribute-sets="vb-table-cell">
  <xsl:value-of select="@name" />
  </xsl:element>
  </fo:table-cell>
- <fo:table-cell border-style="thin" padding="3pt">
- <xsl:element name="fo:block" use-attribute-sets="vb-table-cell">
  <xsl:value-of select="@expr" />
  </xsl:element>
  </fo:table-cell>
  </fo:table-row>
  </xsl:template>
- <!--
  ================================================================================
  ===============
  -->
- <!--
                         OUTPUT SRC AND DST TITLE ROW TEMPLATE
  -->
- <!--
  ================================================================================
  ===============
  -->
- <xsl:template name="SrcDstTitleRow">
- <fo:table-row>
- <fo:table-cell border-style="thin" padding="1pt" background-color="#4995E7">
  <xsl:element name="fo:block" use-attribute-sets="vb-column-heading">Source
    variable</xsl:element>
  </fo:table-cell>
```

FIG. 11-62

```
- <fo:table-cell border-style="thin" padding="1pt" background-color="#4995E7">
  <xsl:element name="fo:block" use-attribute-sets="vb-column-heading">Destination
    variable</xsl:element>
  </fo:table-cell>
  </fo:table-row>
  </xsl:template>
- <!--
  ================================================================================
  =============
  -->
- <!--
                              OUTPUT SRC AND DST ROW TEMPLATE
  -->
- <!--
  ================================================================================
  =============
  -->
- <xsl:template name="SrcDstRow">
- <fo:table-row>
- <fo:table-cell border-style="thin" padding="3pt">
- <xsl:element name="fo:block" use-attribute-sets="vb-table-cell">
  <xsl:value-of select="@src" />
  </xsl:element>
  </fo:table-cell>
- <fo:table-cell border-style="thin" padding="3pt">
- <xsl:element name="fo:block" use-attribute-sets="vb-table-cell">
  <xsl:value-of select="@dst" />
  </xsl:element>
  </fo:table-cell>
  </fo:table-row>
  </xsl:template>
- <!--
  ================================================================================
  =============
  -->
- <!--
                              PER STATE UNIVERSALS TABLE TEMPLATE
  -->
- <!--
  ================================================================================
  =============
  -->
- <xsl:template name="StateSpecificUniversalsSection">
  <xsl:param name="containerState" />
  <xsl:param name="stateNumber" />
  <xsl:param name="sectionNumber" />
  <xsl:value-of select="helper:incrementIndex($helper_instance, $PROJECT_NAME)" />
```

FIG. 11-63

```
- <fo:block jfor-class="SubSubSectionHeader">
- <xsl:attribute name="id">
    <xsl:value-of select="translate(translate(concat(@name, '_', $containerState, '_universals' ),
    ' ', ''), '-', '_')" />
    </xsl:attribute>
    <xsl:value-of select="$sectionNumber" />
    .
    <xsl:value-of select="$stateNumber" />
    .
    <xsl:value-of select="helper:getIndex($helper_instance, $PROJECT_NAME)" />
    State-Specific Universal Behaviors
    </fo:block>
- <fo:table>
    <fo:table-column column-width="50mm" />
    <fo:table-column column-width="60mm" />
    <fo:table-column column-width="45mm" />
- <fo:table-body>
- <xsl:call-template name="ConditionActionGotoTitleRow">
    <xsl:with-param name="condition" select="'Universal Type'" />
    </xsl:call-template>
    <xsl:apply-templates select="*[@name = $containerState]/ns1:universal-
    behavior[not(@enabled = 'false') and not(@scope = 'Global')]" />
    </fo:table-body>
    </fo:table>
    <fo:block />
    </xsl:template>
- <!--
    ================================================================================
    ================
    -->
- <!--
                        CONDITION ACTION GOTO TITLE ROW TEMPLATE
    -->
- <!--
    ================================================================================
    ================
    -->
- <xsl:template name="ConditionActionGotoTitleRow">
    <xsl:param name="condition" />
- <fo:table-row>
- <fo:table-cell border-style="thin" padding="1pt" background-color="#4995E7">
- <xsl:element name="fo:block" use-attribute-sets="vb-column-heading">
    <xsl:value-of select="$condition" />
    </xsl:element>
    </fo:table-cell>
- <fo:table-cell border-style="thin" padding="1pt" background-color="#4995E7">
    <xsl:element name="fo:block" use-attribute-sets="vb-column-heading">Action</xsl:element>
    </fo:table-cell>
```

FIG. 11-64

```
- <fo:table-cell border-style="thin" padding="1pt" background-color="#4995E7">
  <xsl:element name="fo:block" use-attribute-sets="vb-column-heading">Goto</xsl:element>
    </fo:table-cell>
    </fo:table-row>
    </xsl:template>
 - <!--

==================================================-==============================
        =============
        -->
 - <!--
                                        UNIVERSAL  BEHAVIOR  ROW  TEMPLATE
        -->
 - <!--

==================================================================================
        ==============
        -->
- <xsl:template match="ns1:universal-behavior">
    <xsl:variable name="show" select="helper:isUniversalBehaviorShown($helper_instance,
       $PROJECT_NAME, ../../@name, ../@name, name(..), @scope, @type, dialog-
       action/@condition, @enabled)" />
- <xsl:if test="not($show = 'false')">
- <xsl:for-each select="ns1:dialog-action">
- <fo:table-row>
    - <!--
      WL NOTE: jfor doesn't support padding-left so you can only apply general padding
      -->
- <fo:table-cell border-style="thin" padding="3pt">
- <xsl:element name="fo:block" use-attribute-sets="vb-table-cell">
- <fo:inline font-weight="bold">
    <xsl:value-of select="../@type" />
       </fo:inline>
       </xsl:element>
- <xsl:choose>
- <xsl:when test="starts-with(@condition, 'application.previousevent$ != undefined')">
    <xsl:element name="fo:block" use-attribute-sets="vb-table-cell">and following an error, or
       help or other universal</xsl:element>
       </xsl:when>
    <xsl:when test="starts-with(@condition, 'application.previousevent$ == undefined')" />
- <xsl:when test="@condition and not(@condition = '')">
- <xsl:element name="fo:block" use-attribute-sets="vb-table-cell">
    AND (
    <xsl:value-of select="@condition" />
      )
      </xsl:element>
      </xsl:when>
      </xsl:choose>
      </fo:table-cell>
- <fo:table-cell border-style="thin" padding="3pt">
    <xsl:call-template name="DialogAction-ActionCell" />
```

FIG. 11-65

```
        </fo:table-cell>
- <fo:table-cell border-style="thin" padding="3pt">
  - <!--
    normally we'd pass in a current container param but it's no relevant here
    -->
  <xsl:call-template name="DialogAction-GotoCell" />
      </fo:table-cell>
      </fo:table-row>
      </xsl:for-each>
      </xsl:if>
      </xsl:template>
- <!--

================================================================================
    ==============
    -->
- <!--
                            ERROR BEHAVIOR TEMPLATE
    -->
- <!--

================================================================================
    ==============
    -->
- <xsl:template match="ns1:error-behavior">
  <xsl:variable name="show" select="helper:isErrorBehaviorShown($helper_instance,
    $PROJECT_NAME, ../../@name, ../@name, name(..), @scope, @type, @count, dialog-
    action/@condition, @enabled)" />
- <xsl:if test="not($show = 'false')">
  - <!--
    NB: We print one row in the table for each dialog action. Since each dialog action
      has its
    -->
  - <!--
    own descritption we can separate them for clarity.
    -->
- <xsl:for-each select="ns1:dialog-action">
  - <!--
    Whether the behavior has a count specified
    -->
  <xsl:variable name="bCount" select="'false'" saxon:assignable="yes" />
  - <!--
    Whether the behavior has a condition specified
    -->
  <xsl:variable name="bCond" select="'false'" saxon:assignable="yes" />
- <fo:table-row>
- <fo:table-cell border-style="thin" padding="3pt">
- <xsl:element name="fo:block" use-attribute-sets="vb-table-cell">
  <xsl:attribute name="font-style">italic</xsl:attribute>
- <xsl:if test="../@count">
  <saxon:assign name="bCount" select="'true'" />
    </xsl:if>
```

FIG. 11-66

```xml
<xsl:if test="@condition and( not(@condition = ''))">
  <saxon:assign name="bCond" select="'true'" />
    </xsl:if>
  <xsl:if test="($bCount = 'true') or ($bCond = 'true')">WHEN (</xsl:if>
<xsl:if test="$bCount ='true'">
    COUNT =
  <xsl:value-of select="../@count" />
    </xsl:if>
  <xsl:if test="($bCount = 'true') and ($bCond = 'true')">) AND (</xsl:if>
<xsl:if test="$bCond = 'true'">
  <xsl:value-of select="@condition" />
    </xsl:if>
  <xsl:if test="($bCount = 'true') or ($bCond = 'true')">)</xsl:if>
  <xsl:if test="$bCount = 'false'">(DEFAULT)</xsl:if>
    </xsl:element>
<xsl:element name="fo:block" use-attribute-sets="vb-table-cell">
  <xsl:value-of select="../@type" />
    </xsl:element>
    </fo:table-cell>
<fo:table-cell border-style="thin" padding="3pt">
  <xsl:call-template name="DialogAction-ActionCell" />
    </fo:table-cell>
<fo:table-cell border-style="thin" padding="3pt">
<xsl:if test="local-name(../..) = 'generic-container'">
<xsl:call-template name="DialogAction-GotoCell">
  <xsl:with-param name="currentContainer" select="../../@name" />
    </xsl:call-template>
    </xsl:if>
<xsl:if test="not(local-name(../..) = 'generic-container')">
  <xsl:call-template name="DialogAction-GotoCell" />
    </xsl:if>
    </fo:table-cell>
    </fo:table-row>
    </xsl:for-each>
    </xsl:if>
    </xsl:template>
<!--
    ================================================================
    ==============
    -->
<!--
                        DIALOG ACTION CONDITION CELL TEMPLATE
    -->
<!--
    ================================================================
    ==============
    -->
<xsl:template name="DialogAction-ConditionCell">
```

FIG. 11-67

```
- <xsl:choose>
- <xsl:when test="@condition and( not(@condition = ''))">
  <xsl:value-of select="@condition" />
    </xsl:when>
- <xsl:when test="@type and( not(@type = ''))">
  <xsl:value-of select="@type" />
    </xsl:when>
  <xsl:otherwise>--</xsl:otherwise>
    </xsl:choose>
    </xsl:template>
- <!--

================================================================================
  ==============
  -->
- <!--
                              DIALOG ACTION ACTION CELL TEMPLATE
  -->
- <!--

================================================================================
  ==============
  -->
- <xsl:template match="ns1:dialog-action">
  <xsl:param name="currentContainer" />
- <fo:table-row>
- <fo:table-cell border-style="thin" padding="3pt">
- <xsl:element name="fo:block" use-attribute-sets="vb-table-cell">
  <xsl:call-template name="DialogAction-ConditionCell" />
    </xsl:element>
    </fo:table-cell>
- <fo:table-cell border-style="thin" padding="3pt">
  <xsl:call-template name="DialogAction-ActionCell" />
    </fo:table-cell>
- <fo:table-cell border-style="thin" padding="3pt">
- <xsl:call-template name="DialogAction-GotoCell">
  <xsl:with-param name="currentContainer" select="$currentContainer" />
    </xsl:call-template>
    </fo:table-cell>
    </fo:table-row>
    </xsl:template>
- <xsl:template name="DialogAction-ActionCell">
  - <!--
  WL TODO: handle more scenarios and add two dashes if there's nothing
  -->
  - <!--
  now we need to look for one or more of:
              assign, prompt, return, script, send, taskbegin, taskend, log
  -->
  - <!--
  Whether to write a newline or not
```

FIG. 11-68

```xml
-->
<xsl:variable name="bNL" select="'false'" saxon:assignable="yes" />
<xsl:for-each select="*">
<xsl:choose>
<xsl:when test="local-name(.) = 'prompt'">
<xsl:call-template name="InsidePromptTag">
    <xsl:with-param name="bAddNewline" select="$bNL" />
    </xsl:call-template>
    <saxon:assign name="bNL" select="'true'" />
    </xsl:when>
<xsl:when test="local-name(.) = 'assign'">
<xsl:element name="fo:block" use-attribute-sets="vb-action-table-cell">
<xsl:if test="$bNL = 'true'">
    <xsl:value-of select="' '" />
    </xsl:if>
    <fo:inline font-weight="bold">Assign:</fo:inline>
    <xsl:value-of select="concat(ns1:lhs/@expr-gen, ' = ', ns1:rhs/@expr-gen)" />
    </xsl:element>
    <saxon:assign name="bNL" select="'true'" />
    </xsl:when>
<xsl:when test="local-name(.) = 'send'">
<xsl:element name="fo:block" use-attribute-sets="vb-action-table-cell">
<xsl:if test="$bNL = 'true'">
    <xsl:value-of select="' '" />
    </xsl:if>
    <fo:inline font-weight="bold">Send:</fo:inline>
    <xsl:value-of select="concat('destexpr=', @destexpr)" />
    </xsl:element>
    <saxon:assign name="bNL" select="'true'" />
    </xsl:when>
<xsl:when test="local-name(.) = 'taskbegin'">
<xsl:element name="fo:block" use-attribute-sets="vb-action-table-cell">
<xsl:if test="$bNL = 'true'">
    <xsl:value-of select="' '" />
    </xsl:if>
    <fo:inline font-weight="bold">Task Begin:</fo:inline>
    <xsl:value-of select="@name" />
    </xsl:element>
    <saxon:assign name="bNL" select="'true'" />
    </xsl:when>
<xsl:when test="local-name(.) = 'taskend'">
<xsl:element name="fo:block" use-attribute-sets="vb-action-table-cell">
<xsl:if test="$bNL = 'true'">
    <xsl:value-of select="' '" />
    </xsl:if>
    <fo:inline font-weight="bold">Task End:</fo:inline>
    <xsl:value-of select="@name" />
    </xsl:element>
    <saxon:assign name="bNL" select="'true'" />
```

FIG. 11-69

```xml
        </xsl:when>
- <xsl:when test="local-name(.) = 'log'">
- <xsl:element name="fo:block" use-attribute-sets="vb-action-table-cell">
- <xsl:if test="$bNL = 'true'">
    <xsl:value-of select="' '"/>
    </xsl:if>
  <fo:inline font-weight="bold">Log</fo:inline>
    </xsl:element>
  <saxon:assign name="bNL" select="'true'" />
    </xsl:when>
- <xsl:when test="local-name(.) = 'script'">
- <xsl:element name="fo:block" use-attribute-sets="vb-action-table-cell">
- <xsl:if test="$bNL = 'true'">
    <xsl:value-of select="' '" />
    </xsl:if>
  <fo:inline font-weight="bold">Script</fo:inline>
    </xsl:element>
  <saxon:assign name="bNL" select="'true'" />
    </xsl:when>
- <xsl:otherwise>
  - <!--
    This occurs for return, reprompt, ...
    -->
  <saxon:assign name="bNL" select="'false'" />
    </xsl:otherwise>
    </xsl:choose>
    </xsl:for-each>
    </xsl:template>
  - <!--

================================================================================
    ================
    -->
  - <!--
                            DIALOG ACTION GOTO CELL TEMPLATE
    -->
  - <!--

================================================================================
    ================
    -->
- <xsl:template name="DialogAction-GotoCell">
  <xsl:param name="currentContainer" />
- <xsl:apply-templates select="ns1:goto">
  <xsl:with-param name="myContainer" select="$currentContainer" />
    </xsl:apply-templates>
  <xsl:apply-templates select="ns1:return | ns1:throw | ns1:submit | ns1:repeat" />
    </xsl:template>
  - <!--
    ================================================================
    -->
```

FIG. 11-70

```xml
<!--
                 GOTO RADIO BUTTON
-->
<!--
============================================================
-->
<xsl:template match="ns1:goto">
  <xsl:param name="myContainer" />
  <!--
    several different scenarios here.  we need to check the @container and
           @state attributes to see if it's a goto scenario.
           alternatively, rerecognize or reprompt could be set to true.
           there's also the chance that we're throwing an event.
  -->
  <xsl:choose>
    <xsl:when test="@container and( not(@container = ''))">
      <xsl:variable name="containerName" select="@container" />
      <fo:block>
        <!--
          now check if a state name was provided, otherwise we defualt to the initial state
            for the container
        -->
        <xsl:choose>
          <xsl:when test="@state and( not(@state = ''))">
            <fo:basic-link jfor-class="link">
              <xsl:attribute name="internal-destination">
                <xsl:value-of select="helper:getVectorElement($helper_instance, 'StateLinks',
                  concat($containerName, '#', @state), 0)" />
              </xsl:attribute>
              <xsl:value-of select="concat($containerName,'#',@state)" />
            </fo:basic-link>
          </xsl:when>
          <xsl:otherwise>
            <!--
              check if there is an initial state for the container
            -->
            <xsl:choose>
              <xsl:when test="/ns1:project/ns1:generic-container[@name = $containerName]/@initial-
                state and( not(/ns1:project/ns1:generic-container[@name = $containerName]/@initial-
                state = ''))">
                <fo:basic-link jfor-class="link">
                  <xsl:attribute name="internal-destination">
                    <xsl:value-of select="helper:getVectorElement($helper_instance, 'StateLinks',
                      concat($containerName, '#', /ns1:project/ns1:generic-container[@name =
                      $containerName]/@initial-state), 0)" />
                  </xsl:attribute>
                  <xsl:value-of select="concat($containerName,'#',/ns1:project/ns1:generic-
                    container[@name = $containerName]/@initial-state)" />
                </fo:basic-link>
              </xsl:when>
```

FIG. 11-71

```
- <xsl:otherwise>
- <fo:basic-link jfor-class="link">
- <xsl:attribute name="internal-destination">
  <xsl:value-of select="helper:getVectorElement($helper_instance, 'PageLinks',
    $containerName, 0)" />
    </xsl:attribute>
  <xsl:value-of select="concat($containerName,'#',/ns1:project/ns1:generic-
    container[@name = $containerName]/@initial-state)" />
    </fo:basic-link>
    </xsl:otherwise>
    </xsl:choose>
    </xsl:otherwise>
    </xsl:choose>
    </fo:block>
    </xsl:when>
- <xsl:when test="@state and( not(@state = ''))">
  - <!--
    No container name was provided but there's a state name.  So default to the this
    container.
    -->
- <fo:block>
- <fo:basic-link jfor-class="link">
- <xsl:attribute name="internal-destination">
  <xsl:value-of select="helper:getVectorElement($helper_instance, 'StateLinks',
    concat($myContainer, '#', @state), 0)" />
    </xsl:attribute>
  <xsl:value-of select="concat($myContainer,'#',@state)" />
    </fo:basic-link>
    </fo:block>
    </xsl:when>
- <xsl:when test="@url and( not(@url = ''))">
  - <!--
    A URL was provided.
    -->
- <xsl:element name="fo:block" use-attribute-sets="vb-table-cell">
  <xsl:attribute name="color">black</xsl:attribute>
- <fo:basic-link jfor-class="link">
- <xsl:attribute name="external-destination">
  <xsl:value-of select="@url" />
    </xsl:attribute>
  <xsl:value-of select="@url" />
    </fo:basic-link>
    </xsl:element>
    </xsl:when>
    </xsl:choose>
    </xsl:template>
  - <!--
    ======================================================
    -->
  - <!--
```

FIG. 11-72

```
                    RETURN RADIO BUTTON
    -->
 - <!--
    ==================================================
    -->
- <xsl:template match="ns1:return">
- <xsl:choose>
- <xsl:when test="@flavour = 'throw'">
- <xsl:element name="fo:block" use-attribute-sets="vb-table-cell">
    Return to the calling dialog and throw the event:
    <xsl:value-of select="@eventexpr" />
      </xsl:element>
      </xsl:when>
- <xsl:otherwise>
   <xsl:element name="fo:block" use-attribute-sets="vb-table-cell">Return to the calling
      dialog</xsl:element>
      </xsl:otherwise>
      </xsl:choose>
      </xsl:template>
 - <!--
    ==================================================
    -->
 - <!--
                    THROW RADIO BUTTON
    -->
 - <!--
    ==================================================
    -->
- <xsl:template match="ns1:throw">
- <xsl:element name="fo:block" use-attribute-sets="vb-table-cell">
    Throw the event:
    <xsl:value-of select="@eventexpr" />
      </xsl:element>
      </xsl:template>
 - <!--
    ==================================================
    -->
 - <!--
                    SUBMIT RADIO BUTTON
    -->
 - <!--
    ==================================================
    -->
- <xsl:template match="ns1:submit">
- <xsl:element name="fo:block" use-attribute-sets="vb-table-cell">
    Submit to url:
    <xsl:value-of select="@destexpr" />
      </xsl:element>
      </xsl:template>
 - <!--
    ==================================================
```

FIG. 11-73

```
-->
<!--
            RERECOGNIZE RADIO BUTTON
-->
<!--
    ========================================================
-->
<xsl:template match="ns1:repeat">
  <!--
    Select message based on where this action is located
  -->
  <xsl:choose>
    <xsl:when test="ancestor::ns1:universal-behavior/ancestor::ns1:global-information">
      <xsl:element name="fo:block" use-attribute-sets="vb-table-cell">Continue with recognition in the state in which the universal was spoken.</xsl:element>
    </xsl:when>
    <xsl:when test="ancestor::ns1:error-behavior/ancestor::ns1:global-information">
      <xsl:element name="fo:block" use-attribute-sets="vb-table-cell">Continue with state-specific behavior.</xsl:element>
    </xsl:when>
    <xsl:otherwise>
      <xsl:element name="fo:block" use-attribute-sets="vb-table-cell">Continue with rec in this state.</xsl:element>
    </xsl:otherwise>
  </xsl:choose>
</xsl:template>
<!--
    ========================================================
    ==============
-->
<!--
            INITIAL BEHAVIOR CONDITION CELL TEMPLATE
-->
<!--
    ========================================================
    ==============
-->
<xsl:template name="InitialBehavior-ConditionCell">
<xsl:if test="@type = 'previous'">
<xsl:if test="@previous-type = 'state'">
  Previous state:
  <xsl:value-of select="@previous-item" />
</xsl:if>
<xsl:if test="@previous-type = 'page'">
  Previous page:
  <xsl:value-of select="@previous-item" />
</xsl:if>
</xsl:if>
<xsl:if test="not( @type = 'previous' )">
```

FIG. 11-74

```
    Entry Type =
    <xsl:value-of select="@type" />
    </xsl:if>
- <xsl:if test="@condition and( not(@condition = ''))">
    and
    <xsl:value-of select="@condition" />
    </xsl:if>
    </xsl:template>
- <!--

================================================================================
    ==============
    -->
- <!--
                                INSIDE PROMPT TAG TEMPLATE
    -->
- <!--

================================================================================
    ==============
    -->
- <xsl:template match="ns1:pre-recognition">
    <xsl:apply-templates select="ns1:prompt" mode="pre-recognition" />
    </xsl:template>
- <xsl:template match="ns1:prompt" mode="pre-recognition">
- <fo:table-row>
- <fo:table-cell border-style="thin" padding="3pt">
- <xsl:element name="fo:block" use-attribute-sets="vb-table-cell">
    <xsl:call-template name="InitialBehavior-ConditionCell" />
    </xsl:element>
    </fo:table-cell>
- <fo:table-cell border-style="thin" padding="3pt">
  - <!--
    call a template to handle prompt possibilities
    -->
- <xsl:call-template name="InsidePromptTag">
    <xsl:with-param name="bAddNewline" select="'false'" />
    </xsl:call-template>
    </fo:table-cell>
    </fo:table-row>
    </xsl:template>
- <xsl:template name="InsidePromptTag">
    <xsl:param name="bAddNewline" />
  - <!--
    two loops through the prompts: one for a summary, one for details
    -->
  - <!--
    First the summary. This should be maintained to match
      PromptSpec.createItemRendition()
    -->
- <xsl:element name="fo:block" use-attribute-sets="vb-prompt-table-cell">
```

FIG. 11-75

```xml
- <xsl:if test="$bAddNewline = 'true'">
  <xsl:value-of select="' '" />
    </xsl:if>
- <fo:inline font-weight="bold">
  - <!--
    first we check to see if the prompt tag flavour attribute is 'simple' or
    'concatenated'
    -->
- <xsl:choose>
- <xsl:when test="@flavour = 'concatenated' or @flavour = 'random'">
- <xsl:for-each select="*">
- <xsl:choose>
- <xsl:when test="local-name(.) = 'audio-file-ref'">
  <xsl:text />
  <xsl:value-of select="concat(vb:getTranscript(@name), ' ')" />
  <xsl:text />
    </xsl:when>
- <xsl:when test="local-name(.) = 'audio-file-expr'">
- <xsl:choose>
- <xsl:when test="ns1:tts and not(ns1:tts = '')">
  <xsl:value-of select="concat(ns1:tts, ' ')" />
    </xsl:when>
- <xsl:otherwise>
  <xsl:text />
    [File Expression]
  <xsl:text />
    </xsl:otherwise>
    </xsl:choose>
    </xsl:when>
- <xsl:when test="local-name(.) = 'audio-value-expr'">
- <xsl:choose>
- <xsl:when test="ns1:tts and not(ns1:tts = '')">
  <xsl:value-of select="concat(ns1:tts, ' ')" />
    </xsl:when>
- <xsl:otherwise>
  <xsl:text />
    [URL Expression]
  <xsl:text />
    </xsl:otherwise>
    </xsl:choose>
    </xsl:when>
- <xsl:when test="local-name(.) = 'say-as'">
- <xsl:choose>
- <xsl:when test="@type and not(@type = '')">
  <xsl:text />
  <xsl:value-of select="concat('[', @type, '] ')" />
  <xsl:text />
    </xsl:when>
- <xsl:otherwise>
```

FIG. 11-76

```
<xsl:text />
  [TTS Expression]
<xsl:text />
    </xsl:otherwise>
    </xsl:choose>
    </xsl:when>
- <xsl:when test="local-name(.) = 'silence'">
<xsl:text />
<xsl:value-of select="concat('[', @msecs, 'msecs] ')" />
<xsl:text />
    </xsl:when>
- <xsl:when test="local-name(.) = 'tts'">
<xsl:value-of select="concat(., ' ')" />
    </xsl:when>
    </xsl:choose>
    </xsl:for-each>
    </xsl:when>
- <!--
    The default flavour is [S,s]imple
  -->
- <xsl:otherwise>
<xsl:text />
<xsl:value-of select="concat(vb:getTranscript(@src), ' ')" />
<xsl:text />
    </xsl:otherwise>
    </xsl:choose>
    </fo:inline>
    </xsl:element>
- <!--
    now provide details
  -->
- <xsl:element name="fo:block" use-attribute-sets="vb-prompt-detail-cell">
<xsl:value-of select="concat(' ', 'Details:', ' ')" />
    </xsl:element>
- <xsl:choose>
- <xsl:when test="@flavour = 'concatenated' or @flavour = 'random'">
- <xsl:for-each select="*">
- <xsl:choose>
- <xsl:when test="local-name(.) = 'audio-file-ref'">
- <xsl:element name="fo:block" use-attribute-sets="vb-prompt-table-cell">
    <xsl:variable name="linkname" select="concat($PROJECT_NAME, '_prompt_',
      helper:getVectorSize($helper_instance, 'PromptList', 'PromptFiles'))" />
    <xsl:value-of select="helper:addVector($helper_instance, 'PromptList', 'PromptFiles', 'audio-
      file-ref')" />
- <xsl:if test="@name and not(@name = '')">
    <xsl:value-of select="helper:addVector($helper_instance, 'PromptLinks', @name,
      $linkname)" />
- <fo:basic-link jfor-class="link">
- <xsl:attribute name="internal-destination">
<xsl:value-of select="$linkname" />
```

FIG. 11-77

```
            </xsl:attribute>
          <xsl:text />
          <xsl:value-of select="@name" />
          <xsl:text />
            </fo:basic-link>
          </xsl:if>
- <xsl:if test="not(@name) or @name = ''">
  <xsl:text />
    (missing prompt file)
  <xsl:text />
    </xsl:if>
  <xsl:text />
  <xsl:value-of select="concat(' '', vb:getTranscript(@name), '')" />
  <xsl:text />
    </xsl:element>
    </xsl:when>
- <xsl:when test="local-name(.) = 'audio-file-expr'">
- <xsl:element name="fo:block" use-attribute-sets="vb-prompt-table-cell">
- <fo:inline font-weight="bold">
  <xsl:text />
    File Expression:
  <xsl:text />
    </fo:inline>
  <xsl:value-of select="@expr" />
- <xsl:if test="ns1:tts and not(ns1:tts = '')">
  <xsl:value-of select="concat(', '', ns1:tts, '')" />
    </xsl:if>
    </xsl:element>
    </xsl:when>
- <xsl:when test="local-name(.) = 'audio-value-expr'">
- <xsl:element name="fo:block" use-attribute-sets="vb-prompt-table-cell">
- <fo:inline font-weight="bold">
  <xsl:text />
    URL Expression:
  <xsl:text />
    </fo:inline>
  <xsl:value-of select="@expr" />
- <xsl:if test="ns1:tts and not(ns1:tts = '')">
  <xsl:value-of select="concat(', '', ns1:tts, '')" />
    </xsl:if>
    </xsl:element>
    </xsl:when>
- <xsl:when test="local-name(.) = 'dtmf-audio'">
- <xsl:element name="fo:block" use-attribute-sets="vb-table-cell">
  <fo:inline font-weight="bold">DTMF audio:</fo:inline>
  <xsl:value-of select="@expr" />
    </xsl:element>
    </xsl:when>
- <xsl:when test="local-name(.) = 'say-as'">
```

FIG. 11-78

```
- <xsl:element name="fo:block" use-attribute-sets="vb-table-cell">
- <fo:inline font-weight="bold">
  <xsl:text />
    TTS Expression
  <xsl:text />
- <xsl:if test="@type and not(@type = '')">
  <xsl:value-of select="concat(' [', @type, ']')" />
    </xsl:if>
  <xsl:text />
    :
  <xsl:text />
    </fo:inline>
  <xsl:value-of select="@expr" />
    </xsl:element>
    </xsl:when>
- <xsl:when test="local-name(.) = 'silence'">
- <xsl:element name="fo:block" use-attribute-sets="vb-table-cell">
  <fo:inline font-weight="bold">Silence:</fo:inline>
  <xsl:value-of select="@msecs" />
    msecs
    </xsl:element>
    </xsl:when>
- <xsl:when test="local-name(.) = 'tts'">
- <xsl:element name="fo:block" use-attribute-sets="vb-table-cell">
  <fo:inline font-weight="bold">TTS:</fo:inline>
    "
  <xsl:value-of select="." />
    "
    </xsl:element>
    </xsl:when>
    </xsl:choose>
    </xsl:for-each>
    </xsl:when>
- <!--
    The default flavour is [S,s]imple
    -->
- <xsl:otherwise>
  <xsl:variable name="linkname" select="concat($PROJECT_NAME, '_prompt_',
    helper:getVectorSize($helper_instance, 'PromptList', 'PromptFiles'))" />
  <xsl:value-of select="helper:addVector($helper_instance, 'PromptList', 'PromptFiles',
    'prompt')" />
- <xsl:element name="fo:block" use-attribute-sets="vb-prompt-table-cell">
- <xsl:if test="@src and not(@src = '')">
  <xsl:value-of select="helper:addVector($helper_instance, 'PromptLinks', @src, $linkname)"
    />
- <fo:basic-link jfor-class="link">
- <xsl:attribute name="internal-destination">
  <xsl:value-of select="$linkname" />
    </xsl:attribute>
  <xsl:text />
```

FIG. 11-79

```
<xsl:value-of select="@src" />
<xsl:text />
    </fo:basic-link>
    </xsl:if>
- <xsl:if test="not(@src) or @src = ''">
<xsl:text />
  (missing prompt file)
<xsl:text />
    </xsl:if>
<xsl:text />
<xsl:value-of select="concat(' ''', vb:getTranscript(@src), ''')" />
<xsl:text />
    </xsl:element>
    </xsl:otherwise>
    </xsl:choose>
    </xsl:template>
- <!--

================================================================
  ============
  -->
- <!--
                                    ENTRY STATES TEMPLATE
  -->
- <!--

================================================================
  ============
  -->
- <xsl:template name="EntryStates">
  <xsl:param name="state" />
  <xsl:param name="vectorsize" />
  <xsl:param name="count" />
- <xsl:if test="$count > 0">
- <xsl:call-template name="EntryExitStatesLink">
  <xsl:with-param name="pageAndState" select="helper:getVectorElement($helper_instance,
     concat($PROJECT_NAME, 'EntryStates'), string($state), $vectorsize - $count)" />
  </xsl:call-template>
- <xsl:call-template name="EntryStates">
  <xsl:with-param name="state" select="$state" />
  <xsl:with-param name="vectorsize" select="$vectorsize" />
  <xsl:with-param name="count" select="$count - 1" />
    </xsl:call-template>
    </xsl:if>
    </xsl:template>
- <!--

```
                                    EXIT STATES TEMPLATE
  -->
- <!--

=====================================================================================
  =============
  -->
- <xsl:template name="ExitStates">
  <xsl:param name="state" />
  <xsl:param name="vectorsize" />
  <xsl:param name="count" />
- <xsl:if test="$count > 0">
- <xsl:call-template name="EntryExitStatesLink">
  <xsl:with-param name="pageAndState" select="helper:getVectorElement($helper_instance,
     concat($PROJECT_NAME, 'ExitStates'), string($state), $vectorsize - $count)" />
    </xsl:call-template>
- <xsl:call-template name="ExitStates">
  <xsl:with-param name="state" select="$state" />
  <xsl:with-param name="vectorsize" select="$vectorsize" />
  <xsl:with-param name="count" select="$count - 1" />
    </xsl:call-template>
    </xsl:if>
    </xsl:template>
- <!--

=====================================================================================
  =============
  -->
- <!--           ENTRY AND EXIT STATES LINK TEMPLATE
  -->
- <!--

=====================================================================================
  =============
  -->
- <xsl:template name="EntryExitStatesLink">
  <xsl:param name="pageAndState" />
  <xsl:variable name="pageName" select="substring-before($pageAndState, '#')" />
  <xsl:variable name="stateName" select="substring-after($pageAndState, '#')" />
- <xsl:element name="fo:block" use-attribute-sets="vb-table-cell">
- <fo:basic-link jfor-class="link">
- <xsl:attribute name="internal-destination">
- <xsl:choose>
- <xsl:when test="$stateName and( not($stateName = ''))">
   <xsl:value-of select="helper:getVectorElement($helper_instance, 'StateLinks',
      $pageAndState, 0)" />
   </xsl:when>
- <xsl:otherwise>
   <xsl:value-of select="helper:getVectorElement($helper_instance, 'PageLinks', $pageName,
      0)" />
```

FIG. 11-81

```
            </xsl:otherwise>
          </xsl:choose>
        </xsl:attribute>
     <xsl:value-of select="$pageAndState" />
      </fo:basic-link>
     </xsl:element>
   </xsl:template>
   <!--

================================================================================
     ==============
   -->
   <!--
                            ADD TO ENTRY AND EXIT STATES HASH TEMPLATE
   -->
   <!--

================================================================================
     ==============
   -->
   <xsl:template name="AddToEntryAndExitHash">
     <xsl:param name="qName" />
     <xsl:param name="curPage" />
     <xsl:param name="targetPage" />
     <xsl:param name="targetState" />
     <!--
       Whether the goto is to a state
     -->
     <xsl:variable name="bState" select="'false'" saxon:assignable="yes" />
     <xsl:if test="$targetState and not($targetState = '')">
       <saxon:assign name="bState" select="'true'" />
       </xsl:if>
     <!--
       Whether the goto is to a container
     -->
     <xsl:variable name="bContainer" select="'false'" saxon:assignable="yes" />
     <xsl:if test="$targetPage and not($targetPage = '')">
       <saxon:assign name="bContainer" select="'true'" />
       </xsl:if>
     <!--
       there may exist a <goto/> element (with a state, container, or url attribute)
     -->
     <!--
       Stores (Target Container)#(Target State)
     -->
    <xsl:variable name="tgtContainerNState" select="''" saxon:assignable="yes" />
     <!--
       container specified + state specified = container#state
     -->
     <xsl:if test="($bContainer = 'true') and ($bState = 'true')">
       <saxon:assign name="tgtContainerNState" select="concat($targetPage,'#',$targetState)" />
```

```xml
    </xsl:if>
    <!--
    container specified + state NOT specified = container#initstate
    -->
    <xsl:if test="($bContainer = 'true') and ($bState = 'false')">
      <saxon:assign name="tgtContainerNState"
        select="concat($targetPage,'#',/ns1:project/ns1:generic-container[@name =
        $targetPage]/@initial-state)" />
    </xsl:if>
    <!--
    container NOT specified + state specified = currpg#state
    -->
    <xsl:if test="($bContainer = 'false') and ($bState = 'true')">
      <saxon:assign name="tgtContainerNState" select="concat($curPage,'#',$targetState)" />
    </xsl:if>
    <xsl:if test="($bContainer = 'true') or ($bState = 'true')">
      <xsl:value-of select="helper:addVector($helper_instance, concat($PROJECT_NAME,
        'ExitStates'), $qName, $tgtContainerNState)" />
      <xsl:value-of select="helper:addVector($helper_instance, concat($PROJECT_NAME,
        'EntryStates'), $tgtContainerNState, $qName)" />
    </xsl:if>
    <!--
    container NOT specified + state NOT specified = url (no action taken)
    -->
  </xsl:template>
  <!--
  ================================================================================
  ==============
  -->
  <!--
                    DESIGN FILE TABLE OF CONTENTS ENTRY TEMPLATE
  -->
  <!--
  ================================================================================
  ==============
  -->
  <xsl:template name="DesignFileTableOfContentsEntry">
    <fo:table>
      <fo:table-column column-width="147mm" />
      <fo:table-column column-width="8mm" />
      <fo:table-body>
        <fo:table-row>
          <fo:table-cell padding="1pt">
            <fo:block>
              <fo:basic-link jfor-class="link" font-weight="bold" font-size="20pt">
                <xsl:attribute name="internal-destination">
                  <xsl:value-of select="concat('DesignFileStart_', helper:getDialogIndex($helper_instance,
                    $PROJECT_NAME))" />
                </xsl:attribute>
```

FIG. 11-83

```
<xsl:text />
<xsl:value-of select="$PROJECT_NAME" />
<xsl:text />
   </fo:basic-link>
   </fo:block>
   </fo:table-cell>
- <fo:table-cell padding="1pt">
- <xsl:element name="fo:block" use-attribute-sets="vb-table-cell">
 <xsl:attribute name="color">black</xsl:attribute>
 <xsl:attribute name="font-weight">bold</xsl:attribute>
- <fo:page-number-citation>
- <xsl:attribute name="ref-id">
   <xsl:value-of select="concat('DesignFileStart_', helper:getDialogIndex($helper_instance,
      $PROJECT_NAME))" />
   </xsl:attribute>
   </fo:page-number-citation>
   </xsl:element>
   </fo:table-cell>
   </fo:table-row>
   </fo:table-body>
   </fo:table>
   </xsl:template>
- <!--
   ========================================================================
   -->
- <!--
                  PER DESIGN FILE TABLE OF CONTENTS TEMPLATE
   -->
- <!--
   ========================================================================
   -->
- <xsl:template mode="PerDesignFileTblOfContents" match="ns1:project">
 <xsl:param name="companyName" />
 <xsl:param name="companyNameLen" />
 <xsl:param name="COPYRIGHT_FOOTER" />
 <xsl:param name="vb-font-family-times" />
 <xsl:apply-templates select="." mode="state-ordering" />
- <fo:static-content flow-name="xsl-region-after">
- <xsl:element name="fo:block" use-attribute-sets="vb-page-number">
   <fo:page-number />
   </xsl:element>
- <xsl:element name="fo:block" use-attribute-sets="vb-legal-notice">
- <xsl:choose>
- <xsl:when test="$companyNameLen > 0">
   Copyright 2004 by
 <xsl:value-of select="$companyName" />
   . All rights reserved. No part of this document may be used, reproduced or disclosed
      without a license agreement or nondisclosure agreement with
 <xsl:value-of select="$companyName" />
   .
```

FIG. 11-84

```xml
        </xsl:when>
      <xsl:otherwise>
        <xsl:value-of select="$COPYRIGHT_FOOTER" />
      </xsl:otherwise>
    </xsl:choose>
  </xsl:element>
  <fo:block />
  <fo:block />
    </fo:static-content>
  <fo:flow flow-name="xsl-region-body">
    <xsl:call-template name="DesignFileTableOfContentsEntry" />
    <xsl:variable name="sectionIterator" select="0" saxon:assignable="yes" />
    <xsl:variable name="subSectionIterator" select="1" saxon:assignable="yes" />
  <xsl:if test="$PROJECT_NAME = $MAIN_DIALOG">
    <saxon:assign name="sectionIterator" select="$sectionIterator+1" />
  <xsl:call-template name="TableOfContentsSection">
    <xsl:with-param name="heading-number" select="$sectionIterator" />
    <!--
1
-->
    <xsl:with-param name="heading-text" select="'DOCUMENT OVERVIEW'" />
    </xsl:call-template>
  <xsl:call-template name="TableOfContentsSubsection">
    <xsl:with-param name="heading-number" select="concat($sectionIterator, '.',
       $subSectionIterator)" />
    <!--
1.1
-->
    <xsl:with-param name="heading-text" select="'REVISION HISTORY'" />
    </xsl:call-template>
    <saxon:assign name="subSectionIterator" select="$subSectionIterator+1" />
  <xsl:call-template name="TableOfContentsSubsection">
    <xsl:with-param name="heading-number" select="concat($sectionIterator, '.',
       $subSectionIterator)" />
    <!--
1.2
-->
    <xsl:with-param name="heading-text" select="'TYPOGRAPHICAL CONVENTIONS'" />
    </xsl:call-template>
    <saxon:assign name="subSectionIterator" select="$subSectionIterator+1" />
  <xsl:call-template name="TableOfContentsSubsection">
    <xsl:with-param name="heading-number" select="concat($sectionIterator, '.',
       $subSectionIterator)" />
    <!--
1.3
-->
    <xsl:with-param name="heading-text" select="'DIALOG STATE FORMAT'" />
    </xsl:call-template>
  <fo:block />
  </xsl:if>
```

FIG. 11-85

```
- <!--
  test="$PROJECT_NAME = $MAIN_DIALOG"
  -->
  <saxon:assign name="sectionIterator" select="$sectionIterator+1" />
  <saxon:assign name="subSectionIterator" select="0" />
- <xsl:call-template name="TableOfContentsSection">
  <xsl:with-param name="heading-number" select="$sectionIterator" />
  - <!--
  2
  -->
  <xsl:with-param name="heading-text" select="'APPLICATION SUMMARY'" />
  </xsl:call-template>
- <xsl:if test="$PROJECT_NAME = $MAIN_DIALOG">
  <saxon:assign name="subSectionIterator" select="$subSectionIterator+1" />
- <xsl:call-template name="TableOfContentsSubsection">
  <xsl:with-param name="heading-number" select="concat($sectionIterator, '.',
     $subSectionIterator)" />
  - <!--
  2.1
  -->
  <xsl:with-param name="heading-text" select="'FUNCTIONALITY AND FEATURES'" />
  </xsl:call-template>
  <saxon:assign name="subSectionIterator" select="$subSectionIterator+1" />
- <xsl:call-template name="TableOfContentsSubsection">
  <xsl:with-param name="heading-number" select="concat($sectionIterator, '.',
     $subSectionIterator)" />
  - <!--
  2.2
  -->
  <xsl:with-param name="heading-text" select="'USERS'" />
  </xsl:call-template>
  <saxon:assign name="subSectionIterator" select="$subSectionIterator+1" />
- <xsl:call-template name="TableOfContentsSubsection">
  <xsl:with-param name="heading-number" select="concat($sectionIterator, '.',
     $subSectionIterator)" />
  - <!--
  2.3
  -->
  <xsl:with-param name="heading-text" select="'PERSONA'" />
  </xsl:call-template>
  </xsl:if>
- <!--
  test="$PROJECT_NAME = $MAIN_DIALOG"
  -->
  <saxon:assign name="subSectionIterator" select="$subSectionIterator+1" />
- <xsl:call-template name="TableOfContentsSubsection">
  <xsl:with-param name="heading-number" select="concat($sectionIterator, '.',
     $subSectionIterator)" />
  - <!--
  2.4
  -->
```

FIG. 11-86

```xml
      <xsl:with-param name="heading-text" select="'VARIABLE DEFINITIONS'" />
    </xsl:call-template>
    <fo:block />
    <saxon:assign name="sectionIterator" select="$sectionIterator+1" />
    <saxon:assign name="subSectionIterator" select="1" />
-   <xsl:call-template name="TableOfContentsSection">
      <xsl:with-param name="heading-number" select="$sectionIterator" />
-     <!--
      3
      -->
      <xsl:with-param name="heading-text" select="'DIALOG FLOW'" />
    </xsl:call-template>
-   <xsl:call-template name="TableOfContentsSubsection">
      <xsl:with-param name="heading-number" select="concat($sectionIterator, '.',
        $subSectionIterator)" />
-     <!--
      3.2
      -->
      <xsl:with-param name="heading-text" select="'UNIVERSAL BEHAVIORS'" />
    </xsl:call-template>
-   <xsl:call-template name="TableOfContentsSubSubSection">
      <xsl:with-param name="heading-number" select="concat($sectionIterator, '.',
        $subSectionIterator, '.1')" />
-     <!--
      3.2.1
      -->
      <xsl:with-param name="heading-text" select="'Universal Actions'" />
    </xsl:call-template>
-   <xsl:if test="ns1:global-information/ns1:error-behavior">
-     <xsl:call-template name="TableOfContentsSubSubSection">
        <xsl:with-param name="heading-number" select="concat($sectionIterator, '.',
          $subSectionIterator, '.2')" />
-       <!--
        3.2.2
        -->
        <xsl:with-param name="heading-text" select="'Universal Error Handling'" />
      </xsl:call-template>
    </xsl:if>
    <fo:block />
    <saxon:assign name="sectionIterator" select="$sectionIterator+1" />
    <saxon:assign name="subSectionIterator" select="1" />
-   <xsl:call-template name="TableOfContentsSection">
      <xsl:with-param name="heading-number" select="$sectionIterator" />
-     <!--
      4
      -->
      <xsl:with-param name="heading-text" select="'DIALOG STATES'" />
    </xsl:call-template>
-   <!--
      List all dialog states for this design file
      -->
```

FIG. 11-87

```xml
<xsl:variable name="stateListIterator" select="0" saxon:assignable="yes" />
<xsl:variable name="stateListSize" select="helper:getStateListSize($helper_instance,
    $PROJECT_NAME)" />
<xsl:variable name="containerName" select="0" saxon:assignable="yes" />
<saxon:while test="$stateListIterator < $stateListSize">
  <xsl:variable name="completeStateName" select="helper:getState($helper_instance,
      $PROJECT_NAME, $stateListIterator)" />
  <xsl:choose>
    <xsl:when test="contains($completeStateName, '#')">
      <saxon:assign name="containerName" select="substring-before($completeStateName, '#')"
      />
    </xsl:when>
    <xsl:otherwise>
      <saxon:assign name="containerName" select="$completeStateName" />
    </xsl:otherwise>
  </xsl:choose>
  <xsl:apply-templates select="ns1:generic-container[@name = $containerName]"
      mode="create-table-of-contents">
    <xsl:with-param name="containerState" select="substring-after($completeStateName, '#')"
    />
    <xsl:with-param name="stateNumber" select="$stateListIterator + 1" />
    <xsl:with-param name="sectionNumber" select="$sectionIterator" />
  </xsl:apply-templates>
  <saxon:assign name="stateListIterator" select="$stateListIterator+1" />
</saxon:while>
<fo:block />
<saxon:assign name="sectionIterator" select="$sectionIterator+1" />
<saxon:assign name="subSectionIterator" select="1" />
<xsl:call-template name="TableOfContentsSection">
  <xsl:with-param name="heading-number" select="$sectionIterator" />
  <!--
  5
  -->
  <xsl:with-param name="heading-text" select="'APPENDICES'" />
</xsl:call-template>
<xsl:call-template name="TableOfContentsSubsection">
  <xsl:with-param name="heading-number" select="concat($sectionIterator, '.1')" />
  <!--
  5.1
  -->
  <xsl:with-param name="heading-text" select="'GRAMMAR AND SLOT DEFINITIONS'" />
</xsl:call-template>
<xsl:call-template name="TableOfContentsSubsection">
  <xsl:with-param name="heading-number" select="concat($sectionIterator, '.2')" />
  <!--
  5.2
  -->
  <xsl:with-param name="heading-text" select="'PROMPT LIST'" />
</xsl:call-template>
</fo:flow>
```

FIG. 11-88

```
</xsl:template>
- <!--

================================================================================
    ================
    -->
- <!--
                    TABLE OF CONTENTS SUBSECTION TEMPLATE
    -->
- <!--

================================================================================
    ==============
    -->
- <xsl:template name="TableOfContentsSubsection">
  <xsl:param name="heading-number" />
  <xsl:param name="heading-text" />
  <xsl:variable name="heading-hash" select="concat(translate($heading-text, ' ', ''), '_',
      helper:getDialogIndex($helper_instance, $PROJECT_NAME))" />
- <fo:table>
  <fo:table-column column-width="5mm" />
  <fo:table-column column-width="10mm" />
  <fo:table-column column-width="132mm" />
  <fo:table-column column-width="8mm" />
- <fo:table-body>
- <fo:table-row>
- <fo:table-cell padding="0.5pt">
  <fo:block />
    </fo:table-cell>
- <fo:table-cell padding="0.5pt">
- <fo:block>
  <xsl:text />
  <xsl:value-of select="$heading-number" />
  <xsl:text />
    </fo:block>
    </fo:table-cell>
- <fo:table-cell padding="0.5pt">
- <fo:block>
- <fo:basic-link jfor-class="link">
- <xsl:attribute name="internal-destination">
  <xsl:value-of select="$heading-hash" />
    </xsl:attribute>
  <xsl:text />
  <xsl:value-of select="$heading-text" />
  <xsl:text />
    </fo:basic-link>
    </fo:block>
    </fo:table-cell>
- <fo:table-cell padding="0.5pt">
- <xsl:element name="fo:block" use-attribute-sets="vb-table-cell">
```

FIG. 11-89

```xml
<xsl:attribute name="color">black</xsl:attribute>
<fo:page-number-citation>
<xsl:attribute name="ref-id">
<xsl:value-of select="$heading-hash" />
</xsl:attribute>
</fo:page-number-citation>
</xsl:element>
</fo:table-cell>
</fo:table-row>
</fo:table-body>
</fo:table>
</xsl:template>
<!--
===========================================================================
-->
<!--
                TABLE OF CONTENTS SECTION TEMPLATE
-->
<!--
===========================================================================
-->
<xsl:template name="TableOfContentsSection">
<xsl:param name="heading-number" />
<xsl:param name="heading-text" />
<xsl:variable name="heading-hash" select="concat(translate($heading-text, ' ', ''), '_',
    helper:getDialogIndex($helper_instance, $PROJECT_NAME))" />
<fo:table>
<fo:table-column column-width="10mm" />
<fo:table-column column-width="137mm" />
<fo:table-column column-width="8mm" />
<fo:table-body>
<fo:table-row>
<fo:table-cell padding="1pt">
<fo:block>
<xsl:text />
<xsl:value-of select="$heading-number" />
<xsl:text />
</fo:block>
</fo:table-cell>
<fo:table-cell padding="1pt">
<fo:block>
<fo:basic-link jfor-class="link" font-weight="bold">
<xsl:attribute name="internal-destination">
<xsl:value-of select="$heading-hash" />
</xsl:attribute>
<xsl:text />
```

FIG. 11-90

```xml
    <xsl:value-of select="$heading-text" />
    <xsl:text />
      </fo:basic-link>
      </fo:block>
      </fo:table-cell>
  <fo:table-cell padding="1pt">
  <xsl:element name="fo:block" use-attribute-sets="vb-table-cell">
    <xsl:attribute name="color">black</xsl:attribute>
    <xsl:attribute name="font-weight">bold</xsl:attribute>
  <fo:page-number-citation>
  <xsl:attribute name="ref-id">
    <xsl:value-of select="$heading-hash" />
      </xsl:attribute>
      </fo:page-number-citation>
      </xsl:element>
      </fo:table-cell>
      </fo:table-row>
      </fo:table-body>
      </fo:table>
      </xsl:template>
  <!--

================================================================================
  =============
  -->
  <!--
                    TABLE OF CONTENTS SUBSUBSECTION TEMPLATE
  -->
  <!--

================================================================================
  =============
  -->
  <xsl:template name="TableOfContentsSubSubSection">
    <xsl:param name="heading-number" />
    <xsl:param name="heading-text" />
    <xsl:variable name="heading-hash" select="concat(translate($heading-text, ' ', ''), '_',
      helper:getDialogIndex($helper_instance, $PROJECT_NAME))" />
  <fo:table>
    <fo:table-column column-width="10mm" />
    <fo:table-column column-width="12mm" />
    <fo:table-column column-width="125mm" />
    <fo:table-column column-width="8mm" />
  <fo:table-body>
  <fo:table-row>
  <fo:table-cell padding="0.5pt">
    <fo:block />
      </fo:table-cell>
  <fo:table-cell padding="0.5pt">
  <fo:block>
```

FIG. 11-91

```
<xsl:text />
<xsl:value-of select="$heading-number" />
<xsl:text />
    </fo:block>
    </fo:table-cell>
<fo:table-cell padding="0.5pt">
<fo:block>
<fo:basic-link jfor-class="link" font-style="italic">
<xsl:attribute name="internal-destination">
  <xsl:value-of select="$heading-hash" />
    </xsl:attribute>
  <xsl:text />
  <xsl:value-of select="$heading-text" />
  <xsl:text />
    </fo:basic-link>
    </fo:block>
    </fo:table-cell>
<fo:table-cell padding="0.5pt">
<xsl:element name="fo:block" use-attribute-sets="vb-table-cell">
  <xsl:attribute name="color">black</xsl:attribute>
<fo:page-number-citation>
<xsl:attribute name="ref-id">
  <xsl:value-of select="$heading-hash" />
    </xsl:attribute>
    </fo:page-number-citation>
    </xsl:element>
    </fo:table-cell>
    </fo:table-row>
    </fo:table-body>
    </fo:table>
    </xsl:template>
<!--

========================================================================
  ===
-->
<!--
                          APPLICATION VARIABLES
-->
<!--

========================================================================
  ===
-->
<!--
  this will be our instance on the helper class
-->
<xsl:variable name="helper_instance" select="helper:new()" />
<!--
  WL VARIABLES FOR LOWER TO UPPERCASE CONVERSION (OR VICE VERSA)
-->
```

FIG. 11-92

```xml
<xsl:variable name="xsltsl-str-lower"
    select="'abcdefghijklmnopqrstuvwxyzµàáâãäåæçèéêëìíîïðñòóôõöøùúûüýþÿāăąćĉčċďđēĕė
ęěĝğġĥħīĩįıijĵķĺļľŀłńņňŋōŏőœŕŗřśŝşšțťŧũūŭůűųŵŷźżžſƀƈƌƒƕƙơƣƶƨƭɱɣʒƽρDzdzLjljNjnjǎĭŏŭǚ
ǜǟǡǣǧǩǫǭDzdzǵħǻǽǿаӓӕӛӡӫӧӥӱʉʂɾʄɵɣőǒőýьоҷсеɣцшшʋǝʈʊӡѓɇиаβγδεζηθικλμνξопρςστ
υφχψωϊϋόύώθφϖϛғӈɯҷӕӷԺκρсеабвгдежзийклмнопрстуфхцчшщъыьэюяèëĥřесĭĭĵлньħк
ᴎЎџѡѣҡѧӂҙѵҽѵұɵѻѽçьрťғьжҙкҝҟңнҥрҫтүҳҷџҹһеѯқұяӓӟӕөǝӂӡзҥөѳүӱӱӳчюрqηɭɕҡρдһįщδպһλդҽվյԿշηպ
ϙπμʃηρφϥϼορӡаbbbçdddąêęęgfghhhbɧjɪkkklllɭṁṁṁṅṇṇōöóöṕṕṟṝṣṣśṣ̌ttṭṭṳuụụűüṽvwẃẁẉẍẙẑ
zzļaáâãâăâảåäāeéềêếëḛiïqòōōőŏóớờỡǫuúůủứừửũyyýãååảảäãÃẽèèéěëéńňńńññniińnnňôóòõö
ớüůűůώωώώώώώãαεεĥηliòôũúúώągaqąậдńńńńńńńήωώώώώãáq.ηιíɧ̋üρφ i ii iii iv v vi vii viii ix
x xi xii l c dm@ⓑⓒⓓⓔⓕⓖⓗⓘⓙⓚⓛⓜⓝⓞⓟⓠⓡⓢⓣⓤⓥⓦⓧⓨⓩ a b c d e f g h i j k l m n o p q
r s t u v w x y z □□□□□□□□□□□□□□□□□□□□□□□□□□□□□□□□□□□□□"' />
<xsl:variable name="xsltsl-str-upper"
    select="'ABCDEFGHIJKLMNOPQRSTUVWXYZMÀÁÂÃÄÅÆÇÈÉÊËÌÍÎÏÐÑÒÓÔÕÖØÙÚÛÜÝÞŸĀ
ĂĄĆĈČĊĎĐĒĔĖĘĚĜĞĠĢĤĦĪĨĮIIJĴĶĹĻĽĿŁŃŅŇŊŌŎŐŒŔŖŘŚŜŞŠȚŤŦŨŪŬŮŰŲŴŶŹŻŽSƁĊƋF
ƕƘƠƢǷƵƧƬƮƔƷƼPDZDŽLJNJǍĬŎŬǙǛǞǠǢǦǨǪǬDZDŽGŃÁǼØAÀÉẾÒÒŘŘÛÛȘȚȂǎZǼȎȎ
ÒÓΫΒƆĐƏΕĠΥѠΝΘƦƩΤΟΩƷГΛ'Ε'НʾΙΑΒΓΔΕΖΗΘΙΚΛΜΝΞΟΠΡΣΤΥΦΧΨΩΪΫ̈Ό΅ΎΩΒΦΠϚϜϠΨϤҺ
ϚϮ†ΚΡΣΕΑΒΓΔΕЖЗИЙКЛМНОПРСТУФХЦЧШЩЪЫЬЭЮЯЀЁЂЃЄЅІЇЈЉЊЋЌҌҎҐʊᴅᴇᴀᴌᴋӡӶθ
ᴠѶᴥʘԄϚϸΡΓᴦϸжзҝҝҟңнҥҩρϛτʏχҭҷhͼҝΰϒΫ́ϞϞϞϞλϠβεтɆρδͺʃͲγлϛͲϰυҚΆгТΩϟΨҪἏʘθϟΦϮΟͿАΒΒΒϚ́ΔΔΔΔĚĚĚĚĚΓΗΗΗΗΗΗΗĬΚΚΚĿĻĻĻĻϰΜΜΝΝΝΝΟΟΟΟΡΡΡΒΒϚϚϟϠϦϿΤΤΤϒΟϘϒΌ
ΎϒϗΧΧΧϗϗΑΑΑΑΑΑΑΑΑΑΑẾĚĚĚĚĚĚĚÏİǪǪǪǪǪǪǪǪŎŎŎǪǪǪǬΟΌϘυϓϓϓϓϒϓΫΫΫΆΆΆΆΑ̋
ÀÀÁÉÊ'Ê'ÊÈHHH̀H̋H̃ H̄H HʰiIIIIIIǏOOO'O'O'OYYYYOΩῆΏΏΏΏΏΩΆΆΕ̄ΕHHI IOOYYΩΩΑΑΑΑ
ÁÁÁÁÁHHHHHH̀HΩΩΩΩΩΩΩΩΩÂΆΆΙΗĬΪϒϔPΩ I II IIIIV V VI VII VIII IX X XI XII L C D M@ⒷⒸⒹⒺⒻⒼⒽ
ⒾⒿⓀⓁⓂⓃⓄⓅⓆⓇⓈⓉⓊⓋⓌⓍⓎⓏ A B C D E F G H I J K L M N O P Q R S T U V W X Y Z □□□□□□
□□□□□□□□□□□□□□□□□□□□□□□□□□□□□□□"' />
<!--
    return the transcript for the prompt with the given path
-->
<func:function name="vb:getTranscript">
<xsl:param name="promptPath" />
<func:result select="util:getPromptTranscriptByUrl($DIALOG_UNIT, $promptPath)"
    xmlns:util="java:com.nuance.tools.design.main.utils.TransformUtils" />
</func:function>
</xsl:stylesheet>
```

COMPUTER-IMPLEMENTED TOOL FOR CREATION OF SPEECH APPLICATION CODE AND ASSOCIATED FUNCTIONAL SPECIFICATION

This application claims the benefit of U.S. Provisional Patent application No. 60/662,490, filed on Mar. 15, 2005 and entitled, "Framework/Process for Generating Dialog Specifications, VoiceXML, Runnable Grammars, and Prototypes While Building out a Voice Application," which is incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

At least one embodiment of the present invention pertains to systems and applications that employ automatic speech recognition (ASR), and more particularly, to a visual tool with which a voice user interface (VUI) designer and/or a speech application developer can concurrently create a speech application code and an associated specification document.

BACKGROUND

Voice-response systems which employ automatic speech recognition (ASR) technology are becoming increasingly more common in everyday life. ASR is a technology that allows machines to recognize human speech. Applications of voice-response technology include, for example, automated customer service call centers of business enterprises, which respond to a telephone caller's speech, and voice-response systems in automobiles, homes, businesses and entertainment venues.

At the heart of every voice response system is an automatic speech recognizer and a speech application. A "speech application" is a speech-enabled software application, separate from the recognizer, which determines what the system does in response to recognized speech from the recognizer. The speech application receives recognized speech from the recognizer, executes some function or functions based on the speech inputs according to the speech application's internal logic, and generates appropriate output. The speech application further generates various audible prompts to the user, which may be synthesized (machine-generated) speech for example.

The processing logic which speech applications provide is in the form of "dialog flows"; every speech application includes one or more dialog flows. A dialog flow is a set of two or more states in a human-machine dialog ("dialog states") in some logical relationship to each other, which define how a speaker's speech is processed. A dialog state may be a recognition state, which is a state that includes a prompt to request the speaker to speak, a grammar to recognize what the speaker says, and one or more actions to take based on what was recognized.

Although recent years have been marked by a wide variety of new speech applications, the process and technology for designing and building speech applications has lagged behind. That is, the process of designing and building speech application has, prior to the present invention, been slow, difficult, tedious, time-consuming and prone to errors. In general, the process typically has been as follows.

Initially in the design of a speech application, a (human) voice user interface (VUI) designer writes a functional specification for the speech application. The functional specification is a document, written in a human natural language (e.g., English), that specifies at a high level what the speech application will do. In particular, the functional specification specifies the various dialog flows that will form the speech application, including the required prompts, grammars, processing logic, error handling logic, etc. The VUI designer then provides the functional specification to a (human) speech application developer, who is an expert in writing the software to implement speech applications. The developer then begins to implement the speech application in software, using an appropriate language such as VoiceXML.

A problem with this process, however, is that it is not conducive to a short or efficient design/development process. Typically the VUI designer is not very familiar with speech application software code. As a result, the VUI designer is unable to have meaningful input in the design process after providing the specification to the developer, until the developer has generated a working prototype of the speech application. As a result, any flaws or design issues may not be identified until substantial time and effort has been spent on development of the application. Once a prototype has been created by the developer, the VUI designer may make changes to the functional specification, based on feedback from the developer. This process is often time-consuming and tedious. The developer would then modify the speech application code to implement those changes. This cycle may continue through several iterations, resulting in a long and tedious design/development process. Often the implementation of the speech application will diverge from what the VUI designer intended; however, that divergence may go unnoticed until substantial time and effort has been spent on development. This problem may be exacerbated by the fact that the VUI designer and the application developer may work for different business enterprises (e.g., corporate partners in the design/development of a particular product).

Existing approaches to speech application development include VoiceXML coding in a code editing environment, such as V-Builder 2.0 from Nuance Communications of Menlo Park, Calif., or Windows Notepad. However, only very technically knowledgeable individuals who can write code can create applications or prototypes in such an environment.

Existing approaches also include graphical call flow-oriented development with the ability to drag and drop graphical icons. However, this development approach has been primarily available only within legacy, non-VoiceXML tools and has been limited to creating applications in non-standard languages, rather than in VoiceXML. The only solutions known to provide this approach for VoiceXML applications sharply divide the prototyping process from the full deployment process; as such, once a developer moves into deployment mode, his prototyping options are greatly limited with these solutions.

What is needed, therefore, is a tool which overcomes shortcomings of the prior art, including making the process of designing an developing a speech application simpler, more efficient, less time-consuming and less error-prone.

SUMMARY OF THE INVENTION

The present invention includes a machine-implemented method of building a speech application. In at least one embodiment, the method includes generating a graphical user interface to enable a user to create and edit a speech application, and receiving user inputs directed to the graphical user interface, where the user inputs specify a set of dialog flows representing the speech application. The method further includes, based on the user inputs, automatically generating executable code representing the speech application and a functional specification document describing the speech application.

The invention further includes an apparatus which can perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIGS. 2-1 through 2-7 show examples of various display screens that may be displayed by the GUI of the tool, when creating or editing a speech application;

FIGS. 3-1 through 3-5 show examples of various features of a functional specification of a speech application, which may be generated by the tool;

FIG. 4 illustrates the components of the tool and their functional relationships according to an embodiment of the invention;

FIG. 5 is a flow diagram showing a process that the tool can implement to convert user-specified data defining the speech application into PS-XML;

FIG. 6 is a flow diagram showing a process that the tool can implement to generate speech application code from a PS-XML file;

FIG. 7 is a flow diagram showing a process that the tool can implement to generate a functional specification of a speech application from a PS-XML file;

FIGS. 9-1 through 9-29 show an example of an XML schema that the tool can use to generate PS-XML code representing a speech application;

FIGS. 10-1 through 10-68 show an example of an XSLT that the tool can use to generate runnable grammars and VoiceXML code from PS-XML; and FIGS. 11-1 through 11-93 show an example of an XSLT that the tool can use to generate an XSL-FO file from PS-XML in generating a functional specification.

DETAILED DESCRIPTION

A tool for creating, prototyping and editing speech applications is described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As described in greater detail below, the tool generates a graphical user interface (GUI) on a computer system to enable a user to create and/or edit a speech application. In response to user inputs directed to the graphical user interface, specifying dialog flows for the speech application, the tool automatically generates executable code representing the speech application and a functional specification document describing the speech application. In this context, "automatically" means that the operation being referred to is carried out by a computer or other form of processing system, i.e., it is machine-implemented.

The tool enables VUI designers and other types of non-developers to create a VoiceXML prototype and/or application without having to know how to write VoiceXML code. It also allows a VUI designer and/or a speech application developer to quickly create a prototype, run it as a VoiceXML application, and then make modifications and run the modified prototype.

An embodiment of the invention includes an intermediate extensible markup language (XML) representation of the application using an implementation of XML referred to herein as PS-XML, described below. PS-XML represents the application logic in a very flexible XML-based format, that in turn can deliver a dialog specification document, VoiceXML for prototyping, and/or VoiceXML for deployment. The tool also includes the ability to generate runnable speech recognition grammars automatically, based on sample phrases input by the user. Thus, in certain embodiments, the same process/framework that facilitates development of fully deployable speech applications also creates runnable prototypes, a functional (dialog) specification, and editable VoiceXML code.

System Environment

Figure 1:
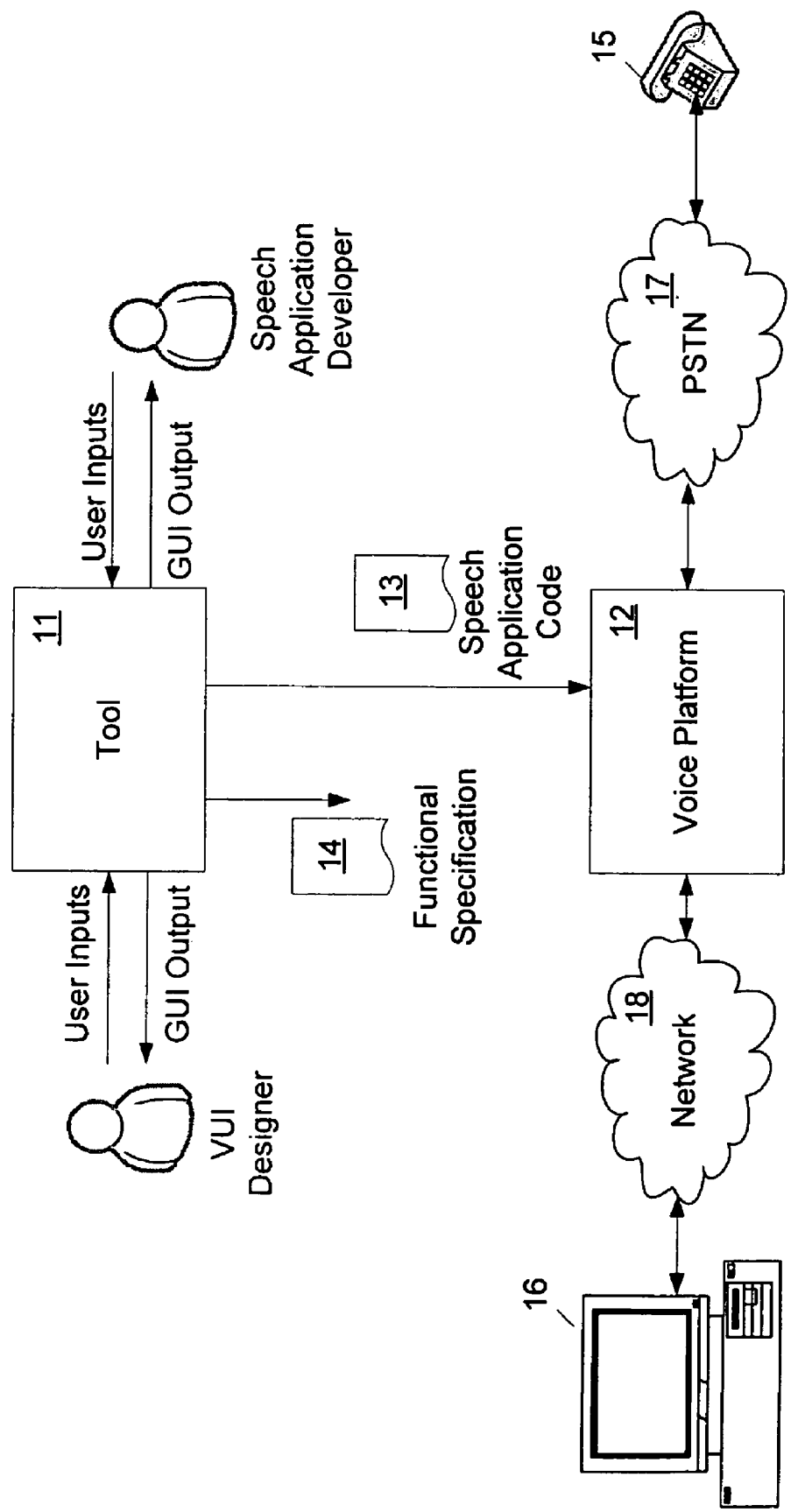
FIG. 1 illustrates an environment in which the tool for creating and editing speech applications can be used.

Refer now to FIG. 1, which illustrates how the tool can be used. The tool 11 is essentially a speech application "builder" and is used in conjunction with a voice platform 12. The tool 11 generates a GUI and receives user inputs directed to the GUI from a VUI designer and/or a speech application developer. Based on those inputs, the tool 11 generates executable speech application code 13 (e.g., VoiceXML), which is provided to the voice platform 12. Based on those user inputs the tool 11 also generates a functional specification 14 for the speech application, which is a document that specifies the details of the dialog flows and other features of the speech application.

The voice platform 12 is a processing system capable of executing the speech application generated by the tool 11. The voice platform 12 includes a voice server, which receives the speech application from the tool 11 in the form of VoiceXML packaged in a Web Application Archive (WAR) file. The voice platform 12 also includes a voice browser, which receives from the voice server VoiceXML code, grammars and prompts representing the speech application. The voice platform 12 further includes a telephony interface to receive audio input representing speech from a remote caller using a remote device such as a telephone 15 or PC 16, for example, via the public switched telephone Network (PSTN) 17 and/or the Internet 18, an ASR engine to recognize the caller's speech, a text-to-speech (TTS) module to convert text based prompts generated by the speech application into audible prompts, and an administrative/management interface to allow configuration in management of voice platform. Further details of the construction and functionality of the voice platform 12 are not germane to the present invention.

Although this description assumes that a speech application created using the tool is for interacting with a remote telephone caller, that need not be the case. The tool can be used to define essentially any type of speech application (and its associated functional specification), including speech applications which interact with non-remote speakers and/or those which interact with speakers through communication modalities other than telephony. Hence, the terms "caller" and "call flow" are used for purposes of description only and do not necessarily imply that the use of telephony is required or that the speaker must be remote from the speech application.

User Interface and High-Level Operation

The operation of the tool will now be described from the user's perspective with reference to FIGS. 2-1 through 2-7, which show examples of display screens that may be generated by the tool's GUI during the course of creating a speech application.

Figures 1, 2:
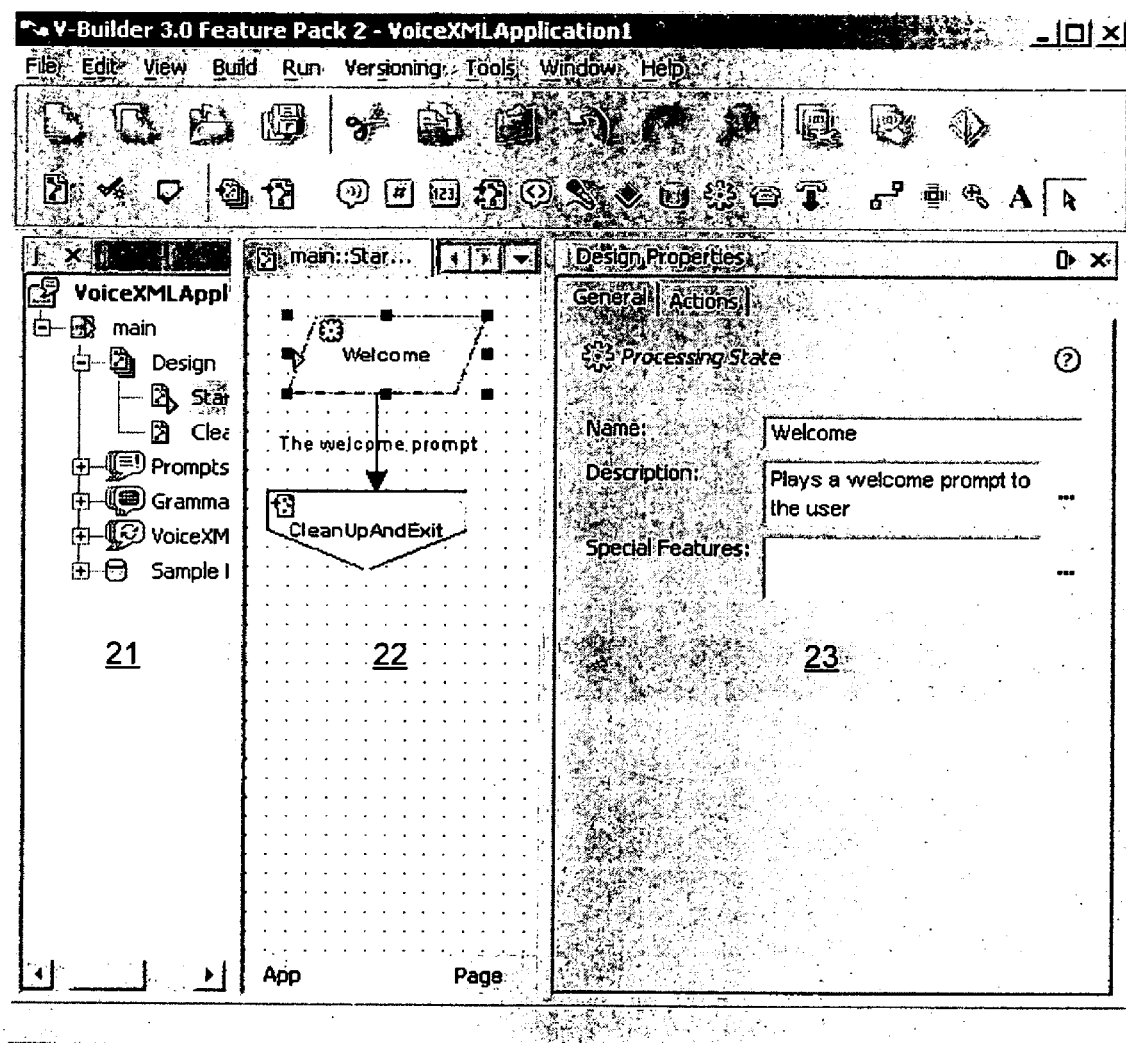
Figure 2:
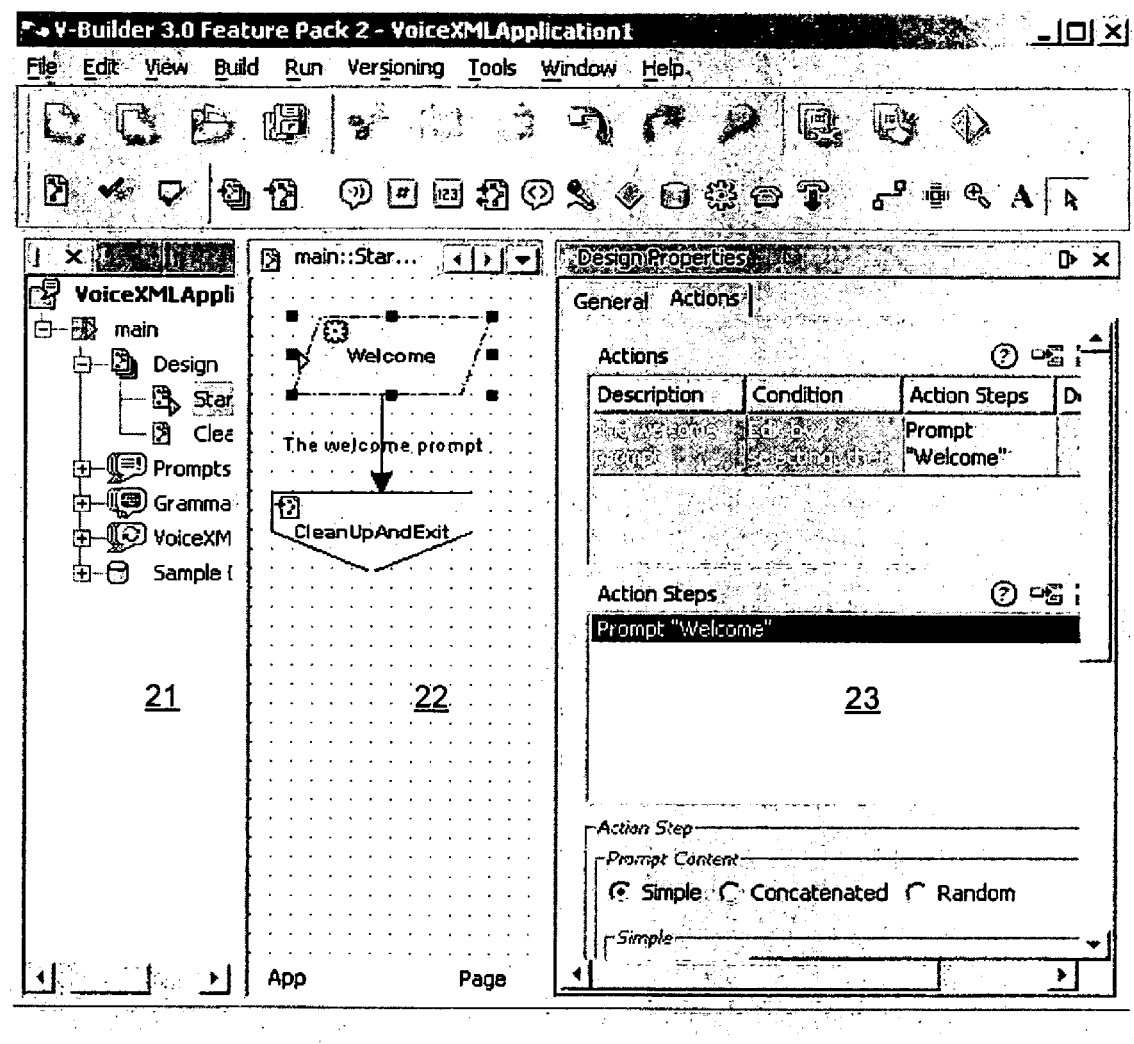

FIG. 2-1 shows an example of the initial screen that may be displayed by the tool 11 when the user first invokes the tool. The user, as indicated above, is generally either a VUI designer or a speech application developer; these two types of user will typically cooperate in the design of a speech application. In general, the GUI of the tool is divided into three distinct display regions, or "panes": a left pane 21, a middle pane 22 and a right pane 23. The left pane 21 lists the contents and organization of the speech application, in a hierarchical manner, similar to what is commonly provided by the Windows Explorer feature of Microsoft Windows operating systems. At a high-level, every speech application will include one or more dialog flows (listed under the "Design" category), prompts, grammars, VoiceXML code, and sample phrases. In the left pane 21, the user can click on any listed category or element in the speech application to display or hide its contents at the next lower level (if any) in the hierarchy.

The middle plane 22 displays a graphical palette on which the user visually creates dialog flows to form the speech application, by dragging and dropping icons that represent dialog states and transitions. Techniques for graphically constructing a dialog flow by dragging and dropping icons are known in the art and need not be described herein. In FIG. 2-1, the middle pane 22 shows two functionally-connected dialog states of a speech application; these states are labeled Welcome and CleanUpandExit. These are the two initial states that are initially created by default when a new speech application is created. Their names and other properties can be modified by the user.

The right pane 23 includes property sheets that display and enable editing of various properties of the speech application. The particular properties that are displayed in the right pane 23 at any particular time depend on which element is currently selected in the middle pane 22. For example, if a particular dialog state is selected in the middle pane 22 (such as the "Welcome" state shown as selected in FIG. 2-1), then the right pane 23 will display the property sheets for that particular dialog state. The property sheets generally include a set of tabs, organized by category, each of which includes various input fields. The user can input data to and edit these fields to specify various aspects of the construction and operation of the speech application.

For example, as shown in FIG. 2-1, the right pane 23 displays the property sheets of the "Welcome" (initial) state, which is currently selected in the middle pane 22. Those property sheets include a General tab and an Actions tab. In general, every dialog state will include at least these two tabs and, for certain types of dialog states, additional tabs. The General tab includes user editable fields for the name, description and special features (if any) of the currently selected dialog state.

FIG. 2-2 illustrates an example of the Actions tab for the Welcome state. This property sheet enables the user to define one or more actions steps (operations) which are to be taken when the speech application is in the corresponding dialog state, and any conditions which apply to such action step(s).

As shown in the example of FIG. 2-2, the "Welcome" state causes the audible prompt "welcome" to be played.

Figures 2, 3:
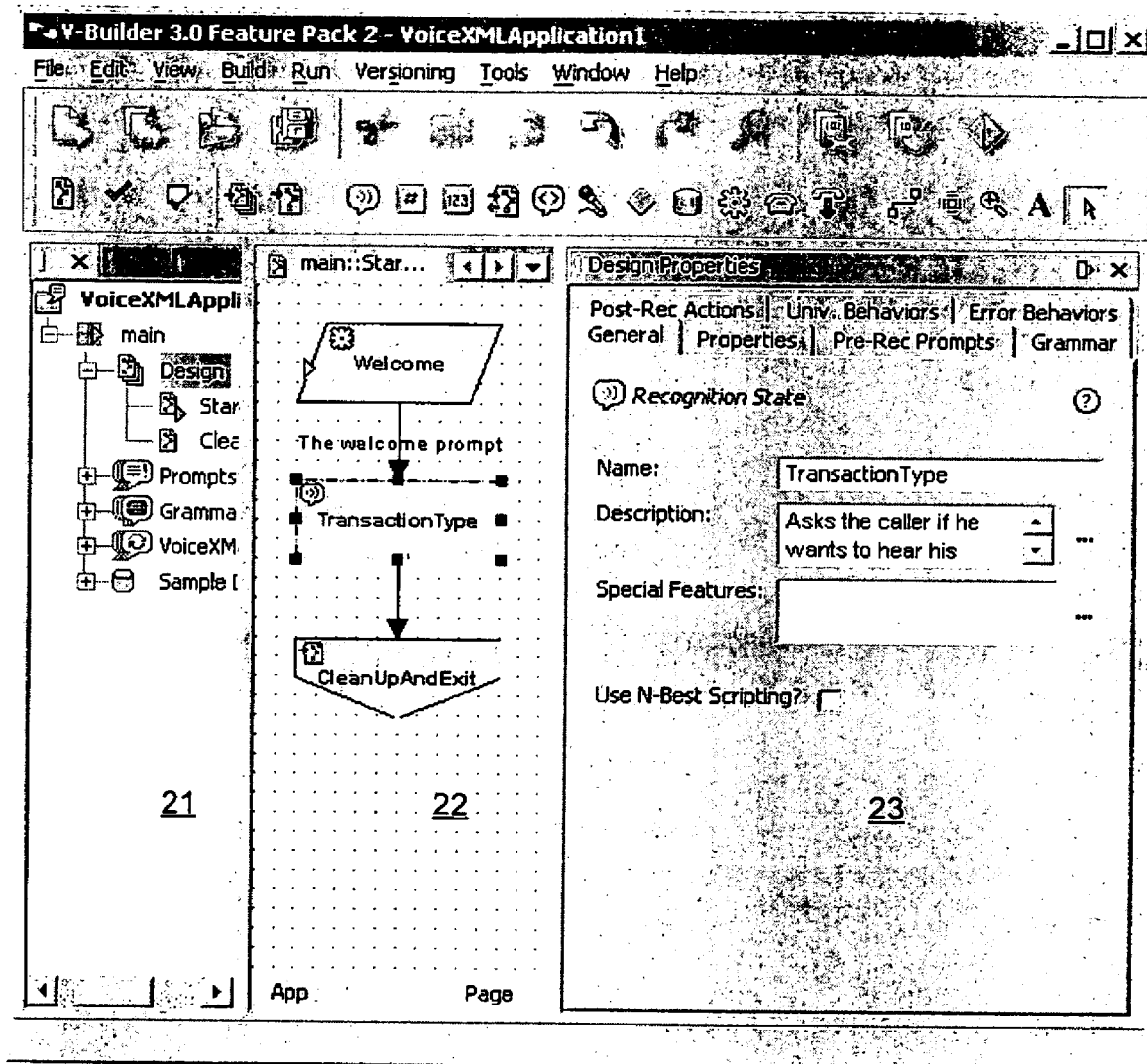

To add a new dialog state to a dialog flow, such as a recognition state, the user can simply drag and drop a predetermined icon into the appropriate place in the dialog flow in the graphical palette. FIG. 2-3 shows an example of a recognition state having been added to the dialog flow of FIGS. 2-1 and 2-2. For a recognition state, the set of property sheets will be more extensive than for the "Welcome" state. In addition to a General tab, the property sheets for a recognition state may include, for example, tabs for pre-recognition prompts, grammars, post-recognition actions, universal behaviors, error behaviors, etc. In this example, the name of the newly added recognition state is "TransactionType", and the Description field indicates that the state "asks the caller if he wants to hear his balance or transfer money."

Figures 2, 3, 4:
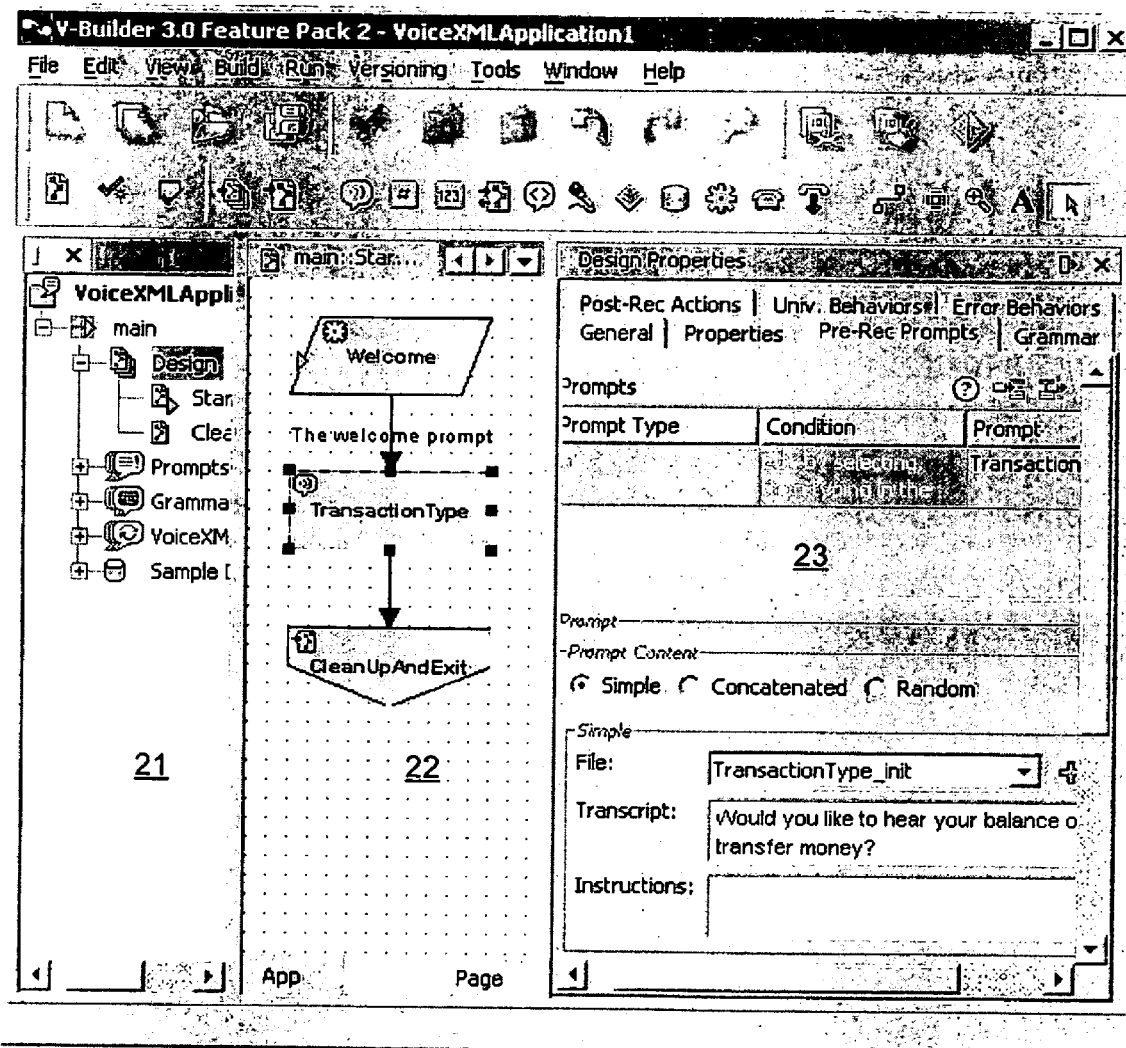

FIG. 2-4 shows an example of the tab which allows the user to specify pre-recognition prompts for the "TransactionType" state. In the input fields on this tab, the user can specify the prompt type as simple, complex or random. For a simple prompt, the user can specify a file and the specific transcript (content) of the prompt. During execution of the speech application, the transcript will be converted to an audible prompt by the TTS module in the voice platform.

FIG. 2-5 shows an example of the tab which allows the user to specify grammar slots, for the "TransactionType" state. In the input fields on this tab, the user can specify one or more slots for the grammar and one or more possible values for each slot. A slot is a variable filled by the result of ASR.

The tool also has the capability to generate a runnable speech recognition grammar automatically, based on sample phrases provided by the user. The manner in which the tool does this is described below. FIG. 2-6 illustrates, for the "TransactionType" state, an example of the property tab that allows the user to input sample phrases for use by the tool in automatically generating a grammar. Sample phrases are used to give an idea of what kinds of expressions should be expected by the grammar. As shown, the user enters one or more sample phrases under the "Phrase" column, which are examples of phrases that a speaker might say when the dialog is in this state, such as "balance", "my balance please", etc. In this context, a phrase is one or more words. Then, for each sample phrase provided, the user specifies the slot to be filled for that phrase under the "Slots Filled" column. Based on this mapping, the tool automatically generates a grammar, as described further below.

FIG. 2-7 shows an example of the tab which allows the user to specify any post-recognition actions, for the "TransactionType" state. As shown, this tab comprises an "Actions" input table, in which the user can input one or more post-recognition actions to be taken ("actions steps") and, for each action step, a description of the actions step, any condition(s) that must be satisfied before performing the action step, and/or a destination of the action step. In the illustrated example, the only post-recognition action to be taken is to transition to the "CleanUpAndExit" state. For each destination specified in the "Actions" input table, the user can specify any of various destination types, such as Goto, Rerecognize, Return, Throw (an event), etc.

As mentioned above, the tool also can automatically generate a functional specification of the speech application, based on the user inputs applied to the GUI. This operation may be initiated by a simple user input, such as the user clicking on a button labeled "Generate Specification", although that is not necessarily the case. The functional specification describes the dialog flows that form the speech application, according to how the user has specified those dialog flows in the graphical palette (middle pane 22) and the property sheets (right pane 23) of the GUI. In general, a functional specification generated by the tool will be a document (file) comprising mostly text, typically with some diagrams and/or tables included therein. However, a functional specification need not be limited to these types of content or any particular format and could include other types of content, such as multimedia. The specific manner in which a functional specification can be generated by the tool is described below.

FIG. 3-1 shows an example of the table of contents of a functional specification that can be generated for a particular (simple) speech application, by a particular embodiment of the tool. This example indicates possible types of content and the organization of such content in a functional specification that can be generated by the tool. In a complete functional specification, the table of contents would generally be preceded by an appropriate cover page and possibly other pages.

Certain sections and content may be present in all functional specifications generated by a particular embodiment of the tool. For example, all functional specifications generated by a particular embodiment of the tool may include a Revision History section, a Typographical Conventions section, a Universal Behaviors section, a Dialog State Format section, general introductory/background information, etc. (although at least some content in these sections may be modifiable by the user). Some of the content in the specification may be fixed content that is the same in every specification generated by the tool ("boilerplate" content). Other content will be specific to the particular speech application with which it is associated, such as the descriptions of the dialog flows that form the speech application. For any particular embodiment of the tool, the particular sections, organization and boilerplate content that the tool automatically includes in a functional specification can be tailored to meet the needs of those who will use the tool to design and develop speech applications.

FIG. 3-2 shows an example of a Universal Behaviors section of a functional specification that may be generated by the tool. A universal behavior is a behavior that is available in all dialog states unless the user of the tool specifies otherwise. The Universal Behaviors section is an example of a section that may be automatically included in all speech applications generated by a particular embodiment of the tool. The upper table is boilerplate (as indicated by the bold text, "The following table shows the universals available with the Nuance Voice Platform. These aren't necessarily active in this application."). The lower table can be modified by the user.

Figures 2, 3, 4, 5:
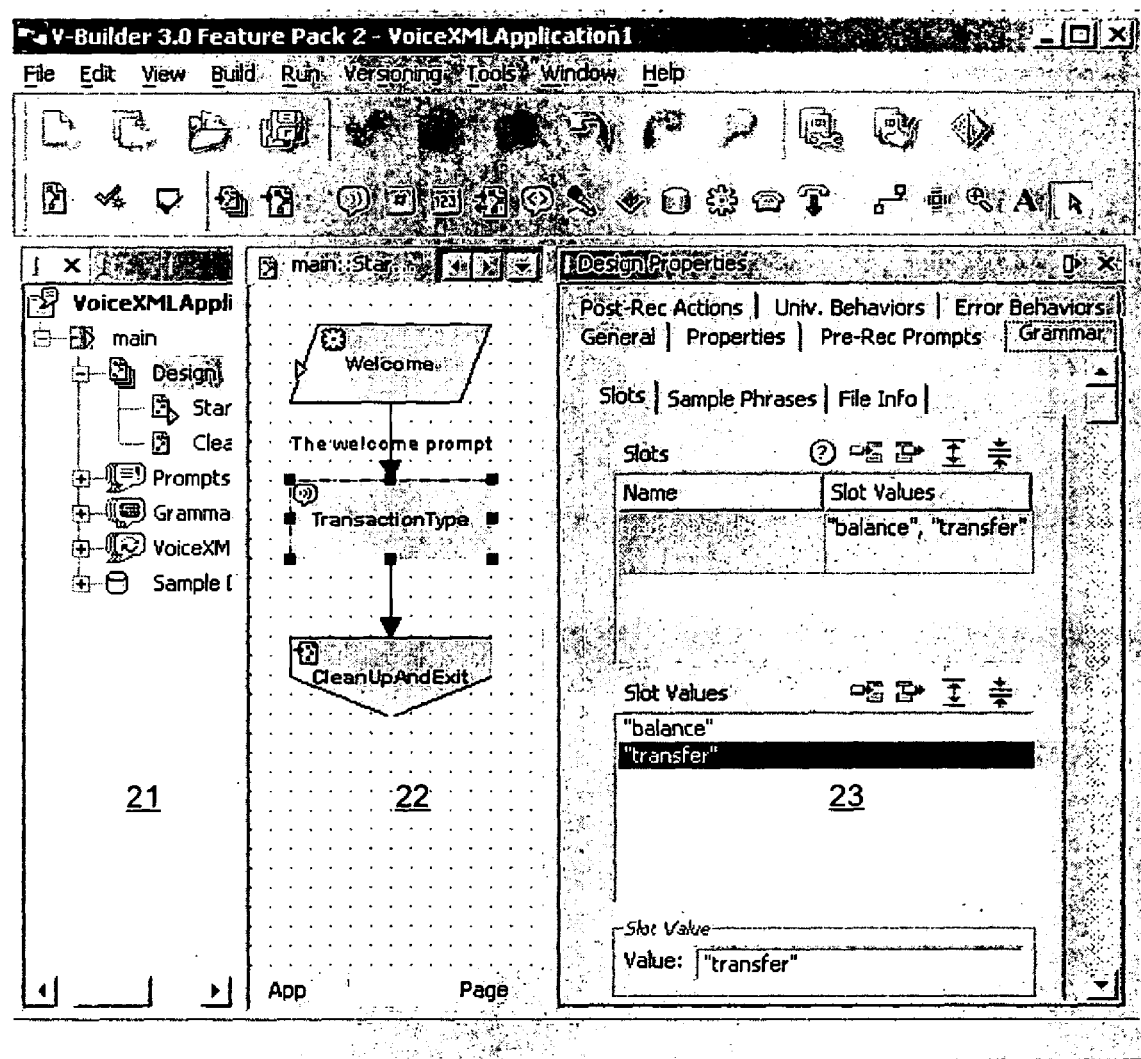

FIGS. 3-3 through 3-5 show examples of application-specific content in a functional specification. In particular, FIG. 3-3 shows an example of a section describing the overall dialog flow of the speech application described in the examples above, as it may appear in a functional specification generated by the tool. As shown, this section includes a graphical representation of the overall dialog flow of the speech application. This graphical representation may be formed by saving the contents of the graphical palette in the GUI as an image (e.g., in JPEG format) and inserting that image into the appropriate place in the functional specification at the time the functional specification is generated.

FIG. 3-4 shows an example of a section in the functional specification which describes the "Welcome" state in FIG. 2-2. Some of the features shown in FIG. 3-4 will typically be boilerplate, such as the table formats and headings and the section headings "Description", "Special Features", "Entry and Exit States", and "Actions". However, the information that is specific to the "Welcome" state in FIG. 2-2, such as the specific description, action and exit state, is taken directly from the user's inputs to the graphical palette and the property sheets for this dialog state, which are shown in FIG. 2-2.

FIG. 3-5 shows an example of a section in the functional specification which describes the "TransactionType" state in FIGS. 2-3 through 2-6. This section includes information from the property sheets of the "TransactionType" state, including the specified pre-recognition prompts, grammar, actions and error behaviors.

Tool Architecture

As indicated above, the tool can be implemented in software, such as in the form of a software application. FIG. 4 illustrates the components of the tool 11 and their functional relationships for such an embodiment. Note, however, that in other embodiments of the invention, any of these functional modules can be implemented purely in hardware (e.g., special-purpose hardwired circuitry) instead of in software.

Referring now to FIG. 4, the tool includes three main functional modules: a design module 41, a Java Architecture for XML Binding (JAXB) module 42 and a code generation/execution module 43 (JAXB is one of the components provided in the Java Web Services Development (JWSDP), as is well-known). Additionally, the tool includes a Session Initiation Protocol (SIP) phone module, through which the user of the tool can provide speech input, for purposes of testing and prototyping a speech application.

The main purpose of the design module 41 is to generate the tool's GUI, aspects of which are described above and illustrated in FIGS. 2-1 through 2-7, and to process user inputs directed to the GUI. The design module 41 uses a framework 44 to generate the basic structure of the property sheets (e.g., tables, buttons, drop-down lists, etc.), which in some embodiments is a Swing (Java based) framework. The framework 44 is an application-independent, platform-independent technique for creating a GUI, given an application-specific, largely declarative specification of the interface.

The main purpose of the JAXB module 42 is to receive from the design module 41 user-specified data specifying the dialog flows and their properties and to convert that data into a format for permanent storage. In particular, the JAXB module 42 generates an XML representation of the speech application in an implementation of XML referred to herein as PS-XML. PS-XML, which is described in detail below, represents the speech application logic in a very flexible XML-based format, that in turn can deliver a dialog specification document, VoiceXML for prototyping, and/or VoiceXML for deployment. The JAXB module 42 converts the application description data into PS-XML according to an XML schema 48 which is described below.

The main purpose of the code generation/execution module 43 is to generate speech recognition grammars and VoiceXML code from the PS-XML and, in response to appropriate user inputs, to execute the grammars and VoiceXML code (e.g., when testing a prototype of the speech application). Accordingly, the code generation/execution module 43 can receive input representing audio input from the SIP phone module 45, for purposes of executing a prototype of the speech application. (In addition to audio input, text input is also permissible, which is useful for testing. The text input can be received via a text box in the GUI.) As indicated above, the VoiceXML code generated by the code generation/execution module is eventually packaged in a WAR file, which can be provided to a voice platform (FIG. 1).

Several functions of the tool make use of Extensible Stylesheet Language Transformations (XSLTs), including generation of VoiceXML code, generation of the functional specification, and generation of grammars from sample phrases. Accordingly, the design module 41 and the code generation/execution module each make use of one or more XSLTs 46 and 47, as shown in FIG. 4 and as described further below. Note that there are ways of transforming XML to other formats besides using XSLTs. For example, this can instead be done with custom Java code. Furthermore, the transformation can be applied to in-memory JAXB objects or to an XML file.

Tool Functionality

The functionality of the tool 11 will now be further described with reference to FIGS. 5 through 11. FIG. 5 shows a process that the tool can implement to convert user-specified data defining the speech application into PS-XML. Note that to simplify description, the process is described for a single displayed object or in-memory object; however, it will be understood that in actual practice this process would typically be applied in the same way concurrently to all of the user-specified objects (dialog states, etc.) that define a speech application.

Initially, user input directed to the GUI is received at 501, for creating or editing an displayed object, such as a dialog state. In response to that input, at 502 the design module 41 creates or edits (as appropriate) in memory a JAXB object of a specific type, corresponding to the displayed object. Subsequently, in response to a user input "save" command (503) (or automatically after a predetermined time interval has elapsed), at 504 the JAXB module 42 generates or modifies a PS-XML file in memory to reflect the created/edited object, according to a defined XML schema 48, and then saves that file to a nonvolatile storage facility (e.g., disk). An example of an XML schema that can be used to generate PS-XML in this process is shown in FIGS. 9-1 through 9-29.

Note that while the embodiment described here uses JAXB to represent the user-defined features of the speech application (dialog flows, etc.), a different kind of schema-based model or models could be used instead of JAXB, or in addition to JAXB, to represent the speech application in other embodiments of the invention. For example, another module could be substituted for the JAXB module 42, to generate a higher-level model of the speech application, e.g., one which enables the design module 41 to manipulate the model at a higher level of abstraction. Such a higher-level model could be designed to "transactionalize" any changes to the PS-XML file, which may provide greater assurance that such changes could be undone or redone. Of course, many other variations in approach are possible.

Figures 2, 3, 4, 5, 6:
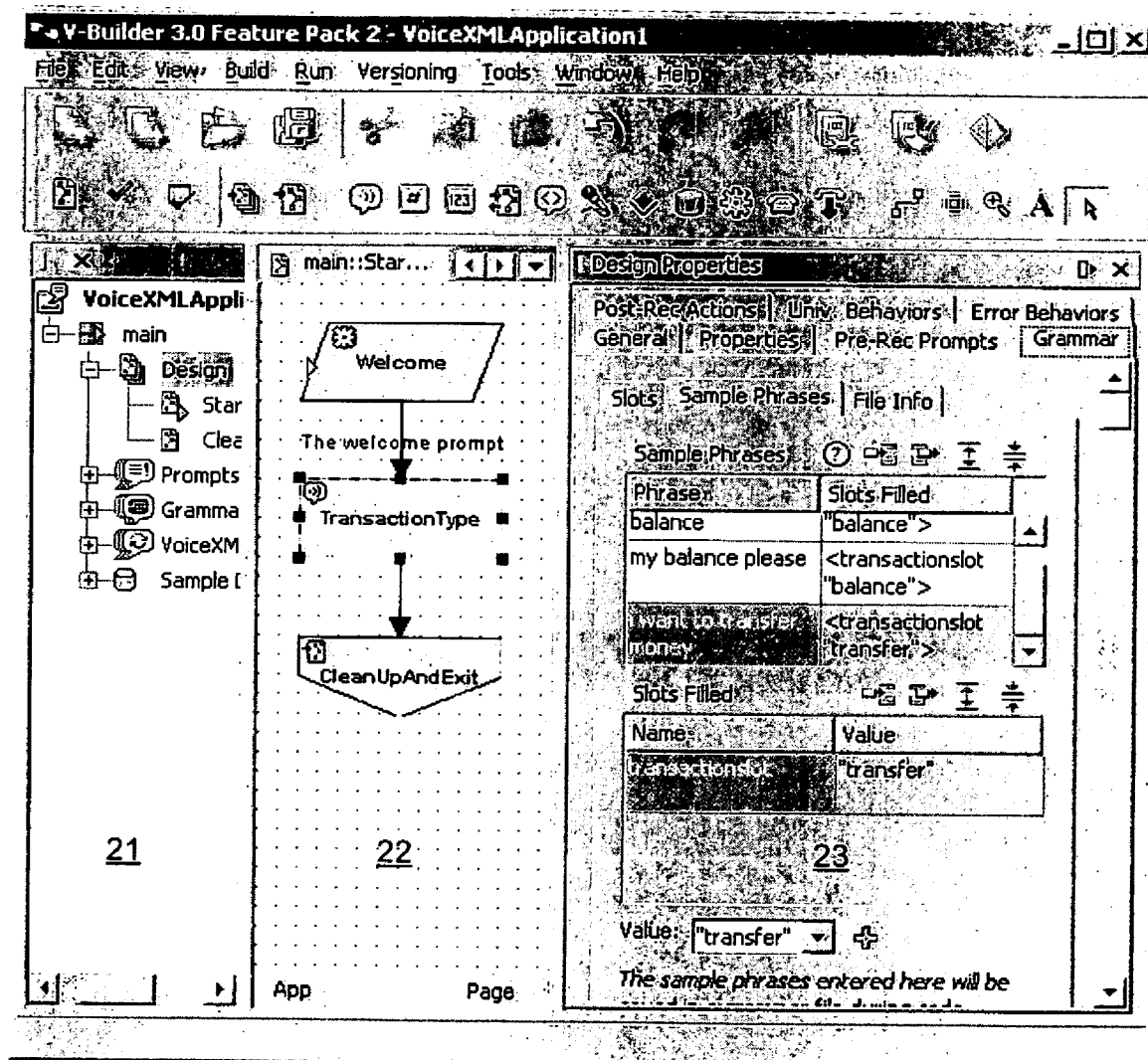

FIG. 6 shows a process that the tool 11 can implement to generate speech application code, such as VoiceXML, from a PS-XML file such as mentioned above. Initially, at 601 the design module 41 receives a user input representing a "generate code" command. This user input may be in the form of the user clicking on a predefined button or selecting a menu item in the GUI, for example. In response to this input, at 602 the design module 41 uses a predefined XSLT to convert the portions of the PS-XML file which contain grammar data (e.g., representing slots and sample phrases) into a file that has a format designed for representing speech recognition grammars, such as Speech Recognition Grammar Specification (SRGS)/GRXML or a proprietary grammar format such as Nuance GSL. At 603 the code generation/execution module 43 uses a predefined XSLT to convert the remainder of the PS-XML file into a VoiceXML file. An example of an XSLT that can be used in this process to generate grammars and VoiceXML code from PS-XML is shown in FIGS. 10-1 through 10-68. The portion which is used to generate a grammar file is shown in FIGS. 10-6 through 10-10.

If the user edits any of the dialog flows after the VoiceXML code is initially generated, those edits will be automatically reflected in revised VoiceXML code in response to the next "generate code" command (or the next automatic code generation event, if applicable).

Figures 2, 3, 4, 5, 6, 7:
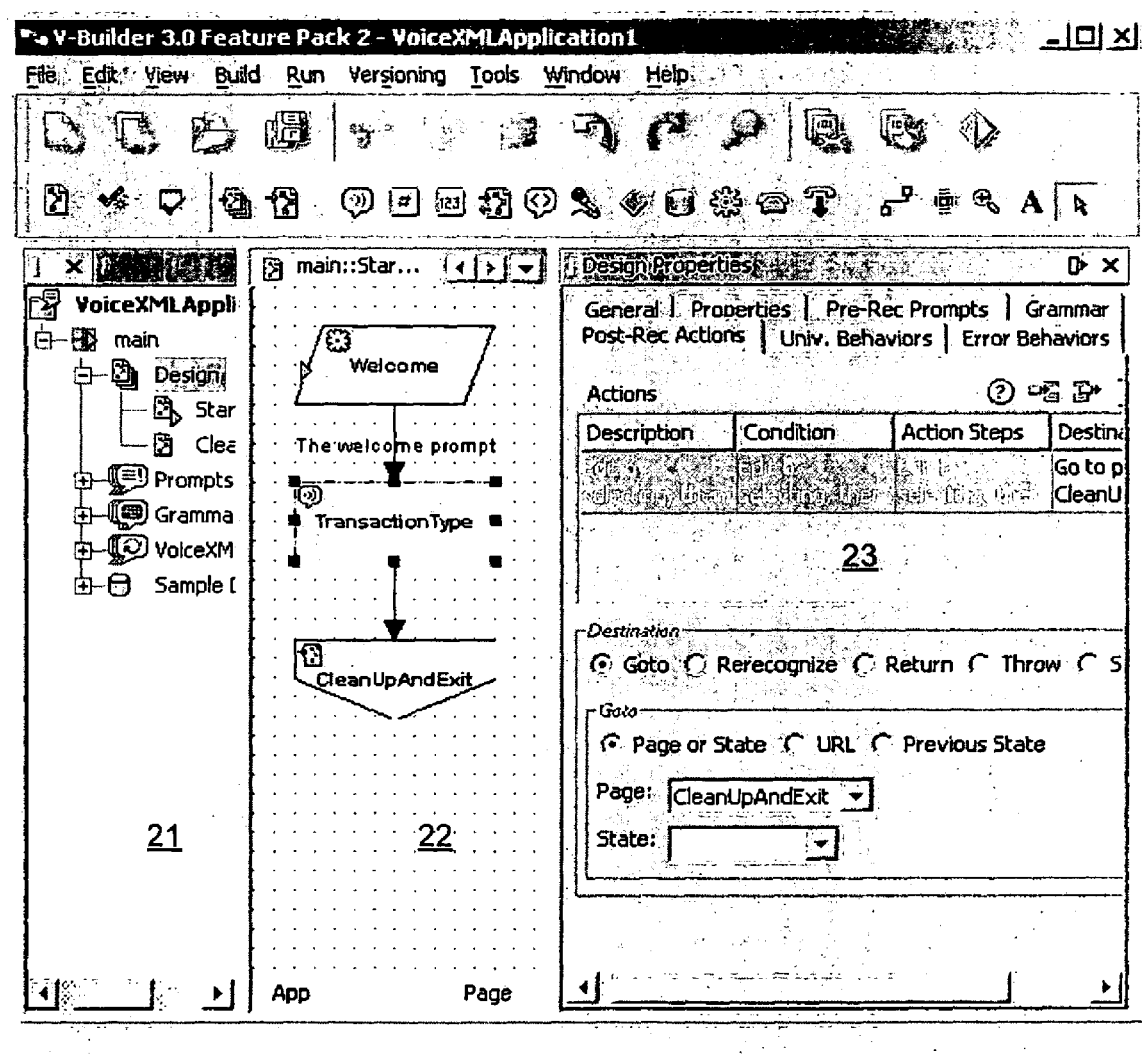
Figure 3:
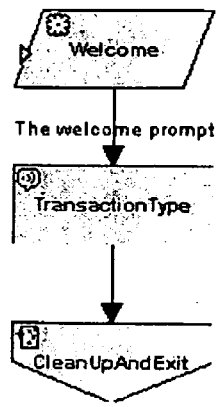
Figure 4:
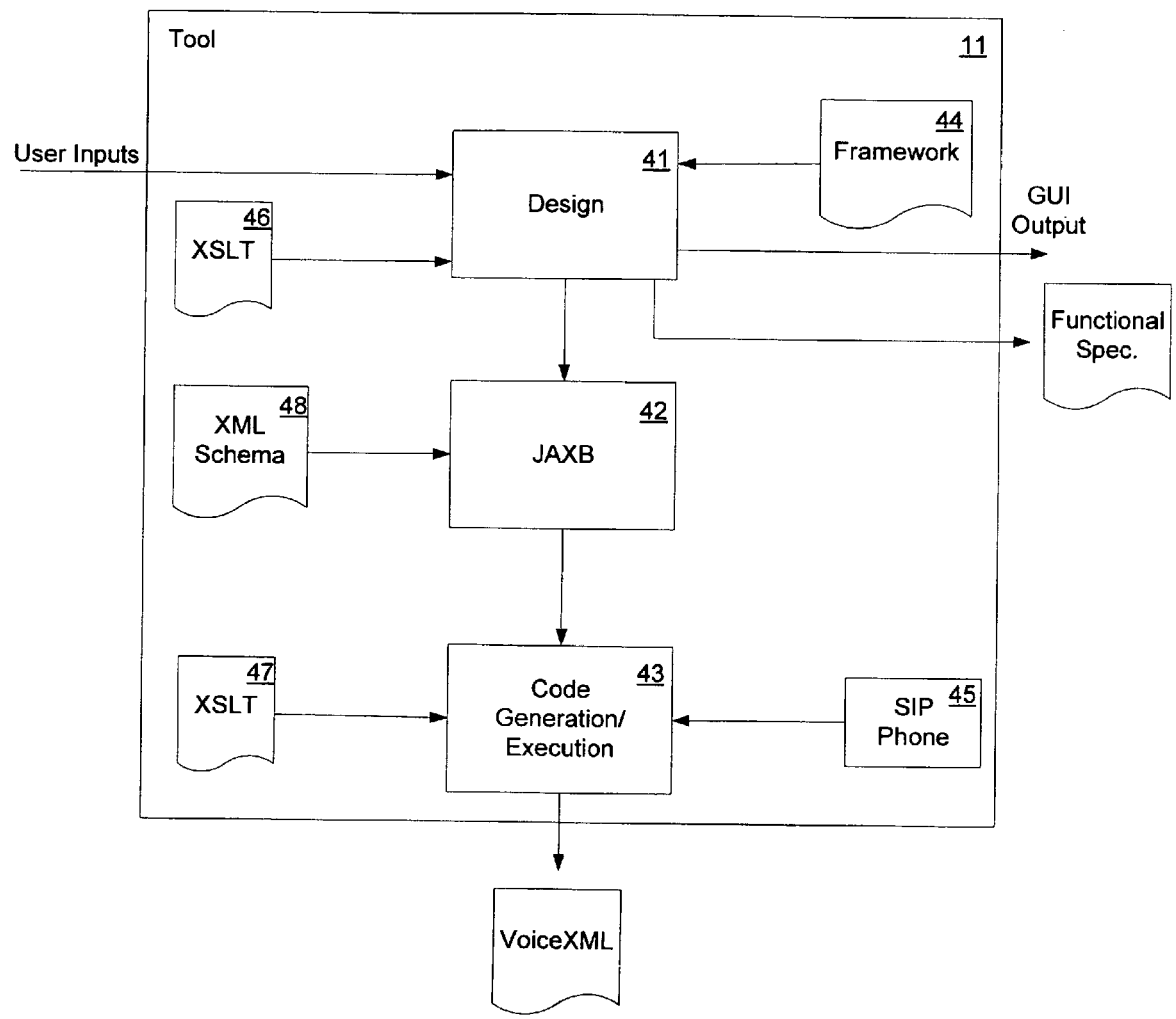
Figure 5:
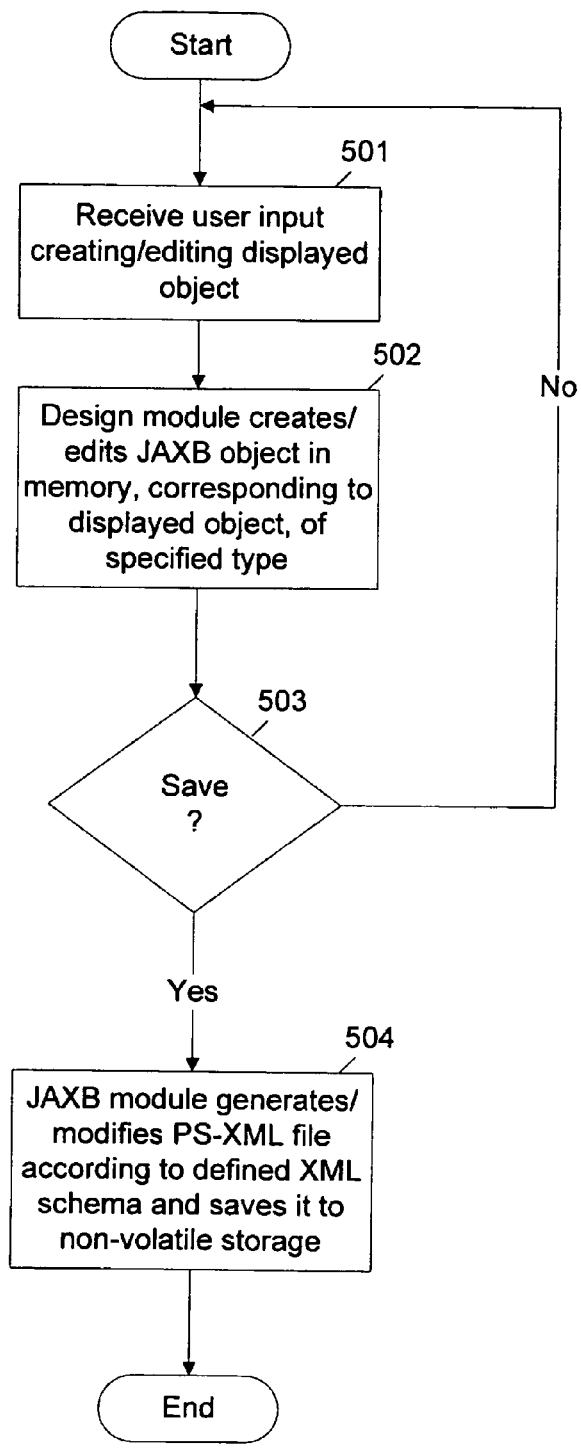
Figure 6:
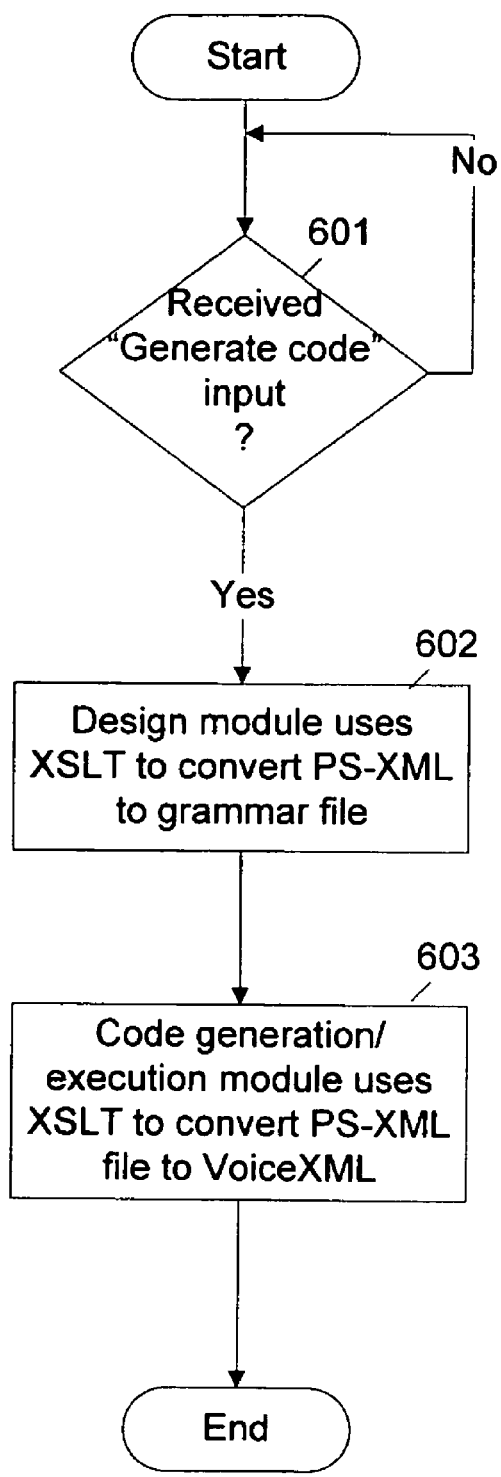
Figure 7:
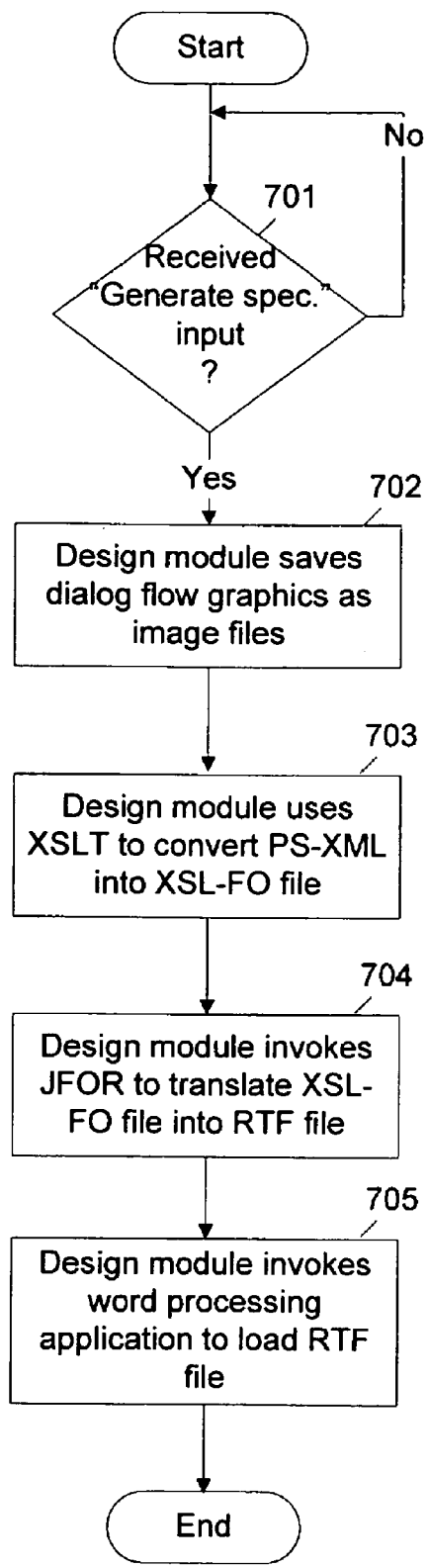

FIG. 7 shows a process that the tool 11 can implement to generate a functional specification of a speech application from a PS-XML file such as mentioned above. Initially, at 701 the design module 41 receives a user input representing a "generate specification" command. This user input may be in the form of the user clicking on a predefined button or selecting a menu item in the GUI, for example. In response to the user input, at 702 the design module 41 saves as image files (e.g., JPEG files) the graphics that represent the various user-defined dialog flows. At 703 the design module 41 uses a predefined XSLT to transform the PS-XML file into an XSL Formatting Objects (XSL-FO) file. An example of an XSLT that can be used in this process to generate such an XSL-FO file from PS-XML is shown in FIGS. 11-1 through 11-93. As part of this transformation, a reference to each image file representing a dialog flow is produced in the XSL-FO file. Next, at 704 the design module 41 translates the XSL-FO file into a Rich text Format (RTF) file. This may be accomplished by using, for example, the JFOR (Java FO to RTF converter) open source library. As part of this action, all of the referenced images are included in the RTF file. At 705 the design module 41 then invokes a word processing application, such as Microsoft Word, to load the RTF file.

If the user edits any of the dialog flows after the functional specification is initially generated, those edits will be automatically reflected in a revised functional specification in response to the next "generate specification" command (or the next automatic specification generation event, if applicable).

PS-XML

As described above, a variation of XML called PS-XML is used as an intermediate format to represent the speech application, prior to converting the speech application into VoiceXML. FIGS. 9-1 through 9-29 show an example of an XML schema for implementing PS-XML. The following is a specification of PS-XML.

1 Overview

PS-XML is a file format for call flow design. A single PS-XML file defines a design. A design consists of multiple pages and some global information. In addition to serving as the backing store of a V-Builder design, the file can be used to generate runtime VoiceXML code, dialog specifications, and prompt lists.

1.1 Goals of PS-XML

PS-XML is not intended to be able to represent any possible VoiceXML dialog. Rather, it is intended to encapsulate good VUI principles, and make it simple to do easy tasks (and provide escape-state callouts for the difficult tasks).

1.2 PS-XML Elements

| Element | Purpose | Section |
|---|---|---|
| <action> | holds a web service declaration with an invocation of that service | 6.1 |
| <application-summary> | documentation element | 2.1.1 |
| <assign> | For assigning ECMAScript expressions to variables | 5.2.1 |

-continued

| Element | Purpose | Section |
|---|---|---|
| <audio-file-expr> | A dynamic reference to a prompt file | 4.1.2 |
| <audio-file-ref> | A static reference to a prompt file | 4.1.1 |
| <audio-value-expr> | A dynamic reference to a playable entity | 4.2.3 |
| <bounds> | Defines bounds for visual graph representation of a state | 9 |
| <business-rule> | (unused) | — |
| <container-declarations> | A collection of variables, properties, and scripts that are scoped to a container. | 2.2 |
| <cti-end-session> | end CTI session | 6.2 |
| <cti-extract> | retrieves variable from CTI server to app server | 6.2 |
| <cti-insert> | pushes variable from the app server to CTI server | 6.2 |
| <cti-interaction> | top level CTI element | 6.2 |
| <cti-new-session> | begin CTI session | 6.2 |
| <cti-query-session> | obtain the command/destination from the CTI server | 6.2 |
| <cti-transfer> | (unused) | 6.2 |
| <data-access> | top level web service interaction element | 6.1 |
| <decision-state> | Dialog state used for branching logic. | 3.1 |
| <designer-arg> | (unused) | — |
| <developer> | documentation element | 2.1.1 |
| <dialog-action> | A unit of executable content, consisting of a condition, action steps, and a destination. | 5 |
| <dtmf-audio> | Prompt segment that plays a dtmf sequence | 4.1.4 |
| <dtmf-state> | Dialog state used for a DTMF menu. | 3.2 |
| <enum> | for enumerating possible values | 6.1.2 |
| <error-behavior> | Catches an event thrown by the platform, or by a <throw> element | 7.4 |
| <escape-state> | Dialog state used for calling out to raw VoiceXML code. | 3.3 |
| <expr> | (unused) | — |
| <generic-container> | A collection of states that have their own variable scope and are rendered as a page in the call flow. | 2.2 |
| <global-information> | Stores documentation for the project, as well as application-scoped variables, properties, error behaviors, and universals. | 2.1 |
| <goto> | Transitions to another state, page, or URL | 5.3.1 |
| <grammar> | Reference to a grammar file or built-in grammar | 7.2.3 |
| <graphics> | Defines visual graph representation of a state | 9 |
| <inputs> | for passing arguments when invoking a web service | 6.1.2 |
| <lhs> | A component of a Boolean <term> or of an <assign> expression | 5.1 |
| <log> | For logging information to trace logs or call logs | 5.2.2 |
| <nbest> | For adding n-best processing to a recognition state | 7.2.3 |
| <operation> | Selects an operation to use in the associated web service | 6.1.1 |
| <output> | for passing arguments when invoking a <subdialog-state> or <escape-state> | 3.3 |
| <outputs> | for passing arguments when invoking a web service | 6.1.2 |
| <param> | for passing arguments when invoking a <subdialog-state> or <escape-state> | 3.3 |
| <persona> | documentation element | 2.1.1 |
| <post-recognition> | Set of dialog actions to perform before transitioning to another state | 7.3 |
| <pre-recognition> | Set of prompts to select from before performing an interactive step | 7.1 |
| <processing-state> | Dialog state for running non-interactive elements. | 3.4 |
| <project> | The root element of a design file. | 2 |
| <prompt> | Plays a prompt. | 4 |
| <property> | Sets a recognition property (see NVP reference for list of available properties) | 8.3 |
| <recognition-state> | Dialog state for performing a recognition. | 3.5 |
| <record-state> | Dialog state for collecting a recorded utterance. | 3.6 |
| <repeat> | Goes back to the top of the current state | 5.3.2 |
| <return> | Returns control back from a subdialog to the parent dialog | 5.3.3 |
| <revision> | documentation element | 2.1.1 |
| <revision-history> | documentation element | 2.1.1 |
| <rhs> | A component of a Boolean <term> or of an <assign> expression | 5.1 |
| <sample-expression> | Maps an <utterance> to a <slot-expression> | 7.2.2 |
| <say-as> | Plays a dynamically rendered string as TTS. Optionally, a type can be applied (e.g. "date", "number: ordinal", etc) | 4.1.5 |
| <script> | For executing blocks of ECMAScript | 5.2.4 |
| <send> | Posts information to a URL without causing a page transition | 5.2.5 |
| <server-side-error> | Exception thrown by the application server. | 2.1.3 |
| <service> | declaration of a web service URL | 6.1.1 |
| <service-template> | (unused) | — |
| <silence> | Prompt segment for playing back silence. | 4.1.6 |
| <simple> | a single argument when invoking a web service | 6.1.2 |
| <simple-expression> | A Boolean condition broken down into its individual <term>s | 5.1 |
| <slot> | Variable filled by a recognition event | 7.2.1 |
| <slot-expression> | Semantic interpretation of an utterance | 7.2.2 |
| <subdialog-state> | Dialog state for calling out to another design. | 3.7 |
| <taskbegin> | Writes specific data to the call logs which signal tasks that can be tracked in Management Station reports for their success rate. | 5.2.6 |
| <taskend> | Writes specific data to the call logs which signal tasks that can be tracked in Management Station reports for their success rate. | 5.2.6 |

-continued

| Element | Purpose | Section |
|---|---|---|
| <term> | A component of a Boolean expression. | 5.1 |
| <terminate-state> | Dialog state for terminating execution. | 3.8 |
| <throw> | Throws an event. The event can be the name of a universal behavior, an error, or a user-specified event. | 5.3.4 |
| <transfer-state> | Dialog state for performing a telephony transfer. | 3.9 |
| <tts> | Plays a static string rendered as TTS. | 4.1.7 |
| <universal> | Declaration of a universal behavior type. | 2.1.2 |
| <universal-behavior> | Catches an event generated by speaking a trigger phrase during a recognition event | 7.5 |
| <users> | documentation element | 2.1.1 |
| <utterance> | An example of something said by a caller. | 7.2.2 |
| <vaf-state> | Dialog state for processing that occurs on the application server. | 3.10 |
| <vaf-variable> | (unused) | 8.2 |
| <variable> | Declares an ECMAScript variable | 8.1 |

1.3 Subdialogs

A subdialog is a mechanism for reusing designs. An entire PS-XML file (along with its associated prompts, grammars, etc.) can be invoked using a subdialog-state. For example, you might write a subdialog for collecting payment information. This dialog could be reused whether you're paying for a plane ticket or a rental car. In reality, any PS-XML design file can be used as a subdialog. One of them is special, only because it is the initial dialog when executing your project.

2 Document Structure

The root element of a PS-XML document is the <project> element.

| <project> | | |
|---|---|---|
| Attributes | version | the PS-XML specification version |
| Parents | (none) | |
| Children | <global-information>, <generic-container> | |

2.1 Global Information

Every <project> contains a single <global-information>, which is used to store documentation for the project, as well as application-scoped variables, properties, error behaviors, and universals.

| <global-Information> | | |
|---|---|---|
| Attributes | name | the name of the design |
| | customer | the customer for whom the app is created |
| | partner | the integrator |
| | company-name | the name to appear on the front page of the dialog specification |
| | application-version | for versioning the design |
| | initial-container | the name of the <generic-container> to be visited first |
| | xml:lang | the language identifier (RFC3066) that serves as the default for this design |
| Parents | <project> | |
| Children | <application-summary>, <developer>, <property>, <variable>, <vaf-variable>, <script>, <universal>, <universal-behavior>, <error-behavior>, <revision-history>, <server-side-error> | |

Documentation Elements

These elements are used mainly to annotate the dialog specification.

| <application-summary> | |
|---|---|
| Attributes | none |
| Parents | <global-information> |
| Children | <description>, <users>, <persona> |

| <users> | |
|---|---|
| Attributes | none |
| Parents | <application-summary> |
| Children | <description> |

| <persona> | |
|---|---|
| Attributes | none |
| Parents | <application-summary> |
| Children | <description> |

| <developer> | | |
|---|---|---|
| Attributes | name | The name of the author |
| Parents | <global-information> | |
| Children | none | |

| <revision-history> | |
|---|---|
| Attributes | none |
| Parents | <global-information> |
| Children | <description>, <revision> |

| <revision> | | |
|---|---|---|
| Attributes | number | for ordering the revisions |
| | date | the date of the revision |
| | author | the author of the revision |
| | notes | freeform notes for the revision |
| Parents | <revision-history> | |
| Children | none | |

Custom Universals

There exists a set of standard, built-in universal behaviors: exit, help, main menu, operator, repeat, and cancel (go back). A PS-XML document can specify additional universal grammar types through the use of the <universal> element.

| <universal> | | |
|---|---|---|
| Attributes | type | the name of the universal type |
| Parents | <global-information> | |
| Children | <description>, <utterance> | |

Server-Side Errors

V-Server is configured to transition to an error page if exceptions are thrown while performing some operation on the application server.

| <server-side-error> | | |
|---|---|---|
| Attributes | type | The java exception that triggers this error behavior |
| | page | The container to transition to. Must specify this or url. |
| | url | A URL to transition to. Must specify this or page. |
| Parents | <global-information> | |
| Children | none | |

2.2 Containers

Aside from global information, a project is made up of containers, which are represented graphically as pages. In this version of PS-XML, there is only one type of container, called <generic-container>.

| <generic-container> | | |
|---|---|---|
| Attributes | name | the name of the page |
| | id | unique identifier for the page |
| | initial-state | the entry point for the page |
| | lang | for overriding the default language specified in <project>'s xml:lang attribute |
| Parents | <project> | |
| Children | <description>, <container-declarations>, <decision-state>, <dtmf-state>, <escape-state>, <processing-state>, <recognition-state>, <record-state>, <subdialog-state>, <terminate-state>, <transfer-state>, <vaf-state> | |

Variables, properties, and scripts that are scoped to the container go into <container-declarations>.

| <container-declarations> | |
|---|---|
| Attributes | none |
| Parents | <generic-container> |
| Children | <variable>, <property>, <script> |

3. States
3.1 Decision State

Decision states are used purely for branching logic.

| <decision-state> | | |
|---|---|---|
| Attributes | name | the state's name |
| Parents | <generic-container> | |
| Children | <description>, <special>, <graphics>, <dialog-action> | |

3.2 DTMF State

DTMF states act as touch tone menus. They map dtmf input sequences with state or page destinations.

| <dtmf-state> | | |
|---|---|---|
| Attributes | name | the state's name |
| | timeout | DTMF termination timeout |
| | termkeys | DTMF termination keys |
| Parents | <generic-container> | |
| Children | <description>, <special>, <graphics>, <property>, <pre-recognition>, <universal-behavior>, <error-behavior>, <dialog-action> | |

3.3 Escape State

Escape states provide a way to call out to hand-written VoiceXML code. Implemented via the VoiceXML <subdialog> element.

| <escape-state> | | |
|---|---|---|
| Attributes | name | the state's name |
| | src | the VoiceXML file to invoke, relative to the project's dialogs/directory |
| Parents | <generic-container> | |
| Children | <description>, <special>, <graphics>, <param>, <output>, <post-recognition>, <error-behavior> | |

Input parameters are passed into the subdialog call using the <param> element. The parameter's name must be declared as a form-level variable in the VoiceXML page being called.

| <param> | | |
|---|---|---|
| Attributes | name | The parameter name |
| | expr | ECMAScript expression, for the value to set |
| | expr-gen | (unused) |
| Parents | <subdialog-state>, <escape-state> | |
| Children | none | |

Outputs returned (using the <return> VoiceXML element) can be mapped to PS-XML global variables using the <output> element.

| <output> | | |
|---|---|---|
| Attributes | src | The name of the variable being returned |
| | dest | The global variable to fill |
| Parents | <subdialog-state>, <escape-state> | |
| Children | none | |

3.4 Processing State

Processing states perform non-recognition functions. Any "executable" tags can go here.

| <processing-state> | | |
|---|---|---|
| Attributes | name | the state's name |
| Parents | <generic-container> | |
| Children | <description>, <special>, <graphics>, <dialog-action> | |

3.5 Recognition State

Recognition states perform a single recognition, along with associated universal and error behaviors.

| <recognition-state> | | |
|---|---|---|
| Attributes | name | the state's name |
| Parents | <generic-container> | |
| Children | <description>, <special>, <graphics>, <property>, <pre-recognition>, <slot>, <sample-expression>, <grammar>, <nbest>, <post-recognition>, <universal-behavior>, <error-behavior> | |

3.6 Record State

Record states gather a recording.

| <record-state> | | |
|---|---|---|
| Attributes | name | the state's name |
| | type | the MIME type of the recording (unused) |
| | beep | If true, a tone is emitted just prior to recording. Defaults to false. |
| | maxtime | The maximum duration to record (in milliseconds). |
| | finalsilence | The interval of silence that indicates end of speech (milliseconds). |
| | dtmfterm | If true, any DTMF keypress not matched by an active grammar will be treated as a match of an active (anonymous) local DTMF grammar. Defaults to true. |
| | destexpr | A URL to post the recording to. |
| | destexpr-gen | (unused) |
| Parents | <generic-container> | |
| Children | <description>, <special>, <graphics>, <dialog-action> | |

3.7 Subdialog State

Subdialog states are similar to escape states, but they invoke another design, rather than a hand-written VoiceXML page.

| <subdialog-state> | | |
|---|---|---|
| Attributes | name | the state's name |
| | container | the design to invoke |
| Parents | <generic-container> | |
| Children | <description>, <special>, <graphics>, <param>, <output>, <post-recognition>, <error-behavior> | |

3.8 Terminate State

Terminate states are exit points from the application. They also allow executable content to be run after the hangup, before the application exits.

| <terminate-state> | | |
|---|---|---|
| Attributes | name | the state's name |
| Parents | <generic-container> | |
| Children | <description>, <special>, <graphics>, <dialog-action> | |

3.9 Transfer State

Transfer states are used for telephony transfers. Blind and conditional transfers are supported.

| <transfer-state> | | |
|---|---|---|
| Attributes | name | the state's name |
| | destexpr | An ECMAScript expression yielding the URI of the destination (telephone, IP telephony address) |
| | destexpr-gen | (unused) |
| | connecttimeout | The time to wait while trying to connect the call before returning the noanswer condition (milliseconds). |
| | maxtime | The time that the call is allowed to last, or 0 if no limit is imposed. |
| | transferaudio | The URI of audio source to play while the transfer attempt is in progress (before far-end answer). |

| <transfer-state> (continued) | | |
|---|---|---|
| | aaiexpr | (unused) |
| | aaiexpr-gen | (unused) |
| | type | blind or conditional |
| | localuriexpr | The localuriexpr attribute is a Nuance extension that specifies an ECMAScript expression that evaluates to the local URI to use on a transfer attempt. |
| | localuriexpr-gen | (unused) |
| | farenddialog | The dialog to run in the case of a conditional transfer |
| | warningtime | (unused) |
| | warningaudio | (unused) |
| | devicedetection | (unused) |
| Parents | <generic-container> | |
| Children | <description>, <special>, <graphics>, <utterance>, <property>, <pre-recognition>, <grammar>, <post-recognition>, <error-behavior> | |

3.10 VAF State

VAF states are made up of data access and CTI transactions occurring on the application server.

| <vaf-state> | | |
|---|---|---|
| Attributes | name | the state's name |
| Parents | <generic-container> | |
| Children | <description>, <special>, <graphics>, <audio-file-ref>, <data-access>, <cti-interaction>, <business-rule>, <dialog-action> | |

4. Prompts

Prompts can occur as executable content (see section 5), or as rows in the pre-recognition table. Some attributes only make sense in the context of the pre-recognition table (type, previous-type, previous-item, count). <prompt> is a conditional element.

A prompt can be expressed in two different ways: simple or concatenated. A simple prompt consists of a single static reference to a filename. filename.prompt is a text file containing the transcript and recording instructions for this prompt. filename.wav is a binary audio file containing the prompt itself. Since a designer may refer to prompts that have yet to be recorded, the .wav file is optional: a prompt reference is primarily a reference to the prompt file. A simple prompt will have a src attribute for the location of the single prompt segment.

A concatenated prompt can specify a list of prompt elements (tts strings, expression values, dynamically resolved prompt filenames, etc) that are to be concatenated together. A concatenated prompt will have a set of "segment" children (audio-file-ref, audio-file-expr, audio-value-expr, dtmf-audio, say-as, silence, tts).

| <prompt> | | |
|---|---|---|
| Attributes | bargein | Affects a caller's ability to interrupt audio contained within a prompt. If the bargein attribute is set to true (the default), any speech or DTMF detected during the prompt will stop prompt playback and immediately proceed to recognition or recording. If the bargein attribute is set to false, user input is ignored until the prompt is complete. |
| | bargeintype | One of "speech" (system detects user input), or "hotword" (system receives a valid semantic interpretation from the recognition engine). The default is "speech". |
| | flavour | One of "simple" or "concatenated". |
| | type | The type attribute only makes sense in the context of a pre-recognition prompt. A value of "initial" indicates a prompt to play when the state is entered for the first time. A value of "reentry" indicates a prompt to play on subsequent visits to the state. There may be more than one reentry prompt, with different count attributes. A value of "previous" indicates a prompt to play if this state was transitioned to from a particular page or state, based on the values of the attributes previous-type and previous-item. |
| | previous-type | One of "page" or "state". |
| | previous-item | The name of the previous page or state which would cause this prompt to be played. |
| | condition | An ECMAScript expression, which, if true, would allow this prompt to be played. |
| | count | For prompts of type "reentry", this indicates the number of time this state needs to be reentered to trigger this prompt. |
| | timeout | The timeout attribute allows you to specify the number of milliseconds of allowed user silence after a prompt is played. If the user does not speak within the specified amount of time, a "noinput" event is thrown. The <prompt> element's timeout attribute takes precedence over any timeout value specified within a property. |
| | lang | Specifies the language in which to speak a TTS rendition of this prompt. A TTS engine must be available running this language. |
| | src | The location of the prompt file, relative to the design's prompts/ directory. The value of this attribute should not include a file extension: V-Builder appends .prompt and .wav to this value in order to find the relevant files. |
| Parents | <dialog-action>, <pre-recognition> | |
| Children | <simple-expression>, <audio-file-ref>, <audio-file-expr>, <audio-value-expr>, <dtmf-audio>, <say-as>, <silence>, <tts> | |

4.1 Prompt Segments

Audio-File-Ref

A static reference to a prompt file. These can occur either within a prompt, or as a child of <send> and <vaf-state>, where it is used to specify latency audio.

| <audio-file-ref> | | |
|---|---|---|
| Attributes | name | The location of the prompt file, relative to the design's prompts/directory. The value of this attribute should not include a file extension: V-Builder appends .prompt and .wav to this value in order to find the relevant files. |
| Parents | <prompt>, <send>, <vaf-state> | |
| Children | none | |

Audio-File-Expr

A dynamic reference to a prompt file. It has an optional <tts> child which specifies an alternate TTS string to be played if the file can not be found.

| <audio-file-expr> | | |
|---|---|---|
| Attributes | expr | ECMAScript expression. Resolved to the location of the prompt file, relative to the design's prompts/directory. |
| | expr-gen | (unused) |
| | offsetexpr | ECMAScript expression. Resolves to the number of milliseconds into the prompt where playback should begin. |
| | offsetexpr-gen | (unused) |
| Parents | <prompt> | |
| Children | <tts> | |

Audio-Value-Expr

A dynamic reference to a playable entity. This can be a URL, a variable containing a recorded utterance (from a <record-state>), a dtmf sequence (e.g. "dtmf:123"), or even an ECMAScript array of these items.

It has an optional <tts> child which specifies an alternate TTS string to be played if the file can not be found.

| <audio-value-expr> | | |
|---|---|---|
| Attributes | expr | ECMAScript expression. Resolved to the item to be played. |
| | expr-gen | (unused) |
| | offsetexpr | ECMAScript expression. Resolves to the number of milliseconds into the prompt where playback should begin. |

<audio-value-expr>

| | | |
|---|---|---|
| | offsetexpr-gen | (unused) |
| Parents | <prompt> | |
| Children | <tts> | |

Dtmf-Audio

Plays back a dtmf sequence.

<dtmf-audio>

| | | |
|---|---|---|
| Attributes | expr | ECMAScript expression. Resolved to the dtmf sequence to be played. |
| | expr-gen | (unused) |
| Parents | <prompt> | |
| Children | none | |

Say-as

Plays a dynamically rendered string as text-to-speech. Optionally, a type can be applied (e.g. "date", "number:ordinal", etc).

<say-as>

| | | |
|---|---|---|
| Attributes | expr | ECMAScript expression. Resolved to the TTS string to be spoken. |
| | expr-gen | (unused) |
| | type | The "say-as" category to be applied to the TTS expression. |
| Parents | <prompt> | |
| Children | none | |

Silence

<silence>

| | | |
|---|---|---|
| Attributes | msecs | Duration in milliseconds |
| Parents | <prompt> | |
| Children | none | |

TTS

A static string to be rendered as text-to-speech.

<tts>

| | |
|---|---|
| Attributes | none |
| Parents | <prompt> |
| Children | PCDATA |

5. Executable Elements

Executable content is made up of a set of dialog actions. A dialog action has three components: a condition under which it is executed; a set of action steps such as ECMAScript operations, logging, and playing prompts; and a destination, which can be a target state, target page, or an event to throw. Conditions are expressed differently in different state types. For most states, the condition is an ECMAScript expression. For vaf-states, the condition is evaluated in the struts rules engine, so the expression is java/drools. For dtmf-states, the condition is a simple dtmf sequence (e.g. "123").
Action steps all map to VoiceXML executable content. Therefore, they do not make any semantic sense inside a vaf-state, which executes on the application server. There are also no action steps in dtmf-states, for simplicity's sake.

<dialog-action>

| | | |
|---|---|---|
| Attributes | id | unique id for this graph transition |
| | target-id | id of the target state |
| | condition | If this expression evaluates to false, the dialog-action will not execute |
| Parents | <decision-state>, <dtmf-state>, <error-behavior>, <post-recognition>, <processing-state>, <terminate-state>, <universal-behavior>, <vaf-state> | |
| Children | <simple-expression>, <description>, <graphics>, <assign>, <log>, <prompt>, <script>, <send>, <taskbegin>, <taskend>, <goto>, <repeat>, <return>, <throw> | |

5.1 Conditions

<dialog-action>, <prompt> and <taskend> are conditional elements. A conditional element has a condition attribute that stores the complete expression used at runtime, as well as a <simple-expression> child element that stores the breakdown of each term in the boolean expression. The <simple-expression> element is important for loading the "condition builder" grid representation of the expression.

<simple-expression>

| | |
|---|---|
| Attributes | none |
| Parents | <dialog-action>, <prompt> |
| Children | <term> |

<term>

| | | |
|---|---|---|
| Attributes | firstrow | (Boolean) true if this is the first term in the expression |
| | booleanop | values are "and", "or", and "n/a" |
| | op | values are "==", "<", "<=", ">=", ">", "!=" |
| Parents | <simple-expression> | |
| Children | <lhs>, <rhs> | |

The <lhs> (left hand side) and <rhs> (right hand side) elements:

<lhs>, <rhs>

| | | |
|---|---|---|
| Attributes | advanced | (Boolean) true if this expression is advanced (default: true) |
| | category | The expression category (String, Constant, App variable, etc) |
| | expr | The user-friendly expression term (e.g., SlotA) |
| | expr-gen | The generated code for the expression term (e.g., lastresult$.interpretation.SlotA) |
| Parents | <assign>, <term> | |
| Children | none | |

5.2 Action Steps

Assign

For assigning ECMAScript expressions to variables.

<assign>

| | |
|---|---|
| Attributes | none |
| Parents | <dialog-action> |
| Children | <description>, <lhs>, <rhs> |

Log
For logging information to trace logs or call logs.

| <log> | | |
|---|---|---|
| Attributes | label | The destination log to write to (see VoiceXML <log> element) |
| | expr | The ECMAScript expression to log. |
| | expr-gen | (unused) |
| Parents | <dialog-action> | |
| Children | none | |

Prompt
For playing prompts (see section 4).

Script
For executing blocks of ECMAScript. Can be used in <container-declarations> and <global-information> for declaring scoped functions.

| <script> | | |
|---|---|---|
| Attributes | src | Loads an external javascript file (relative to the design's dialogs/directory). Must specify one of 'src' or an inline body. |
| | charset | Specifies the character set of external script specified in the src attribute. |
| Parents | <dialog-action>, <container-declarations>, <global-information>, <nbest> | |
| Children | PCDATA | |

Send
Posts information to a URL without causing a page transition. The <audio-file-ref> child element is used as latency audio.

| <send> | | |
|---|---|---|
| Attributes | destexpr | ECMAScript expression resolving to the target URL. |
| | enctype | One of "application/x-www-form-urlencoded" (the default), "multipart/form-data", or "application/octet-stream". |
| | method | One of "get" (the default) or "post". |
| | namelist | List of variables to pass. |
| Parents | <dialog-action> | |
| Children | <audio-file-ref> | |

Tasks
Tasks are a special case of the <log> element. They write specific data to the call logs which signal tasks that can be tracked in Management Station reports for their success rate. <taskend> is a conditional element.

| <taskbegin> | | |
|---|---|---|
| Attributes | name | The name of the task. |
| Parents | <dialog-action> | |
| Children | none | |

| <taskend> | | |
|---|---|---|
| Attributes | name | The name of the task (must match corresponding name in <taskbegin> element). |
| | condition | Boolean ECMAScript expression. If this evaluates to true, the task is considered successful. |
| | reasonexpr | ECMAScript expression. Evaluates to a string which is given as the reason for failure, if the task fails. |
| | reasonexpr-gen | (unused) |
| Parents | <dialog-action> | |
| Children | <simple-expression> | |

5.3 Destinations

Goto
Transitions to another state, page, or URL. No more than one of the three attributes may be specified. If no attribute is specified, the browser will interpret this as going "nowhere", and execution will cease.

| <goto> | | |
|---|---|---|
| Attributes | state | The name of a state in the current page. |
| | container | The name of a page in the current design. |
| | Url | A fully-qualified URL to a VoiceXML page. |
| Parents | <dialog-action> | |
| Children | none | |

Repeat
Goes back to the top of the current state.

| <repeat> | | |
|---|---|---|
| Attributes | reprompt | If true, the pre-recognition prompt will be replayed before waiting on the next response. |
| Parents | <dialog-action> | |
| Children | none | |

Return
Only valid inside a subdialog. Returns control back to the parent dialog.

| <return> | | |
|---|---|---|
| Attributes | flavour | One of "namelist" or "throw". If "namelist", it will return the values of all application-scoped variables in the design. If "throw" it will return to the parent dialog, then throw event based on the other attributes. |
| | eventexpr | ECMAScript expression. Evaluates to the name of the event to throw. |
| | eventexpr-gen | (unused) |
| | messageexpr | ECMAScript expression. Evaluates to the message included with the thrown event. |
| | messageexpr-gen | (unused) |
| Parents | <dialog-action> | |
| Children | none | |

Throw
Throws an event. The event can be the name of a universal behavior, an error, or a user-specified event.

| <throw> | | |
|---|---|---|
| Attributes | eventexpr | ECMAScript expression. Evaluates to the name of the event to throw. |
| | eventexpr-gen | (unused) |
| | messageexpr | ECMAScript expression. Evaluates to the message included with the thrown event. |
| | messageexpr-gen | (unused) |

| <throw> | |
|---|---|
| Parents | <dialog-action> |
| Children | none |

6. Application Server Processing

The vaf-state contains all processing that occurs outside the VoiceXML browser. These can be web service transactions (<data-access>), CTI interactions (<cti-interaction>), or the execution of business rules (<business-rule>, unused in this version).

6.1 Data Access

Data access is implemented as a pointer to a web service, arguments to pass into that web service, and variables mapped to the outputs.

| <data-access> | |
|---|---|
| Attributes | none |
| Parents | <vaf-state> |
| Children | <action> |

| <action> | |
|---|---|
| Attributes | none |
| Parents | <data-access> |
| Children | <description>, <service>, <operation>, <inputs>, <outputs> |

Service Declaration

<service> fully defines the web service operation to perform.

| <service> | | |
|---|---|---|
| Attributes | flavour | One of "prototype" or "production" |
| | name | unique id assigned to this service |
| | uri | Location of the WSDL file |
| | qname | QName of the service to use |
| | port | Web service port to use |
| Parents | <action> | |
| Children | <description> | |

| <operation> | | |
|---|---|---|
| Attributes | name | Name of the operation to use in the associated service |
| Parents | <action> | |
| Children | none | |

Service Invocation

| <inputs>, <outputs> | |
|---|---|
| Attributes | none |
| Parents | <action> |
| Children | <simple> |

| <simple> | | |
|---|---|---|
| Attributes | name | The web service parameter name |
| | value | value to map to the web service parameter |
| | value-gen | (unused) |
| | type | the argument's data type (e.g. "string") |
| Parents | <inputs>, <outputs> | |
| Children | <description>, <enum> | |

| <enum> | | |
|---|---|---|
| Attributes | value | one of the enumerated possible values |
| Parents | <simple> | |
| Children | none | |

6.2 CTI

The CTI elements correspond precisely to the schema of the resulting cti-config.xml file.

| <cti-interaction> | | |
|---|---|---|
| Attributes | name | unique name for this interaction |
| | cti-info | (unused) |
| Parents | <vaf-state> | |
| Children | <description>, <cti-new-session>, <cti-insert>, <cti-extract>, <cti-end-session>, <cti-query-session>, <cti-transfer> | |

| <cti-new-session> | | |
|---|---|---|
| Attributes | dialed-number | script name |
| Parents | <cti-interaction> | |
| Children | <description> | |

| <cti-insert> | | |
|---|---|---|
| Attributes | vafsrc | app server variable to push into the cti context |
| | ctidest | name of the cti variable to fill |
| | description | description string |
| Parents | <cti-interaction> | |
| Children | none | |

| <cti-extract> | | |
|---|---|---|
| Attributes | ctisrc | name of the cti variable to fetch |
| | vafdest | app server variable to fill |
| | description | description string |
| Parents | <cti-interaction> | |
| Children | none | |

| <cti-end-session> | | |
|---|---|---|
| Attributes | reason | one of "cause-normal" or "cause-connected" |
| Parents | <cti-interaction> | |
| Children | none | |

| <cti-query-session> | | |
|---|---|---|
| Attributes | status | always set to "none" in this version |
| | ced | (unused) |
| Parents | <cti-interaction> | |
| Children | none | |

| <cti-transfer> | | |
|---|---|---|
| Attributes | type | one of "fast" or "consultation" |
| | destination | |
| | location | |
| Parents | <cti-interaction> | |
| Children | none | |

7. Recognition Flow

7.1 Pre-Recognition

The pre-recognition section consists of a set of prompts. Only the first one whose conditions are met is played. The conditions are a combination of looking at the prompt type (initial, reentry, previous), and any ECMAScript condition associated with the prompt.

| <pre-recognition> | |
|---|---|
| Attributes | none |
| Parents | <dtmf-state>, <recognition-state>, <record-state>, <transfer-state> |
| Children | <description>, <prompt> |

7.2 Grammars

Slots

A slot is a variable filled by the recognition. They remain in scope until the next recognition event.

| <slot> | | |
|---|---|---|
| Attributes | name | variable name |
| Parents | <dtmf-state>, <recognition-state>, <record-state>, <transfer-state> | |
| Children | <description>, <enum> | |

Sample Phrases

Sample phrases are used to give an idea of what kinds of expressions should be expected by the grammar. Used primarily for documentation purposes. They can also be used to generate stub or starter grammars.

A sample expression maps an utterance to a slot expression. The utterance is what is said by the caller. The slot expression is the semantic interpretation of that utterance.

| <sample-expression> | | |
|---|---|---|
| Attributes | none | |
| Parents | <recognition-state> | |
| Children | <utterance>, <slot-expression> | |

| <utterance> | | |
|---|---|---|
| Attributes | none | |
| Parents | <sample-expression>, <transfer-state>, <universal> | |
| Children | PCDATA | |

| <slot-expression> | | |
|---|---|---|
| Attributes | name | slot name |
| | value | value to give the slot |
| Parents | <sample-expression> | |
| Children | none | |

Grammar File

| <grammar> | | |
|---|---|---|
| Attributes | top-rule | Name of the public rule to use (optional) |
| | src | Path to the grammar file, relative to the design's grammars/directory; or, the name of the built-in grammar |
| | flavour | One of "grammar file" or "built-in grammar" |
| | lang | (not used) |
| Parents | <recognition-state>, <transfer-state> | |
| Children | <description> | |

| <nbest> | | |
|---|---|---|
| Attributes | enabled | Use n-besting |
| | maxnbest | The maximum size of the application.lastresult$ array. |
| Parents | <recognition-state> | |
| Children | <script> | |

7.3 Post-Recognition

Set of dialog actions to perform before transitioning to another state.

| <post-recognition> | | |
|---|---|---|
| Attributes | enabled | Use n-besting |
| | maxnbest | The maximum size of the application.lastresult$ array. |
| Parents | <escape-state>, <recognition-state>, <record-state>, <subdialog-state>, <transfer-state> | |
| Children | <description>, <dialog-action> | |

7.4 Error Behaviors

Error behaviors are used for catching events thrown by the platform. These include recognition errors, disconnection events, or events thrown with a <throw> element.

Behaviors can be declared in three scopes: locally (in an interactive state), globally (in <global-information>), or hybrid. Hybrid behaviors have components in both scopes, with the same global-id attribute. The order of execution is:

Action steps from the globally scoped portion
Action steps from the locally scoped portion
Destination from the globally scoped portion

| <error-behavior> | | |
|---|---|---|
| Attributes | type | name of the event to catch |
| | scope | One of "Global", "Local", or "Hybrid" |
| | global-id | correlates between globally-scoped and locally-scoped error behaviors |
| | enabled | (unused) |
| | expanded | used when serializing/deserializing the design file to enable certain runtime consistency checks |
| | count | specifies the minimum number of specified event occurrences that must take place before the handler is executed |
| Parents | <dtmf-state>, <escape-state>, <global-information>, <recognition-state>, <record-state>, <subdialog-state>, <transfer-state> | |
| Children | <dialog-action> | |

7.5 Universal Behaviors

Universal behaviors are like error behaviors, with a grammar component. The event is triggered by the caller speaking the grammar during a recognition event, rather than in response to some condition generated by the platform.

| <universal-behavior> | | |
|---|---|---|
| Attributes | type | name of the universal |
| | scope | One of "Global", "Local", or "Hybrid" |
| | global-id | correlates between globally-scoped and locally-scoped error behaviors |
| | enabled | If false, the grammar is disabled. |
| | expanded | used when serializing/deserializing the design file to enable certain runtime consistency checks |
| Parents | <dtmf-state>, <global-information>, <recognition-state> | |
| Children | <dialog-action> | |

8. Variables and Properties 8.1 Variables

Standard ECMAScript variables can be declared with the <variable> element in two scopes: application (global), or page (container).

| <variable> | | |
|---|---|---|
| Attributes | name | Name of the variable |
| | value | Initial value for the variable |
| | value-gen | (unused) |
| Parents | <global-information>, <container-declarations> | |
| Children | <description>, <enum> | |

8.2 VAF Variables (unused)

8.3 Properties

Properties can be set at any scope (application, page, state). The list of available properties can be found in the NVP reference documentation, in the VoiceXML reference, under "VoiceXML properties".

| <property> | | |
|---|---|---|
| Attributes | name | Name of the property |
| | value | value to assign to this property |
| Parents | <container-declarations>, <dtmf-state>, <global-information>, <recognition-state>, <record-state>, <transfer-state> | |
| Children | <description> | |

Universal Weights

When the JIT request is created in a recognition state, the universals are put in parallel with the "main" grammar for that state. By default they all have the same weight or probability. We use universal weights to control the probabilities of the universal grammars relative to the main grammar, the weight of which is always 1.0.

The weights can be set at all three scopes: at the app level, the page level, as well as the state level.

| <universal-weight> | | |
|---|---|---|
| Attributes | Name | Name of the property |
| | Value | value to assign to this property (a float between 0 and 1) |
| Parents | <container-declarations>, <dtmf-state>, <global-information>, <recognition-state>, <record-state>, <transfer-state> | |
| Children | None | |

9. Visual Elements

The <graphics> and <bounds> elements are used as clues to the GUI for drawing the states in the graph representation.

| <graphics> | | |
|---|---|---|
| Attributes | None | |
| Parents | <dialog-action>, <decision-state>, <dtmf-state>, <escape-state>, <processing-state>, <recognition-state>, <record-state>, <subdialog-state>, <terminate-state>, <transfer-state>, <vaf-state> | |
| Children | <bounds> | |

| <bounds> | | |
|---|---|---|
| Attributes | x | x-dimension of the top-left of the state |
| | y | y-dimension of the top-left of the state |
| | width | width of the state cell tag |
| | width | width of the state cell tag |
| | height | height of the state cell tag |
| Parents | <graphics> | |
| Children | none | |

Figure 8:
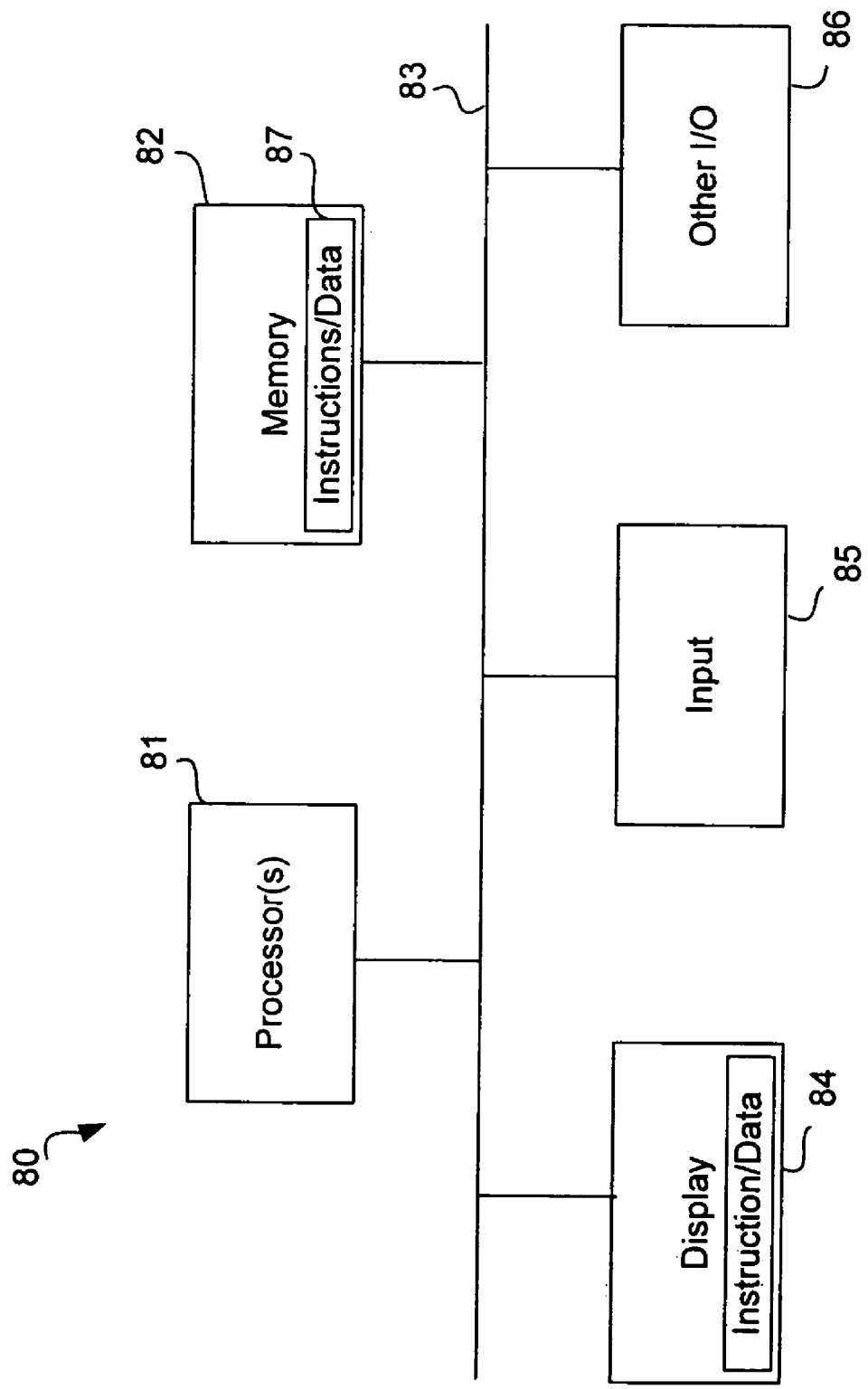
FIG. 8 is a high-level block diagram of a computer system on which the tool described above can execute.

FIG. 8 is a high-level block diagram of a computer system on which the tool described above can execute. The computer system 80 includes one or more processors 81 and memory 82 coupled to a bus system 83. The bus system 83 is an abstraction that represents any one or more separate physical buses and/or point-to-point connections, connected by appropriate bridges, adapters and/or controllers. The bus system 83, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 81 are the central processing units (CPUs) of the computer system 80 and, thus, control its overall operation. In certain embodiments, the processors 81 accomplish this by executing software stored in memory 82. Such processor 81 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 82 can store software 87 which embodies or implements the tool described above. Memory 82 represents the main memory of the computer system 80 as well as any secondary information storage facilities, such as disk drives, tape drives, etc. Hence, memory 82 may represent and/or include any of various forms of random access memory (RAM), read-only memory (ROM), flash memory, magnetic disks, optical disks, etc.

Also connected to the processors 81 through the bus system 83 are one or more display devices 84, input devices 85 and other input/output (I/O) devices 86. The display device(s) 84 may include, for example, a liquid crystal display (LCD) device, a cathode ray tube (CRT) display device, plasma display device, etc. The input device(s) 85 may include, for example, one or more of a mouse, trackball, joystick, keyboard, microphone, etc. The other I/O device(s) 86 may include, for example, an audio speaker, a network adapter, a telephony interface, etc.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Thus, a tool for creating, prototyping and editing speech applications has been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A machine-implemented method of building a speech application, the method comprising:
    generating a graphical user interface to enable a user to create and edit a speech application;
    receiving user inputs directed to the graphical user interface, the user inputs specifying a set of dialog flows representing the speech application; and
    based on the user inputs, automatically generating:
        executable code representing the speech application and a functional specification document describing the speech application;

wherein the functional specification document is written in a natural language and comprises, for each dialog flow in said set of dialog flows, an image file representing said dialog flow;

wherein each of the dialog flows includes one or more dialog states; and wherein the user interface comprises:
a first display area in which to display a user-specified flow of each of the dialog flows; and
a second display area in which to display property sheets, in which the user can specify properties of the dialog states of the dialog flows, said property sheets including input fields, which the user can (a) input data to and (b) edit.

2. A method as recited in claim 1, wherein the functional specification document is platform-independent.

3. A method as recited in claim 1, wherein automatically generating the functional specification document comprises:
automatically invoking a word processing application; and
automatically creating and editing the functional specification document in the word processing application, in response to said user inputs specifying the set of dialog flows representing the speech application.

4. A method as recited in claim 1, further comprising:
receiving user inputs specifying a modification to one of the dialog flows, and in response thereto,
automatically making a corresponding modification to the functional specification document to reflect the modification to said one of the dialog flows.

5. A method as recited in claim 1, further comprising:
receiving user inputs specifying a modification to one of the dialog flows, and in response thereto,
automatically making a corresponding modification to the executable code representing the speech application.

6. A method as recited in claim 1, further comprising:
executing one of the dialog flows in response to a user input before construction of the speech application has been completed.

7. A method as recited in claim 1, wherein the specified properties include prompts, grammars and actions to be taken, for each of a plurality of dialog states.

8. A method as recited in claim 1, further comprising:
receiving user inputs, directed to the second display area, specifying a plurality of sample phrases for one of the dialog states, and in response thereto,
automatically creating a grammar for said one of the dialog states, based on the plurality of sample phrases.

9. A computer-implemented tool for building a speech application, the tool comprising:
a code generation module to generate executable code of the speech application in response to user inputs to a graphical user interface, the user inputs specifying a set of dialog flows to be executed by the speech application, the code generation module further to execute any of the dialog flows; and
a design module to generate a functional specification document describing the speech application based on said user inputs, wherein the functional specification document is written in a natural language and comprises, for each dialog flow in said set of dialog flows, an image file representing said dialog flow;
wherein the graphical user interface enables a user, for each of a plurality of dialog states, (a) to specify properties of dialog states of the dialog flows, including prompts, grammars and actions to be taken and (b) to edit properties of the dialog states by any of (i) the user inputting data to input fields and editing the input fields.

10. A tool as recited in claim 9, wherein the design module is to:
automatically invoke a word processing application; and
automatically create and edit the functional specification document in the word processing application, in response to said user inputs specifying the set of dialog flows to be executed by the speech application.

11. A tool as recited in claim 10, wherein the design module further is to automatically make a modification to the functional specification document in response to user inputs specifying a corresponding modification to the speech application.

12. A tool as recited in claim 10, wherein the design module further is to automatically make a modification to the executable code of the speech application in response to user inputs specifying a corresponding modification to the speech application.

13. A tool as recited in claim 9, wherein the functional specification document is platform-independent.

14. A tool as recited in claim 9, wherein the code generation module further is capable of executing one of the dialog flows in response to a user input before construction of the speech application has been completed.

15. A tool as recited in claim 9, wherein:
the design module further is to receive user inputs specifying a plurality of sample phrases for one of the dialog states, and in response thereto,
the code generation module further is to create automatically a grammar for said one of the dialog states, based on the plurality of sample phrases.

16. A computer-implemented tool for building a speech application, the tool comprising:
a design module to generate a functional specification document describing the speech application based on user inputs specifying a set of dialog flows to be executed by the speech application, wherein the functional specification document is written in a natural language and comprises, for each dialog flow in the set of dialog flows, an image file representing said dialog flow;
wherein the design module includes;
a property sheet generation module to generate a set of property sheets for each of the dialog flows, and
a document generation module to generate the functional specification document;
a framework based on which to generate a graphical user interface, the graphical user interface including
a first display area in which to display a flow of each of the dialog flows specified by the user inputs, and
a second display area, displayed concurrently with the first display area, in which to display property sheets, in which the user can specify and edit properties of dialog states of the dialog flows, wherein the property sheets include input fields, which the user can (a) input data to and (b) edit;
a binding module to provide a model for each of a plurality of types of objects relating to dialog flow design, including dialog states, and to create in-memory objects representing the dialog flows of the speech application, based on the models, in response to said user inputs; and
a code generation module to generate executable code of the speech application, based on the in-memory objects, based on said user inputs, and to execute any of the dialog flows.

17. A tool as recited in claim 16, wherein the design module is to:
automatically invoke a word processing application; and automatically create and edit the functional specification document in the word processing application, in response to said user inputs specifying the set of dialog flows to be executed by the speech application.

18. A tool as recited in claim 16, wherein the design module further is to automatically make a modification to the functional specification document in response to user inputs specifying a corresponding modification to the speech application.

19. A tool as recited in claim 16, wherein the design module further is to automatically make a modification to the executable code of the speech application in response to user inputs specifying a corresponding modification to the speech application.

20. A tool as recited in claim 16, wherein the binding module is to create an XML based representation of the dialog flows, and wherein the code generation module is to use an extensible style sheet transformation (XSLT) to convert the XML based representation of the dialog flows into a VoiceXML based encoding of the speech application.

21. A tool as recited in claim 16, wherein the functional specification document is platform-independent.

22. A tool as recited in claim 16, wherein the code generation module further is to execute one of the dialog flows in response to a user input before construction of the speech application has been completed.

23. A tool as recited in claim 16, wherein the properties which the user can specify include prompts, grammars and actions to be taken, for each of a plurality of dialog states.

24. A tool as recited in claim 16, wherein:
the design module further is to receive user inputs, directed to the second display area, specifying a plurality of sample phrases for one of the dialog states, and in response thereto,
the code generation module further is to create automatically a grammar for said one of the dialog states, based on the plurality of sample phrases.

25. A machine-accessible storage medium storing instructions which, when executed by a processing system, cause the processing system to perform a process that comprises:
generating a graphical user interface, using which a user can create and edit a set of dialog flows to be executed by the speech application, wherein the graphical user interface contains property sheets of the dialog states to enable the user to specify and edit properties of the dialog states, wherein the property sheets include input fields, which the user can (a) input data to and (b) edit;
receiving user inputs which specify the set of dialog flows to be executed by the speech application; and
based on the user inputs, automatically generating
executable code of the speech application, and
a functional specification document describing the speech application, wherein the functional specification document is written in a natural language and comprises, for each dialog flow in said set of dialog flows, an image file representing said dialog flow.

26. A method of enabling a user to create and edit a speech application, the method comprising:
causing a first display area to be displayed on a display device, the first display area to enable a user to graphically specify a dialog flow for the speech application and to contain a graphical representation of the dialog flow, wherein the dialog flow includes one or more dialog states, each represented by a separate symbol; and
causing a second display area to be displayed on the display device concurrently with and adjacent to the first display area, the second display area to contain property sheets of the dialog states, to enable the user to specify and edit properties of the dialog states, wherein the property sheets include input fields, which the user can (a) input data to and (b) edit;
receiving a user input selecting a particular dialog state of the dialog flow in the first display area;
in response to the user input, displaying within the second display area property sheets of the particular dialog state, while displaying the graphical representation of the dialog flow in the first display area; and
in response to another user input, saving the graphical representation of the dialog flow in an image file and including said image file in a functional specification document that is written in a natural language.

27. A method as recited in claim 26, wherein the properties of the dialog states which the user can specify include prompts, grammars and actions to be taken, for each of a plurality of dialog states.

\* \* \* \* \*